United States Patent
Pettinger et al.

(10) Patent No.: US 12,353,214 B2
(45) Date of Patent: Jul. 8, 2025

(54) VEHICLE CONTROL SYSTEM AND CONTROL METHOD

(71) Applicant: JAGUAR LAND ROVER LIMITED, Warwickshire (GB)

(72) Inventors: David Pettinger, Coventry (GB); Daniel Woolliscroft, Coventry (GB); Mostafa Taie, Coventry (GB); Max Nalborczyk, Coventry (GB); David Torres, Coventry (GB); Qian Lu, Coventry (GB); Shyam Mohandas, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 691 days.

(21) Appl. No.: 16/970,219

(22) PCT Filed: Dec. 18, 2018

(86) PCT No.: PCT/EP2018/085430
§ 371 (c)(1),
(2) Date: Aug. 14, 2020

(87) PCT Pub. No.: WO2019/158261
PCT Pub. Date: Aug. 22, 2019

(65) Prior Publication Data
US 2021/0080967 A1 Mar. 18, 2021

(30) Foreign Application Priority Data

Feb. 15, 2018 (GB) .......................... 1802475
Aug. 10, 2018 (GB) .......................... 1813040

(51) Int. Cl.
*G05D 1/00* (2024.01)
*B60W 60/00* (2020.01)

(52) U.S. Cl.
CPC ......... *G05D 1/0221* (2013.01); *G05D 1/0061* (2013.01); *B60W 60/0053* (2020.02)

(58) Field of Classification Search
None
See application file for complete search history.

(56) References Cited

U.S. PATENT DOCUMENTS

2009/0260907 A1 10/2009 Moshchuk et al.
2013/0231824 A1 9/2013 Wilson et al.
(Continued)

FOREIGN PATENT DOCUMENTS

DE 102013015348 A1 4/2014
EP 3115272 A1 1/2017
(Continued)

OTHER PUBLICATIONS

Combined Search and Examination Report under Sections 17 and 18(3) for Application No. GB1813040.1 dated Feb. 11, 2019.
(Continued)

*Primary Examiner* — Jaime Figueroa
*Assistant Examiner* — Jerrod Irvin Davis
(74) *Attorney, Agent, or Firm* — Carlson, Gaskey & Olds, P.C.

(57) ABSTRACT

Embodiments of the present invention provide a control system (100). The control system (100) is for a host vehicle (10) operable in an autonomous mode and a non-autonomous mode. The control system (100) comprises one or more controllers (110). The control system (100) is configured to receive, when operating in a non-autonomous mode, a mode signal and environment data. The mode signal is indicative of the host vehicle (10) operating in a training mode. The environment data is indicative of a sensed environment of the host vehicle (10) during a first manoeuvre by the host vehicle (10) from a first location to a first
(Continued)

navigation goal. In the training mode, the one or more controllers (110) identify a navigable area and output vehicle control data. The navigable area is in a vicinity of the first manoeuvre and is suitable to contain a plurality of possible navigation paths for subsequent navigation of the host vehicle (10), operating in an autonomous mode, to a second navigation goal within the navigable area. The second navigation goal is different to the first navigation goal. The navigable area is identified in dependence on the environment data. The vehicle control data is indicative of the navigable area. When subsequently navigating to the second navigation goal in the autonomous mode, the control system (100) utilises the vehicle control data to autonomously control the host vehicle (10).

17 Claims, 33 Drawing Sheets

(56) References Cited

U.S. PATENT DOCUMENTS

| | | | |
|---|---|---|---|
| 2016/0264132 A1* | 9/2016 | Paul | B60W 10/04 |
| 2017/0197618 A1 | 7/2017 | Ali et al. | |
| 2017/0329331 A1* | 11/2017 | Gao | B60W 50/14 |
| 2018/0194344 A1* | 7/2018 | Wang | G05D 1/0236 |
| 2018/0246515 A1* | 8/2018 | Iwama | G05B 13/0265 |
| 2019/0025842 A1* | 1/2019 | Kim | G05D 1/0276 |
| 2019/0143992 A1* | 5/2019 | Sohn | G05D 1/0088 |
| | | | 701/23 |

FOREIGN PATENT DOCUMENTS

| | | | | |
|---|---|---|---|---|
| EP | 3381758 A1 * | 10/2018 | | B60W 50/14 |
| WO | 2015/039726 A1 | 3/2015 | | |
| WO | 2018/162459 A1 | 3/2018 | | |

OTHER PUBLICATIONS

International Search Report for International application No. PCT/EP2018/085430 dated May 14, 2019.
Volkswagen, Sep. 11, 2015, CES 2015—Trained Parking I Volkswagen, Youtube.com, [online], Available from: https:/ /www.youtube.com/watch?v=ymMOhxBdEb Y, Accessed Aug. 2, 2019.
Daniel Bonnighausen, Apr. 2, 2018, Nissan Leaf(2018) ProPilot & ProPilot Park, Youtube.com, [online], Avalable from: https://www.youtube.com/watch?v=eWe5E5cC3-A, Accessed Aug. 2, 2019.

* cited by examiner

VEHICLE CONTROL SYSTEM AND CONTROL METHOD

TECHNICAL FIELD

The present disclosure relates to a vehicle control system and control method and particularly, but not exclusively, to a control system and a method for controlling the vehicle. Aspects of the invention relate to a control system, to a system, to a method, to a vehicle and to computer software.

BACKGROUND

It is known for a vehicle to navigate itself along a predetermined path by recording the control inputs from a user of the vehicle and replaying the control inputs during subsequent navigation of the vehicle along the predetermined path. It is also known for a vehicle to navigate along the predetermined path in a reverse direction by simply following the predetermined bath in a reverse direction, i.e. reversing. In environments containing several possible navigation destinations, it is necessary to perform manual navigation of the vehicle at least to or from each of the possible navigation destinations, which can take time.

It is an object of embodiments of the invention to at least mitigate one or more of the problems of the prior art.

SUMMARY OF THE INVENTION

Aspects and embodiments of the invention provide a control system, a system, a method, a vehicle, computer software and a storage medium as claimed in the appended claims.
Second Navigation Goal from First Manoeuvre According to an aspect of the invention, there is provided a control system for a host vehicle arranged to operably cause the host vehicle, operating in an autonomous mode, to autonomously navigate to a second navigation goal, different to a first navigation goal, utilising vehicle control data. The vehicle control data may be determined in dependence on a sensed environment of the host vehicle during a first manoeuvre by the host vehicle to the first navigation goal.

According to an aspect of the invention, there is provided a control system for a host vehicle operable in an autonomous mode and a non-autonomous mode. The control system comprises one or more controllers. The control system is configured to receive, when operating in a non-autonomous mode, a mode signal indicative of a host vehicle operating in a training mode, and environment data indicative of a sensed environment of the host vehicle during a first manoeuvre by the host vehicle from a first location to a first navigation goal. In the training mode, the one or more controllers identify a navigable area in a vicinity of the first manoeuvre in dependence on the environment data. The navigable area is suitable to contain a plurality of possible navigation paths for subsequent navigation of the host vehicle, operating in an autonomous mode, to a second navigation goal within the navigable area. The second navigation goal is different to the first navigation goal. In the training mode, the one or more controllers output vehicle control data indicative of the navigable area. When subsequently navigating to the second navigation goal in the autonomous mode, the control system utilises the vehicle control data to autonomously control the host vehicle. Advantageously, following manoeuvring of the host vehicle to the first navigation goal, when operating in the autonomous mode, the host vehicle can autonomously navigate to the second navigation goal along any of the plurality of possible navigation paths without needing to previously manoeuvre to the second navigation goal.

The one or more controllers may collectively comprise at least one electronic processor having an electrical input for receiving the mode signal and the environment data, and at least one electronic memory device electrically coupled to the at least one electronic processor and having instructions stored therein. The at least one electronic processor may be configured to access the at least one memory device and execute the instructions thereon so as to utilise the vehicle control data to autonomously navigate to the second navigation goal. The at least one electronic processor may have an electrical output for outputting the vehicle control data.

A start location associated with the plurality of possible navigation paths may be the first navigation goal. Thus, subsequent to manoeuvring to the first navigation goal, the host vehicle, operating in the autonomous mode, can navigate autonomously away from the first navigation goal.

A location of the second navigation goal may substantially correspond to a navigation waypoint during the first manoeuvre from the first location to the first navigation goal. A location of the second navigation goal may substantially correspond to the first location. Advantageously, subsequent to manoeuvring to the first navigation goal, the host vehicle, operating in the autonomous mode, can navigate autonomously back to the first location. In some embodiments, subsequent to manoeuvring to the first navigation goal, the host vehicle, operating in the autonomous mode, can navigate autonomously from the location associated with the first navigation goal to the start location of the first navigation goal.

The environment data may be indicative of the sensed environment of the host vehicle proximal to the host vehicle during the first manoeuvre. Advantageously, the environment in proximity of the host vehicle can be sensed during the first manoeuvre to identify the navigable area.

The environment data may be indicative of the sensed environment of the host vehicle at a rear of the host vehicle during the first manoeuvre. The environment data may be indicative of the sensed environment of the host vehicle generally rearward of the rear of the host vehicle during the first manoeuvre. Advantageously, the host vehicle may be configured to identity the navigable area based on data indicative of the sensed environment at or rearwardly from the rear of the host vehicle during the first manoeuvre. In other words, the host vehicle can collect data for subsequent autonomous navigation of at least a portion of the route of the first manoeuvre in reverse during the first manoeuvre.

The environment data may be indicative of the sensed environment of the host vehicle at or generally forward of a front of the host vehicle during the first manoeuvre. Advantageously, the host vehicle can collect data for subsequent autonomous navigation of at least a portion of the route of the first manoeuvre during the first manoeuvre.

The control system may be configured to receive, when operating in the autonomous mode, a goal signal indicative of the second navigation goal. In the autonomous mode, the one or more controllers may determine the navigation path in dependence on the navigable area and the goal signal and output a navigation signal to cause the host vehicle to navigate autonomously to the second navigation goal along the determined navigation path. Advantageously, the control system can determine the navigation path through the navigable area utilising the second navigation goal. Thus, the host vehicle can operate in an autonomous mode and manoeuvre autonomously through the navigable area to the second navigation goal subsequent to identification of the navigable area based on the first manoeuvre of the host vehicle.

During the first manoeuvre, the host vehicle may be steered to the navigation goal in dependence on a steering control input by a user of the host vehicle. During the first manoeuvre, an acceleration and/or braking of the host vehicle may be controlled in dependence on an acceleration control input and/or braking control input by the user of the host vehicle.

In the determined navigation path, the host vehicle may be to arrive forwardly at the second navigation goal. Alternatively, the host vehicle may be to arrive rearwardly at the second navigation goal.

The determined navigation path may comprise a turn manoeuvre. Advantageously, the control system can utilise the vehicle control data to cause the host vehicle to arrive at the second navigation goal in a desired orientation, even where the desired orientation requires the host vehicle to complete a turn manoeuvre. The turn manoeuvre may comprise a U-turn. The turn manoeuvre may comprise a multi-point turn, for example a three-point turn. The turn manoeuvre may comprise a reverse turn. The turn manoeuvre may comprise a turn of a driving direction of the host vehicle by substantially 180 degrees.

The control system may be configured to output a notification signal to cause output of a user notification for notifying a user of the host vehicle of an availability of autonomous navigation of the host vehicle to the second navigation goal. The one or more controllers may cause the control system to output the notification signal in dependence on the navigable area. Advantageously, the user can be notified that autonomous navigation of the host vehicle to the second navigation signal is available. The notification signal may be output during operation of the host vehicle in the training mode. The notification signal may be output during operation of the host vehicle in a mode other than the training mode.

The navigable area may be an area of non-zero width. In other words, the navigable area may be more than a single navigation path from which the host vehicle is incapable of deviating. The navigable area may have a width on each side from a trajectory of the first manoeuvre of less than a predetermined limit. Thus, the navigable area cannot exceed the predetermined limit from the trajectory of the first manoeuvre. Advantageously, the sensed environment of the host vehicle during the first manoeuvre can allow identification of the navigable area of the width on each side from the trajectory of the first manoeuvre of less than the predetermined limit.

The predetermined limit may be less than ten metres. Thus, the total width of the navigable area may be less than twenty metres. The predetermined limit may be less than eight metres. The predetermined limit may be less than six metres. The predetermined limit may be less than five metres. The predetermined limit may be less than four metres. The predetermined limit may be less than two metres. The predetermined limit may be less than one metre.

The one or more controllers may include a first controller for receiving the mode signal. The control system may comprise an input apparatus, operable by a user of the host vehicle to output the mode signal to the first controller. Advantageously, the mode signal may be caused by an input of the user of the host vehicle applied to the input apparatus.

The control system may comprise a primary control apparatus to receive one or more primary control inputs from the user to cause the host vehicle to perform the first manoeuvre. The primary control input may comprise the steering control input. The primary control input may comprise the acceleration control input. The primary control input may comprise the braking control input.

The control system may comprise a vehicle controller to receive the navigation signal from the controller. The vehicle controller may cause the host vehicle to navigate autonomously to the second navigation goal along the determined navigation path in dependence on the navigation signal.

The control system may comprise sensing means configured to output the environment data to the one or more controllers. Advantageously, control system includes the sensing means. The sensing means may detect one or more characteristics of the sensed environment of the host vehicle during the first manoeuvre.

The sensing means may comprise at least one sensor for sensing the environment of the host vehicle during the first manoeuvre. The sensing means may comprise a radar sensor. The sensing means may comprise an ultrasound sensor. The sensing means may comprise an optical camera. The sensing means may comprise an infrared camera. The sensing means may comprise a LI DAR sensor. The sensing means may comprise a stereoscopic sensor.

The sensing means may comprise a first sensing means configured to be directed generally forward from the host vehicle. The sensing means may comprise a second sensing means configured to be directed generally rearward from the host vehicle. Advantageously, the sensing means can detect the sensed environment of the host vehicle both forward and rearward from the host vehicle during the first manoeuvre, which can allow the control system to collect the environment data to enable identification of the navigable area to allow subsequent operation of the host vehicle in the autonomous mode to the second navigation goal different from the first navigation goal.

A sensor type of the first sensing means may be the same as a sensor type of the second sensing means. Advantageously, at least a portion of the environment data collected by the second sensing means of the host vehicle moving in a first direction during the first manoeuvre may be substantially identical to at least a portion of expected environment data which would be collected by the first sensing means of the host vehicle moving in a second direction, opposite the first direction, during a fictional further manoeuvre, being the reverse of the first manoeuvre.

The sensing means may comprise a sensor having a 360 degree field of view.

The system may comprise notification means to cause output of a user notification for notifying the user of the host vehicle of an availability of autonomous navigation of the host vehicle to the second navigation goal on receipt of the notification signal. The notification means may include an electronic display to display the user notification to the user.

According to an aspect of the invention, there is provided a method for controlling a vehicle operable in an autonomous mode and a non-autonomous mode. The method comprises receiving, when a vehicle is operating in a non-autonomous mode, environment data indicative of a sensed environment of the vehicle during a first manoeuvre by the vehicle from a first location to a first navigation goal. The method comprises operating the vehicle in a training mode. When operating in the training mode, the method comprises identifying a navigable area being suitable to contain a plurality of possible navigation paths for autonomous navigation of the vehicle to a second navigation goal different to the first navigation goal, the navigable area being in a vicinity of the first manoeuvre, in dependence on the sensed environment. Men operating in the training mode, the method comprises outputting vehicle control data indicative of the navigable area. When operating in the autonomous mode, the method comprises autonomously controlling the vehicle to navigate to the second navigation goal utilising the vehicle control data. Advantageously, the vehicle can navigate autonomously to the second navigation goal through a navigable area suitable to contain the plurality of possible navigation paths, based on the sensed environment of the vehicle during a first manoeuvre.

The environment data may be received prior to operation of the vehicle in the training mode. Alternatively, the environment data may be received during operation of the vehicle in the training mode.

The method may comprise performing the first manoeuvre.

The method may comprise receiving the second navigation goal, determining a selected navigation path from the plurality of possible navigation paths in dependence on the navigable area and the second navigation goal, and navigating the host vehicle to the second navigation goal via the selected navigation path.

According to an aspect of the invention, there is provided a vehicle comprising the control system, and a sensing means arranged to output the environment data to the control system.

The vehicle may have a front and a rear. The sensing means may comprise a first sensing means directed generally forward of the front of the vehicle and a second sensing means directed generally rearward of the rear of the vehicle.

The sensing means may be arranged such that the environment data indicative of the sensed environment of the host vehicle during the first manoeuvre is indicative of a sensed environment of the host vehicle from the host vehicle when performing the first manoeuvre in a reverse orientation. Advantageously, the sensors of the sensing means are positioned such that the host vehicle is capable of autonomously navigating to the second navigation goal subsequent to performing the first manoeuvre.

Autonomous Navigation in Dependence on Plurality of Previous Manoeuvres

According to an aspect of the invention, there is provided a control system for a host vehicle arranged to operably cause output on a notification signal to notify a user of the host vehicle of the availability of navigation in an autonomous mode in accordance with a navigation goal in dependence on path data associated with a plurality of previous manoeuvres of the host vehicle. The plurality of previous manoeuvres of the host vehicle may be when the host vehicle is operating in a non-autonomous mode.

According to an aspect of the invention, there is provided a control system for a host vehicle operable in an autonomous mode and a non-autonomous mode. The control system comprises one or more controllers. The control system is configured to receive, when operating in a non-autonomous mode, path data indicative of a plurality of previous manoeuvres of a host vehicle. The one or more controllers identify an availability of a navigation goal, associated with at least a portion of each of the plurality of previous manoeuvres, for subsequent navigation of the host vehicle, operating in an autonomous mode, thereto. The availability of the navigation goal is identified in dependence on the path data. The one or more controllers output a notification signal to notify a user of the host vehicle of the availability of navigation in the autonomous mode in accordance with the navigation goal. Advantageously, following a plurality of manoeuvres of the host vehicle, the control system can provide the user of the host vehicle with autonomous navigation to a navigation goal associated with each of the plurality of manoeuvres of the host vehicle. In this way, the user need not pre-emptively request that the host vehicle learns to autonomously navigate to the navigation goal. Furthermore, the computational burden generally involved in identifying the availability of the navigation goal can be spread over a plurality of previous manoeuvres of the host vehicle.

The one or more controllers may collectively comprise at least one electronic processor having an electrical input for receiving the path data, and at least one electronic memory device electrically coupled to the at least one electronic processor and having instructions stored therein. The at least one electronic processor may be configured to access the at least one memory device and execute the instructions thereon so as to notify the user of the host vehicle of the availability of navigation to the navigation goal.

The one or more controllers may output a request signal to request the user to define a portion of the navigation goal. The control system may be configured to, after output of the request signal, receive a navigation definition associated with the portion of the navigation goal. The one or more controllers may determine the navigation goal in dependence on the path data and the navigation definition.

Advantageously, the user can define part of the navigation goal. In this way, the one or more controllers may identify the availability of a plurality of navigation goals within a navigable area. As described hereinbefore, the navigation goal may include one or more of a destination location, a start location, a vehicle orientation at the destination location and an intermediate location on a route between the start location and the destination location.

The navigation goal may comprise navigation of the host vehicle from a first location to a second location. The portion of the navigation goal may comprise the first location of the navigation goal. Advantageously, the user can set a drop-off location for the navigation goal. It will be understood that in some examples, the host vehicle may not have stopped at the drop-off location during at least some, or even all, of the plurality of previous manoeuvres because the user was still required to drive the host vehicle to a further location for storage of the host vehicle. The portion of the navigation goal may comprise the second location of the navigation goal.

The navigation goal may comprise navigation of the host vehicle via an intermediate location. The portion of the navigation goal may comprise the intermediate location of the navigation goal. Advantageously, the host vehicle may navigate differently in the autonomous mode than in the non-autonomous mode. In particular, the host vehicle may start autonomous navigation from the first location, drop off the user of the host vehicle at the intermediate location, and then complete autonomous navigation to the second location. Previously, the host vehicle would have no need to stop at, or even navigate via the intermediate location as the user would remain in control of the host vehicle until the host vehicle has reached the second location. It will be understood that the second location may be a parking location, such as a garage location or similar.

The intermediate location may be a drop-off location. Advantageously, the user of the host vehicle can disembark the host vehicle before the host vehicle has reached the second location.

The path data may comprise first path data indicative of a first manoeuvre of the host vehicle within a navigable area and second path data indicative of a second manoeuvre of the host vehicle within the navigable area. The one or more controllers may determine a first characteristic of the navigable area in dependence on the first path data. The one or more controllers may determine a second characteristic of the navigable area, different to the first characteristic, in dependence on the second path data. The one or more controllers may identify the availability of the navigation goal in dependence on the first characteristic and the second characteristic. Advantageously, characteristics of the navigable area can be used to identify the availability of the navigation goal.

The first characteristic may comprise map data associated with the navigable area. Advantageously, the map data may be used to determine the availability of the navigation goal. The second characteristic may comprise further map data associated with the navigable area. The second manoeuvre may be subsequent to the first manoeuvre.

The first path data may be indicative of a first sensor output from a first sensing means of the host vehicle. The second path data may be indicative of a second sensor output from a second sensing means of the host vehicle. Advantageously, the first path data can be indicative of an environment in a vicinity of the host vehicle during the plurality of previous manoeuvres. The first sensing means may be different to the second sensing means. The first sensing means and the second sensing means may be a first sensor and a second sensor respectively. As described hereinbefore, the sensing means may comprise a radar sensor. The sensing means may comprise an ultrasound sensor. The sensing means may comprise an optical camera. The sensing means may comprise an infrared camera. The sensing means may comprise a LIDAR sensor. The sensing means may comprise a stereoscopic sensor.

The control system may be configured to receive a navigation request signal to request navigation of the host vehicle in accordance with the navigation goal. The one or more controllers, when the navigation goal is available and subsequent to receiving the navigation request signal, may navigate the host vehicle in accordance with the navigation goal in the autonomous mode. Advantageously, the host vehicle can navigate autonomously to the navigation goal. The one or more controllers may navigate autonomously in accordance with the navigation goal in dependence on receiving the navigation request signal. It will be understood that navigation of the host vehicle in accordance with the navigation goal may include navigation of the host vehicle to a destination location of the navigation goal.

The control system may be configured to receive location data indicative of a location of the host vehicle. The one or more controllers, subsequent to receiving the path data, may identify the availability of the navigation goal in dependence on a determination that the location of the host vehicle is in a vicinity of at least one of the previous manoeuvres of the host vehicle. Advantageously, the user can be notified of the availability of navigation in the autonomous mode in accordance with the navigation goal when the host vehicle nears a location of a previous navigation which would be used to identify the availability of the navigation goal. In some examples, the one or more controllers, subsequent to receiving the path data, may output the notification signal in dependence on the determination that the location of the host vehicle is in the vicinity of at least one of the previous manoeuvres of the host vehicle, even if the availability of the navigation goal was previously identified. The location of the host vehicle may be a geographic location. The location of the host vehicle may be a relative location. It will be understood that the location may be determined in any of a number of ways, as described elsewhere herein.

The one or more controllers may activate the sensing means of the host vehicle in dependence on a determination that the location of the host vehicle is in a vicinity of at least one of the previous manoeuvres of the host vehicle.

According to an aspect of the invention, there is provided a system. The system comprises the control system, including a first controller arranged to output the notification signal. The system comprises a sensor system configured to determine one or more attributes of an environment of the host vehicle during the plurality of previous manoeuvres of the host vehicle and to output path data to the control system in dependence thereon. Advantageously, the system can cause the user to be notified when one or more attributes of the environment of the host vehicle during the plurality of previous manoeuvres of the host vehicle are utilised to identify the availability of the navigation goal.

The sensor system may be configured to sense the environment of the host vehicle. The sensor system may include one or more of the sensing means described hereinbefore.

The sensor system may comprise the first sensing means to output the first path data to the controller and the second sensing means, different from the first sensing means, to output the second path data to the control system.

The system may comprise a vehicle controller configured to, when operating in the autonomous mode, navigate the host vehicle in accordance with the navigation goal. Advantageously, the host vehicle can navigate autonomously to the identified available navigation goal.

According to an aspect of the invention, there is provided a method for controlling a vehicle operable in an autonomous mode and a non-autonomous mode. The method comprises receiving, when a vehicle is operating in a non-autonomous mode, path data indicative of a plurality of previous manoeuvres of the vehicle. The method comprises identifying an availability of operation of the vehicle in an autonomous mode to navigate in accordance with a navigation goal, associated with at least a portion of each of the plurality of previous manoeuvres, in dependence on the path data. The method comprises notifying a user of the vehicle of the availability of the autonomous navigation. Advantageously, the user can be notified of the availability of the autonomous navigation in accordance with the navigation goal based on the plurality of previous manoeuvres of the vehicle, even where the user has not actively requested the vehicle to identify the availability of operation of the vehicle in the autonomous mode to navigate in accordance with the navigation goal.

The method may comprise operating the vehicle in the autonomous mode and, when in the autonomous mode, subsequent to receiving a request from the user to navigate the vehicle in accordance with the navigation goal, navigating the vehicle autonomously in accordance with the navigation goal. Advantageously, the vehicle can navigate in accordance with the navigation goal.

The method may comprise requesting the user to define a portion of the navigation goal, receiving a navigation definition associated with the portion of the navigation goal, and determining the navigation goal in dependence on the path data and the navigation definition. Advantageously, the user can still alter the navigation goal, even after the availability of the navigation goal has been identified.

Autonomous navigation utilising a vehicle state other than a basic control input According to an aspect of the invention, there is provided a control system arranged the operably cause the output of vehicle control data to be utilised by the control system to autonomously control a host vehicle when navigating the environment to a navigation goal in an autonomous mode. The vehicle control data is indicative of a vehicle state other than a basic control input of the host vehicle during a manoeuvre of the host vehicle. It will be understood that the term basic control input covers any control input by the user of the host vehicle which directly controls a longitudinal movement or a lateral movement of the host vehicle during the manoeuvre.

According to an aspect of the invention, there is provided a control system for a host vehicle operable in an autonomous mode and a non-autonomous mode. The control system comprises one or more controllers. The control system is configured to receive, when operating in a non-autonomous mode a mode signal indicative of a host vehicle operating in a training mode, and a state signal indicative of at least one vehicle state of the host vehicle during a manoeuvre of the host vehicle within a navigable area. The at least one vehicle state comprises a vehicle state other than a steering control input, an acceleration control input or a braking control input of the host vehicle. In the training mode, the one or more controllers identify an environment of the navigable area for the host vehicle for subsequent navigation by the host vehicle, operating in an autonomous mode, to at least one navigation goal, and output vehicle control data indicative of the at least one vehicle state. When subsequently navigating the environment to a navigation goal in the autonomous mode, the control system utilises the vehicle control data to autonomously control the host vehicle. Advantageously, the subsequent navigation of the environment to the navigation goal by the host vehicle operating in the autonomous mode can utilise a vehicle state other than the steering control input, the acceleration control input or the braking control input. In other words, more than basic vehicle control inputs during a previous manoeuvre by the host vehicle in the navigable area can be used to determine how to autonomously control the host vehicle when operating in the autonomous mode in the navigable area.

The at least one navigation goal may be a plurality of navigation goals. Each of the at least one navigation goal has associated therewith a location. The location may be a destination location. The location may be a geographic location. The location may be a relative location.

The one or more controllers may collectively comprise at least one electronic processor having an electrical input for receiving the mode signal and the state signal, and at least one electronic memory device electrically coupled to the at least one electronic processor and having instructions stored therein. The at least one electronic processor may be configured to access the at least one memory device and execute the instructions thereon so as to utilise the vehicle control data to autonomously navigate the environment.

The at least one vehicle state may comprise a primary control input of the host vehicle. The term primary control input will be understood to mean any control input by the user of the host vehicle which affects the way in which the host vehicle moves through the surroundings, for example by affecting the speed, direction or other characteristics of the movement, or by affecting the size or external condition of the vehicle. Advantageously, by utilising such primary control inputs of the host vehicle, the host vehicle can be set-up and move in substantially the same way as the user operated the host vehicle when performing the manoeuvre in the non-autonomous mode, resulting in the autonomous navigation of the host vehicle to the navigation goal in the autonomous mode being able to take account of user preferences or features of the environment.

The primary control input may comprise a suspension setting of the host vehicle. The suspension setting may include a ride height of the host vehicle. Advantageously, the host vehicle can be set up to traverse the terrain in the navigable area based on the setup of the host vehicle used by the user when performing the previous manoeuvre in the navigable area.

The primary control input may comprise a terrain mode of the host vehicle. The primary control input may comprise a gear of the host vehicle. The primary control input may comprise a traction mode of the host vehicle. The at least one vehicle state may comprise a mirror state of the host vehicle. The mirror state may be a wing mirror state, for example, folded-in or folded-out. The at least one vehicle state may comprise a roof state of the host vehicle, for example a state of a sunroof of the host vehicle.

The one or more controllers may determine the one or more vehicle states in dependence on the state signal. The one or more controllers may operate in the training mode in dependence on the mode signal.

The one or more navigation goals may comprise a navigation goal of the manoeuvre. Advantageously, the navigation goal of the manoeuvre can be utilised to provide one of the at least one navigation goals of the navigable area.

In the autonomous mode, the one or more controllers may output a navigation signal to cause the host vehicle to navigate to the navigation goal within the navigable area utilising the vehicle control data in dependence on a received request signal. The received request signal may be indicative of a request for the host vehicle to navigate to the navigation goal. Advantageously, the host vehicle can be requested to navigate to the navigation goal and can autonomously navigate thereto utilising the vehicle control data in dependence on the request.

According to another aspect of the invention, there is provided a control system configured to receive vehicle control data indicative of the at least one vehicle state including a vehicle state other than a steering control input, an acceleration control input or a braking control input, and the request signal, and to utilise the vehicle control data to autonomously control a host vehicle to navigate to a navigation goal in a navigable area. In particular, the vehicle control data may relate to a further vehicle, different to the host vehicle, which has previously manoeuvred in the navigable area.

The request may be from the user of the host vehicle.

The one or more controllers may include a first controller for outputting the vehicle control data and a vehicle controller configured to receive the vehicle control data and to cause the host vehicle to navigate to the navigation goal within the navigable area in dependence thereon. Advantageously, the control system can directly control navigation of the host vehicle in the autonomous mode.

The control system may comprise an input apparatus configured to receive the control input from a user of the host vehicle during the manoeuvre and to output the state signal to the control system in dependence thereon. Advantageously, the at least one vehicle state other than the steering control input, the acceleration control input or the braking control input may be input to the control system through the input apparatus by the user, instead of automatically determined.

In accordance with an aspect of the invention, there is provided a method for controlling a vehicle operable in an autonomous mode and a non-autonomous mode. The method comprises receiving, when the vehicle is operating in the non-autonomous mode, one or more vehicle states of the vehicle during a manoeuvre of the vehicle within a navigable area. The one or more vehicle states comprise at least one vehicle state other than a steering control input, an acceleration control input or a braking control input of the vehicle. The method comprises operating the vehicle in a training mode. The method comprises, when operating in the training mode, identifying an environment of the navigable area for the vehicle for subsequent navigation by the vehicle, operating in an autonomous mode, to at least one navigation goal, and outputting vehicle control data indicative of the at least one vehicle state. The method comprises, when operating in the autonomous mode, autonomously controlling the vehicle to navigate the environment to a navigation goal utilising the vehicle control data. Advantageously, the vehicle can navigate the environment to the navigation goal utilising vehicle states other than the steering control input, the acceleration control input and the braking control input during the previous manoeuvre of the vehicle in the navigable area.

Localisation of Vehicle

According to an aspect of the invention, there is provided a control system arranged to operably cause an output of a second location signal indicative of the location of a host vehicle relative to a second area in dependence on the location of the host vehicle, one or more sensed characteristics of a first area in a vicinity of the host vehicle, and a location of the second area relative to the first area. The second area may be in a vicinity of the first area. The second location signal may be utilised by the control system to notify the user that autonomous navigation within the second area is available.

According to an aspect of the invention, there is provided a control system for a host vehicle operable in an autonomous mode. The control system comprises one or more controllers. The control system is configured to receive a first location signal indicative of a location of a host vehicle, a first area signal indicative of one or more sensed characteristics of at least a portion of a first area in a vicinity of the host vehicle, and a reference signal indicative of a location of a second area relative to the first area. The second area is in a vicinity of the first area. The one or more controllers, after receipt of the first location signal, the first area signal and the reference signal: determine the location of the host vehicle relative to the second area in dependence on the first location signal, the first area signal and the reference signal, and output a second location signal indicative of the location. When subsequently navigating to a navigation goal within the second area in an autonomous mode, the control system utilises the second location signal to autonomously control the host vehicle. Advantageously, the control system allows precise localisation of the host vehicle by localising the host vehicle relative to the second area, even in the absence of high precision location information about the host vehicle in the first location signal.

The one or more controllers may collectively comprise at least one electronic processor having an electrical input for receiving the first location signal, the first area signal and the reference signal, and at least one electronic memory device electrically coupled to the at least one electronic processor and having instructions stored therein. The at least one electronic processor may be configured to access the at least one memory device and execute the instructions thereon so as to determine the location of the host vehicle relative to the second area.

The first location signal may be indicative of a geographic location of the host vehicle. The first location signal may be indicative of a location having a location accuracy coarser than 20 centimetres. In other words, a location accuracy coarser than 20 centimetres will be understood to mean that the location indicated by the location signal may be accurate to just over 20 centimetres, or may instead be accurate to only 50 centimetres or more. The first location signal may be indicative of a location having a location accuracy coarser than 50 centimetres. The first location signal may be indicative of a location having a location accuracy coarser than 1 metre. The first location signal may be indicative of a location having a location accuracy coarser than 2 metres.

The first location signal may be indicative of the location of the host vehicle being within a predetermined distance of a home location. The predetermined distance may be less than 100 metres. The predetermined distance may be less than 50 metres.

The first location signal may be indicative of the location of the host vehicle being on a predetermined road.

The first location signal may be indicative of a location indicated by an external location service, such as a GPS location of the host vehicle.

Determining the location of the host vehicle relative to the second area may comprise determining a first area indicator that the host vehicle is in a vicinity of the first area in dependence on the first area signal and the first location signal, subsequent to determining the first area indicator, determining a second area indicator that the host vehicle is within a predetermined distance of the second area in dependence on the reference signal and the first area signal, and subsequent to determining the second area indicator, determining the location of the host vehicle relative to the second area in dependence on the first area signal. Advantageously, accurate localisation of the host vehicle relative to the second area can be a simple three-stage process. The second area indicator may be determined in dependence on the first area indicator. The location of the host vehicle relative to the second area may be determined in dependence on the second area indicator.

The predetermined distance may be less than 20 metres. The predetermined distance may be less than 10 metres.

The one or more controllers may determine the first area indicator in dependence on comparing the one or more sensed characteristic of the first area indicated by the first area signal with reference area data indicative of one or more reference characteristics of the first area. Advantageously, the sensed characteristics of the first area can be used to localise the host vehicle in the vicinity of the first area. The first area may be a larger area than the second area. In examples, the first area is a home approach area, or a street.

The one or more sensed characteristics of the first area may comprise a location of one or more structural features associated with the first area. Advantageously, the location of the one or more structural features can be used to confirm that the host vehicle is in the vicinity of the first area. The one or more structural features may include vegetation features, such as trees or shrubbery. The one or more structural features may include a building. The one or more structural features may include a wall.

The first area signal may be indicative of a sensor output of a sensing means arranged to receive sensing data of the vicinity of the host vehicle. Advantageously, the sensing means can be arranged to detect the one or more sensed characteristics of the first area in order to localise the host vehicle first broadly in a vicinity of the first area, and then secondly more precisely in the first area, to determine the location of the host vehicle relative to the second area. The sensing means may be substantially any of the sensor types described previously herein.

The second area may be a navigable area in which the host vehicle can navigate autonomously. Advantageously, determining the location of the host vehicle relative to the second area can be determining the location of the host vehicle within the navigable area. It will be understood that accurate location of the host vehicle relative to the navigable area allows for accurate autonomous navigation of the host vehicle within the navigable area.

The second area may be such that the host vehicle can navigate via a plurality of different routes in the navigable area. The second area may be within the first area.

According to an aspect of the invention, there is provided a system. The system comprises the control system, including a first controller configured to receive the first area signal. The system comprises sensing means arranged to determine sensing data of an environment associated with a vicinity of the host vehicle, and to output the first area signal to the first controller in dependence thereon. Advantageously, the sensing means can be part of the same system, and can provide the required first area signal to the first controller to localise the host vehicle relative to the second area.

According to an aspect of the invention, there is provided a method for controlling a vehicle operable in an autonomous mode. The method comprises receiving a first location signal indicative of a location of a vehicle. The method comprises receiving one or more sensed characteristics of at least a portion of a first area in a vicinity of the vehicle. The method comprises receiving a location of a second area relative to the first area, the second area being in a vicinity of the first area. The method comprises determining a location of the host vehicle relative to the second area in dependence on the first location signal, the one or more sensed characteristics of the first area and the location of the second area relative to the first area. The method comprises, when operating in an autonomous mode, autonomously controlling the vehicle to navigate to a navigation goal within the second area utilising the location of the host vehicle relative to the second area. Advantageously, the vehicle can be localised accurately relative to the second area based on a less accurate location signal indicative of the location of the host vehicle.

Local Map Updating According to an aspect of the invention, there is provided a control system arranged to operably cause determination of map data relating to an area within which a host vehicle is operated in dependence on a navigation characteristic relating to the area at a first time, and on the navigation characteristic at a second time, different from the first time. The map data may be utilised to autonomously control the host vehicle operating in an autonomous mode. The navigation characteristic may relate to a potential obstacle associated with the area.

According to an aspect of the invention, there is provided a control system for a host vehicle operable in an autonomous mode. The control system comprises one or more controllers. The control system is configured to receive first environment data indicative of a navigation characteristic associated with a potential obstacle relating to an area within which a host vehicle is operated at a first time, and second environment data indicative of the navigation characteristic relating to the area at a second time, different from the first time. The one or more controllers determine map data relating to the area in dependence on the first environment data and the second environment data. When subsequently navigating the area to a navigation goal in an autonomous mode, the control system utilises the map data to autonomously navigate the host vehicle. Advantageously, the map data can be determined based on a plurality of indications of the environment data indicative of the navigation characteristic, at both the first time and the second time.

A time difference between the first time and the second time may be at least six hours. A time difference between the first time and the second time may be at least one day.

The one or more controllers may collectively comprise at least one electronic processor having an electrical input for receiving the first environment data and the second environment data, and at least one electronic memory device electrically coupled to the at least one electronic processor and having instructions stored therein. The at least one electronic processor may be configured to access the at least one memory device and execute the instructions thereon so as to utilise the map data to autonomously navigate the host vehicle.

The first environment data may be indicative of the first time. The second environment data may be indicative of the second time. The one or more controllers may determine the map data in dependence on a time difference between the first time and the second time. Advantageously, the map data may only be determined where the time difference between the first time and the second time satisfies a predetermined criterion.

The one or more controllers may determine the map data in dependence on the time difference being greater than a predetermined time threshold. The predetermined time threshold may be at least six hours.

The predetermined time threshold may be at least one day.

The second environment data may be indicative of the navigation characteristic of the area at the second time, at which the host vehicle is operated within the area. The control system may be configured to receive an operating signal indicative of the host vehicle operating in the area at a third time, separately from and between the first time and the second time. The one or more controllers may determine the map data of the area in dependence on the operating signal. Advantageously, the control system may be arranged to determine the map data less than every time the host vehicle operates in the area.

The map data may be indicative of an availability of autonomous navigation of the host vehicle in a plurality of regions of the area.

The navigation characteristic may relate to a presence of the potential obstacle. The navigation characteristic may relate to an absence of the potential obstacle. Advantageously, the determined map data may be different where a potential obstacle has appeared or disappeared in a vicinity of the area.

The navigation characteristic may relate to a density of the potential obstacle. Advantageously, the determination of the map data may depend on the density of the potential obstacle. For example, a low-density potential obstacle such as some vegetation may not represent an actual obstacle. In contrast, a higher-density potential obstacle such as a wall, may represent an actual obstacle to navigation of the host vehicle.

The potential obstacle may be a static obstacle. The potential obstacle may be a dynamic obstacle. Advantageously, the nature of the obstacle can be utilised in determining the map data.

The first environment data may be indicative of previous map data of the area. The first environment data may comprise previous map data of the area. Advantageously, the map data can be updated incrementally as features in the area develop and change.

When the map data is determined, the one or more controllers may output the map data. Advantageously, the map data can be output to memory, or sent to further devices to be utilised in subsequent autonomous navigation of the host vehicle (or a further vehicle).

According to an aspect of the invention, there is provided a system. The system comprises the control system of any preceding claim, including a first controller configured to receive the second environment data, and sensing means configured to detect the navigation characteristic of the area within which the host vehicle is operated at the second time and configured to output the second environment data to the first controller in dependence thereon. Advantageously, the sensing means can be provided as part of the system to determine the map data.

The sensing means may comprise a sensor, substantially as described hereinbefore.

The sensing means may be configured to detect the navigation characteristic of the area within which the host vehicle is operated at the first time and configured to output the first environment data to the first controller in dependence thereon.

The system may comprise a vehicle controller configured to receive the map data from the control system, and to cause navigation of the host vehicle to the navigation goal in dependence on the map data Advantageously, the host vehicle can utilise the map data during autonomous navigation of the host vehicle in the autonomous mode.

According to an aspect of the invention, there is provided a method for controlling a vehicle operable in an autonomous mode. The method comprises receiving first environment data indicative of a navigation characteristic associated with a potential obstacle relating to an area within which a vehicle is operated at a first time. The method comprises receiving second environment data indicative of the navigation characteristic relating to the area at a second time, different from the first time. The method comprises determining map data of the area in dependence on the first environment data and the second environment data. The method comprises operating the vehicle in an autonomous mode. The method comprises, when operating in an autonomous mode, autonomously controlling the vehicle to navigate to a navigation goal utilising the map data. Advantageously, the method enables the vehicle to determine map data based on how the navigation characteristic relating to the area changes between a first time and a second time and to utilise the determined map data for autonomous navigation of the vehicle.

Change between images According to an aspect of the invention, there is provided a control system arranged to operably cause identification of a change in an environment of a host vehicle between a first time and a second time in dependence on a first image taken at the first time and a second image taken at the second time. In between the first time and the second time, the host vehicle may have completed at least one shutdown event and at both the first time and the second time, the host vehicle may be substantially stationary. The first image and the second image may each capture an environment of the host vehicle.

According to an aspect of the invention, there is provided a control system for a host vehicle operable in an autonomous mode. The control system comprises one or more controllers. The control system is configured to receive first image data indicative of a first image of at least a first portion of an environment of a host vehicle taken at a first time. The control system is configured to receive, when operating in an autonomous mode, second image data indicative of a second image of at least a second portion of the environment of the host vehicle taken at a second time, after the first time. A field of view of the first image at least partially overlaps a field of view of the second image. In the autonomous mode, the one or more controllers identify a change in the environment of the host vehicle between the first time and the second time in dependence on the first image data and the second image data, and output a change signal indicative of the change in the environment of the host vehicle. In between the first time and the second time the host vehicle has completed at least one system shutdown event and at both the first time and the second time is substantially stationary. Advantageously, changes in the environment of the host vehicle can be detected using change detection techniques on two images taken of the environment at two different times.

The one or more controllers may collectively comprise at least one electronic processor having an electrical input for receiving the first image data and the second image data, and at least one electronic memory device electrically coupled to the at least one electronic processor and having instructions stored therein. The at least one electronic processor may be configured to access the at least one memory device and execute the instructions thereon so as to utilise the first image data and the second image data to identify the change in the environment.

The term system shutdown event will be understood to mean any change in the operational mode of the host vehicle associated with the host vehicle being stationary and unsupervised by the user of the host vehicle. The system shutdown event may include a system charging event where the host vehicle comprises a rechargeable battery to be charged during non-operational modes of the host vehicle.

In some examples, the term system shutdown event covers any operational mode of the host vehicle where the user of the host vehicle has become unaware of the environment of the host vehicle, such that an identification of any changes in the environment is beneficial. The user may be away from the host vehicle at the second time.

The host vehicle may be substantially unmoved between the at least one system shutdown event and the second time. The host vehicle may be substantially unmoved between the first time and the second time.

The change in the environment may comprise the addition of a new object in a vicinity of the host vehicle. Advantageously, the control system can recognise changes in the environment when new objects appear in the environment relative to a previous image of the environment. The one or more controllers may identify the new object in dependence on the second image data. The one or more controllers may output the change signal in dependence on the identification of the new object. The change signal may include the identification of the new object. The one or more controllers may output the change signal in dependence on a proximity of the new object to the host vehicle being less than a predetermined proximity distance.

The first image may be taken immediately preceding a previous operation of the host vehicle. The first image may be taken during a previous operation of the host vehicle. Advantageously, the first image can be indicative of a previous occasion on which the environment of the host vehicle was deemed acceptable to allow the host vehicle to move.

At the first time, the host vehicle may be in a first location. At a second time, the host vehicle may be in a second location in a vicinity of the first location. Advantageously, the first image and the second image can be used to identify a change in the vicinity of the host vehicle. The first location may be substantially the same as the second location. In this case, a comparison between the first image and the second image to identify the change in the environment may be simpler.

The host vehicle may be in an identical location relative to the environment at the first time and the second time. It will be understood that the identical location does not preclude a different orientation of the host vehicle at the first time and the second time. The host vehicle may be in the identical location and an identical orientation at the first time and the second time.

The field of view of the first image and of the second image may each comprise a view relating to a lateral side of the host vehicle. Advantageously, when the host vehicle comprises sensors for autonomous driving, it can be difficult to identify changes in a local environment of the host vehicle when the host vehicle is stationary. This is particularly so relating to the environment of the host vehicle in a vicinity of the lateral side of the host vehicle.

The field of view of the first image and of the second image may each comprise a view relating to a front of the host vehicle. The field of view of the first image and of the second image may each comprise a view relating to a rear of the host vehicle.

The one or more controllers may output the change signal in dependence on a comparison between the first image data and the second image data. Advantageously, the change in the environment can be easily identified based on comparing the first image with the second image. The comparison may include registration of the first image data with the second image data to align the first image and the second image relative to each other. The comparison may include subtraction of the registered image data to leave only any changed portions of the environment observed in the first image and the second image.

In the autonomous mode, the one or more controllers may determine output image data indicative of the change in the environment. The change signal may comprise the output image data. Advantageously, the change signal can be provided to the user of the host vehicle to illustrate the change seen in the environment. The user can then decide whether to pause or start any operations of the host vehicle depending on the change.

The output image data may comprise at least a portion of the second image data.

The control system may be configured to receive a goal signal indicative of a navigation goal of the host vehicle. In the autonomous mode, the one or more controllers, after receipt of the goal signal, may output a navigation signal to cause the host vehicle to navigate autonomously to the navigation goal in dependence on the change identified. Advantageously, the host vehicle can navigate autonomously, operating in the autonomous mode, to the navigation goal where no change is identified, or where any changes identified are determined to be insignificant to the host vehicle. Alternatively, the host vehicle can prevent autonomous navigation to the navigation goal where a change is identified. The control system may be configured to receive a confirmation signal indicative of a confirmation from the user to proceed with autonomous navigation to the navigation goal, after notification of the identified change to the user. The one or more controllers may output the navigation signal in dependence on the confirmation signal. Advantageously, the user can deem the identified change to be acceptable for navigation past by the host vehicle.

Where the navigation signal is output, the host vehicle may begin autonomous navigation away from a current position of the host vehicle within one minute of identification of the change in the environment.

According to an aspect of the invention, there is provided a system. The system comprises the control system, including a first controller arranged to output the change signal. The system comprises notification means configured to receive the change signal from the control system and to output a user notification fa notifying a user of the host vehicle of the change in the environment of the host vehicle. Advantageously, the user can be notified of the identified change in the environment. The notification means may be a notification unit, for example an electronic display or an audio output device.

The system may comprise image sensing means configured to capture the first image of the environment of the host vehicle at the first time and to output the first image data to the control system in dependence thereon. The image sensing means may be configured to capture the second image of the environment of the host vehicle at the second time and to output the second image data to the control system in dependence thereon. Advantageously, the system can capture the first image and the second image itself.

The image sensing means may comprise an optical imaging device, for example a camera.

The image sensing means may be arranged such that the field of view of the first image and the field of view of the second image each include a ground surface of the environment of the host vehicle. Advantageously, the first image and the second image can detect changes in the vicinity of the ground surface, such as new objects on the ground. The ground surface may be the ground surface adjacent the host vehicle.

The field of view of the first image and the field of view of the second image may each include only the environment of the host vehicle below a predetermined height from the ground surface. Advantageously, any changes in the environment above the predetermined height can be ignored, for example because they may be unlikely to affect the operation of the host vehicle in the autonomous mode. In some examples, the one or more controllers of the control system may identify the change in the environment in dependence on only portions of the first image data and the second image data associated with the field of view below the predetermined height from the ground surface (even if the field of view of the first image and of the second image extends above the predetermined height from the ground surface).

The image sensing means may be arranged to be directed at least partially downward. Advantageously, the position of the identified change in the image is indicative of a proximity of the identified change to the image sensing means, and therefore the host vehicle.

According to an aspect of the invention, there is provided a method for controlling a vehicle operable in an autonomous mode. The method comprises receiving a first image of an environment of a vehicle taken at a first time when the vehicle is substantially stationary. The method comprises receiving a second image of the environment of the vehicle taken at a second time when the vehicle is substantially stationary, the second time being after the first time and after at least one system shutdown event between the first time and the second time. A field of view of the first image at least partially overlaps a field of view of the second image. The method comprises operating the vehicle in an autonomous mode. The method comprises identifying a change in the environment of the vehicle between the first time and the second time in dependence on the first image and the second image. The method may comprise outputting a change signal indicative of the change in the environment of the vehicle. When operating in the autonomous mode, the method comprises autonomously controlling the vehicle to navigate the environment to a navigation goal in dependence on the change. Advantageously, the vehicle can be controlled to identify a change in the environment based on images of the environment.

Indication of Operation in Autonomous Driving Mode

According to an aspect of the invention, there is provided a control system arranged to operably cause an external indication that the host vehicle is starting or is about to start to move away in an autonomous driving mode in dependence on a request for the host vehicle to navigate to a navigation goal in the autonomous driving mode. The external indication may be provided by an output of an audio output external to the host vehicle. The external indication may be provided by an output of a visual output external to the host vehicle. The external indication may be produced when the host vehicle is operating in a preliminary mode, different to the autonomous driving mode. The external indication may be caused by a movement of the host vehicle, different from the movement in the autonomous driving mode of the host vehicle.

According to an aspect of the invention, there is provided a control system for a host vehicle operable in an autonomous driving mode and a preliminary mode. The control system comprises one or more controllers. The control system is configured to receive a request signal indicative of a request for a host vehicle to navigate to a navigation goal in an autonomous driving mode. The one or more controllers, subsequent to receipt of the request signal, operate the host vehicle in a preliminary mode, different from the autonomous driving mode. When operating in the preliminary mode, the one or more controllers cause production of at least one of an audio and visual output external to the host vehicle, for at least a predetermined first duration prior to any movement of the host vehicle. The production of at least one of the audio and visual output external to the host vehicle is to indicate that the host vehicle is about to move off from the stationary position. The one or more controllers output a navigation signal to cause the host vehicle to navigate to the navigation goal in the autonomous driving mode prior to a predetermined second duration after cessation of the production of the at least one of the audio and visual output external to the host vehicle. Advantageously, the control system can be used to provide an external indication in the form of one or both of an audio output and a visual output that the host vehicle is about to move off in the autonomous driving mode. Thus, nearby parties can be alerted, even if no user has approached the host vehicle, that the vehicle is about to move.

It will be understood that the production of the at least one of the audio and visual output external to the host vehicle can be by an audio output device or a visual output device audible or visible from outside the host vehicle, regardless of whether the audio output device or the visual output device is situated internally or externally on the host vehicle.

The one or more controllers may collectively comprise at least one electronic processor having an electrical input for receiving the control signal, and at least one electronic memory device electrically coupled to the at least one electronic processor and having instructions stored therein. The at least one electronic processor may be configured to access the at least one memory device and execute the instructions thereon so as to cause production of the at least one of the audio and visual output.

The one or more controllers, after receipt of the request signal cause a movement of the host vehicle in the preliminary mode, for at least the predetermined first duration prior to movement of the vehicle in the autonomous driving mode and for less than a predetermined distance in a longitudinal direction of the host vehicle, to advertise that the host vehicle is about to move off in the autonomous driving mode, and wherein the one or more controllers output the navigation signal prior to the predetermined second duration after cessation of the movement in the preliminary mode. Advantageously, the control system can be used to provide an external indication in the form of a movement of the host vehicle to indicate that the host vehicle is about to move off in the autonomous driving mode. Use of movement provides notification that the host vehicle is about to move in the autonomous driving mode without creating excess sound or light, which may be disadvantageous in some situations.

The predetermined distance may be less than two metres. The predetermined distance may be less than one metre. The predetermined distance may be less than ten centimetres. The predetermined distance may be substantially zero. Thus, the host vehicle may not move in the longitudinal direction in the preliminary mode.

The predetermined second duration may be less than five seconds. The predetermined second duration may be less than two seconds. The predetermined second duration may be as little as zero seconds. In some examples, the movement of the host vehicle in the preliminary mode may continue at least partly into the movement of the host vehicle in the autonomous driving mode.

In one embodiment, the movement of the host vehicle in the preliminary mode is of a predetermined speed or a predetermined acceleration.

According to another aspect of the invention, there is provided a control system for a host vehicle operable in an autonomous driving mode and a preliminary mode. The control system comprises one or more controllers. The control system is configured to receive a request signal indicative of a request for a host vehicle to navigate to a navigation goal in an autonomous driving mode. The one or more controllers, subsequent to receipt of the request signal, operate the host vehicle in a preliminary mode, different from the autonomous driving mode. The one or more controllers, after receipt of the request signal, operating in the preliminary mode, cause a movement of the host vehicle for at least a predetermined first duration prior to movement of the host vehicle in the autonomous driving mode, the movement of the host vehicle in the preliminary mode of a predetermined speed or a predetermined acceleration, to indicate that the host vehicle is about to move off in the autonomous driving mode. The one or more controllers output a navigation signal to cause the host vehicle to navigate to the navigation goal in the autonomous driving mode prior to a predetermined second duration after cessation of the movement in the preliminary mode Advantageously, the control system can advertise that the host vehicle is about to operate in the autonomous driving mode by a movement of the vehicle.

The predetermined speed may be less than five metres per second. The predetermined speed may be less than two metres per second. The predetermined speed may be less than one metre per second. The predetermined acceleration may be greater than one metre per second per second. The predetermined acceleration may be greater than two metres per second per second. The predetermined acceleration may be greater than five metres per second per second.

The one or more controllers, in the preliminary mode, may cause the host vehicle to move in the longitudinal direction of the host vehicle. The one or more controllers, in the preliminary mode, may cause the host vehicle to move in a direction other than the longitudinal direction of the host vehicle. The one or more controller, in the preliminary mode, may cause the host vehicle to move in a substantially vertical direction. In other words, a ground clearance of the host vehicle may be changed in the preliminary mode. A first movement of the host vehicle in the preliminary mode may be to cause an increase of the ground clearance of the host vehicle.

The one or more controllers, in the preliminary mode, may cause the host vehicle to move in a discontinuous manner during the predetermined first duration. Advantageously, discontinuous movement can catch the attention of any parties external to the host vehicle more than continuous movement of the host vehicle, and can advertise that the host vehicle is about to move off in the autonomous driving mode effectively.

The one or more controllers, in the preliminary mode, may cause the host vehicle to move at a first speed for a first portion of the predetermined first duration and to move at a second speed, different from the first speed, for a second portion of the predetermined first duration. Advantageously, the host vehicle can move in a "jerky" manner, to effectively advertise that the host vehicle is about to move off in the autonomous driving mode.

The movement in the preliminary mode may comprise a first movement in a first direction and a second movement, subsequent to the first movement, in a second direction, substantially opposite the first movement. In this way, the host vehicle can be made to "bounce" in order to advertise that the host vehicle is about to move off in the autonomous driving mode.

The second speed may be substantially zero. Thus, the host vehicle can move in a "stop-start" manner in the preliminary mode.

The second speed may be lower than the first speed. A transition from the first speed in the first portion of the predetermined first duration to the second speed in the second portion of the predetermined first duration may be such that a deceleration of the host vehicle is at least five metres per second per second. Thus, the host vehicle can move in a particularly jerky manner in the preliminary mode. In some examples, the deceleration of the host vehicle is such that a user of the host vehicle would find the deceleration uncomfortable were the user to be in the host vehicle. The host vehicle may be configured to operate in the preliminary mode only in the absence of any occupants in the host vehicle.

The first speed may be less than five metres per second. The first speed may be less than three metres per second. The first speed may be less than two metres per second. The first speed may be less than one metre per second.

The request signal may be indicative of the request for the host vehicle to navigate to the navigation goal at a predetermined first time. Advantageously, the host vehicle can operate in the preliminary mode immediately preceding operation in the autonomous driving mode. The request may be for the host vehicle to navigate to the navigation goal for arrival at the predetermined first time. The request signal may be indicative of an entry in a calendar associated with the user.

According to an aspect of the invention, there is provided a system. The system comprises the control system, including a first controller outputting a notification signal to cause the production of at least one of the at least one of the audio and visual output, and the movement of the host vehicle in the preliminary mode. The system comprises notification means configured to receive the notification signal and operable in dependence thereon to advertise that the host vehicle is about to move in the autonomous driving mode. Advantageously, the system can itself advertise that the host vehicle is about to move in the autonomous driving mode. The notification means may comprise an audio output device. The notification means may comprise a display device, for example a lighting device.

The notification means may comprise a movement means configured to cause a movement of the host vehicle in dependence on the notification signal. The movement means may comprise an actuator. The actuator may be utilised for moving the host vehicle in the autonomous driving mode. The actuator may comprise at least one motor.

The notification means may comprise a sound production means to cause production of sound at the host vehicle in dependence on the notification signal. The sound production means may comprise an audio transducer. The notification means may comprise a lighting device to cause production of light at the host vehicle in dependence on the notification signal.

The lighting device may be arranged to be visible from a ground surface in a vicinity of the host vehicle. Advantageously, this ensures that any parties near the vicinity of the ground of the host vehicle are notified that the vehicle can be about to move off in the autonomous mode. In another advantage, by illuminating the ground surface in the vicinity of the host vehicle, light pollution from the host vehicle prior to movement of the host vehicle in the autonomous mode may be reduced.

The lighting device may be arranged to be visible from the ground surface directly beneath the host vehicle. Advantageously, light pollution can be further minimised.

According to an aspect of the present invention, there is provided a method for controlling a vehicle operable in an autonomous driving mode and a preliminary mode. The method comprises receiving a request for a vehicle to navigate to a navigation goal in an autonomous driving mode, while the vehicle is in a stationary position. The method comprises operating the vehicle in a preliminary mode, different to the autonomous driving mode. The method comprises, when operating in the preliminary mode, producing at least one of an audio and visual output external to the vehicle, for at least a predetermined first duration prior to any movement of the vehicle, to indicate that the vehicle is about to move off towards from the stationary position. The method comprises navigating the vehicle towards the navigation goal in the autonomous driving mode prior to a predetermined second duration after cessation of the at least one of the audio and visual output external to the vehicle. Advantageously, it can be advertised using one or both of sound and light that the vehicle is about to move off in the autonomous driving mode, before the vehicle moves in the autonomous driving mode.

According to an aspect of the present invention, there is provided a method for controlling a vehicle operable in an autonomous driving mode and a preliminary mode. The method comprises receiving a request for a vehicle to navigate to a navigation goal in an autonomous driving mode, while the vehicle is in a stationary position. The method comprises operating the vehicle in a preliminary mode, different to the autonomous driving mode. The method comprises moving the vehicle for at least a predetermined first duration prior to movement of the vehicle in the autonomous driving mode, the movement of the vehicle in the preliminary mode of a predetermined speed or a predetermined acceleration, to indicate that the host vehicle is about to move off in the autonomous driving mode. The method comprises navigating the vehicle towards the navigation goal in the autonomous driving mode prior to a predetermined second duration after cessation of the movement of the vehicle in the preliminary mode. Advantageously, it can be advertised using movement of the vehicle that the vehicle is about to move off in the autonomous driving mode, before the vehicle moves in the autonomous driving mode.

Alternative Goal Prompt

According to an aspect of the invention, there is provided a control system arranged to operably cause a host vehicle to autonomously navigate to a secondary navigation goal instead of a primary navigation goal in dependence on a request for the host vehicle to navigation autonomously to the primary navigation goal and on an availability of the primary navigation goal for the host vehicle.

According to an aspect of the invention, there is provided a control system for a host vehicle operable in an autonomous mode. The control system comprises one or more controllers. The control system is configured to receive a first request signal indicative of a request for the host vehicle to navigate autonomously to a primary navigation goal in an autonomous mode, a first availability signal indicative of an availability of the primary navigation goal for the host vehicle, and a second availability signal indicative of an availability of a secondary navigation goal for the host vehicle. The one or more controllers, subsequent to receipt of the first request signal and the first availability signal, output a first notification signal to notify a user of the host vehicle of an unavailability of the primary navigation goal. The one or more controllers, subsequent to receipt of the second availability signal, output a second notification signal to notify the user of the availability of the secondary navigation goal for the host vehicle. The control system is configured to cause the host vehicle to subsequently navigate to the secondary navigation goal instead of the primary navigation goal in the autonomous mode. Advantageously, the control system can notify the user of an alternative, available navigation goal in the situation where the primary navigation goal is unavailable.

The one or more controllers may collectively comprise at least one electronic processor having an electrical input for receiving the first request signal, the first availability signal and the second availability signal, and at least one electronic memory device electrically coupled to the at least one electronic processor and having instructions stored therein. The at least one electronic processor may be configured to access the at least one memory device and execute the instructions thereon so as to cause the host vehicle to subsequently navigate to the secondary navigation goal instead of the primary navigation goal in the autonomous mode.

The primary navigation goal may be unavailable due to an obstacle in a navigation path to the primary navigation goal. The obstacle may be at the primary navigation goal, for example another vehicle. The primary navigation goal may be unavailable due to an extent of the host vehicle.

The first request signal may be received when the vehicle is operating in a non-autonomous mode, different to the autonomous mode.

The first notification signal may comprise the second notification signal. In his way, the user can be notified of the availability of the secondary navigation goal al substantially the same time as the user is notified of the unavailability of the primary navigation goal.

The request indicated by the first request signal may be from the user of the host vehicle.

The one or more controllers may determine a location of first divergence between a first navigable area between a start location of the host vehicle and the primary navigation goal, and a second navigable area between the start location and the secondary navigation goal. The one or more controllers may output the second notification signal in dependence on the location of first divergence. Advantageously, the control system can utilise the location of first divergence to navigate the host vehicle autonomously to the secondary navigation goal. In other examples, the control system can utilise the location of first divergence to determine the availability of the secondary navigation goal for the host vehicle.

As used herein, the term navigable area will be understood to mean either a navigable area having a width lateral to a direction of movement of the host vehicle from the start location towards the primary navigation goal, in which a plurality of navigation routes for the host vehicle can be calculated. In some examples, the term navigable area will be understood to mean a single, calculated navigation route.

The location of first divergence may be determined as a centre location in the first navigable area in a direction of travel of the host vehicle from the start location to the primary navigation goal at which a distance from the centre location to a centre location in the second navigable area in a direction of travel of the host vehicle from the start location to the secondary navigation goal first exceeds a predetermined divergence threshold. The predetermined divergence threshold may be less than ten metres. The predetermined divergence threshold may be less than five metres. The predetermined divergence threshold may be greater than one metre.

The predetermined divergence threshold may be substantially a first distance from the centre point of the first navigable area at the location of first divergence to a lateral edge of the first navigable area closest the second navigable area plus a second distance from the centre point of the second navigable area at the location of first divergence to a lateral edge of the second navigable area closest the first navigable area.

The first availability signal may be indicative of an impassable location in the first navigable area. The second availability signal may be indicative of the second navigable area. The one or more controllers may output the second notification signal in dependence on the impassable location in the first navigable area being prior to the location of first divergence in a direction of travel of the host vehicle from the start location to the first navigation goal. Advantageously, the second notification signal can only be output where the host vehicle is not blocked from navigating to the secondary navigation goal by the same obstacle blocking the path of the host vehicle to the primary navigation goal.

The one or more controllers may determine a third navigable area between a current location of the host vehicle and the secondary navigation goal via the location of first divergence, and output the second notification signal in dependence thereon. Advantageously, the second notification signal can only be output where the host vehicle can identify a navigable path from the current location of the host vehicle and the secondary navigation goal. The third navigable area may exclude the start location of the host vehicle. In other words, the host vehicle need not retrace the route exactly to the start location in order to navigate to the secondary navigation goal.

The current location of the host vehicle may be diverged from the second navigable area.

The control system may be configured to receive a second request signal indicative of a request for the host vehicle to navigate autonomously to the secondary navigation goal in the autonomous mode, wherein the one or more controllers, subsequent to receipt of the second request signal, output an alternative navigation signal to cause the host vehicle to navigate autonomously to the secondary navigation goal in the autonomous mode. Advantageously, the navigation to the secondary navigation goal may be in response to the request for the host vehicle to navigate to the secondary navigation goal. The alternative navigation signal may be output in dependence on the second request signal.

The request indicated by the second request signal may be from the user.

The alternative navigation signal may be to cause the host vehicle to navigate autonomously to the secondary navigation goal via the third navigable area. Advantageously, the host vehicle need not retrace the whole journey back to the start location.

The one or more controllers, subsequent to receipt of the first request signal, may output a first navigation signal to cause the host vehicle to navigate autonomously towards the primary navigation goal in the autonomous mode, and to output the first notification signal thereafter In this way, it can be seen that the host vehicle may already have started on the path towards the primary navigation goal prior to receiving the first availability signal. The host vehicle can be re-routed en-route.

According to an aspect of the invention, there is provided a system. The system comprises the control system of any preceding claim, including at least a first controller. The at least one controller is arranged to output the first notification signal and the second notification signal. The system comprises notification means configured to receive the first notification signal and to output a first user notification that a primary navigation goal is unavailable in dependence thereon. The notification means is configured to receive the second notification signal and to output a second user notification that a secondary navigation goal is available in dependence thereon. Advantageously, the system can include the notification means to notify the user of the availability of the primary and secondary navigation goals.

The first controller may output both the first notification signal and the second notification signal.

The notification means may comprise a display means to display the first user notification and the second user notification. The display means may be a display unit, such as an electronic display.

The system may comprise an input apparatus to receive the request for the host vehicle to navigate autonomously to the primary navigation goal and to output the first request signal to the control system in dependence thereon. The input apparatus may comprise at least one switch, operable by the user to receive the request. The input apparatus may comprise an interactive display unit, operable by the user to receive the request.

According to an aspect of the invention, there is provided a method for controlling a vehicle operable in an autonomous mode and a non-autonomous mode. The method comprises receiving a request for the vehicle to navigate autonomously to a primary navigation goal in an autonomous mode. The method comprises receiving an availability of the primary navigation goal for the vehicle. The method comprises, subsequent to receipt of the request and the availability of the primary navigation goal, notifying a user of the vehicle of an unavailability of the primary navigation goal. The method comprises receiving an availability of a secondary navigation goal for the vehicle. The method comprises, subsequent to receipt of the availability of the secondary navigation goal, notifying the user of the availability of the secondary navigation goal. The method comprises autonomously controlling the vehicle to navigate to the secondary navigation goal instead of the primary navigation goal in the autonomous mode. Advantageously, the vehicle can notify the user of the availability of and navigate to the alternative navigation goal in the event the primary navigation goal in unavailable Desired Vehicle Orientation According to an aspect of the invention, there is provided a control system arranged to operably cause autonomous navigation of a host vehicle into a desired vehicle orientation at a navigation goal in dependence on an identified availability of the navigation into the desired vehicle orientation at the navigation goal. The availability may be identified in dependence on environment data indicative of an environment of the host vehicle and a goal signal indicative of the navigation goal of the host vehicle.

According to an aspect of the invention, there is provided a control system for a host vehicle operable in an autonomous mode and a non-autonomous mode. The control system comprises one or more controllers. The control system is configured to receive environment data indicative of an environment of a host vehicle. The control system is configured to receive, when operating in a non-autonomous mode, a goal signal indicative of a navigation goal of the host vehicle. The one or more controllers, after receipt of the environment data and the goal signal, identify an availability of subsequent navigation of the host vehicle, operating in an autonomous mode, into a desired vehicle orientation at the navigation goal. The one or more controllers output a navigation signal to cause the host vehicle, operating in the autonomous mode, to navigate autonomously into the desired vehicle orientation at the navigation goal. Advantageously, the control system can control the host vehicle to navigate autonomously to the navigation goal into the desired vehicle orientation where the desired vehicle orientation is available.

The one or more controllers may collectively comprise at least one electronic processor having an electrical input for receiving the environment data and the goal signal, and at least one electronic memory device electrically coupled to the at least one electronic processor and having instructions stored therein. The at least one electronic processor may be configured to access the at least one memory device and execute the instructions thereon so as to output the availability signal to notify the user of an availability of navigation of the host vehicle, operating in the autonomous mode, into the desired vehicle orientation at the navigation goal.

It will be understood that the desired vehicle orientation may be one of at least two possible vehicle orientations at the navigation goal. The control system may be configured to receive an orientation signal indictive of the desired vehicle orientation. The goal signal may include the orientation signal. In another embodiment, the orientation signal may be separate to the goal signal.

In this example, the navigation goal indicated by the goal signal may include a location for autonomous navigation thereto, and a plurality of possible vehicle orientations at the location of the navigation goal. It will be understood that where the navigation goal includes no information on the vehicle orientation at the location of the navigation goal, this can also be understood to be indicative of any vehicle orientation at the location of the navigation goal.

The navigation goal may be a parking goal. The desired vehicle orientation may be a nose out vehicle orientation. Advantageously, the control system can ensure the host vehicle navigated into the desired vehicle orientation at the navigation goal whenever possible. This is particularly so in parking, where the user of the host vehicle can expect the host vehicle to be autonomously navigated into the desired vehicle orientation, which can be a nose-out vehicle orientation during any parking manoeuvres. It will be understood that the term nose-out means that a front of the host vehicle is to be facing out of the parking location, such as a parking space. In other words, the nose-out vehicle orientation is the orientation of the host vehicle where the host vehicle can move forward to exit the parking location. In some situations, it can be that the desired vehicle orientation is a nose-in vehicle orientation, for example to allow easy access to a storage compartment at a rear of the host vehicle when the host vehicle is in the parking location.

The navigation goal may comprise a drop-off location. The drop-off location may be to be navigated to by the host vehicle in advance of navigation to a final location, such as the parking location, of the navigation goal. The drop-off location may also have associated therewith a desired vehicle orientation.

The one or more controllers may output an availability signal to notify a user of the host vehicle of the availability of the subsequent navigation of the host vehicle, operating in the autonomous mode, into the desired vehicle orientation at the navigation goal. Advantageously, the user can be informed on the vehicle orientation at the navigation goal into which the host vehicle can navigate in the autonomous mode.

The control system may be configured to receive a location signal indicative of a current location of the host vehicle. The one or more controllers, after receipt of the location signal, the environment data and the goal signal, may determine a proposed navigation path from the current location to the navigation goal, and output the navigation signal in dependence on a vehicle orientation associated with the proposed navigation path at the navigation goal. Advantageously, the exact navigation path to the navigation goal for ensuring the host vehicle is positioned in the desired vehicle orientation at the navigation goal can be determined.

The navigation signal may be indicative of the proposed navigation path. In this way, the control system can ensure that the host vehicle navigates along the proposed navigation path towards the navigation goal.

The control system may be configured to receive a request signal indicative of a request for the host vehicle to navigate autonomously, in the autonomous mode, to the navigation goal to be positioned in the desired vehicle orientation. Advantageously, the navigation of the host vehicle into the desired vehicle orientation at the navigation goal can be following a request. The request may be from the user. The request may be subsequent to the identification of the availability of the navigation to the navigation goal. The request may be subsequent to output of the availability signal. The one or more controllers, after receipt of the request signal, may output the navigation signal in dependence on the desired vehicle orientation being determined to be available at the navigation goal. Advantageously, the host vehicle can only navigate to the navigation goal when it is determined that the desired vehicle orientation is available. Alternatively, the host vehicle can navigate autonomously to the navigation goal to be positioned in an orientation other than the desired vehicle orientation if the desired vehicle orientation is determined to be unavailable at the navigation goal.

The availability of the navigation of the host vehicle, operating in the autonomous mode, into the desired vehicle orientation at the navigation goal may be determined in dependence on the environment data and the goal signal. The environment data may comprise a navigable area in which the host vehicle can navigate in the autonomous mode.

According to an aspect of the invention, there is provided a system. The system comprises the control system, including a first controller arranged to output the navigation signal. The system comprises a vehicle controller configured to receive the navigation signal and to cause the host vehicle to navigate autonomously, in the autonomous mode, to the navigation goal to be positioned in the desired vehicle orientation in dependence thereon. Advantageously, the system can include the vehicle controller to control the host vehicle during operation of the host vehicle in the autonomous mode.

The system may comprise sensing means configured to sense the environment of the host vehicle and to output the environment data to the control system in dependence thereon. Advantageously, the environment data can be indicative of the sensed environment of the host vehicle. The environment data can be indicative of a current environment of the host vehicle.

The sensing means may comprise a laser sensor. The sensing means may comprise a radar sensor. The sensing means may comprise an optical imaging device. The sensing means may comprise an infrared camera. The sensing means may comprise an ultrasound sensor.

The system may comprise notification means configured to output a user notification that autonomous navigation of the host vehicle, operating in the autonomous mode, to be positioned in the desired vehicle orientation at the navigation goal, is available in dependence on the availability signal. Advantageously, the system can notify the user directly. The notification means may comprise an electronic display. The notification means may comprise a notification unit. The notification means may comprise an audio output.

According to an aspect of the invention, there is provided a method for controlling a vehicle operable in an autonomous mode and a non-autonomous mode. The method comprises receiving environment data indicative of an environment of a vehicle. The method comprises receiving, when the vehicle is operating in a non-autonomous mode, a navigation goal of the vehicle including a desired vehicle orientation at the navigation goal. The method comprises subsequent to receipt of the environment data and the navigation goal, identifying an availability of subsequent navigation of the vehicle, operating in an autonomous mode, into the desired vehicle orientation at the navigation goal. The method comprises when the vehicle is operating in the autonomous mode, autonomously navigating the vehicle into the desired vehicle orientation at the navigation goal. Advantageously, the vehicle can navigate into a desired vehicle orientation.

Rearward Travel Avoidance

According to an aspect of the invention, there is provided a control system arranged to operably cause determination of a navigation path for a host vehicle to a navigation goal in dependence on a first amount of frontward travel of the host vehicle along the determined navigation path and a second amount of rearward travel of the host vehicle along the determined navigation path. The determination of the navigation path may be such that a first navigation path having a lesser amount of rearward travel of the host vehicle is chosen as the determined navigation path in preference to a second navigation path having a greater amount of rearward travel of the host vehicle.

According to an aspect of the invention, there is provided a control system for a host vehicle operable in an autonomous mode. The control system comprises one or more controllers. The control system is configured to receive a goal signal indicative of a navigation goal of a host vehicle. The host vehicle has a front and a rear. The navigation goal defines a target location for the host vehicle and a target orientation of the host vehicle at the target location. The control system is configured to receive environment data indicative of an environment of the host vehicle. The one or more controllers, subsequent to receipt of the goal signal and the environment data, determine path data indicative of a determined navigation path for the host vehicle, operating in an autonomous mode, to autonomously navigate, to the navigation goal in dependence on a direction parameter. The one or more controllers, output the path data indicative of the determined navigation path. The direction parameter is determined in dependence on a first amount of frontward travel of the host vehicle along the determined navigation path and a second amount of rearward travel of the host vehicle along the determined navigation path, such that a first navigation path having a lesser amount of rearward travel of the host vehicle is chosen as the determined navigation path in preference to a second navigation path having a greater amount of rearward travel. Advantageously, the host vehicle can provide an autonomous navigation function to determine the navigation path to the navigation goal, and ensure that the host vehicle does not determine a navigation path having a large amount of rearward travel. It will be understood that there can be several reasons to avoid navigation paths involving a large amount of rearward travel of the host vehicle, for example to avoid observer unease at seeing an autonomous vehicle completing a large amount of a manoeuvre in a reverse direction of travel of the host vehicle.

The one or more controllers may collectively comprise at least one electronic processor having an electrical input for receiving the goal signal and the environment data, and at least one electronic memory device electrically coupled to the at least one electronic processor and having instructions stored therein. The at least one electronic processor may be configured to access the at least one memory device and execute the instructions thereon so as to utilise the path data to autonomously navigate the host vehicle to the navigation goal in accordance with the determined navigation path.

The path data may be determined in dependence on the goal signal and the environment data.

The control system may be configured to receive a request signal indicative of a request for the host vehicle, when operating in the autonomous mode, to navigate autonomously to the navigation goal. The one or more controllers, subsequent to receipt of the request signal and determination of the path data, may output a navigation signal to cause the host vehicle to navigate to the target location along the determined navigation path. Advantageously, the host vehicle can navigate to the target location along the determined path. In some examples where the host vehicle is to be navigated to the target location along the determined path, it will be understood that the path data need not be output from the control system.

It will be understood that the term "amount" as used in his context can cover a fractional proportion of the rearward gavel relative to the total gavel, a distance of the rearward gavel, or a duration in time of the rearward gavel in the determined path.

The direction parameter may be determined in dependence on a total path length of the determined navigation path. Advantageously, a shorter path can be chosen even if a potentially longer path includes a lesser amount of rearward travel, providing there exists another potential path including a greater amount of rearward travel than the shorter path. For example, a determined path may include a turn manoeuvre comprising a change of direction of travel of the host vehicle instead of driving around forwardly in an arc of a circle to change orient the host vehicle in different direction.

Where the determined navigation path includes a turn manoeuvre, it will be understood that the one or more controllers may determine the navigation path to be such that the turn manoeuvre is at a point along the navigation path so as to substantially reduce an amount of rearward travel compared to a navigation path having the turn manoeuvre at a different point along the navigation path.

The one or more controllers may determine the navigation path to substantially minimise the amount of rearward travel of the host vehicle compared to other possible navigation paths.

The first amount and the second amount may be proportional amounts relative to the total path length of the determined navigation path.

The environment data may be indicative of a current location of the host vehicle. The one or more controllers may determine the determined navigation path in dependence on the current location of the host vehicle. Advantageously, the determined navigation path can start at the current location of the host vehicle.

The environment data may be indicative of one or more navigation obstacles to the host vehicle between a current location of the host vehicle and the target location for the host vehicle. Advantageously, the determined navigation path can avoid the navigation obstacles in the environment.

The navigation goal may be a parking goal. Advantageously, autonomous navigation of the host vehicle to the parking goal can be carried out in along an efficient route.

The target orientation of the host vehicle may be different to a preliminary orientation of the host vehicle prior to navigation along the determined navigation path in the autonomous mode. The determined navigation path may comprise a change of direction manoeuvre in which a direction of travel of the host vehicle changes between a forward direction and a rearward direction. The change of direction manoeuvre may be a turn manoeuvre, for example a three-point turn.

According to an aspect of the invention, there is provided a system. The system comprises the control system, including a first controller arranged to output the path data. The system comprises a vehicle controller configured to cause the host vehicle to navigate autonomously, in the autonomous mode, along the determined navigation path to the navigation goal. Advantageously, the system can include the vehicle controller to cause the host vehicle to navigate in accordance with the determined navigation path.

The system may comprise sensing means configured to sense the environment of the host vehicle and to output the environment data to the control system in dependence thereon. Advantageously, the system can detect the environment of the host vehicle using sensing means. The sensing means may comprise a radar sensor. The sensing means may comprise an ultrasound sensor. The sensing means may comprise an optical camera. The sensing means may comprise an infrared camera. The sensing means may comprise a LIDAR sensor. The sensing means may comprise a stereoscopic sensor.

The system may comprise an input apparatus operable by a user of the host vehicle to receive a navigation goal of the host vehicle, and configured to output the goal signal to the control system in dependence thereon. Advantageously, the system can be operable by the user to control the host vehicle to navigate autonomously along the determined navigation path.

According to an aspect of the invention, there is provided a method for controlling a vehicle operable in an autonomous mode. The method comprises receiving a navigation goal of a vehicle. The vehicle has a front and a rear. The navigation goal defines a target location for the vehicle and a target orientation of the vehicle at the target location. The method comprises receiving environment data indicative of an environment of the vehicle. The method comprises, subsequent to receiving the navigation goal and the environment data, determining path data indicative of a determined navigation path for the vehicle to navigate, in an autonomous mode, to the navigation goal in dependence on a direction parameter. The method comprises autonomously navigating the vehicle to the navigation goal along the determined navigation path. The direction parameter is determined in dependence on a first amount of frontward travel of the vehicle along the determined navigation path and a second amount of rearward travel of the vehicle along the determined navigation path, such that a first navigation path having a lesser amount of rearward travel of the vehicle is chosen as the determined navigation path in preference of a second navigation path having a greater amount of rearward travel. Advantageously, the vehicle can navigate autonomously to the target location defined by the navigation goal along the determined navigation path, associated with a relatively little amount of rearward travel of the host vehicle.

Speed dependent on proximity to navigation obstacles
According to an aspect of the invention, there is provided a control system arranged to operably cause determination of a navigation trajectory including a plurality of navigation waypoints, each having associated therewith a navigation speed, wherein each navigation speed is determined in dependence on a proximity of the navigation trajectory to a location of one or more navigation obstacles indicated by environment data.

According to an aspect of the invention, there is provided a control system for a host vehicle operable in an autonomous mode. The control system comprises one or more controllers. The control system is configured to receive a goal signal indicative of a navigation goal of a host vehicle. The control system is configured to receive map data indicative of a navigable area in which the host vehicle is permitted to operate in an autonomous mode to navigate autonomously to the navigation goal. The control system is configured to receive environment data indicative of a location of one or more navigation obstacles in an environment associated with the navigable area of the host vehicle. At least one of the one or more navigation obstacles is not indicated in the map data. The one or more controllers, subsequent to receipt of the goal signal, the map data and the environment data, determine a navigation trajectory including a plurality of navigation waypoints, each having associated therewith a navigation speed. Each navigation speed is determined in dependence on a proximity of the navigation trajectory to the location of the one or more navigation obstacles indicated by the environment data. The one or more controllers output a navigation signal to cause the host vehicle, operating in the autonomous mode, to navigate autonomously to the navigation goal in accordance with the navigation trajectory. Advantageously, the navigation speeds along the navigation trajectory can be set depending on a proximity of the navigation obstacle(s) indicated in the environment data, even where at least one of the navigation obstacles is not present in the map data.

The one or more controllers may collectively comprise at least one electronic processor having an electrical input for receiving the goal signal, the map data and the environment data, and at least one electronic memory device electrically coupled to the at least one electronic processor and having instructions stored therein. The at least one electronic processor may be configured to access the at least one memory device and execute the instructions thereon so as to navigate the host vehicle, operating in the autonomous mode, to the navigation goal in accordance with each of the navigation speeds associated with the navigation waypoints along the navigation trajectory.

The environment data may be indicative of a current location of the host vehicle.

The navigation signal may be to cause the host vehicle, operating in the autonomous mode, to navigate autonomously to the navigation goal in dependence on the determined navigation speeds.

The map data may be indicative of a location of one or more previously identified navigation obstacles. Advantageously, the map data can be compared with the environment data to identify changes in the environment and to alter a navigation speed of the host vehicle in the vicinity of previously unseen navigation obstacles. The one or more navigation obstacles indicated by the environment data may include at least one navigation obstacle different to the one or more previously identified navigation obstacles indicated by the map data. The map data may comprise previous environment data indicative of a location of one or more navigation obstacles in the environment during a previous manoeuvre of the host vehicle in the environment. In other words, the previous environment data may be associated with the previous manoeuvre of the host vehicle at a first time, and the environment data may be indicative of the location of the one or more navigation obstacles in the environment at a second time, separated from the first time. The second time may be at least six hours after the first time. The second time may be substantially 24 hours after the first time. There may be at least one shutdown event of the host vehicle between the first time and the second time.

A first navigation speed associated with a first navigation waypoint of the navigation trajectory may be greater than a second navigation speed associated with a second navigation waypoint of the navigation trajectory. A distance between the first navigation waypoint and a first navigation obstacle may be greater than a distance between the second navigation waypoint and the first navigation obstacle. Advantageously, the host vehicle can move at a slower speed when in the vicinity of navigation obstacles. The distance between the second navigation waypoint and the first navigation obstacle may be less than a predetermined threshold distance. The distance between the first navigation waypoint and the first navigation obstacle may be greater than a predetermined threshold distance. The predetermined threshold distance may be greater than 0.5 metres. The predetermined threshold distance may be greater than one metre. The predetermined threshold distance may be less than ten metres. The predetermined threshold distance may be less than five metres.

It will be understood that a navigation obstacle can be any object, such as a physical object, in the environment associated with the navigable area of the host vehicle. The navigation obstacle may be such that the host vehicle is substantially unable to traverse the location of the navigation obstacle. Alternatively, the navigation obstacle may be such that it has been determined to avoid traversing the location of the navigation obstacle, even though the host vehicle may be capable, for example a flower bed. Typically, the navigation obstacle will be such as to provide an obstacle to movement for the host vehicle. The navigation obstacle may be a static navigation obstacle, that is, the obstacle is identified as being substantially incapable of movement, for example a wall, water body (e g a pond, lake or swimming pool), or vegetation. The navigation obstacle may be a dynamic navigation obstacle, that is, the obstacle is identified as being capable of movement between a first position in the environment and a second position in the environment. The dynamic navigation obstacle may be a further vehicle, an animal or a person. In this way, it will be understood that even if the navigation trajectory of the host vehicle is not in the vicinity of a current position of the dynamic navigation obstacle, the dynamic navigation obstacle may move to a further position during a movement of the host vehicle, such that the host vehicle is in the vicinity of the dynamic navigation obstacle at the further position.

The environment data may be indicative of an obstacle type of at least one of the one or more navigation obstacles being a dynamic obstacle, capable of moving along an obstacle path between a first location and a second location in the environment of the host vehicle. The one or more controllers may determine the navigation trajectory including each of the navigation speeds in dependence on the obstacle type of the at least one of the navigation obstacles being the dynamic obstacle. Advantageously, the speed of the host vehicle can be reduced when a dynamic obstacle is in the vicinity of the host vehicle.

The one or more controllers may determine the navigation speed associated with at least one navigation waypoint of the navigation trajectory in dependence on the obstacle path of the dynamic obstacle. The navigation speed associated with the at least one navigation waypoint may be determined such that the host vehicle remains at least a first predetermined distance from the dynamic obstacle during autonomous navigation to the navigation goal in the autonomous mode. Advantageously, the host vehicle can be slowed down or paused in advance of the dynamic obstacle to avoid an expected or possible movement of the navigation obstacle into the vicinity of the host vehicle. The first predetermined distance may be greater than 0.5 metres. The first predetermined distance may be greater than one metre. The first predetermined distance may be less than five metres.

The one or more controllers, during operation of the host vehicle in the autonomous mode, may output a pause signal to cause the host vehicle to stop in dependence on a distance to a first navigation obstacle, having an obstacle type of the dynamic obstacle, being less than a predetermined minimum distance. The predetermined minimum distance may be greater than 0.5 metres. The predetermined minimum distance may be greater than one metre. The predetermined minimum distance may be less than five metres. The one or more controllers, during operation of the host vehicle in the autonomous mode, may output a resume signal, subsequent to outputting the pause signal, to cause the host vehicle to resume movement along the navigation trajectory in dependence on the distance to the first navigation obstacle increasing beyond a predetermined second threshold. Advantageously, the host vehicle can move off again after being paused, once the first navigation obstacle is moved out of the vicinity of the host vehicle.

The predetermined second threshold may be greater than the predetermined minimum distance. The predetermined second threshold may be substantially equal to the predetermined minimum distance.

The one or more controllers, may determine the navigation trajectory in dependence on the map data. Advantageously, the navigable area can be used to determine the navigation trajectory. It will be understood that the navigation trajectory may change in dependence on the location of the one or more navigation obstacles indicated by the environment data.

The one or more controllers, subsequent to receipt of the environment data, may determine further area data indicative of a further navigable area, not including at least one of the one or more navigation obstacles, in dependence on the environment data, and determine the navigation trajectory in dependence on the further navigable area. Advantageously, the navigation trajectory may be determined taking into account the location of the one or more navigation obstacles.

The navigation goal may be a parking goal. The navigation goal may be a drop-off goal. The navigation goal may be a pick-up goal.

According to an aspect of the invention, there is provided a system. The system comprises the control system, including a first controller arranged to output the navigation signal. The system comprises a vehicle controller configured to receive the navigation signal and to cause the host vehicle, operating in the autonomous mode, to navigate to the navigation goal in accordance with the navigation trajectory. Advantageously, the system includes the vehicle controller to control the host vehicle.

The system may comprise sensing means to sense the location of the one or more navigation obstacles in the environment of the host vehicle and to output the environment data to the control system in dependence thereon. Advantageously, the environment data can be determined by sensing means associated with the host vehicle. The host vehicle may comprise the sensing means. As described hereinbefore, the sensing means may comprise a radar sensor. The sensing means may comprise an ultrasound sensor. The sensing means may comprise an optical camera. The sensing means may comprise an infrared camera. The sensing means may comprise a LIDAR sensor. The sensing means may comprise a stereoscopic sensor.

According to an aspect of the invention, there is provided a method for controlling a vehicle operable in an autonomous mode. The method comprises receiving a navigation goal of a vehicle. The method comprises receiving map data indicative of a navigable area in which the vehicle is permitted to operate in an autonomous mode to navigate autonomously to the navigation goal. The method comprises receiving environment data indicative of a location of one or more navigation obstacles in an environment associated with the navigable area of the vehicle, at least one of the one or more navigation obstacles not indicated in the map data. The method comprises, subsequent to receipt of the navigation goal, the map data and the environment data, determining a navigation trajectory including a plurality of navigation waypoints, each having associated therewith a navigation speed, wherein the navigation speeds are determined in dependence on a proximity of the navigation trajectory to the one or more navigation obstacles indicated by the environment data. The method comprises operating the vehicle in an autonomous mode. The method comprises, when operating in the autonomous mode, autonomously controlling the vehicle to navigate the environment to the navigation goal utilising the navigation trajectory. Advantageously, the host vehicle can be operated past navigation obstacles not indicated in the map data.

Control of Access Control Apparatus

According to an aspect of the invention, there is provided a control system arranged to operably cause an access control apparatus to change from a first state in which access for a host vehicle past the access control apparatus is prohibited to a second state in which access past the access control apparatus is permitted, and to cause the host vehicle to autonomously navigate past the access control apparatus to a navigation goal.

According to an aspect of the invention, there is provided a control system for a host vehicle operable in an autonomous mode. The control system comprises one or more controllers. The control system is configured to receive a goal signal indicative of a navigation goal for autonomous navigation thereto by a host vehicle operating in an autonomous mode. The navigation goal is associated with a traverse past an access control apparatus when the host vehicle is operating in the autonomous mode. The access control apparatus is operable on receipt of an access request to change from a first state in which access for the host vehicle past the access control apparatus is prohibited to a second state in which access past the access control apparatus is permitted. The one or more controllers output a first request signal indicative of the access request to cause the access control apparatus to change from the first state to the second state. When autonomously navigating to the navigation goal in the autonomous mode, the control system autonomously controls the host vehicle to traverse past the access control apparatus. Advantageously, the host vehicle can control the access control apparatus as part of the autonomous navigation to the navigation goal. Therefore, a user of the host vehicle need not separately activate the access control apparatus.

The one or more controllers may collectively comprise at least one electronic processor having an electrical input for receiving the mode signal and the state signal, and at least one electronic memory device electrically coupled to the at least one electronic processor and having instructions stored therein. The at least one electronic processor may be configured to access the at least one memory device and execute the instructions thereon so as to control the access control apparatus as part of the autonomous navigation of the host vehicle to the navigation goal.

The one or more controllers, subsequent to output of the first request signal, may output a navigation signal to cause the host vehicle, operating in the autonomous mode, to autonomously navigate to the navigation goal past the access control apparatus. Advantageously, the navigation signal can be used to cause the autonomous navigation of the host vehicle.

The control system may be configured to receive a state signal indicative of the access control apparatus being in the second state. The one or more controllers may output the navigation signal in dependence on the state signal. Advantageously, the host vehicle can wait for confirmation that the access control apparats has changed from the first state to the second state before causing the host vehicle to traverse past the access control apparatus. This can avoid damage to the host vehicle from proceeding too soon before the access control apparatus has fully changed from the first state to the second state.

The control system may comprise a wireless transmitter in data communication with the one or more controllers and configured to wirelessly output the first request signal. Advantageously, the control system can control the access control apparatus even when not connected to the access control apparatus via a wired connection.

The wireless transmitter may be configured to transmit the first request signal according to a predetermined wireless protocol. Advantageously, the control system can control the access control apparatus over one or more known wireless protocols.

The predetermined wireless protocol may be a radio frequency communication channel. The radio frequency communication channel may be one of a WiFi network connection, a Bluetooth connection and a cellular network connection. Advantageously, the wireless transmitter can control the access control apparatus over a common wireless protocol.

The one or more controllers may output the first request signal for receipt by a smart home hub connected to the access control apparatus. Advantageously, the first request signal may be sent indirectly from the control system to the access control apparatus. It will be understood that increasing numbers of homes have smart home hubs for controlling one or more electronic devices around the home, for example, security doors, heating, lighting, audio-visual systems, and access control apparatus. In some examples, the smart home hub may directly relay the first request signal to the access control apparatus. In other examples, the smart home hub may send a hub request signal, determined utilising the first request signal, to the access control apparatus to cause the access control apparatus to change from the first state to the second state. The smart home hub may be connected by a wired connection to the access control apparatus. The smart home hub may be connected by a wireless connection to the access control apparatus.

The control system may be configured to receive a location signal indicative of the host vehicle having cleared the access control apparatus. The one or more controllers, subsequent to receipt of the location signal and to output of the first request signal, may output a second request signal to cause the access control apparatus to change from the second state to the first state. Advantageously, the access control apparatus can revert back to the first state once the host vehicle has traversed past the access control apparatus. Thus, security at the access control apparatus can be maintained.

The navigation goal may be a parking goal. The navigation goal may be a pick-up goal. The navigation goal may be a drop-off goal (sometimes referred to as a set-down goal) The navigation goal may be from a parking location. It will be understood that a pick-up goal is for the host vehicle to pick up one or more occupants of the host vehicle, or to receive cargo for transportation by the host vehicle. It will be understood that a drop-off goal is for the host vehicle to drop off one or more occupants of the host vehicle, or to drop off cargo transported by the host vehicle.

The term "access control apparatus" will be understood to mean any physical or virtual barrier to access for the host vehicle. The access control apparatus may move from the first state to the second state. The access control apparatus may comprise a gate. The access control apparatus may comprise a garage door. The access control apparatus may comprise a rising bollard. The access control apparatus may comprise a movable ramp. Advantageously, the control system can control movement of a garage door and autonomous navigation of the host vehicle.

The goal signal may be indicative of a location of the navigation goal. Advantageously, the goal signal can be more than a mere request for the access control apparatus to change from the first state to the second state. The goal signal may comprise the location of the navigation goal. The location may be a symbolic location, for example "parking location", or may be a geographic location. The goal signal may be indicative of a vehicle orientation at the navigation goal.

According to an aspect of the invention, there is provided a system. The system comprises the control system, including a first controller configured to output the first request signal. The system comprises communication means configured to receive the first request signal from the first controller and to transmit an access request signal to the access control apparatus in dependence thereon, the access request signal to cause the access control apparatus to change from the first state to the second state. Advantageously, the system can include the communication means to communicate with the access control apparatus.

The communication means may comprise a wireless transmitter. The communication means may comprise a wired connection. The wireless transmitter may be substantially as described hereinbefore.

According to an aspect of the invention, there is provided a method for controlling a vehicle operable in an autonomous mode. The method comprises receiving a navigation goal for autonomous navigation thereto by a vehicle, operating in an autonomous mode. The method comprises identifying that the navigation goal is associated with a traverse past an access control apparatus when the vehicle is operating in the autonomous mode, the access control apparatus being operable on receipt of an access request to change between a first state in which access for the vehicle past the access control apparatus is prohibited and a second state in which access past the access control apparatus is permitted. The method comprises, subsequent to receipt of the navigation goal, changing the access control apparatus from the first state to the second state. The method comprises, when operating in the autonomous mode, autonomously controlling the vehicle to traverse past the access control apparatus towards the navigation goal while the access control apparatus is in the second state. Advantageously, there is a method of controlling the vehicle to traverse past the access control apparatus when the vehicle is operating in the autonomous mode Navigation Through a Non-Navigable Area According to an aspect of the invention, there is provided a control system arranged to operably cause the host vehicle to autonomously navigate to a navigation goal via a navigable area, the navigable area including at least a portion of a navigation path of the host vehicle, operating in a training mode, passing through a non-navigable area.

According to an aspect of the invention, there is provided a control system for a host vehicle operable in an autonomous mode and a non-autonomous mode. The control system comprises one or more controllers. The control system is configured to receive environment data indicative of an environment of the host vehicle. The one or more controllers identify a non-navigable area associated with the environment of the host vehicle in which autonomous navigation of the host vehicle, operating in the autonomous mode, is unavailable in dependence on the environment data. The one or more controllers, in a training mode, navigate the host vehicle via a navigation path through the environment in dependence on at least a steering input by a user of the host vehicle. The navigation path passes at least partially through the non-navigable area. The one or more controllers identify a navigable area associated with the environment of the host vehicle in which autonomous navigation of the host vehicle, operating in the autonomous mode, is available. The navigable area includes at least a portion of the navigation path passing through the non-navigable area. When subsequently navigating to a navigation goal in the autonomous mode, the control system utilises the navigable area to autonomously control the host vehicle. Advantageously, the host vehicle can autonomously navigate through at least a portion of a previously identified non-navigable area when the user of the host vehicle drives the host vehicle through the non-navigable area. For example, where the environment data is indicative of a region of the environment covered in grass, this can be identified as a non-navigable area. However, if the user, operating the host vehicle in the training mode, subsequently controls the host vehicle to drive over the grass region, the region of the environment covered in grass can be included in the navigable area associated with the environment. In this way, in subsequent autonomous navigation of the host vehicle, the vehicle can drive over the region covered in grass, whilst still remaining in the navigable area.

The one or more controllers may collectively comprise at least one electronic processor having an electrical input for receiving the environment data and the path data, and at least one electronic memory device electrically coupled to the at least one electronic processor and having instructions stored therein. The at least one electronic processor may be configured to access the at least one memory device and execute the instructions thereon so as to utilise the navigable area to autonomously navigate the environment.

The control system may be configured to receive a goal signal indicative of the navigation goal of the host vehicle associated with the navigable area. The one or more controllers, subsequent to receiving the goal signal and identifying the navigable area, may output a navigation signal to cause the host vehicle to navigate to the navigation goal via a determined path associated with the navigable area. Advantageously, the host vehicle can navigate via a determined path through the navigable area, including the region previously determined to be part of the non-navigable area. The one or more controllers may determine the path in dependence on the navigable area and the goal signal.

The control system may be configured to receive, during the training mode, one or more state signals indicative of one or more control inputs of the host vehicle during the navigation via the navigation path. When subsequently navigating to the navigation goal in the autonomous mode, the control system may utilise the one or more state signals to autonomously control the host vehicle. The one or more control inputs may comprise a ride height. The one or more control inputs may comprise a traction control setting. The one or more control inputs may comprise an ABS setting. The one or more control inputs may comprise a transmission gear.

The environment data may be indicative of one or more terrain categories associated with the environment. The one or more controllers may identify the non-navigable area in dependence on the one or more terrain categories. Advantageously, some of the one or more terrain category (sometimes referred to as terrain type) associated with the environment can, by default, be associated with the non-navigable area of the environment. For example, the host vehicle may not, by default navigate autonomously over grass or mud. However, where the user navigates the host vehicle over any of the terrain categories included in the non-navigable areas, the control system may subsequently allow autonomous navigation of the host vehicle over the terrain categories included in the non-navigable area and navigated over by the user in the training mode.

The terrain categories may include at least one of grass, mud, gravel, tarmac, sand, snow, earth, and concrete. In some examples, the terrain categories may be further subdivided, for example into short grass and long grass.

The navigable area may have associated therewith each of the one or more terrain categories of the environment associated with the navigation path. Advantageously, the host vehicle can then determine that any of the terrain categories covered by the navigation path can be included in the navigable area. The host vehicle may be in the non-navigable area in the training mode.

The navigable area may include all of the non-navigable area associated with each of the terrain categories of the environment associated with the navigation path. The navigable area may have associated therewith each of the one or more terrain categories of the environment associated with the navigation path. Advantageously, any terrain covered by the navigation path can be included in the navigable area for subsequent autonomous navigation of the host vehicle thereover.

A boundary of the navigable area may be associated with a further terrain category different from the one or more terrain categories associated with the navigation path. Advantageously, the navigable area may be contained within terrain categories not available for autonomous navigation by the host vehicle.

According to an aspect of the invention, there is provided a system. The system comprises the control system, including a first controller configured to receive the environment data. The system comprises sensing means configured to sense the environment of the host vehicle, and configured to output the environment data to the first controller in dependence thereon. Advantageously, the system includes the sensing means to sense the environment.

The sensing means may be configured to sense the one or more terrain categories associated with the environment. As described hereinbefore, the sensing means may comprise a radar sensor. The sensing means may comprise an ultrasound sensor. The sensing means may comprise an optical camera. The sensing means may comprise an infrared camera. The sensing means may comprise a LIDAR sensor.

Theسensing means may comprise a stereoscopic sensor.

The system may comprise a vehicle controller configured to receive the navigation signal from the control system and to cause the host vehicle, operating in the autonomous mode, to autonomously navigate to the navigation goal via the determined path associated with the navigable area. Advantageously, the system can include the vehicle controller to autonomously control the host vehicle.

According to an aspect of the invention, there is provided a method for controlling a vehicle operable in an autonomous mode and a non-autonomous mode. The method comprises receiving environment data indicative of an environment of the vehicle. The method comprises identifying a non-navigable area in the environment of the host vehicle in which autonomous navigation of the host vehicle, operating in the autonomous mode, is unavailable in dependence on the environment data. The method comprises operating the vehicle in a training mode. The method comprises, when operating in the training mode, navigating the vehicle via a navigation path through the environment in dependence on at least a steering input by a user of the vehicle. The navigation path passes through the non-navigable area. The method comprises identifying a navigable area in the environment of the vehicle in which autonomous navigation of the vehicle, operating in the autonomous mode, is available. The navigable area includes at least a portion of the navigation path passing through the non-navigable area. The method comprises, when operating in the autonomous mode, autonomously controlling the vehicle to navigate to a navigation goal utilising the navigable area. Advantageously, the method can control the vehicle to navigate autonomously in the navigable area including portions of the environment previously identified as being in a non-navigable area for the vehicle.

The navigable area may be determined in dependence on one or more terrain categories of the environment indicated by the environment data.

Preparing for autonomous navigation According to an aspect of the invention, there is provided a control system arranged to operably cause one or more components associated with an effectiveness of one or more sensors of a host vehicle to prepare the host vehicle for autonomous navigation to a navigation goal in dependence on receipt of a request for autonomous navigation of the host vehicle to the navigation goal.

According to an aspect of the invention, there is provided a control system for a host vehicle operable in an autonomous mode. The control system comprises one or more controllers. The control system is configured to receive a request signal indicative of a request for autonomous navigation of the host vehicle, operating in the autonomous mode, from a current location of the host vehicle to a navigation goal. The one or more controllers, subsequent to receipt of the request signal, output a precondition signal to cause one or more components associated with an effectiveness of one or more sensors of the host vehicle to prepare the host vehicle for autonomous navigation to the navigation goal prior to movement of the host vehicle away from the current location. The one or more controllers navigate the host vehicle to the navigation goal. Advantageously, the control system can prepare the host vehicle for navigation in the autonomous mode where the sensors required for operation of the host vehicle in the autonomous mode are in an ineffective state.

The one or more controllers may collectively comprise at least one electronic processor having an electrical input for receiving the request signal, and at least one electronic memory device electrically coupled to the at least one electronic processor and having instructions stored therein. The at least one electronic processor may be configured to access the at least one memory device and execute the instructions thereon so as to prepare the host vehicle, operating in the autonomous mode, for autonomous navigation to the navigation goal.

The request signal may be indicative of the navigation goal. Advantageously, the navigation goal can be included in the request signal, allowing the host vehicle to determine a navigation path to the navigation goal for autonomous navigation thereto. In some examples, the precondition signal may be output in dependence on the navigation goal. For example, for some navigation goals, it may be only some of the one or more sensors of the host vehicle need be effective.

The request may be for the host vehicle to arrive at a predetermined time. The request may be for the host vehicle to depart at a predetermined time. The request signal may be indicative of the predetermined time. Advantageously, the host vehicle can prepare in advance for autonomous navigation to the navigation goal on time.

The one or more controllers may navigate the host vehicle to the navigation goal for arrival at the predetermined time. Advantageously, the host vehicle can arrive on time.

The navigation goal may be a pick-up location.

The one or more controllers may output a notification signal to notify a user of the host vehicle of an expected arrival time of the host vehicle at the navigation goal. Advantageously, the user can be provided with information on the expected arrival time of the host vehicle at the navigation goal. For example, the notification signal may be to notify the user that the host vehicle will not arrive at the predetermined time. The expected arrival time may comprise a time. For example, the expected arrival time may take the form "09.34".

The precondition signal may be to cause operation of a heating component associated with the host vehicle to prepare the host vehicle for the autonomous navigation to the navigation goal. Advantageously, the one or more components associated with the effectiveness of the one or more sensors of the host vehicle may prepare the host vehicle for autonomous navigation to the navigation goal by heating, for example where the one or more sensors are covered in frost, or are less effective at low temperatures.

The precondition signal may be to cause operation of a cooling component associated with the host vehicle to prepare the host vehicle for the autonomous navigation to the navigation goal. Advantageously, the one or more components associated with the effectiveness of the one or more sensors of the host vehicle may prepare the host vehicle for autonomous navigation to the navigation goal by cooling, for example where the one or more sensors are less effective at high temperatures.

The ore or more components may be part of the host vehicle. Alternatively, the one or more components may be separate from the host vehicle, for example in a garage for storage of the host vehicle.

The control system may be configured to receive a status signal indicative of an effectiveness of the one or more sensors. The one or more controllers may commence navigation of the host vehicle to the navigation goal in dependence on the effectiveness of the one or more sensors. Advantageously, the host vehicle can begin navigating autonomously to the navigation goal when the one or more sensors is sufficiently effective for utilising in the autonomous mode of the host vehicle.

The status signal may be indicative of a time since activation of the one or more components associated with the effectiveness of the one or more sensors.

The host vehicle may begin autonomous navigation to the navigation goal when only some of the one or more sensors are sufficiently effective.

The request signal may be indicative of an entry in a calendar associated with a user of the host vehicle. Advantageously, the control system can use the calendar of the user to determine that the host vehicle will be required.

At least one of the one or more components may be for clearing an aperture of the host vehicle, the aperture associated with at least one of the one or more sensors. Advantageously, the aperture can be cleared to improve the effectiveness of the sensor(s) The aperture may be a window. The aperture may be a sunroof. The aperture may be a headlight.

The one or more components may comprise a wiper. The one or more components may comprise a window washing component. The one or more components may comprise a de-icing component.

The at least one of the one or more components may comprise a heating component for de-icing the aperture. Advantageously, the control system can de-ice the aperture covering the one or more sensors prior to autonomous navigation of the host vehicle to the navigation goal.

The one or more controllers may navigate the host vehicle to the navigation goal utilising sensor data received from the one or more sensors.

According to an aspect of the invention, there is provided a system. The system comprises the control system, including a first controller configured to output the precondition signal. The system comprises one or more components associated with the effectiveness of the one or more sensors configured to receive the precondition signal from the first controller and, in dependence thereon, to prepare the host vehicle, operating in the autonomous mode, for autonomous navigation to the navigation goal. Advantageously, the system includes the one or more components associated with the effectiveness of the one or more sensors.

The system may comprise the one or more sensors. Advantageously, the sensors can be included in the system, for example as part of the host vehicle.

The ore or more components may comprise a heating component. Advantageously, heating can improve the effectiveness of the one or more sensors.

The one or more components may comprise a cooling component. Advantageously, cooling can improve the effectiveness of the one or more sensors.

The system may comprise a vehicle controller configured to cause the host vehicle, operating in the autonomous mode, to navigate autonomously to the navigation goal. Advantageously, the system can include the vehicle controller to control the autonomous navigation of the host vehicle. The vehicle controller may be configured to cause the host vehicle, operating in the autonomous mode, to navigate autonomously to the navigation goal in dependence on a sensor output from the one or more sensors.

According to an aspect of the invention, there is provided a method for controlling a vehicle operable in an autonomous mode. The method comprises receiving a request for autonomous navigation of the vehicle, operating in the autonomous mode, from a current location of the vehicle to a navigation goal. The method comprises operating one or more components associated with an effectiveness of one or more sensors of the vehicle to prepare the vehicle for navigation to the navigation goal prior to movement of the vehicle away from the current location. The method comprises operating the vehicle in the autonomous mode. The method comprises, when the vehicle is operating in the autonomous mode, autonomously navigating the vehicle to the navigation goal. Advantageously, the host vehicle can be prepared for autonomous navigation to the navigation goal.

Accessibility Based on Extent of External Feature

According to an aspect of the invention, there is provided a control system arranged to operably cause notification of a user of a host vehicle of the accessibility of a navigation goal for autonomous navigation thereto by the host vehicle, operating in an autonomous mode. The notification of the user is caused in dependence on environment data indicative of an environment of the host vehicle and on an extent of an external feature associated with the host vehicle.

According to an aspect of the invention, there is provided a control system for a host vehicle, operable in an autonomous mode. The control system comprises one or more controllers. The control system is configured to receive a size signal indicative of an extent of an external feature associated with a host vehicle. The control system is configured to receive environment data indicative of an environment of the host vehicle. The one or more controllers identify an accessibility of a navigation goal for the host vehicle in dependence on the size signal and the environment data. The one or more controllers output an accessibility signal to notify a user of the host vehicle of the accessibility of the navigation goal. The one or more controllers, when operating the host vehicle in the autonomous mode, autonomously navigate the host vehicle to one of the navigation goal or an alternative navigation goal in dependence on the accessibility of the navigation goal. Advantageously, the control system can navigate the host vehicle to the navigation goal only if the navigation goal is determined to be accessible based on the extent of an external feature associated with the host vehicle. It will be understood that the external feature is different from an outer body of the host vehicle. For example, where the navigation goal comprises a navigation through a restricted opening, the extent of the external feature associated with the host vehicle can be taken into account as well as the extent of the host vehicle in the absence of the external feature.

The one or more controllers may collectively comprise at least one electronic processor having an electrical input for receiving the size signal and the environment data, and at least one electronic memory device electrically coupled to the at least one electronic processor and having instructions stored therein. The at least one electronic processor may be configured to access the at least one memory device and execute the instructions thereon so as to notify the user of the accessibility of the navigation goal for the host vehicle and to autonomously navigate the host vehicle to one of the navigation goal and the alternative navigation goal.

The one or more controllers may determine the extent of the external feature in dependence on the size signal.

The external feature may be an optional feature. It will be understood that the term optional feature includes any feature of the host vehicle which is removable or attached after assembly of the host vehicle.

The external feature can sometimes be referred to as an attachment. In other words, the external feature may be to attach to a body of the host vehicle.

The accessibility signal may be to request confirmation from the user to autonomously navigate the host vehicle to the navigation goal.

The alternative navigation goal may be a different navigation goal. In some examples, the alternative navigation goal may comprise not navigating the host vehicle to the navigation goal. Navigation of the host vehicle to the alternative navigation goal may comprise movement of the host vehicle.

The external feature may be one of a plurality of external features of the host vehicle. The external feature may be removably mounted to the host vehicle. Advantageously, the external feature can be a temporary feature of the host vehicle, where the size of the external feature changes an accessibility of navigation goals for the host vehicle.

The external feature may comprise one or more roof-mounted objects, sometimes referred to as a roof attachment. The size signal may be indicative of an extent of the external feature in a dimension that impacts the accessibility of the navigation goal. The size signal may be indicative of an additional height of the host vehicle due to the one or more roof-mounted objects. Advantageously, where the host vehicle is provided with a roof-mounted object, the host vehicle can be controlled to only autonomously navigate into spaced having sufficient height clearance, for example garages.

The one or more controllers, subsequent to receipt of the environment data, may determine a clearance extent defined by at least one feature of the environment of the host vehicle. The one or more controllers, subsequent to receipt of the size signal, may determine a vehicle extent of the host vehicle. The one or more controllers, subsequent to determining the clearance extent and the vehicle extent, may determine the accessibility of the navigation goal. Advantageously, the autonomous navigation of the host vehicle may only proceed when the host vehicle, including the external feature will fit through an opening defined by one or more features of the environment. The clearance extent may be determined in dependence on the environment data. The vehicle extent may be determined in dependence on the size signal and a reference vehicle size in the absence of the external feature. The accessibility of the navigation goal may be determined in dependence on the clearance extent and the vehicle extent. For example, the navigation goal may be determined to be accessible in dependence on the clearance extent being greater than the vehicle extent. The navigation goal may be determined to be accessible in dependence on the clearance extent being greater than the vehicle extent by at least a first predetermined threshold. The first predetermined threshold may be at least 10 centimetres.

According to an aspect of the invention, there is provided a system. The system comprises the control system, including a first controller configured to output the accessibility signal. The system comprises notification means configured to receive the accessibility signal from the first controller and in dependence thereon, output a user notification of the accessibility of the navigation goal for the host vehicle Advantageously, the system includes the notification means to notify the user of the accessibility of the navigation goal.

The notification means may comprise a display means, for example an electronic display. The notification means may comprise audio output means, for example an audio transducer.

The system may comprise an input apparatus to receive a user input indicative of the extent of the external feature in at least one dimension of the external feature and to output the size signal to the control system in dependence thereon. Advantageously, the user can easily provide the extent of the external feature.

The system may comprise sensing means to sense the environment of the host vehicle and to output the environment data to the control system in dependence thereon. Advantageously, the system can include the sensing means to sense the environment. The sensing means may comprise one or more sensors. The sensing means may comprise a radar sensor. The sensing means may comprise an ultrasound sensor. The sensing means may comprise an optical camera. The sensing means may comprise an infrared camera. The sensing means may comprise a LI DAR sensor. The sensing means may comprise a stereoscopic sensor.

According to an aspect of the invention, there is provided a method for controlling a vehicle. The method comprises receiving a size signal indicative of an extent of an external feature associated with a vehicle. The method comprises receiving environment data indicative of an environment of the vehicle. The method comprises identifying an accessibility of a navigation goal for the vehicle in dependence on the size signal and the environment data. The method comprises notifying a user of the vehicle of the accessibility of the navigation goal. The method comprises, when operating the vehicle in an autonomous mode, autonomously navigating the vehicle to one of the navigation goal or an alternative navigation goal in dependence on the accessibility of the navigation goal. Advantageously, the user can be notified of the accessibility of the navigation goal to the vehicle operating in the autonomous mode, even when the vehicle is provided with an external feature Modified Navigation Definition According to an aspect of the invention, there is provided a control system arranged to operably cause modification of a navigation definition associated with autonomous navigation of a host vehicle to a first navigation goal in dependence on a request by a user of the host vehicle and a location of the host vehicle.

According to an aspect of the invention, there is provided a control system for a host vehicle operable in an autonomous mode and a non-autonomous mode. The control system comprises one or more controllers. The control system is configured to receive, when operating in the non-autonomous mode a navigation signal indicative of a navigation definition associated with navigation to a first navigation goal, a request signal indicative of a request by a user of a host vehicle to modify the navigation definition, and a location signal indicative of a location of the host vehicle. In the non-autonomous mode, subsequent to receipt of the request signal, the one or more controllers determine a modified navigation definition associated with navigation of the host vehicle in the autonomous mode via the location indicated by the location signal, and output the modified navigation definition. When subsequently navigating the host vehicle in the autonomous mode, the control system utilises the modified navigation definition to autonomously control the host vehicle. Advantageously, the autonomous navigation of the host vehicle can be modified to be via one location of the host vehicle in response to the request from the user. In other words, if the user is unhappy with a particular part of the navigation definition, this can be re-driven by the user and the modified navigation definition determined using the location of the host vehicle.

The one or more controllers may collectively comprise at least one electronic processor having an electrical input for receiving the navigation signal, the request signal and the location signal, and at least one electronic memory device electrically coupled to the at least one electronic processor and having instructions stored therein. The at least one electronic processor may be configured to access the at least one memory device and execute the instructions thereon so as to utilise the location signal to modify the navigation definition.

The modified navigation definition may be associated with navigation of the host vehicle in accordance with a second navigation goal, different from the first navigation goal, in the autonomous mode. Advantageously, the host vehicle can navigate differently based on the location of the host vehicle. The second navigation goal may define a different destination location to a destination location associated with the first navigation goal. A navigation route associated with the second navigation goal may be different to a navigation route associated with the first navigation goal. A vehicle orientation associated with the second navigation goal may be different to a vehicle orientation associated with the first navigation goal. The vehicle orientations in each of the first and second navigation goals may each be at the destination locations of the first and second navigation goals.

A location of the second navigation goal may be determined in dependence on the location indicated by the location signal. Advantageously, the location of the host vehicle indicated by the location signal can be part of the autonomous navigation by the host vehicle in accordance with the second navigation goal. For example, where the user of the host vehicle navigates the vehicle to a second destination location, different to a destination location of the first navigation goal, the modified navigation definition can be associated with autonomous navigation of the host vehicle to the second destination location. Therefore, it will be understood that the term 'via' as used herein includes navigation of the host vehicle in the autonomous mode to the location indicated by the location signal. The location of the second navigation goal may be a geographic location. The geographic location may be indicated in a predetermined coordinate system, for example longitude and latitude. The location of the second navigation goal may be a relative location.

The location of the second navigation goal may be the location indicated by the location signal.

The location signal may comprise a path signal indicative of a path of the host vehicle. Advantageously, the path of the host vehicle following the request by the user can be used to determine the modified navigation definition.

The location signal may be indicative of a current location of the host vehicle. The location signal may be indicative of a previous location of the host vehicle. The location signal may be indicative of an expected future location of the host vehicle. The path may be a current path of the host vehicle. The path may be a previous path of the host vehicle. The path may be an expected future path of the host vehicle.

In the non-autonomous mode, subsequent to receipt of the request, the host vehicle may be navigated via the location, for example via the path, in dependence on at least a primary control input of the user. The primary control input may be a steering control input. The primary control input may be an acceleration control input and/or a braking control input.

The path may be to the second navigation goal. Advantageously, the host vehicle can determine the modified navigation definition to be associated with navigation of the host vehicle in the autonomous mode along at least a portion of the path.

The one or more controllers may replace the navigation definition with the modified navigation definition. The one or more controllers may determine the modified navigation definition in dependence on the navigation definition associated with navigation of the host vehicle to the first navigation goal. Advantageously, much of the navigation definition associated with autonomous navigation of the host vehicle to the first navigation goal can be retained and re-used in determining the modified navigation definition. Therefore, the user need only re-drive the portion of the navigation of the host vehicle which they wish to differ from the navigation to the first navigation goal indicated by the navigation definition.

The request signal may be indicative of the request by the user to modify only a portion of the navigation definition. Advantageously, at least some of the navigation definition indicated by the navigation signal may remain unmodified in the modified navigation definition.

The navigation definition may be associated with navigation of the host vehicle to the first navigation goal in the autonomous mode. Advantageously, the navigation definition may be for the host vehicle.

According to an aspect of the invention, here is provided a system. The system comprises the control system, configured to output the modified navigation definition. The system comprises an input apparatus, configured to receive the request to modify the navigation definition from the user, and to output the request signal to a first controller of the control system in dependence thereon. Advantageously, the system includes the input apparatus and can receive the request from the user.

The system may comprise primary control apparatus configured to receive one or more primary control inputs from the user to cause the host vehicle to perform navigation of the host vehicle via the location indicated by the location signal in dependence on the one or more primary control inputs. Advantageously, the host vehicle can be controlled by the user to navigate via the location in order to determine the modified navigation definition associated with autonomous navigation of the host vehicle via the location.

The one or more primary control inputs from the user may be to cause the host vehicle to perform navigation of the host vehicle to the location indicated by the location signal. The one or more primary control inputs may include a steering control input. The one or more primary control inputs may include an acceleration control input. The one or more primary control inputs may include a braking control input.

According to an aspect of the invention, there is provided a method for controlling a vehicle operable in an autonomous mode and a non-autonomous mode. The method comprises receiving, when a vehicle is operating in the non-autonomous mode, a navigation definition associated with navigation to a first navigation goal. The method comprises receiving a request by a user of the vehicle to modify the navigation definition. The method comprises receiving location data indicative of a location of the vehicle. The method comprises, subsequent to receipt of the request and the location data, determining a modified navigation definition, associated with navigation of the vehicle in the autonomous mode, in dependence on the navigation definition and the location. The method comprises operating the vehicle in the autonomous mode. The method comprises navigating the host vehicle in the autonomous mode in accordance with the modified navigation definition. Advantageously, the modified navigation definition can be determined to alter operation of the vehicle in the autonomous mode.

The method may comprise navigating to the first navigation goal prior to receiving the request, and navigating to the location in dependence on the request. In other words, the user can re-navigate part of a previously performed autonomous manoeuvre of the host vehicle in order that future performance of the autonomous manoeuvre, as defined by the modified navigation definition, will meet with the users requirements.

Supervised Navigation

According to an aspect of the invention, there is provided a control system arranged to operably cause autonomous navigation of a host vehicle to a navigation goal in the presence of a user, for example in the vehicle, in dependence on a confirmation of a navigation request by the user that the host vehicle is to navigate to the navigation goal.

According to an aspect of the invention, there is provided a control system for a host vehicle operable in an autonomous mode and a non-autonomous mode. The control system comprises one or more controllers. The control system is configured to receive vehicle control data for causing a host vehicle to navigate to a navigation goal in an autonomous mode. The control system is configured to receive, when operating in a non-autonomous mode, a request signal indicative of a navigation request by a user for navigation of the host vehicle to the navigation goal, and a presence signal indicative of a presence of the user in the host vehicle. The one or more controllers, subsequent to receipt of the request signal, output a notification signal to notify the user that the host vehicle can navigate to the navigation goal in the autonomous mode in the absence of the user in dependence on the presence signal. The one or more controllers, when operating in a supervised mode, autonomously navigate the host vehicle towards the navigation goal in dependence on receipt of a confirmation signal indicative of confirmation of the navigation request by the user for navigation of the host vehicle to the navigation goal in the presence of the user. The host vehicle is autonomously navigated towards the navigation goal utilising the vehicle control data. Advantageously, the autonomous navigation of the host vehicle to the navigation goal can be performed even in the presence of the user in the host vehicle. The user can therefore be reassured that the host vehicle is carrying out autonomous navigation to the navigation goal along an acceptable route. It will be understood that the vehicle control data is sufficient for the host vehicle to autonomously navigate to the navigation goal in the absence of the user in the host vehicle.

The one or more controllers may collectively comprise at least one electronic processor having an electrical input for receiving the vehicle control data, the request signal, the presence signal and the confirmation signal, and at least one electronic memory device electrically coupled to the at least one electronic processor and having instructions stored therein. The at least one electronic processor may be configured to access the at least one memory device and execute the instructions thereon so as to cause the host vehicle to navigate autonomously towards the navigation goal in the supervised mode.

The vehicle control data may comprise one or more vehicle control instructions for controlling one or more locomotive components, such as motors, of the host vehicle.

The control system may be configured to receive a validation signal indicative of a validation of the vehicle control data by the user of the host vehicle after the host vehicle has completed autonomous navigation towards the navigation goal in the supervised mode. Advantageously, the users validation of the autonomous navigation to the navigation goal can be used to determine whether to make the user aware in future that autonomous navigation of the host vehicle to the navigation goal with the user in the vehicle is available. The one or more controllers may store data, in a memory, associated with the autonomous navigation towards the navigation goal. The data stored in the memory may include validation data indicative of the validation of the vehicle control data.

The validation of the vehicle control data by the user may be implicit or explicit. Where the validation is explicit, the validation signal may be indicative of a validation input from the user to indicate that the user accepts the autonomously navigation of the host vehicle to the navigation goal was as required. Alternatively, where the validation is implicit, the validation signal may be indicative of a non-action from the user which would indicate that the user does not find the autonomous navigation of the host vehicle to the navigation goal unacceptable. For example, the implicit validation may be based on an inaction of the user, such as a lack of interaction by the user with the control system for at least a predetermined time after completion of the autonomous navigation to the navigation goal. The explicit validation may be associated with an exit of the user from the host vehicle.

The control system may be configured to receive a control signal indicative of a control request by the user for deviating from a navigation path of the host vehicle during autonomous navigation towards the navigation goal in the supervised mode. The one or more controllers may deviate from the navigation path in dependence on the control signal. Advantageously, where the user is not satisfied with the navigation path followed by the host vehicle during autonomous navigation of the host vehicle to the navigation goal, the user can change the navigation path. The control system may determine modified vehicle control data based on the deviation from the navigation path, such that future autonomous navigation of the host vehicle to the navigation goal utilises the modified vehicle control data and also deviates from the previous navigation path. The deviation may be associated with a portion of the autonomous navigation to the navigation goal other than a destination location associated of the navigation goal.

Deviating from the Navigation Path May Comprise Stopping the Host Vehicle

The one or more controllers may deviate from the navigation path during navigation towards the navigation goal in dependence on the control signal in only the supervised mode of the supervised mode and an unsupervised mode. Advantageously, the control signal can be ignored where the host vehicle is autonomously navigating to the navigation goal in the unsupervised mode. It will be understood that the unsupervised mode is a mode in which the host vehicle autonomously navigates to the navigation goal in the absence of the user in the host vehicle.

The control signal may be indicative of a primary control input from the user. The primary control input may comprise at least one of a longitudinal movement control input and a lateral movement control input Advantageously, the path of the host vehicle may be changed as a result of primary control intervention by the user during autonomous navigation to the navigation goal. The longitudinal movement control input may comprise an acceleration control input. The longitudinal movement control input may comprise a braking control input. The lateral movement control input may comprise a steering control input.

The control system may be configured to receive an availability signal indicative of an availability of an autonomous navigation of the host vehicle to the navigation goal in an unsupervised mode. The one or more controllers may output a further notification signal to notify the user of an availability of operation of the host vehicle in the supervised mode for navigation towards the navigation goal, in dependence on autonomous navigation of the host vehicle to the navigation goal being available. Advantageously, the user can be made aware that autonomous navigation of the host vehicle to the navigation goal can be performed in the presence of the user, when it is determined that autonomous navigation of the host vehicle to the navigation is available without the presence of the user. In response, the user can request that the autonomous navigation is performed in the presence of the user, for example inside the vehicle.

According to an aspect of the invention, there is provided a system. The system comprises the control system, arranged to cause the host vehicle to navigate towards the navigation goal. The control system comprises an input apparatus, configured to receive the confirmation by the user and to output the confirmation signal to the control system in dependence thereon. Advantageously, the system includes the input apparatus and can receive the confirmation by the user.

It will be understood that the confirmation by the user may be an explicit confirmation, for example where the input apparatus is a button to be operated by the user to indicate confirmation that the host vehicle is to autonomously navigate to the navigation goal in the presence of the user in the host vehicle. Alternatively, the confirmation by the user may be an implicit confirmation, for example where the input apparatus is a presence sensor which detects a continued presence of the user in the vehicle for at least a predetermined time.

The system may comprise a control apparatus to receive the control request by the user and to output the control signal to the control system in dependence thereon. Advantageously, the control signal can be received by the system.

The control apparatus may comprise a primary control apparatus to receive at least one of a longitudinal movement control input and a lateral movement control input from the user.

The system may comprise notification means to receive the notification signal from the control system and to output the user notification in dependence thereon. The notification means may comprise a display means, such as an electronic display. The notification means may comprise audio generating means, such as an audio transducer. The notification means may comprise haptic means, such as a haptic device, for example a vibration motor.

According to an aspect of the invention, there is provided a method for controlling a vehicle operable in an autonomous mode and a non-autonomous mode. The method comprises receiving vehicle control data for causing a vehicle to navigate to a navigation goal in an unsupervised mode. The method comprises operating the vehicle in a supervised mode. The method comprises, when operating in the supervised mode, receiving a navigation request by a user for navigation of the vehicle to the navigation goal. The method comprises, when operating in the supervised mode, determining a presence of the user in the vehicle. The method comprises, when operating in the supervised mode, notifying the user that the vehicle can navigate to the navigation goal in the autonomous mode in the absence of the user in dependence on the determined presence of the user. The method comprises, when operating in the supervised mode, receiving a confirmation of the navigation request by the user for navigation of the vehicle to the navigation goal in the presence of the user. The method comprises, when operating in the supervised mode, autonomously navigating the vehicle towards the navigation goal in the presence of the user, utilising the vehicle control data, in dependence on the received confirmation. Advantageously, the vehicle can autonomously navigate to the navigation goal when the user is present in the vehicle, using vehicle control data suitable for use during autonomous navigation of the vehicle to the navigation goal when the user is not present in the vehicle. This can provide confidence to the user that the vehicle can correctly navigate to the navigation goal.

The method may comprise operating the vehicle in the unsupervised mode, and, when operating in the unsupervised mode, receiving a further navigation request by the user for navigation of the vehicle to the navigation goal. The method may comprise, when operating in the unsupervised mode, autonomously navigating the vehicle to the navigation goal in the unsupervised mode utilising the vehicle control data Advantageously, the vehicle can autonomously navigate to the navigation goal utilising the vehicle control data in both the supervised mode and the unsupervised mode.

In the unsupervised mode, the user may not be present in the vehicle. In some examples, the user can be in a vicinity of the vehicle in the unsupervised mode. In other examples, the user can be away from the vehicle in the unsupervised mode Modified Portion of Navigation Goal According to an aspect of the invention, there is provided a control system arranged to operably cause autonomous navigation of a host vehicle in accordance with a first navigation definition and a third navigation definition associated with a navigation goal in dependence on an availability of autonomous navigation of the host vehicle in accordance with the first navigation definition and a second navigation definition associated with the navigation goal, and in dependence on a rejection of autonomous navigation in accordance with the second navigation definition.

According to an aspect of the invention, there is provided a control system for a host vehicle operable in an autonomous mode and a non-autonomous mode. The control system comprises one or more controllers. The control system is configured to receive an availability signal indicative of an availability of autonomous navigation by the host vehicle operating in the autonomous mode in accordance with a navigation goal. The navigation goal is associated with, for example includes a first navigation definition for autonomous navigation in accordance therewith and a second navigation definition for autonomous navigation in accordance therewith subsequent to navigation in accordance with the first navigation definition. The control system is configured to receive, when operating in the non-autonomous mode, a rejection signal indicative of a rejection by the user of autonomous navigation in accordance with the second navigation definition of the navigation goal. The control system is configured to receive, when operating in the non-autonomous mode, a request signal indicative of a request for the host vehicle to autonomously navigate in accordance with a third navigation definition of the navigation goal subsequent to navigation in accordance with the first navigation definition. The third navigation definition is different to the second navigation definition. The one or more controllers, subsequent to receipt of the availability signal, output a notification signal to notify a user of a host vehicle of the availability of autonomous navigation in accordance with the first navigation definition and the second navigation definition. The one or more controllers, subsequent to receipt of the rejection signal and the request signal, output a navigation signal to cause the host vehicle to navigate autonomously in accordance with the first navigation definition and the third navigation definition of the navigation goal instead of the second navigation definition. Advantageously, the host vehicle can replace the second navigation definition associated with autonomous navigation in accordance with the navigation goal with the third navigation definition, whilst maintaining the first navigation definition. In other words, a first portion of the autonomous navigation of the host vehicle in accordance with the navigation goal can be maintained while a second portion of the autonomous navigation of the host vehicle in accordance with the navigation goal is changed. Therefore, if the user wants to change only characteristics of part of the autonomous navigation in accordance with the navigation goal, a portion of the autonomous navigation acceptable to the user need not be re-learned or re-defined, even where the autonomous navigation to the navigation goal as a whole is unacceptable.

The one or more controllers may collectively comprise at least one electronic processor having an electrical input for receiving the availability signal and the alternative goal signal, and at least one electronic memory device electrically coupled to the at least one electronic processor and having instructions stored therein. The at least one electronic processor may be configured to access the at least one memory device and execute the instructions thereon so as to cause the host vehicle to navigate autonomously in accordance with the first navigation definition and the third navigation definition whereby to navigate autonomously in accordance with the navigation goal in the autonomous mode.

The second navigation definition and the third navigation definition may each be associated with an end portion of the autonomous navigation in accordance with the navigation goal. Advantageously, the user can replace only the end portion of the autonomous navigation in accordance with the navigation goal by replacing the second navigation definition with the third navigation definition.

The second navigation definition may be associated with a destination location. The second navigation definition may be associated with a first destination orientation. Therefore, autonomous navigation of the host vehicle in accordance with the first navigation definition and the second navigation definition may be for autonomous navigation of the host vehicle to the destination location at the first destination orientation. The third navigation definition may be associated with the same destination location as the second navigation definition. The third navigation definition may be associated with a second destination orientation, different to the first destination orientation. Therefore, the autonomous navigation of the host vehicle in accordance with the first navigation definition and the third navigation definition may be for autonomous navigation of the host vehicle to the destination location at the second destination orientation. Advantageously, the difference between the second navigation definition and the third navigation definition can be a change in orientation of the host vehicle at the destination location. It will be understood that his may result in changes to one or more other portions of the autonomous navigation of the host vehicle in accordance with the navigation goal in order for the host vehicle to arrive at the destination location in the second destination orientation instead of the first destination orientation.

A relative orientation of the second destination orientation to the first destination orientation may be substantially 180 degrees. The navigation goal may be a parking goal. The first destination orientation may be a nose-out orientation. In his example, the second destination orientation may be a nose-in orientation. Alternatively, it will be understood that the orientations may be swapped, for example the first destination orientation may be a nose-in orientation and the second destination orientation may be a nose-out orientation. Advantageously, the user can change the orientation of the host vehicle at the parking location, even though a default orientation associated with the second navigation definition is offered to the user in the first instance.

The second navigation definition may be associated with a first destination location. The third navigation definition may be associated with a second destination location, different from the first destination location. Therefore, the first navigation definition and the third navigation definition are together for autonomous navigation of the host vehicle to the second destination location. Advantageously, the switch from the second navigation definition to the third navigation definition may represent a change in destination location for the host vehicle during autonomous navigation in accordance with the navigation goal.

The second destination location is typically in a vicinity of the first destination location, for example within 50 metres of the first destination location. The second destination location may be within 20 metres of the first destination location. The second destination location may be within 10 metres of the first destination location.

Where the navigation goal is a parking goal, the first destination location may be associated with a first parking space and the second destination location may be associated with a second parking space. Advantageously, the switch from the second navigation definition to the third navigation definition may represent a change between different parking spaces in a car park. It will be understood that the parking spaces may be physical parking spaces corresponding to markings in a car park. Alternatively or additionally, the parking spaces may be virtual parking spaces associated with different regions in a parking area. The regions defining the virtual parking spaces may be defined manually by the user of the host vehicle, or may be determined by the control system in dependence on environment data of the environment of the host vehicle.

The notification signal may be to notify the user of the availability of autonomous navigation in accordance with only the second navigation definition among the second navigation definition and the third navigation definition. Therefore, initially at least, the user may not be notified of the availability of autonomous navigation in accordance with the third navigation definition. The availability of autonomous navigation in accordance with the third navigation definition may only be revealed to the user following a rejection of autonomous navigation in accordance with the second navigation definition.

The availability signal may be indicative of the host vehicle being within a predetermined distance of a navigable area. The navigable area may have associated therewith the first navigation definition. The navigable area may have associated therewith the second navigation definition. The navigable area may have associated therewith the third navigation definition. The one or more controllers may output the notification signal in dependence on the host vehicle being within the predetermined distance of the navigable area. Advantageously, the host vehicle can make the user aware of the availability of the autonomous navigation only when the host vehicle is near the navigable area in which the host vehicle is to autonomously navigate.

The one or more controllers, subsequent to receiving the rejection signal, may output a further notification signal to notify the user of an availability of autonomous navigation in accordance with the third navigation definition of the navigation goal. Advantageously, the user can be made aware that autonomous navigation in accordance with the third navigation definition is available only after the user has rejected autonomous navigation in accordance with the second navigation definition.

The rejection may be explicit or implicit. For example, the user may be determined to have rejected autonomous navigation in accordance with the second navigation definition if the user accepts autonomous navigation in accordance with the first navigation definition, and if the user does not accept autonomous navigation in accordance with the second navigation definition.

According to an aspect of the invention, there is provided a system. The system comprises the control system, including a first controller arranged to receive the request signal. The system comprises an input apparatus configured to receive the request from the user for the host vehicle to navigate autonomously in accordance with the third navigation definition and to output the request signal to the first controller in dependence thereon. Advantageously, the system can include the input apparatus.

The system may comprise notification means configured to output a user notification that autonomous navigation in accordance with the first navigation definition and the second navigation definition of the navigation goal is available in dependence on receiving the notification signal from the control system. Advantageously, the system can notify the user.

The notification means may be configured to output a further user notification that autonomous navigation in accordance with the third navigation definition is available in dependence on receiving the further notification signal. The notification means may comprise a display means, such as an electronic display. The notification means may comprise audio generating means, such as an audio transducer. The notification means may comprise haptic means, such as a haptic device, for example a vibration motor.

According to an aspect of the invention, there is provided a method for controlling a vehicle operable in an autonomous mode and a non-autonomous mode. The method comprises receiving an availability of autonomous navigation by a vehicle operating in an autonomous mode in accordance with a navigation goal. The navigation goal includes a first navigation definition for autonomous navigation in accordance therewith and a second navigation definition for autonomous navigation in accordance therewith subsequent to navigation in accordance with the first navigation definition. The method comprises, subsequent to receiving the availability, notifying a user of the vehicle of an availability of autonomous navigation in accordance with the first navigation definition and the second navigation definition. The method comprises receiving, when operating in non-autonomous mode, a request from the user of the vehicle for the vehicle to navigate autonomously in accordance with a third navigation definition of the navigation goal. The method comprises, subsequent to receiving the request, navigating the vehicle autonomously in accordance with the first navigation definition and the third navigation definition of the navigation goal instead of the second navigation definition. Advantageously, the vehicle can autonomously navigate in accordance with the first navigation definition and the third navigation definition instead of the second navigation definition when the user request autonomous navigation of the vehicle in accordance with the third navigation definition, having been made aware of the availability of autonomous navigation of the vehicle in accordance with the second navigation definition.

The method may comprise receiving a rejection by the user of autonomous navigation in accordance with the second navigation definition of the navigation goal. The vehicle may be navigated autonomously in accordance with the first navigation definition and the third navigation definition subsequently to receipt of the rejection.

Of the second navigation definition and the third navigation definition, when the user is notified of the availability of autonomous navigation in accordance with the first navigation definition and the second navigation definition, the user is notified of the availability of autonomous navigation in accordance with only the second navigation definition. Advantageously, the user is initially not notified of the availability of autonomous navigation in accordance with unnecessary navigation definitions, for example the third navigation definition. The third navigation definition is representative of a less preferred navigation definition than the second navigation definition.

Common Elements

According to an aspect of the invention, there is provided a vehicle comprising a control system according to an aspect of the invention as described hereinbefore, a system according to an aspect of the invention as described hereinbefore or arranged to perform a method according to an aspect of the invention as described hereinbefore.

According to an aspect of the invention, there is provided a mobile terminal comprising the control system according to an aspect of the invention as described hereinbefore. The mobile terminal may comprise communication means, for example a communication unit for wireless communication with the host vehicle. The communication unit may be a wireless transmitter arranged to wirelessly transmit one or more signals to the host vehicle via a predetermined wireless communication protocol. The one or more signals may include the navigation signal.

According to an aspect of the invention, there is provided computer software which, when executed by a processing means, is arranged to perform a method according to an aspect of the invention. The computer software may be stored on a computer readable medium. The computer software may be tangibly stored on a computer readable medium. The computer readable medium may be non-transitory.

According to an aspect of the invention, there is provided a non-transitory, computer-readable storage medium storing instructions thereon that when executed by one or more processors causes the one or more processors to carry out a method according to an aspect of the invention.

SAE International's J3016 defines six levels of driving automation for on-road vehicles. The terms autonomous driving mode and autonomous mode as used herein will be understood to cover any of the SAE levels one to five. In an embodiment, the autonomous driving modes and autonomous modes disclosed herein will be understood to be of at least SAE level three. In other words, the automated driving system of the host vehicle will control all aspects of the dynamic driving task. The autonomous mode may be referred to as an autonomous driving mode.

The term navigation goal as used herein will be understood to mean a location within a navigable area of an environment of the host vehicle for navigation of the host vehicle thereto. In some examples, the location may be a geographic absolute location, in a coordinate system, such as latitude and longitude. In other examples, the location may be a relative location, relative to one or more other features or regions associated with the environment of the host vehicle. In some examples, the term navigation goal as used herein will be understood to comprise the location within the navigable are as described hereinbefore, in addition to any other characteristics associated with the navigation of the host vehicle to the location of the navigation goal, for example an orientation of the host vehicle at the location of the navigation goal.

In autonomous driving modes of the host vehicle described herein, it will be understood that the control system may control the host vehicle to autonomously navigate through a navigable area, such as in accordance with a navigation goal, utilising a map of the navigable area. Thus, the map of the navigable area of the host vehicle can be used during autonomous navigation of the host vehicle in the navigable area, for example in accordance with the navigation goal.

The map may comprise a retrievable map stored on a memory means, such as a non-transitory computer readable medium associated with the host vehicle, or on a cloud-based server accessible by the control system of the host vehicle. Such maps may be uploaded by the user to a cloud-based server. The uploaded map may be shared with other users. Maps uploaded by other users may likewise be shared, such that a user has access to a number of maps which may be downloaded directly from the cloud-based server. In some embodiments, one or more maps may additionally or alternatively be provided by a third-party service provider, such as a map and/or navigation service company, or a provider which generates a map of a particular navigable area on request as a service and makes the map available, whether via an on-line source or otherwise.

In another example, the map may be built by a driver teaching the host vehicle the navigable area in an initial mapping process. The map may be built by the driver teaching the host vehicle a navigable area in an independent mapping process by driving the host vehicle around the navigable area to provide guidance to the host vehicle. While the driver drives the host vehicle around the navigable area, one or more sensing means associated with the host vehicle, such as one or more on-board vehicle sensors, scan at least a portion of the navigable area to gradually build a map of the scanned area, optionally including landmarks, features or environmental attributes. In this way, the map can be used for later localisation and/or autonomous navigation of the host vehicle. The initial mapping process may be selected by the user of the host vehicle for teaching the host vehicle the map of the navigable area. Alternatively, the initial mapping process may be a passive mapping process in which the map is built during movement of the host vehicle in the navigable area. Where the initial mapping process is the passive mapping process, the user may not be notified that the host vehicle is building the map whilst the host vehicle is moving in the navigable area. Thus, the user can be made aware that the map of the navigable area is being or has been built only after building the map has already started. Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
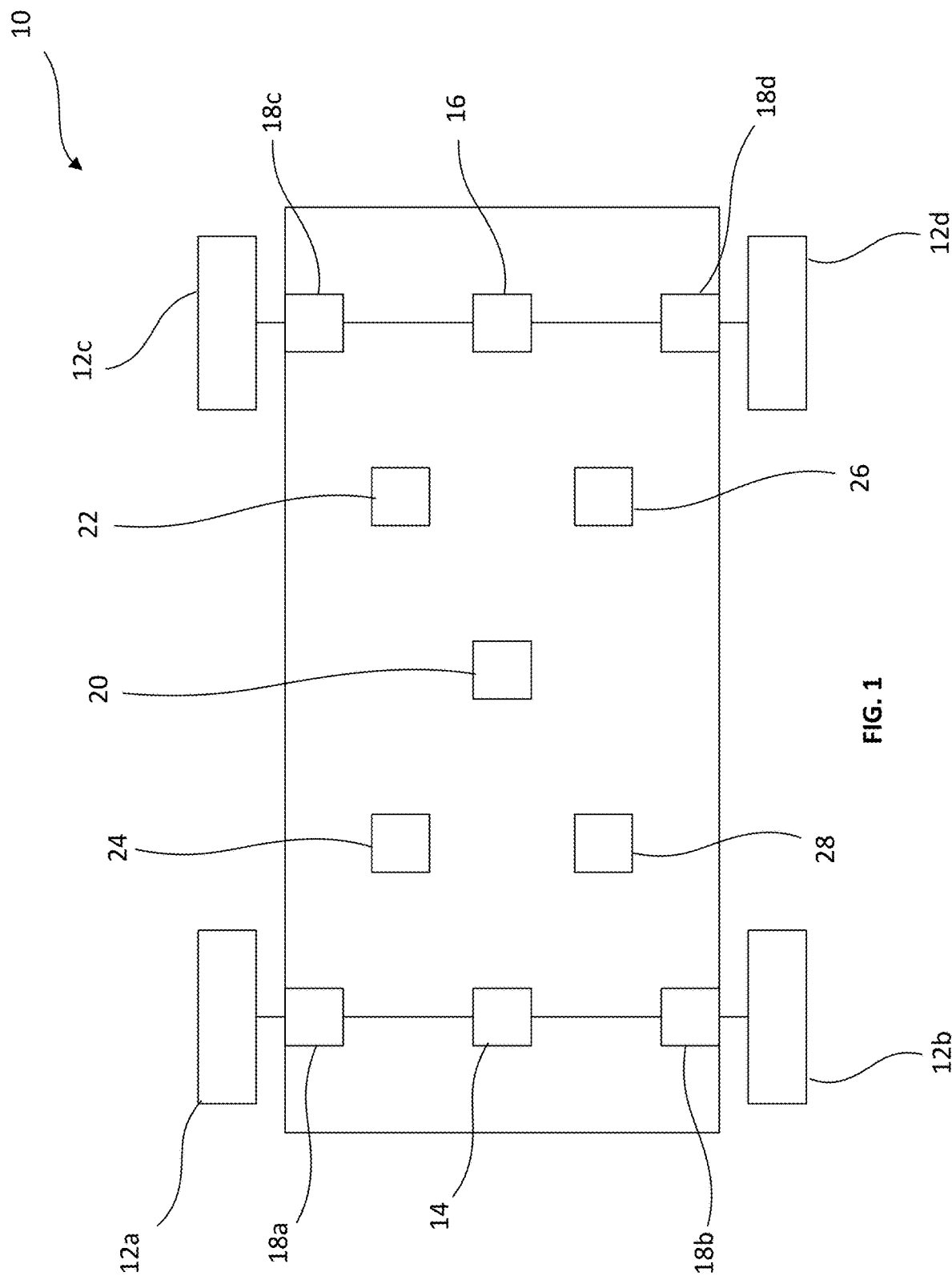
FIG. 1 shows a schematic representation of a host vehicle.

Vehicle Systems A schematic diagram representative of the subsystems associated with a host vehicle 10 in accordance with an embodiment of the invention is shown in FIG. 1. The host vehicle 10 is for operating in an autonomous mode, to autonomously navigate through an environment to a navigation goal. The host vehicle 10 may comprise any of the control systems, or systems described herein. The host vehicle 10 may be arranged to perform any of the method described herein.

The host vehicle 10 is a land-going vehicle comprising a plurality of wheels 12a, 12b, 12c, 12d, which may be in the form of four wheels 12a, 12b, 12c, 12d The host vehicle 10 comprises a front drivetrain controller 14 and a rear drivetrain controller 16. The front drivetrain controller 14 is connected to each of the front wheels 12a, 12b The front drivetrain controller 14 may be mechanically connected to each of the front wheels 12a, 12b Alternatively or additionally, the front drivetrain controller 14 is electrically connected to each of the front wheels 12a, 12b via one or more motors (not shown) The rear drivetrain controller 16 is connected to each of the rear wheels 12c, 12d The rear drivetrain controller 16 may be mechanically connected to each of the rear wheels 12c, 12d Alternatively, the rear drivetrain controller 16 is electrically connected to each of the rear wheels 12c, 12d via one or more motors (not shown) The front drivetrain controller 14 and the rear drivetrain controller 16 each control a motive torque being applied to the wheels 12a, 12b, 12c, 12d for movement of the host vehicle 10 through the environment. It will be appreciated that in some embodiments a single drivetrain controller may perform the functions of the front and rear drive train controller 14, 16. Each of the wheels 12a, 12b, 12c, 12d has associated therewith a respective torque modification controller 18a, 18b, 18c, 18d, which may be in the form of a braking controller 18a, 18b, 18c, 18d The braking controller 18a, 18b, 18c, 18d can control an application of a braking torque to the rotational movement of the associated wheel 12a, 12b, 12c, 12d It will be appreciated that the torque modification controllers 18a, 18b, 18c, 18d can be capable of applying additional torque to the wheels 12a, 12b, 12c, 12d In this case, the drivetrain controllers 14, 16 may not apply torque to the wheels 12a, 12b, 12c, 12d, but can instead be used to control the application of motive torque by the toque modification controllers 18a, 18b, 18c, 18d Such an arrangement is typically found in electric vehicles. In hybrid electric vehicles, there may be provided the drivetrain controllers 12, 16 to apply torque to the wheels 12a, 12b, 12c, 12d via a motor, for example an internal combustion engine, as well as the torque modification controllers 18a, 18b, 18c, 18d to apply torque to the wheels 12a, 12b, 12c, 12d via one or more electric motors. In some examples, the host vehicle 10 is powered by hydrocarbon-based fuels via an internal combustion engine. The internal combustion engine is mechanically connected to the front and rear drivetrain controllers 14, 16 (or the single drivetrain controller) Although the preceding disclosure has described a vehicle in which each of the four wheels 12a, 12b, 12c, 12d are driven, it will be understood that not all of the wheels 12a, 12b, 12c, 12d may be driven. For example, only the front wheels 12a, 12b may be driven, for example by the front drivetrain controller 14 or by the torque modification controller 18a, 18b In an alternative example, only the rear wheels 12c, 12d may be driven, for example by the rear drivetrain controller 16 or by the torque modification controller 18c, 18d.

The host vehicle 10 comprises a vehicle controller 20 to control the operation of the host vehicle 10. The vehicle controller 20 is typically in communication with each of the other motive controllers 14, 16, 18a, 18b, 18c, 18d of the host vehicle 10. The vehicle controller 20 may send and receive vehicle control instructions over one or more data communication networks of the vehicle 10 controlled by a network controller 22. The host vehicle 10 comprises a steering controller 24 to steer the host vehicle 10. Typically, the steering controller 24 will control steering of the host vehicle 10 by steering the front wheels 12a, 12b The steering controller 24 may be in data communication with the vehicle controller 20 to receive steering control requests therefrom and to steer the host vehicle 10 in dependence on the steering control requests. In some embodiments, the steering controller 24 can receive a user steering input to control the steering of the host vehicle 10. The steering controller 24 may be in data communication with the torque modification controllers 18a, 18b, 18c, 18d to control the torque applied at the wheels 12a, 12b, 12c, 12d to assist in steering the host vehicle 10. The host vehicle 10 comprises a navigation controller 26 to determine a navigation route of the host vehicle 10 through the environment. The route may be between a start location and a destination location. The navigation controller 26 may be in data communication with the vehicle controller 20 to send the determined navigation route to the vehicle controller 20 to cause the host vehicle 10 to navigate in accordance with the determined navigation route. The host vehicle comprises a sensor controller 28 to control one or more sensors (not shown in FIG. 1) of the host vehicle 10. The sensors are arranged to sense data indictive of the environment of the host vehicle 10. The data indicative of the environment may be stored in data storage accessible to the vehicle, such as in one or more memory devices of the vehicle. The sensor controller 28 may be in data communication with the vehicle controller 20 to output the data indicative of the environment to the vehicle controller 20 to cause the host vehicle 10 to navigate utilising the data indicative of the environment. The sensor controller 28 may be in data communication with the navigation controller 26 to output the data indicative of the environment to the vehicle controller 20 to cause the host vehicle 10 to determine the navigation route utilising the data indicative of the environment. As will be described hereinafter, it will be understood that the sensors may include a first sensor means in the form of a first plurality of sensors to sense the environment rearward at or from a rear of the host vehicle and a second sensor means in the form of a second plurality of sensors to sense the environment frontward at or from a front of the host vehicle. It will be understood that many combinations of sensors are suitable for supporting autonomous navigation of the host vehicle, including any combination of one or more radar sensors, one or more stereoscopic sensors, one or more cameras, one or more LI DAR sensors, and one or more ultrasound sensors.

As will be described in more detail hereinafter, the host vehicle 10 is for autonomously navigating in an autonomous driving mode of the host vehicle 10. The host vehicle 10 may comprise any of the controllers or systems described hereinafter. The host vehicle 10 may be arranged to perform any of the methods described hereinafter.

As will be understood, the host vehicle 10 is typically a land-going vehicle, for example a road vehicle such as a car, a lorry, or any other suitable vehicle.

Second Navigation Coal from First Manoeuvre

Figure 2:
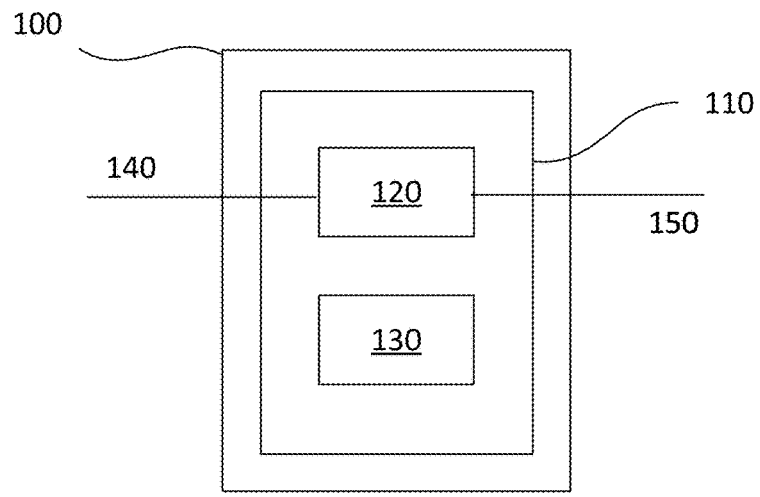
FIGS. 2, 6, 10, 13, 16, 19, 23, 26, 30, 33, 36, 40, 43, 47, 50, 54, 57 and 60 each show a schematic representation of a control system associated with the host vehicle of FIG. 1.

A control system 100 or control unit 100 in accordance with an embodiment of the invention is shown in FIG. 2.

The control system 100 is for a host vehicle operable in an autonomous mode and a non-autonomous mode. The host vehicle may be substantially as described with reference to FIG. 1 hereinbefore. The control system 100 comprises one or more controllers 110. The one or more controllers 110 include a first controller 110. The control system 100 is configured to receive a mode signal and environment data when operating in the non-autonomous mode. The mode signal is indicative of the host vehicle operating in the non-autonomous mode. The environment data is indicative of a sensed environment of the host vehicle during a first manoeuvre by the host vehicle. The first manoeuvre is from a first location to a first navigation goal. In the training mode, the one or more controllers 110 identify a navigable area in a vicinity of the first manoeuvre. The navigable area is identified utilising the environment data. The navigable area is suitable to contain a plurality of possible navigation paths for subsequent navigation of the host vehicle, operating in the autonomous mode, to a second navigation goal. The second navigation goal is within the navigable area and is different to the first navigation goal. In the training mode, the one or more controllers 110 output vehicle control data. The vehicle control data is indicative of the navigable area. When autonomously navigating to the second navigation goal, the control system 100 utilises the vehicle control data to autonomously control the host vehicle. The one or more controllers 110 comprise an electronic processor 120 having an electrical input 140 and an electronic memory device 130 electrically coupled to the electronic processor 120. The electronic memory device 130 has instructions stored therein. The electronic processor 120 is configured to access the memory device 130 and execute the instructions thereon so as to utilise the vehicle control data to autonomously navigate to the second navigation goal. The electrical input 140 is for receiving the mode signal and the environment data. The electronic processor 120 includes an electrical output 150 for outputting the vehicle control data. Therefore, the host vehicle can be autonomously navigated to the second navigation goal following the first manoeuvre of the host vehicle to the first navigation goal. There is no need for the host vehicle to navigate previously to the second navigation goal prior to being capable of autonomous navigation thereto. In particular, the host vehicle can autonomously navigate to the second navigation goal along any of the plurality of possible navigation paths to the second navigation goal without having to previously manoeuvre to the second navigation goal. The electrical input 140 and the electrical output 150 may be combined such as by being formed by an I/O unit or interface unit. For example, the one or more controllers 110 may comprise an interface to a network forming a communication bus of the host vehicle. The interface bus may be an Internet Protocol (IP) based communication bus such as Ethernet, although embodiments of the invention are not limited in this respect.

Figure 3:
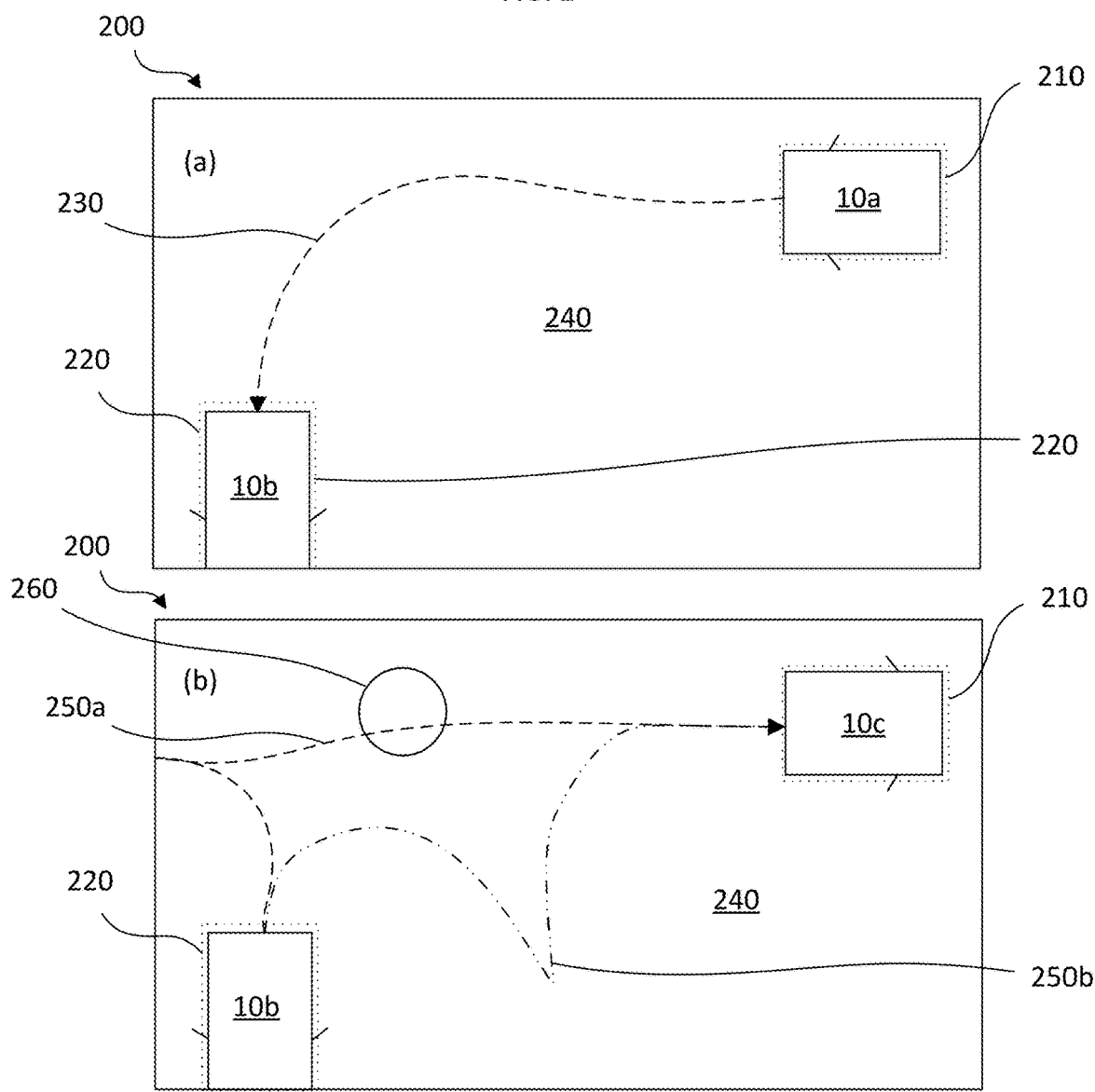
FIGS. 3, 7, 21, 27, 37, 44, 64 show a schematic representation of an environment in which the host vehicle can operate.

An environment 200 in which a host vehicle 10 in accordance with an embodiment of the invention can operate is shown schematically in FIG. 3 FIG. 3(a) shows the host vehicle 10 performing the first manoeuvre from a first location 210 to a second location 220 along a manoeuvre path 230. In other words, the host vehicle 10a in the first location 210 moves through the environment along the manoeuvre path 230 to become the host vehicle 10b in the second location 220. Subsequently, when the host vehicle 10 is operating in the autonomous mode, the host vehicle can navigate autonomously to a second navigation goal within the navigable area 240 as depicted in FIG. 3(b) In this example, the environment 200 is the navigable area 240. The second navigation goal may comprise navigation of the host vehicle 10 to the first location 210. Therefore, the host vehicle 10b in the second location 220 autonomously navigates to the first location 210 indicative of the second navigation goal to become the host vehicle 10c. The host vehicle 10 can autonomously navigate to the first location 210 along any of a plurality of navigation paths 250a, 250b associated with the navigable area 240. The autonomous navigation to the first location 210 can comprise a turn manoeuvre such that the host vehicle 10c at the first location 210 is arranged in a different orientation to the host vehicle 10a prior to the first manoeuvre along the manoeuvre path 230. In other words, where the host vehicle 10 departed the first location 210 forward, the host vehicle 10 can also arrive back at the first location 210 travelling forward, but arranged in the opposite orientation. Other configurations of starting and ending orientations are also possible. In the examples shown in FIG. 3(b) it can be seen that the turn manoeuvres are those typically referred to as a "3-point turn" It will be understood that other turn manoeuvres are possible, as described elsewhere. Due to the plurality of possible navigation paths possible through the navigable area 240, even where an obstacle 260 appears along one of the navigation paths 250a, the host vehicle 10 can still navigate autonomously to the second navigation goal via any of one or more other navigation paths 250b As can be seen, in this example, a start location associated with the plurality of navigation paths 250a, 250b is the second location 220 indicative of a destination location of the first manoeuvre along the manoeuvre path 230. Although the plurality of navigation paths 250a, 250b are each along a different route in this example, it will be understood that the host vehicle 10 could navigate autonomously to the second navigation goal, avoiding the obstacle 260, by navigation substantially along the navigation path 250a, but with a minor adjustment to the precise navigation of the host vehicle 10 to evade the obstacle 260.

The location of the second navigation goal can correspond to a navigation waypoint during the first manoeuvre from the first location 210 to the first navigation goal 220 in the form of the second location 220.

The environment data input to the one or more controllers 110 is indicative of the sensed environment of the host vehicle 10 at a rear of the host vehicle during the first manoeuvre along the manoeuvre path 230. In other words, one or more sensors (not shown in FIG. 3) associated with the host vehicle 10 are arranged to capture data at or from a rear of the host vehicle 10. The control system 100 is configured to determine the navigable area 240 based on the environment data indicative of the sensed environment at or rearward from the rear of the host vehicle during the first manoeuvre. Therefore, the host vehicle 10 can collect data for subsequent autonomous navigation of at least a portion of the route of the first manoeuvre in reverse during the first manoeuvre. In addition, the one or more sensors of the host vehicle 10 are arranged to capture data at or from a front of the host vehicle 10. The control system 100 is configured to determine the navigable area 240 based on the environment data indicative of the sensed environment at or frontward from the front of the host vehicle during the first manoeuvre. Therefore, the host vehicle can subsequently perform autonomous navigation along a plurality of different navigation paths to a plurality of different navigation goals in the navigable area 240.

Returning to FIG. 2, the control system 100 is configured to receive a goal signal, for example via the electrical input 140 of the electronic processor 120. The goal signal is indicative of the second navigation goal. The one or more controllers 110 determine the navigation path to the second navigation goal based on the goal signal. The navigation path is determined utilising the or further environment data. The one or more controllers 110 output a navigation signal via the electrical output 150 of the electronic processor 120. The navigation signal causes the host vehicle to navigate autonomously to the second navigation goal along the determined navigation path.

During the first manoeuvre along the manoeuvre path 230, the host vehicle is steered to the navigation goal in the form of the second location 220 by user inputs on a steering control input of the host vehicle 10, for example a steering wheel. Typically, the longitudinal movement of the host vehicle during the first manoeuvre is also controlled by the user, for example through operation by the user of an acceleration control input and a braking control input.

The control system 100 is configured to output a notification signal, for example via the electrical output 150 of the electronic processor 120. The notification signal causes output of a user notification. The user notification notifies a user of the host vehicle 10 of an availability of autonomous navigation of the host vehicle 10 to the second navigation goal. The notification signal is output in dependence on the navigable area. For example, the notification signal is output if it is determined that autonomous navigation via the navigable area 240 to the second navigation goal is possible. In one example, the notification signal is output during operation of the host vehicle in the training mode. The notification signal may additionally or instead be output during operation of the host vehicle in a mode other than the training mode.

The navigable area 240 is of non-zero width. In particular, the navigable area 240 includes more than a single navigation path. In some embodiments, the navigable area 240 may have a width on each side from the manoeuvre path 230 of less than 20 metres. It will be understood that the width on each side from the manoeuvre path 230 is typically limited by a detection range of the sensors used to detect the environment of the host vehicle 10. In this way, the width on each side from the manoeuvre path 230 may depend on a detection range of one or more sensors detecting the environment of the host vehicle 10. For example, if the sensors have a range exceeding 20 metres, it is possible that the width on each side from the manoeuvre path 230 can be greater than 20 metres.

Figure 4:
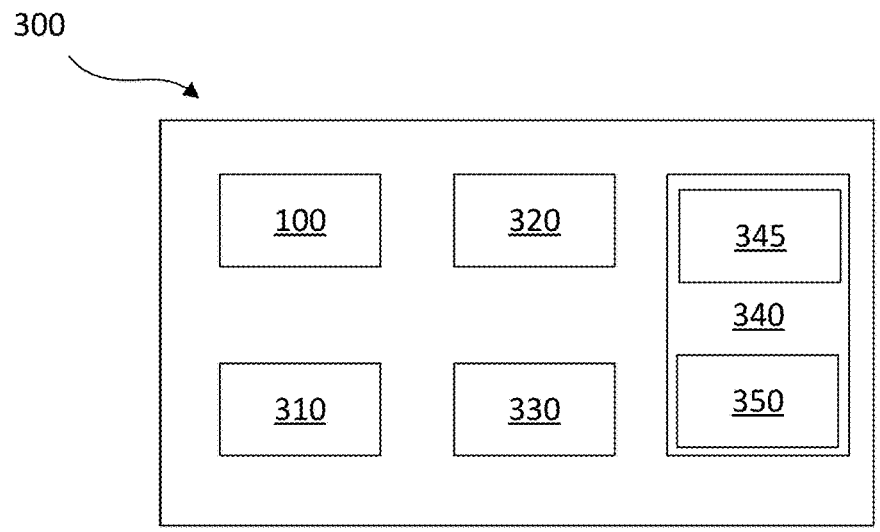
FIGS. 4, 8, 11, 14, 17, 20, 24, 28, 31, 34, 38, 41, 45, 48, 52, 55, 58 and 61 each show a schematic representation of a system associated with the host vehicle of FIG. 1.

A system 300 in accordance with an embodiment of the invention is shown in FIG. 4. The system 300 comprises the control system 100 as described hereinbefore with reference to FIG. 2. The system 300 comprises an input apparatus 310. The input apparatus 310 is operable by the user of the host vehicle 10 to output the mode signal to the one or more controllers 110 of the control system 100. The system 300 comprises a primary control apparatus 320. The primary control apparatus 320 receives one or more primary control inputs from the user to cause the host vehicle 10 to perform the first manoeuvre. The primary control apparatus 320 includes a steering wheel, an acceleration control input and a braking control input. The system 300 comprises a vehicle controller 330 to receive the navigation signal from the one or more controllers 110 of the control system 100. The vehicle controller 330 causes the host vehicle 10 to navigate autonomously to the second navigation goal along the determined navigation path in dependence on the navigation signal. The system comprises sensing means 340 to sense the environment of the host vehicle 10 and to output the environment data to the one or more controllers 110 of the control system 100. In this embodiment, the sensing means 340 comprises a first sensing means 345 in the form of a front sensing means 345 arranged to be directed generally forward from the host vehicle 10. The sensing means 340 comprises a second sensing means 350 in the form of a rear sensing means 350 arranged to be directed generally rearward from the host vehicle 10. The first sensor means 345 and the second sensor means 350 include at least some of the same type of sensors. Therefore, the host vehicle 10 can collect data when travelling in a first direction, which is substantially similar to data which could be collected were the host vehicle to be travelling along the same route, but in a reverse direction.

In some embodiments, the system 300 comprises notification means in the form of a notification unit to output the user notification on receipt of the notification signal. The notification means includes an electronic display to display the user notification to the user.

Figure 5:
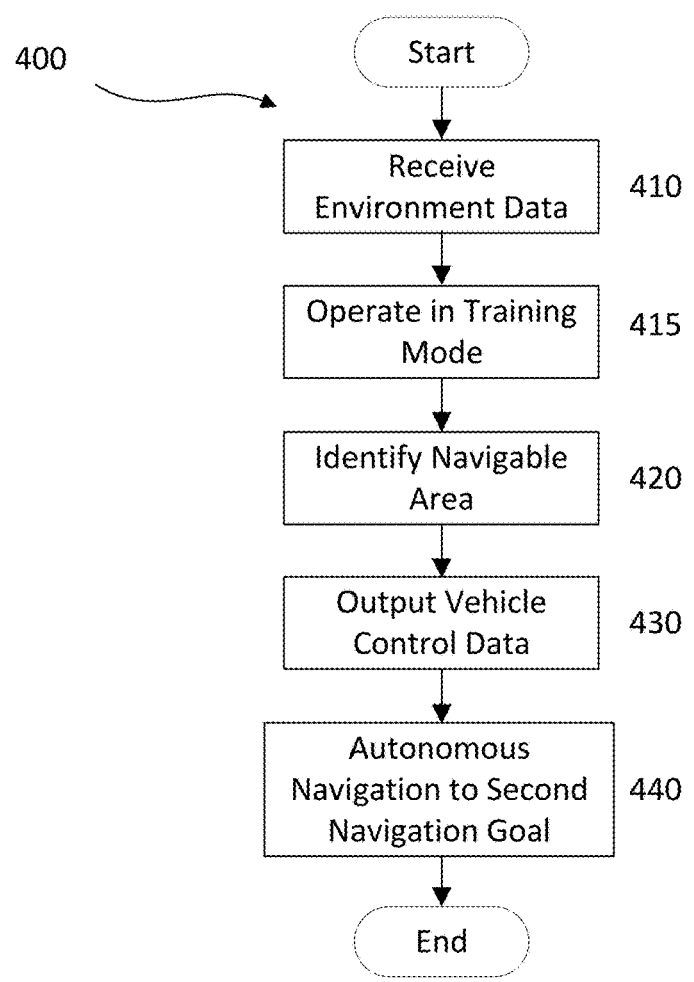
FIGS. 5, 9, 12, 15, 18, 22, 25, 29, 32, 35, 39, 42, 46, 49, 53, 56, 59 and 62 each show a flowchart representative of a method associated with control of the host vehicle of FIG. 1.

A method 400 according to an embodiment of the invention is shown in FIG. 5. The method 400 is a method of controlling the host vehicle 10. In particular, the method 400 is a method of controlling the autonomous navigation of the host vehicle to a second navigation goal. The method 400 may be performed by the control system 100 and system 300 described hereinbefore with reference to FIGS. 2 and 4.

The method 400 broadly comprises steps of receiving 410 environment data indicative of a sensed environment of the vehicle during a first manoeuvre by the vehicle and, in dependence thereon, identifying 420 a navigable area of the host vehicle for autonomous navigation of the host vehicle to a second navigation goal, and outputting 430 vehicle control data to be utilised during autonomous navigation 440 of the host vehicle to the second navigation goal.

Referring to FIG. 4, the illustrated embodiment of the method 400 comprises a step of receiving 410, when the vehicle is operating in a non-autonomous mode, environment data indicative of a sensed environment of the vehicle 10. The environment data is indicative of the sensed environment of the vehicle during a first manoeuvre by the vehicle from a first location to a first navigation goal. The environment data is received from the sensing means 340. The method may comprise performing the first manoeuvre.

In step 415, the vehicle is operated in a training mode. The environment data may be received prior to operation of the vehicle in the training mode. In the training mode, in step 420, a navigable area suitable to contain a plurality of possible navigation paths is identified in dependence on the environment data. The plurality of possible navigation paths are for autonomous navigation of the vehicle to a second navigation goal different from the first navigation goal. The navigable area is in a vicinity of the first manoeuvre, for example encompassing the first manoeuvre. The method may comprise receiving the second navigation goal.

In the training mode, in step 430, vehicle control data indicative of the navigable area is output. In step 440, the vehicle is autonomously controlled to navigate to the second navigation goal utilising the vehicle control data. Therefore, the vehicle can be autonomously controlled to navigate to the second navigation goal via the navigable area based on previous navigation of the host vehicle to a first navigation goal different from the second navigation goal.

Figure 6:
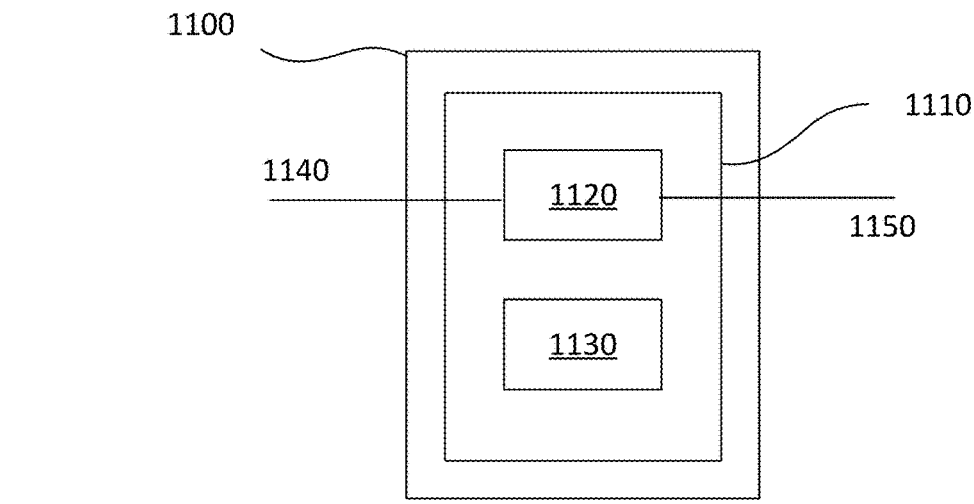

Autonomous Navigation in Dependence on Plurality of Previous Manoeuvres A control system 1100 or control unit 1100 in accordance with an embodiment of the invention is shown in FIG. 6.

The control system 1100 is for a host vehicle 10 operable in an autonomous mode and a non-autonomous mode. The host vehicle 10 may be substantially as described with reference to FIG. 1 hereinbefore. The control system 1100 comprises one or more controllers 1110. The one or more controllers 1110 include a first controller 1110. The control system 1100 is configured to receive path data. The path data is indicative of a plurality of previous manoeuvres of the host vehicle 10. The one or more controllers 1110 identify an availability of a navigation goal, associated with at least a portion of each of the plurality of previous manoeuvres. The navigation goal is for navigation thereto by the host vehicle 10, operating in the autonomous mode. In other words, when the navigation goal is available, the host vehicle is capable of operating in the autonomous mode and performing autonomous navigation in accordance with the navigation goal. The availability of the navigation goal is identified utilising the path data. Therefore, each of the plurality of earlier manoeuvres of the host vehicle can be used to determine the availability of the navigation goal. The one or more controllers 1110 output a notification signal to notify a user of the host vehicle 10 of the availability of navigation in the autonomous mode in accordance with the navigation goal. The one or more controllers 1110, when the host vehicle 10 is operating in the autonomous mode, autonomously navigate the host vehicle 10 in accordance with the navigation goal. For example, the one or more controllers 1110 may autonomously navigate the host vehicle 10 to a location associated with the navigation goal. Therefore, the ability to autonomously navigate the host vehicle 10 in accordance with the navigation goal can be acquired gradually based on path data collected from several previous manoeuvres. The one or more controllers 1110 comprise an electronic processor 1120 having an electrical input 1140 and an electronic memory device 1130 electrically coupled to the electronic processor 1120. The electronic memory device 1130 has instructions stored therein. The electronic processor 1120 is configured to access the memory device 1130 and execute the instructions thereon so as to notify the user of the host vehicle of the availability of navigation to the navigation goal. The electrical input 1140 is for receiving the path data. The electronic processor 1120 includes an electrical output 1150 for outputting the notification signal. The electrical input 1140 and the electrical output 1150 may be combined such as by being formed by an I/O unit or interface unit. For example, the one or more controllers 1110 may comprise an interface to a network forming a communication bus of the host vehicle. The interface bus may be an Internet Protocol (IP) based communication bus such as Ethernet, although embodiments of the invention are not limited in this respect.

Typically, each of the plurality of previous manoeuvres are performed when the host vehicle 10 is operating in a non-autonomous mode. In other words, the user drives the host vehicle 10 for each of the plurality of previous manoeuvres before the control system 1100 notifies the user that autonomous navigation in accordance with the navigation goal is available. The one or more controllers 1110 output a request signal to request the user to define a portion of the navigation goal. After output of the request signal, the control system 1100 is configured to receive a navigation definition associated with the portion of the navigation goal. Therefore, the navigation definition can define a portion of the navigation goal. Typically, the portion of the navigation goal can include one or more of a destination location associated with the navigation goal, an orientation of the host vehicle 10 associated with the navigation goal, a start location associated with the navigation goal and an intermediate location, along a navigation route between the start location and the destination location, associated with the navigation goal. The one or more controllers 1110 determine the navigation goal in dependence on the path data and the navigation definition. In this way, the availability of the navigation goal can be determined prior to determining the particular navigation goal. In other words, the one or more controllers 1110 identify the availability of a plurality of navigation goals within a navigable area, and by defining the portion of the navigation goal, the user selects one of the plurality of navigation goals to be a selected navigation goal to which the host vehicle can subsequently navigate autonomously.

The navigation goal can be as described hereinbefore, for example defining navigation of the host vehicle 10 from a first location to a second location. The portion of the navigation goal may include the first location. The portion of the navigation goal may include the second location. In one example, the navigation definition defines a drop-off location for the navigation goal, where the user exits the host vehicle 10. The one or more controllers 1110 can then autonomously navigate the host vehicle to a destination location associated with the navigation goal. Therefore, the host vehicle can navigate differently in the autonomous mode than when being controlled by the user, because the user need not exit the host vehicle 10 at the end of autonomous navigation of the host vehicle 10 in accordance with the navigation goal.

Figure 7:
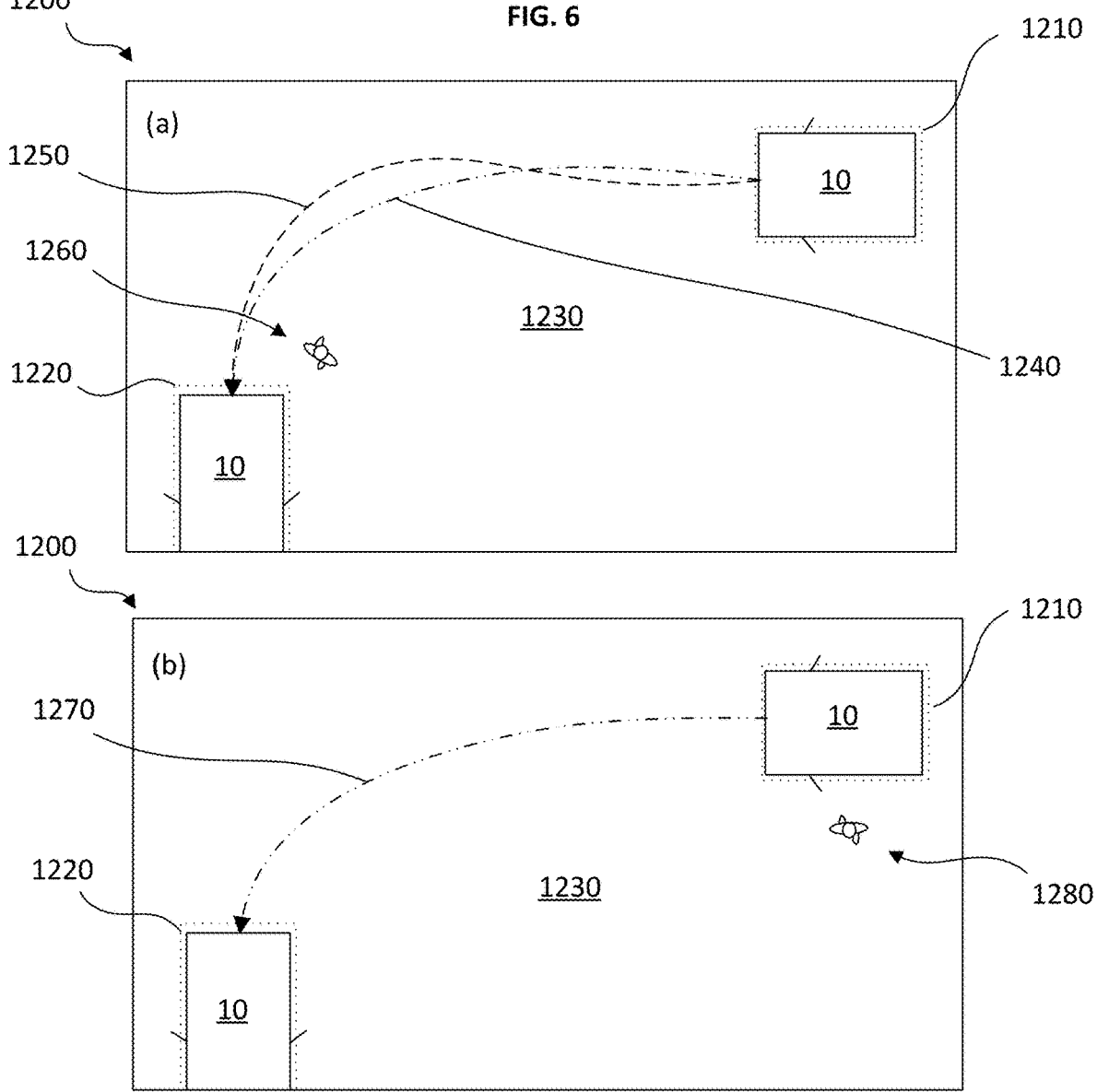

An environment 1200 in which the host vehicle 10 in accordance with an embodiment of the invention can operate is shown schematically in FIG. 7 FIG. 7(a) shows the host vehicle 10 performing a first manoeuvre 1240 and a second manoeuvre 1250 amongst the plurality of manoeuvres. Each of the first manoeuvre 1240 and the second manoeuvre 1250 comprises movement of the host vehicle 10 from the first location 1210 to the second location 1220. The user 1260 then exits the host vehicle 10 at the second location 1220. As described hereinbefore, after sufficient manoeuvres in the environment 1200, the availability of autonomous navigation of the host vehicle 10 in the navigable area 1230 to a navigation goal becomes available. The navigation goal can be one of the first location 1210, the second location 1220 or any other location in the navigable area 1230. In some examples, the user can be notified that autonomous navigation of the host vehicle 10 to any location in the navigable area 1230 is available. The user 1260 is also typically requested to define a portion of the navigation goal. FIG. 7(*b*) shows where the user has been notified that autonomous navigation to the second location 1220 is available, and has selected as a Mae location for the manoeuvre the first location 1210. Thus, the user 1280 exits the host vehicle 10 at the first location 1210 and the host vehicle 10 thereafter completes autonomous navigation to the navigation goal, that is the second location 1220, along the determined navigation path 1270 without any further supervision from the user 1280. The start location may be selected to be close to a building, for example a home, of the user 1280 to reduce an amount of walking from the host vehicle 10 to the building compared with in the first and second manoeuvres 1240, 1250 shown in FIG. 7(*a*).

Returning to FIG. 6, the path data comprises first path data indicative of the first manoeuvre 1240 of the host vehicle 10 within the navigable area 1230 and second path data indicative of the second manoeuvre 1250 of the host vehicle 10 within the navigable area 1230. The one or more controllers 1110 determine a first characteristic of the navigable area 1230 in dependence on the first path data and a second characteristic of the navigable area 1230 in dependence on the second path data. The second characteristic is different to the first characteristic. Therefore, the path data to be utilised to determine the availability of the navigation goal is built up gradually using different data from both the first manoeuvre 1240 and the second manoeuvre 1250. In some embodiments, the first and second characteristics may each comprise map data associated with the navigable area. For example, the first characteristic may be determined based on different sensing means of the host vehicle 10. In other words, the first path data is indicative of a first sensor output from a first sensing means in the form d a first sensor of the host vehicle 10, and the second path data is indicative of a second sensor output from a second sensing means in the form of a second sensor of the host vehicle 10. In an example, the first path data is indicative of a rider sensor output from a rider sensor of the host vehicle 10, and the second path data is indicative of a video sensor output from a video sensor of the host vehicle 10. In his way, the video sensor output is acquired separately from the lidar sensor output, for example of ter the lidar sensor output. It will be understood that the rider sensor output can be in the form of point cloud data for use in verification of a location of the host vehicle 10. The verification of the location of the host vehicle 10 may be performed in dependence on the point cloud data from the lidar sensor and a GPS sensor output.

The control system 1100 is configured to receive a navigation request signal. The navigation request signal is indicative of a request for autonomous navigation of the host vehicle 10 to the navigation goal. Thereafter, when the navigation goal is available, the one or more controllers 1110 autonomously navigate the host vehicle 10 in accordance with the navigation goal.

The control system 1100 is configured to receive location data indicative of a location of the host vehicle 10. The one or more controllers 1110 identity that autonomous navigation to the navigation goal is available in dependence on the location of the host vehicle 10 being in a vicinity of at least one of the previous manoeuvres of the host vehicle 10. Alternatively, the availability of the autonomous navigation may be determined at any time after the plurality of previous manoeuvres of the host vehicle, but the notification signal is output in dependence on the location of the host vehicle 10 being in the vicinity of at least one of the previous manoeuvres of the host vehicle 10.

The one or more controllers 1110 activate the sensing means of the host vehicle 10 in dependence on the location of the host vehicle 10 being in the vicinity of at least one of the previous manoeuvres of the host vehicle 10. Therefore, the sensing means are only activated as needed, which can reduce a power consumption for the host vehicle 10.

Figure 8:
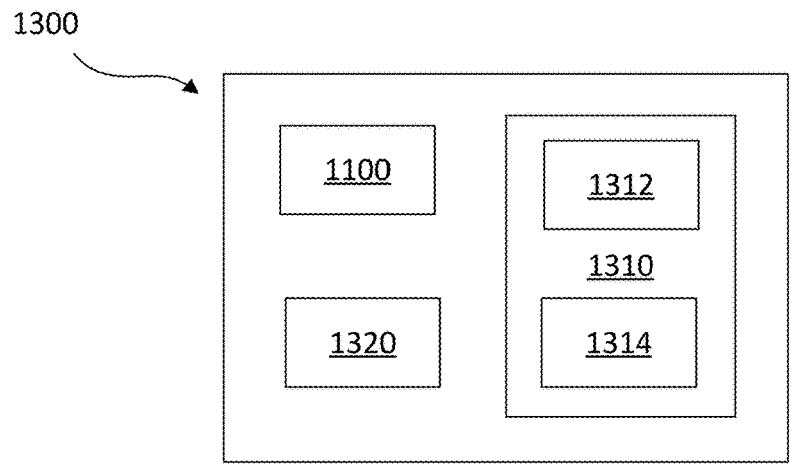

A system 1300 in accordance with an embodiment of the invention is shown in FIG. 8. The system comprises the control system 1100 as described hereinbefore with reference to FIG. 6. The system 1300 comprises a sensor system 1310 to determine one or more attributes of an environment of the host vehicle during the plurality of previous manoeuvres of the host vehicle. The sensor system 1310 outputs the path data to the control system 1100. The sensor system 1310 comprises first sensing means 1312 in the form of one or more first sensors 1312 and second sensing means 1314 in the form of one or more second sensors 1314. Typically, the first sensing means 1312 is different to the second sensing means 1314. The one or more first sensors 1312 output the first path data to the control system 1100. The one or more second sensors 1314 output the second path data to the control system 1100. The system 1300 comprises a vehicle controller 1320. The vehicle controller 1320 autonomously navigates the host vehicle 10 in accordance with the navigation goal in dependence on the request to navigate to the navigation goal. The request is typically from the user.

Figure 9:
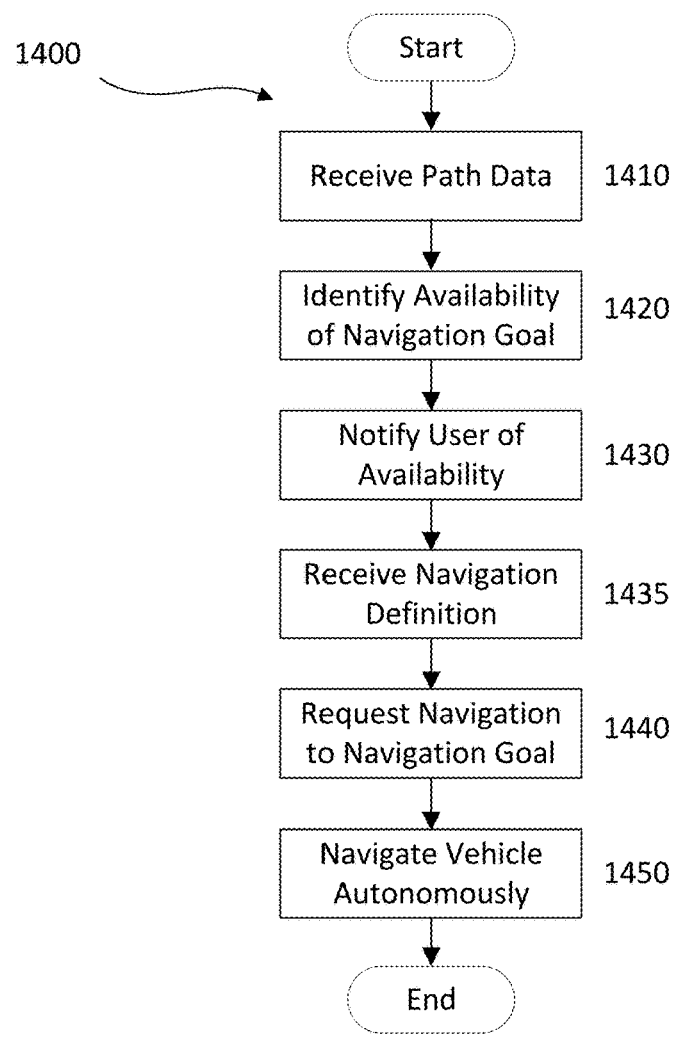

A method 1400 according to an embodiment of the invention is shown in FIG. 9. The method 1400 is a method of controlling the host vehicle 10. In particular, the method 1400 is a method of notifying a user of the vehicle 10 of the availability of autonomous navigation to a navigation goal in dependence on each of a plurality of previous manoeuvres of the vehicle. The method 1400 may be performed by the control system 1100 and the system 1300 described hereinbefore with reference to FIGS. 6 and 8.

The method 1400 broadly comprises steps of receiving 1410 path data indicative of a plurality of previous manoeuvres of the vehicle and, in dependence thereon, identifying 1420 availability of operation of the vehicle in an autonomous mode to navigate in accordance with a navigation goal, and notifying 1430 the user of the availability.

Referring to FIG. 9, the illustrated embodiment of the method 1400 comprises a step of receiving 1410, when the vehicle is operating in a non-autonomous mode, path data indicative of a plurality of previous manoeuvres of the vehicle.

In step 1420, an availability of operation of the vehicle in an autonomous mode to navigate autonomously in accordance with a navigation goal is identified in dependence on the path data. The navigation goal is associated with at least a portion of each of the plurality of previous manoeuvres.

In step 1430, a user of the vehicle is notified of the availability of the autonomous navigation. In this example, in step 1435, a navigation definition associated with a portion of the navigation goal is received following a request for the user to define a portion of the navigation goal.

In this example, in step 1440, a request from the user to navigate the vehicle in accordance with the navigation goal is received. In step 1450, the vehicle is autonomously navigated in accordance with the navigation goal. The navigation goal can be determined utilising the navigation definition.

Figure 10:
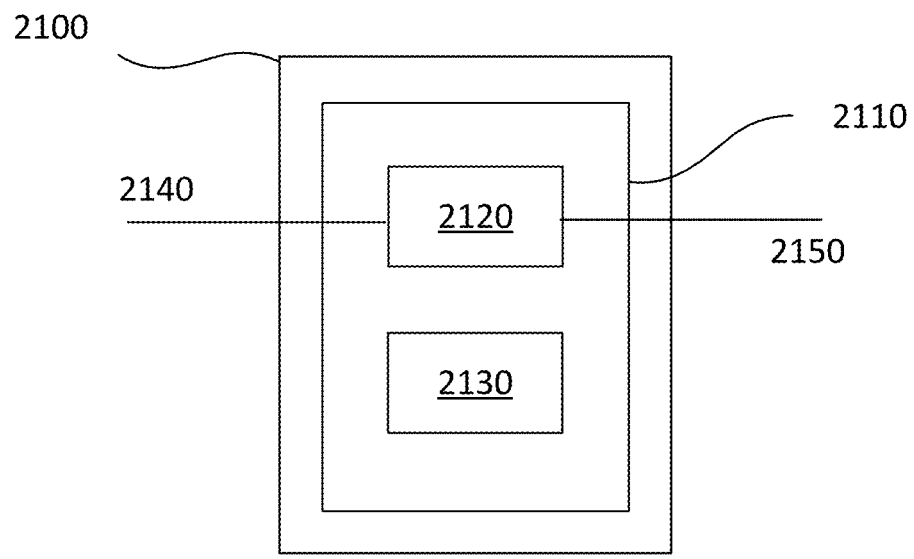

Autonomous navigation utilising a vehicle state other than a basic control input A control system 2100 or control unit 2100 in accordance with an embodiment of the invention is shown in FIG. 10.

The control system 2100 is for a host vehicle 10 operable in an autonomous mode and a non-autonomous mode. The host vehicle 10 may be substantially as described with reference to FIG. 1 hereinbefore. The control system 2100 comprises one or more controllers 2110. The one or more controllers 2110 include a first controller 2110. The control system 2100 is configured to receive a mode signal and a state signal. The mode signal is indicative of a host vehicle 10 operating in a training mode. The state signal is indicative of at least one vehicle state of the host vehicle 10 during a manoeuvre of the host vehicle 10 within a navigable area. In particular, the at least one vehicle state comprises a vehicle state other than a steering control input, an acceleration control input and a braking control input of the host vehicle. In this example, the vehicle state other than the steering control input, the acceleration control input and the braking control input is a suspension setting of the host vehicle. When operating in the training mode, the one or more controllers 2110 identify an environment of the navigable area associated with the host vehicle. The navigable area is for subsequent autonomous navigation therethrough by the host vehicle, operating in an autonomous mode, to at a navigation goal. The one or more controllers 2110 output vehicle control data indicative of the at least one vehicle state. When subsequently navigating the environment to the navigation goal in the autonomous mode, the control system 2100 utilises the vehicle control data to autonomously control the host vehicle 10. Therefore, the vehicle state other than the steering control input, the acceleration control input and the braking control input can be used to determine how to control the host vehicle during a subsequent autonomous navigation of the host vehicle. The one or more controllers 2110 comprise an electronic processor 2120 having an electrical input 2140 and an electronic memory device 2130 electrically coupled to the electronic processor 2120. The electronic memory device 2130 has instructions stored therein. The electronic processor 2120 is configured to access the memory device 2130 and execute the instructions thereon so as to utilise the vehicle control data to autonomously navigate the environment. The electrical input 2140 is for receiving the mode signal and the state signal. The electronic processor 2120 includes an electrical output 2150 for outputting the vehicle control data. The electrical input 2140 and the electrical output 2150 may be combined such as by being formed by an I/O unit or interface unit. For example, the one or more controllers 2110 may comprise an interface to a network forming a communication bus of the host vehicle. The interface bus may be an Internet Protocol (IP) based communication bus such as Ethernet, although embodiments of the invention are not limited in this respect. The host vehicle, when navigating autonomously to the navigation goal typically follows a different path than that of the manoeuvre from which the at least one vehicle state is associated with.

The at least one vehicle state includes a primary control input of the host vehicle 10. Therefore, the state signal is indicative of a control input by the user of the host vehicle 10 during the manoeuvre of the host vehicle 10 having an effect on the speed, direction or other characteristic of movement of the host vehicle 10, or on the size or external condition of the host vehicle. Therefore, the vehicle can be set up and can move in substantially the same way as done for the user in the manoeuvre when being navigated autonomously through the same navigable area.

In his example, the state signal is indicative of a ride height of the host vehicle. Therefore, the control system 2100 can use the user's judgement on appropriate ride-height when deciding how to set up the host vehicle 10 for autonomous navigation through the navigable area. The state signal can additionally or alternatively be indicative of one or more of another suspension setting of the host vehicle 10, a terrain mode of the host vehicle 10, a gear of the host vehicle 10, a traction mode of the host vehicle 10, a mirror state of the host vehicle and a roof state of the host vehicle 10.

The one or more controllers 2110 determine the one or more vehicle states utilising the state signal. The one or more controllers 2110 output a navigation signal via the electrical output 2150 of the electronic processor 2120. The navigation signal causes the host vehicle 10 to navigate autonomously to the navigation goal within the navigable area utilising the vehicle control data. The navigation signal is output in dependence on a received request signal. The received request signal is indicative of a request, for example from a user, for the host vehicle to navigate to the navigation goal.

It will be understood that the control system 2100 may instead receive the vehicle control data from elsewhere. As hereinbefore, the vehicle control data is indicative of the at least one vehicle state including a vehicle state other than the steering control input, the acceleration control input and the braking control input during a manoeuvre through a navigable area. As hereinbefore, the control system 2100 can utilise the vehicle control data to autonomously control the host vehicle 10 to navigate to a navigation goal within the navigable area.

Figure 11:
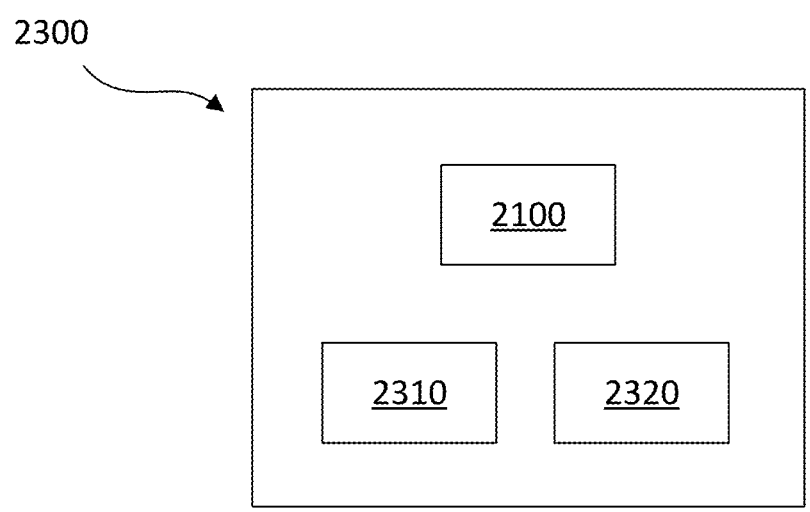

A system 2300 in accordance with an embodiment of the invention is shown in FIG. 11. The system comprises the control system 2100 as described hereinbefore with reference to FIG. 10. The system 2300 comprises a vehicle controller 2310. The vehicle controller 2310 receives the vehicle control data from the control system 2100 and causes the host vehicle to navigate to the navigation goal within the navigable area utilising the vehicle control data, for example by setting up the host vehicle to substantially match the vehicle conditions indicated in the vehicle control data. The system 2300 comprises an input apparatus 2320. The input apparatus 2320 is configured to receive the control input from the user during the manoeuvre in the navigable area. The input apparatus 2320 outputs the state signal to the control system 2100 in dependence on the control input.

Figure 12:
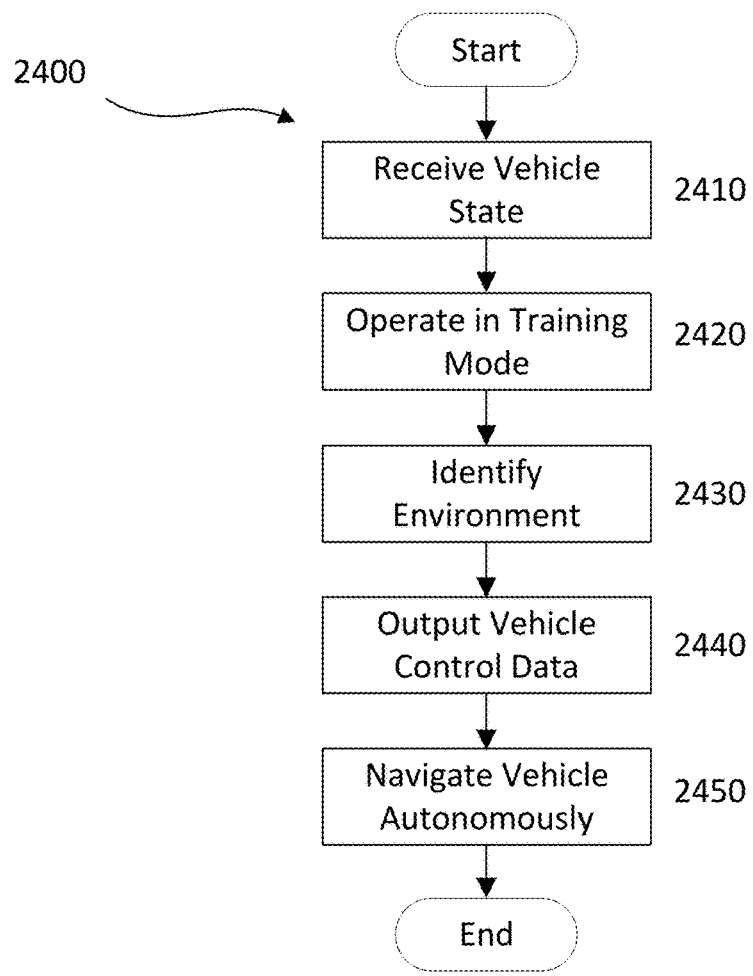

A method 2400 according to an embodiment of the invention is shown in FIG. 12. The method 2400 is a method of controlling the host vehicle 10. In particular, the method is a method of autonomously controlling the vehicle to navigate an environment to a navigation goal utilising vehicle control data indicative of at least one vehicle state during a previous manoeuvre of the vehicle within the navigable area. The method 2400 may be performed by the control system 2100 and the system 2300 described hereinbefore with reference to FIGS. 10 and 11.

The method 2400 broadly comprises steps of receiving 2410 one or more vehicle states of the vehicle associated with a manoeuvre of the vehicle within a navigable area, and including at least one vehicle state other than a steering control input, an acceleration control input and a braking control input of the vehicle and, in utilisation thereof, autonomously navigating 2450 the vehicle to a navigation goal in the navigable area.

Referring to FIG. 12, the illustrated embodiment of the method 2400 comprises a step of receiving 2410, when the vehicle is operating in a non-autonomous mode, one or more vehicle states of the vehicle during a manoeuvre of the vehicle within a navigable area. The one or more vehicle states include at least one vehicle state other than a steering control input, an acceleration control input and a braking control input of the vehicle.

In step 2420, the vehicle is operated in a training mode.

In step 2430, in the training mode, an environment of the navigable area for the vehicle is identified. The environment is for subsequent navigation by the vehicle, operating in an autonomous mode, to at least one navigation goal.

In step 2440, vehicle control data indicative of the at least one vehicle state is output. The vehicle control data is determined in dependence on the one or more vehicle states.

In step 2450, when the vehicle is operating in the autonomous mode, the vehicle is autonomously controlled to navigate the environment to the navigation goal utilising the vehicle control data.

Localisation of Vehicle

Figure 13:
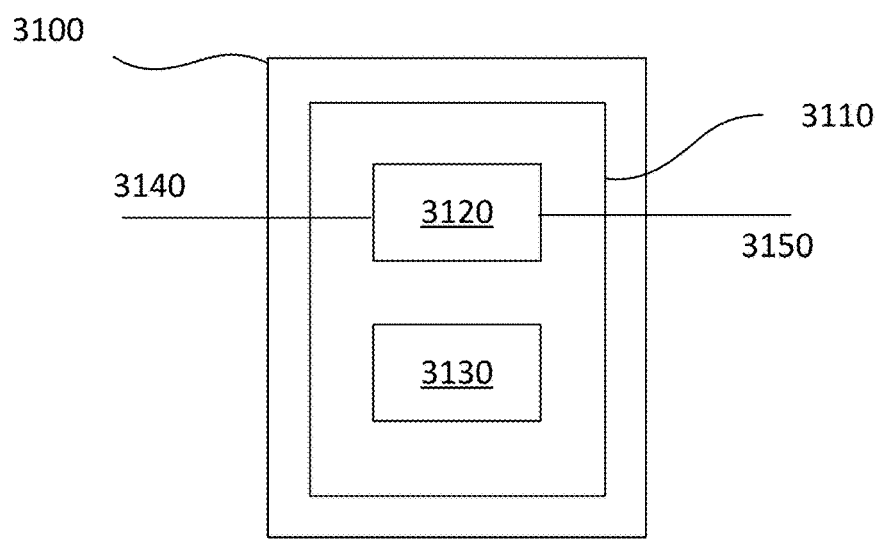

A control system 3100 or control unit 3100 in accordance with an embodiment of the invention is shown in FIG. 13.

The control system 3100 is for a host vehicle 10 operable in an autonomous mode. The host vehicle 10 may be substantially as described with reference to FIG. 1 hereinbefore. The control system 3100 comprises one or more controllers 3110. The one or more controllers 3110 include a first controller 3110. The control system 3100 is configured to receive a first location signal, a first area signal and a reference signal. The first location signal is indicative of a location of the host vehicle 10. The first area signal is indicative of one or more sensed characteristics of at least a portion of a first area in a vicinity of the host vehicle. The reference signal is indicative of a location of a second area relative to the first area. The second area is in a vicinity of the first area. The one or more controllers 3110 determine the location of the host vehicle relative to the second area in dependence on the first location signal, the first area signal and the reference signal. The location of the host vehicle 10, the one or more sensed characteristics of the first area and the location of the second area relative to the first area are used to determine the location of the host vehicle 10 relative to the second area. The one or more controllers 3110 output a second location signal indicative of the location of the host vehicle 10 relative to the second area. Therefore, an accurate localisation of the host vehicle 10 is possible even in the absence of accurate location data for the host vehicle 10, based on localising the host vehicle relative to the second area. The one or more controllers 3110 comprise an electronic processor 3120 having an electrical input 3140 and an electronic memory device 3130 electrically coupled to the electronic processor 3120. The electronic memory device 3130 has instructions stored therein. The electronic processor 3120 is configured to access the memory device 3130 and execute the instructions thereon so as to determine the location of the host vehicle relative to the second area. The electrical input 3140 is for receiving the first location signal, the first area signal and the reference signal. The electronic processor 3120 includes an electrical output 3150 for outputting the second location signal. The electrical input 3140 and the electrical output 3150 may be combined such as by being formed by an I/O unit or interface unit. For example, the one or more controllers 3110 may comprise an interface to a network forming a communication bus of the host vehicle. The interface bus may be an Internet Protocol (IP) based communication bus such as Ethernet, although embodiments of the invention are not limited in this respect.

The first location signal is indicative of a geographic location of the host vehicle. In one example, the first location signal is indicative of a low-accuracy location of the host vehicle, for example a five-metre accuracy. Alternatively, the location signal may be indicative of the location of host vehicle being within a predetermined distance of a home location, or the first area, or on a predetermined road. The first area is associated with the home location. It will be understood that for autonomous navigation of the host vehicle, a high-accuracy location of the host vehicle relative to a navigation goal is likely to be required. Thus, the present embodiment provides an improved location accuracy based on determining the location of the host vehicle relative to a second area, which can include the navigation goal. The location of the host vehicle relative to the second area can be accurately determined based on localisation of the host vehicle within the first area using sensed characteristics of the vicinity of the host vehicle and reference data indicative of the location of the second area relative to the first area.

The one or more controllers 3110 determining the location of the host vehicle relative to the second area determine a first area indicator that the host vehicle is in a vicinity of the first area. The first area indicator is determined in dependence on the first location signal. In an example, the first area indicator is determined in dependence on the first area signal. In this way, it is determined that the host vehicle is near or within the first area. The location of the host vehicle indicated by the location signal alone is used in conjunction with the one or more sensed characteristics indicated by the first area signal to localise the host vehicle in the vicinity of the first area. In particular, the location of the host vehicle indicated by the location signal can be used to determine the host vehicle should be near the first area. The one or more sensed characteristics indicated by the first area signal are compared with one or more expected characteristics to determine a location of the host vehicle relative to the first area. The one or more sensed characteristics typically include map data, including a location associated with the one or more sensed characteristics, such that the location of a plurality of sensed characteristics can be used to determine the location of the host vehicle relative to the first area in dependence on the one or more expected characteristics. Determining the location of the host vehicle relative to the second area comprises determining a second area indicator that the host vehicle is within a predetermined distance of the second area in dependence on the reference signal and the first area signal. Thus, the location of the host vehicle relative to the first area and the location of the second area relative to the first area can be used to determine the location of the host vehicle relative to the second area. Therefore, the accurate location of the host vehicle need only be determined when the host vehicle is in the vicinity of the second area, in which case the location of the host vehicle relative to the second area can be utilised during autonomous navigation of the host vehicle to the navigation goal through the second area.

The one or more controllers 3110 determine the first area indicator in dependence on comparing the one or more sensed characteristic of the first area indicated by the first area signal with reference area data indicative of one or more reference characteristics of the first area. In this example, the first area includes the second area and is larger than the second area.

The one or more sensed characteristics of the first area include a location of one or more structural features associated with the first area. The one or more structural features can include vegetation features, such as trees or shrubbery. In some examples, the one or more structural features include a building or a wall. Thus, triangulation of the host vehicle within the first area is possible based on comparing the one or more sensed characteristics with expected characteristics, for example based on a previous measurement by the host vehicle at the first area.

The first area signal is indicative of a sensor output of a sensing means arranged to receive sensing data of the vicinity of the host vehicle 10. Therefore, the sensing means can be arranged to detect the one or more sensed characteristics of the first area in order to localise the host vehicle first broadly in a vicinity of the first area, and then secondly more precisely in the first area, to determine the location of the host vehicle relative to the second area. The sensing means may be substantially any of the sensor types described previously herein.

The second area is a navigable area in which the host vehicle can navigate autonomously via a plurality of different routes in the navigable area.

Figure 14:
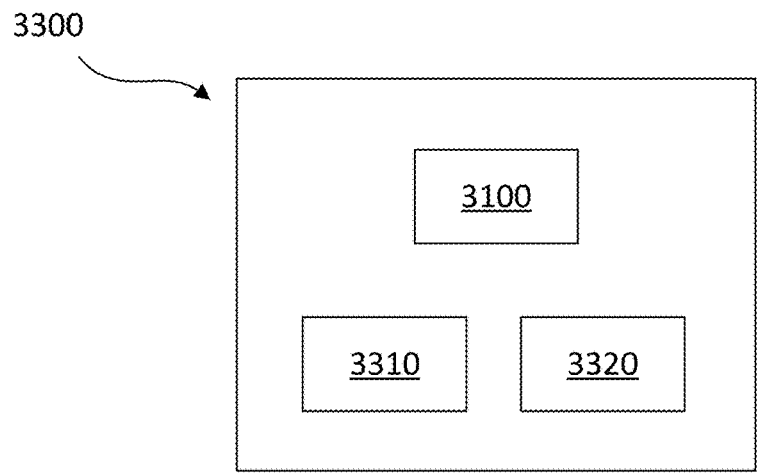

A system 3300 in accordance with an embodiment of the invention is shown in FIG. 14. The system 3300 comprises the control system 3100 as described hereinbefore with reference to FIG. 13. The system 3300 comprises sensing means 3310 in the form of one or more sensors 3310. The sensing means 3310 is arranged to determine sensing data of an environment associated with a vicinity of the host vehicle 10 and, in dependence thereon, to output the first area signal to the first controller 3110. The system 3300 can comprise a location system 3320 to determine a geographic location of the host vehicle via, for example GPS, GLONASS or similar and output the first location signal to the control system 3100 in dependence thereon.

Figure 15:
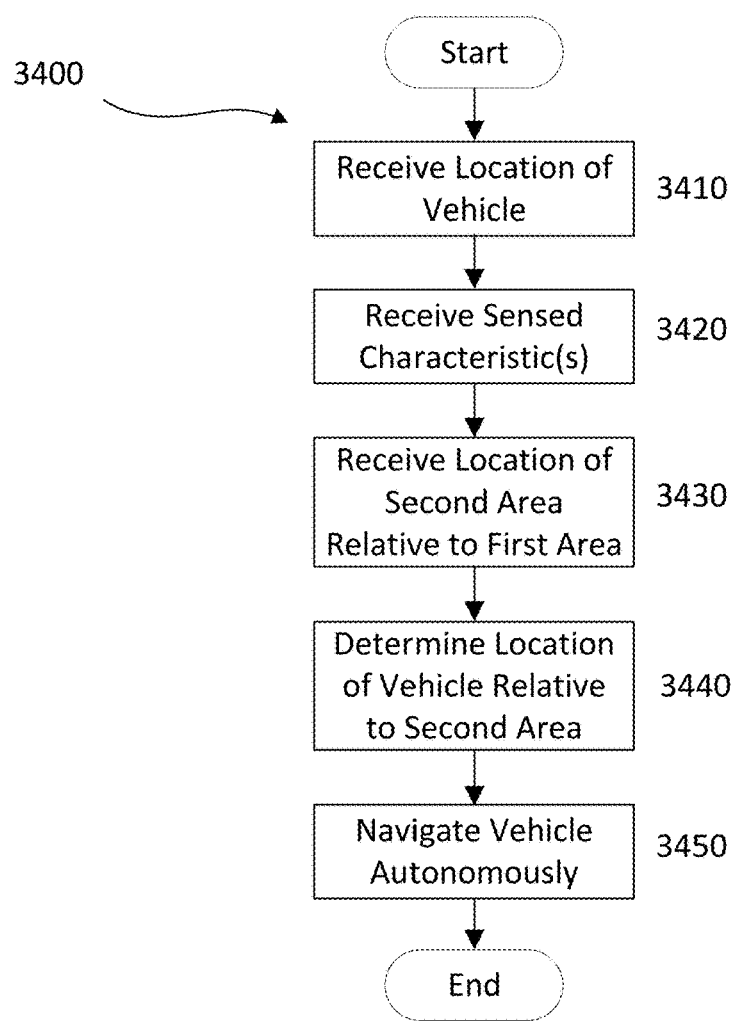

A method 3400 according to an embodiment of the invention is shown in FIG. 15. The method 3400 is a method of controlling the host vehicle 10. In particular, the method 3400 is a method of autonomously navigating the vehicle to a navigation goal within a second area utilising a location of the host vehicle relative to the second area determined in dependence on a location of the vehicle, one or more sensed characteristics of at least a portion of a first area and a location of a second area relative to the first area. The method 3400 may be performed by the control system 3100 and the system 3300 described hereinbefore with reference to FIGS. 13 and 14.

The method 3400 broadly comprises steps of receiving 3410 a first location signal indicative of a location of a vehicle, receiving 3420 one or more sensed characteristics of at least a portion of a first area, receiving 3430 a location of a second area relative to the first area, and in dependence thereon, autonomously navigating 3450 the host vehicle to a navigation goal within the second area utilising a location of the host vehicle relative to the second area.

Referring to FIG. 15, the illustrated embodiment of the method 3400 comprises a step of receiving 3410 a first location signal indicative of a location of a vehicle.

In step 3420, one or more sensed characteristics of at least a portion of a first area in a vicinity of the vehicle are received. The sensed characteristics can include a location of one or more structural features associated with the first area.

In step 3430, a location of a second area relative to the first area is received. The second area is in a vicinity of the first area.

In step 3440, a location of the vehicle relative to the second area is determined in dependence on the first location signal, the one or more sensed characteristics and the location of the second area relative to the first area.

In step 3450, when operated in an autonomous mode, the vehicle navigates autonomously to a navigation goal within the second area utilising the location of the host vehicle relative to the second area.

As a result of the method 3400, the vehicle can navigate autonomously to the navigation goal in the second area even when an accurate geographic location of the vehicle is unavailable, or is not sufficiently accurate to support autonomous navigation operations.

Local Map Updating

Figure 16:
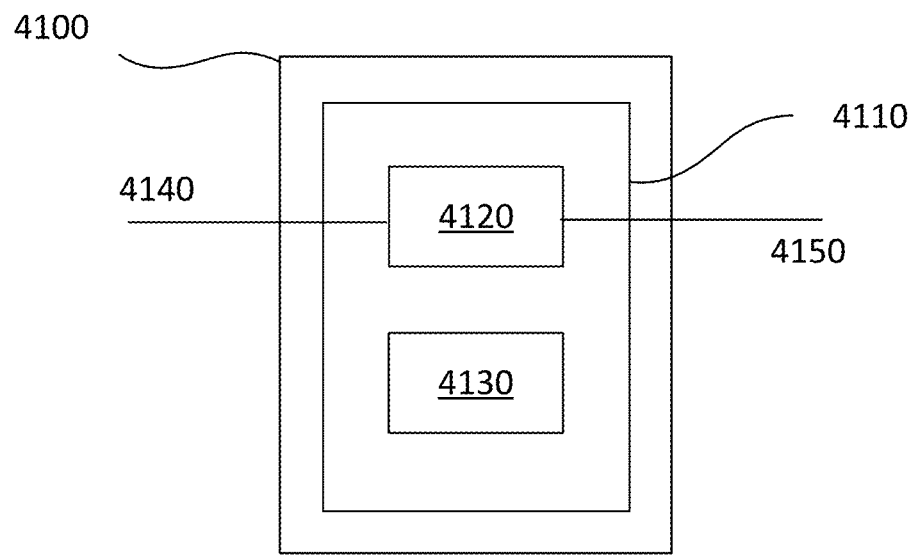

A control system 4100 or control unit 4100 in accordance with an embodiment of the invention is shown in FIG. 16.

The control system 4100 is for a host vehicle 10 operable in an autonomous mode. The host vehicle 10 may be substantially as described with reference to FIG. 1 hereinbefore. The control system 4100 comprises one or more controllers 4110. The one or more controllers 4110 include a first controller 4110. The control system 4100 is configured to receive first environment data and second environment data. The first environment data is indicative of a navigation characteristic associated with a potential obstacle relating to an area within which a host vehicle is operated at a first time. The second environment data is indicative of the navigation characteristic relating to the area at a second time. The second time is different to the first time. The second time may be after the first time. The one or more controllers 4110 determine map data relating to the area in dependence on the first environment data and the second environment data. The control system 4100 utilises the map data to autonomously navigate the host vehicle when subsequently navigating the area to a navigation goal in an autonomous mode. Therefore, autonomous navigation can be performed utilising a navigation characteristic of an area at a first time and a second time. In this way, any changes in the navigation characteristic between the first time and the second time can also be taken into account, for example by updating the map data. The one or more controllers 4110 comprise an electronic processor 4120 having an electrical input 4140 and an electronic memory device 4130 electrically coupled to the electronic processor 4120. The electronic memory device 4130 has instructions stored therein. The electronic processor 4120 is configured to access the memory device 4130 and execute the instructions thereon so as to autonomously control the host vehicle operating in the autonomous mode utilising the map data. The electrical input 4140 is for receiving the first environment data and the second environment data. The electronic processor 4120 includes an electrical output 4150 for outputting the map data. The electrical input 4140 and the electrical output 4150 may be combined such as by being formed by an I/O unit or interface unit. For example, the one or more controllers 4110 may comprise an interface to a network forming a communication bus of the host vehicle. The interface bus may be an Internet Protocol (IP) based communication bus such as Ethernet, although embodiments of the invention are not limited in this respect.

The first time and the second time are typically separated by approximately one day, or greater. In some examples, the environment data is determined each time the host vehicle enters the vicinity of the area.

The first environment data is indicative of the first time. The second environment data is indicative of the second time. In other words, the first environment data and the second environment data can each be timestamped with a data collection time.

The one or more controllers 4110 determine the map data in dependence on a time difference between the first time and the second time satisfying a predetermined criterion, for example greater than six hours. Therefore, in this example, the map data is not determined again where the host vehicle re-enters the vicinity of the area less than six hours ofter the first time. In other examples, it will be understood that the map data can be determined each time the host vehicle enters the vicinity of the area.

The second environment data is indicative of the navigation characteristic of the area at the second time, at which the host vehicle is operated within the area. In one example, the one or more controllers 4110 determine the map data in dependence on the control system 4100 receiving an operating signal. The operating signal is indicative of the host vehicle operating in the area at a third time. The third time is separate from the first time and the second time. The third time is between the first time and the second time. Therefore, the map data can be determined every i'th time in which the host vehicle operates in the area, where i is an integer greater than 1.

The map data is indicative of an availability of autonomous navigation of the host vehicle in a plurality of regions of the area. Therefore, the area can be split into regions.

The navigation characteristic relates to a presence or absence of the potential obstacle. Therefore, the map data can be determined when a navigation obstacle appears or disappears in the area. As will be understood, the autonomous navigation of the host vehicle through the area may be different when one or more new obstacles have appeared in the area, or when previous obstacles have been removed. Updating the map data ensures the control system 4100 can autonomously control the host vehicle to navigate to the navigation goal in the area, taking account of the presence or absence of the potential obstacles in the area.

In some examples, the navigation characteristic relates to a density of the potential obstacle, such as the density of foliage on a shrub or other vegetation. The one or more controllers 4110 determine the potential obstacle as an actual obstacle in dependence on the density.

The one or more controllers 4110 classify the potential obstacle as a static obstacle or a dynamic obstacle in dependence on the first environment data and the second environment data. Furthermore, the one or more controllers 4110 determine the map data in dependence on the potential obstacle being classified as static or dynamic. In this way, the map data can be left unchanged where a dynamic obstacle appears. For example, with a dynamic obstacle, it is expected that the obstacle is capable of movement to a plurality of different locations within the area, and even out of the area. Therefore, the map data need not be updated because there is an expectation the dynamic obstacle will no longer be in the same location, or even in the area at all, the next time the host vehicle enters the area. Conversely, where the potential obstacle is classified as a static obstacle, it is expected that the obstacle will not typically move in advance of the host vehicle entering the area a further time. Therefore, it is generally useful to determine the map data taking into account the location of the static obstacle so that autonomous navigation of the host vehicle can avoid the static obstacle.

In this example, the first environment data is indicative of, and indeed comprises previous map data of the area, though it will be understood that the first environment data may be different to previous map data. The one or more controllers 4110 output the map data. In this example, the map data is output to memory to be used in subsequent autonomous navigation of the host vehicle in the area. However, it will be understood that the map data may instead be output to further systems of the host vehicle 10, or indeed to further vehicles for utilisation in subsequent autonomous navigation of one or more vehicles in the area.

Figure 17:
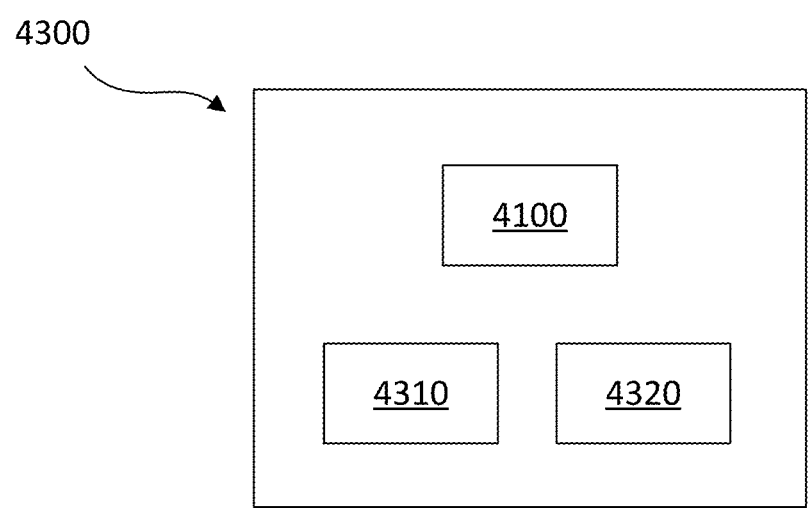

A system 4300 in accordance with an embodiment of the invention is shown in FIG. 17. The system 4300 comprises the control system 4100 as described hereinbefore with reference to FIG. 16. The system 4300 comprises sensing means 4310 in the form of one or more sensors 4310. The sensing means 4310 is arranged to detect the navigation characteristic of the area within which the host vehicle is operated at the second time and, in dependence thereon, output the second environment data to the first controller 4110. In this example, the sensing means 4310 is configured to detect the navigation characteristic of the area within which the host vehicle is operated at the first time. The sensing means 4310 is configured to output the first environment data to the first controller 4110 in dependence on detecting the navigation characteristic of the area within which the host vehicle is operated at the first time. The system 4300 comprises a vehicle controller 4320. The vehicle controller 4320 receives the map data from the control system 4100. In dependence on receipt of the map data, the vehicle controller 4320 causes navigation of the host vehicle to the navigation goal in the area.

Figure 18:
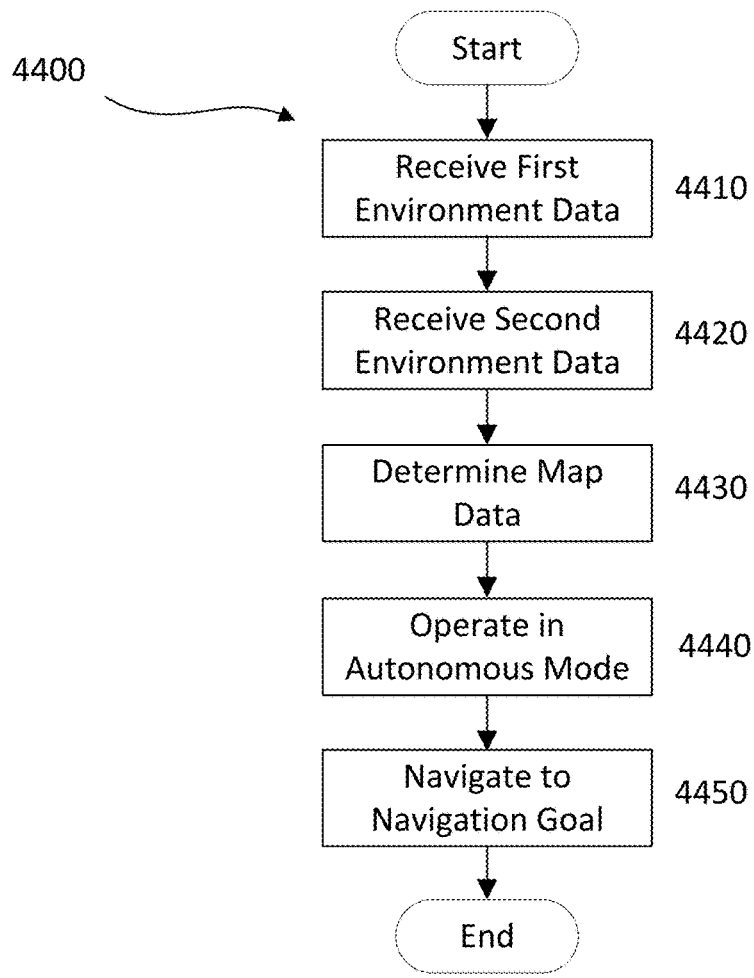

A method 4400 according to an embodiment of the invention is shown in FIG. 18. The method 4400 is a method of controlling the host vehicle 10. In particular, the method 4400 is a method of autonomously controlling the vehicle to navigate to a navigation goal utilising map data determined in dependence on a navigation characteristic relating an area of the vehicle at a first time and a second time. The method 4400 may be performed by the control system 4100 and the system 4300 described hereinbefore with reference to FIGS. 16 and 17.

The method 4400 broadly comprises steps of receiving 4410 first environment data indicative of a navigation characteristic associated with an area, receiving 4420 second environment data indicative of the navigation characteristic at a different time, and in dependence thereon, determining 4430 map data of the area for utilising during autonomous navigation 4450 of the vehicle in the area.

Referring to FIG. 18, the illustrated embodiment of the method 4400 comprises a step of receiving 4410 first environment data. The first environment data is indicative of a navigation characteristic associated with a potential obstacle relating to an area within which a vehicle is operated at a first time. The first environment data can be indicative of a presence or absence of an obstacle in the area.

In step 4420, second environment data is received. The second environment data is indicative of the navigation characteristic relating to the area at a second time. The second time is different to the first time, for example after the first time.

In step 4430, map data of the area is determined in dependence on the first environment data and the second environment data. The map data can be determined in dependence on the second environment data being indicative of one or more new obstacles appearing in the area, compared to the area indicated by the first environment data. The map data can be determined in dependence on the second environment data being indicative of one or more obstacles being absent from the area, compared to the area indicated by the first environment data.

In step 4440, the vehicle is operated in an autonomous mode. Therefore, the vehicle can be navigated autonomously.

In step 4450, when the vehicle is operating in the autonomous mode, the vehicle is autonomously controlled to navigate to a navigation goal associated with, for example within, the area utilising the map data. As a result of the method 4400, the vehicle can navigate autonomously to the navigation goal in the area utilising map data determined taking account of changes in the environment of the vehicle between a first time and a second time.

Change Between Images

Figure 19:
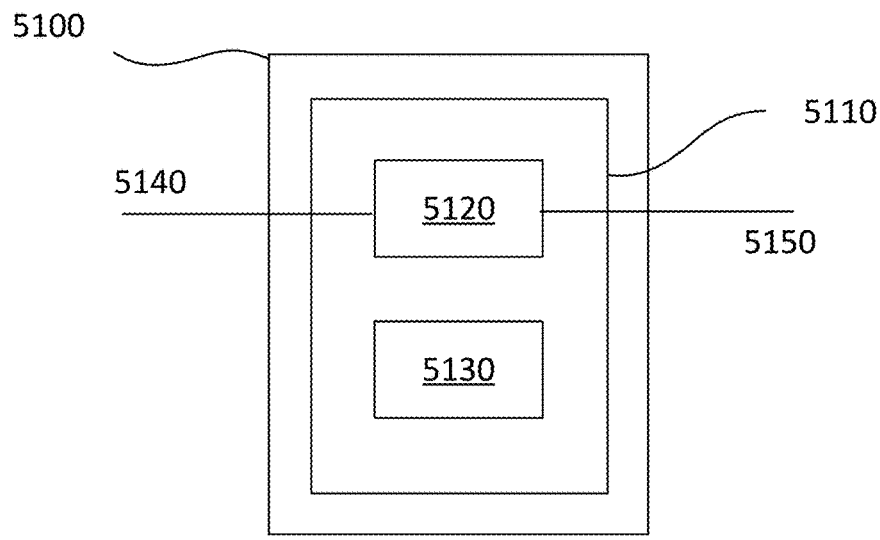

A control system 5100 or control unit 5100 in accordance with an embodiment of the invention is shown in FIG. 19.

The control system 5100 is for a host vehicle 10 operable in an autonomous mode. The host vehicle 10 may be substantially as described with reference to FIG. 1 hereinbefore. The control system 5100 comprises one or more controllers 5110. The one or more controllers 5110 include a first controller 4110. The control system 5100 is configured to receive first image data and second image data. The first image data is indicative of a first image of at least a first portion of an environment of the host vehicle. The first image is taken at a first time. The second image data is indicative of a second image of at least a second portion of the environment of the host vehicle taken at a second time, after the first time. In this example, the second image data is to be received by the control system 5100 when the host vehicle 10 is operating in an autonomous mode. A field of view of the first image at least partially overlaps a field of view of the second image. Therefore, at least part of the scene of the environment of the host vehicle can be seen in both the first image and the second image. When the vehicle is operating in the autonomous mode, the one or more controllers 5110 identify a change in the environment of the host vehicle between the first time and the second time. The change is identified in dependence on the first image data and the second image data. For example, the one or more controllers 5110 identify the change in dependence on the first image data and the second image data being indicative of the first image being different to the second image. The one or more controllers 5110 output a change signal indicative of the change in the environment of the host vehicle. In between the first time and the second time, the host vehicle has completed one system shutdown event. At both the first time and the second time, the host vehicle is substantially stationary, for example, the host vehicle is in a parking location. Therefore, changes in the environment of the host vehicle can be detected using change detection techniques on two images taken of the environment of the host vehicle at two different times. The one or more controllers 5110 comprise an electronic processor 5120 having an electrical input 5140 and an electronic memory device 5130 electrically coupled to the electronic processor 5120. The electronic memory device 5130 has instructions stored therein. The electronic processor 5120 is configured to access the memory device 5130 and execute the instructions thereon so as to output a change signal indicative of a change in the environment of the host vehicle 10 utilising the first image and the second image. The electrical input 5140 is for receiving the first image data and the second image data. The electronic processor 5120 includes an electrical output 5150 for outputting the change signal. The electrical input 5140 and the electrical output 5150 may be combined such as by being formed by an I/O unit or interface unit. For example, the one or more controllers 5110 may comprise an interface to a network forming a communication bus of the host vehicle. The interface bus may be an Internet Protocol (IP) based communication bus such as Ethernet, although embodiments of the invention are not limited in this respect.

The host vehicle 10 in his example is arranged to take the first image while the host vehicle 10 is at a parking location and prior to shutdown of the host vehicle 10 at the parking location. The host vehicle 10 is arranged to take the second image after the first image and while the host vehicle 10 is at the parking location. In particular, the host vehicle 10 is arranged to take the second image immediately prior to movement of the host vehicle 10 away from the parking location in the autonomous mode of the host vehicle 10.

The one or more controllers 5110 can identify the addition of a new object in a vicinity of the host vehicle as the change in the environment. For example, the new object can appear in the second image which was not previously present in the first image, even though the new object in the second image is within the field of view of the first image. Therefore, the one or more controllers 5110 can determine that the environment has changed and notify the user that there has been a change in the environment. In this example, the one or more controllers 5110 can output the second image to the user to notify the user of the observed change. Therefore, the user can determine whether to continue with autonomous navigation of the host vehicle even in view of the change in the environment of the host vehicle.

In the present example, the one or more controllers 5110 attempt to identify the new object in the second image and provide the identification to the user as part of the change signal.

Where the first image and the second image are each acquired while the host vehicle 10 is in slightly different locations, but nevertheless where there is at least partial overlap in the field of view associated with the first image and the second image, the one or more controllers 5110 can transform the second image relative to the first image (or vice versa) to allow simple comparison between the first image and the second image.

In this example, the first image and the second image each comprise a view relating to a lateral side of the host vehicle 10. Therefore, changes in the environment can be identified even where typical sensors used for autonomous navigation have poor coverage, for example because typical sensors used for autonomous navigation predominantly sense frontward and rearward regions of the host vehicle.

The one or more controllers 5110 output the change signal in dependence on a comparison between the first image data and the second image data.

The control system 5100 is configured to receive a goal signal indicative of a navigation goal of the host vehicle. In the autonomous mode, the one or more controllers 5110, after receipt of the goal signal, output a navigation signal to cause the host vehicle 10 to navigate autonomously to the navigation goal in dependence on the change identified. For example, where there is no change identified, or where the change identified is determined to be negligible, the host vehicle 10 can proceed with autonomous navigation to the navigation goal. Conversely, where there is a change identified, or where the change is determined to be significant, the host vehicle can be prevented from autonomously navigating to the navigation goal until the user is made aware of the change in the environment and confirms that the host vehicle 10 should proceed in the autonomous mode with autonomous navigation to the navigation goal. In this way, the control system 5100 is configured to receive a confirmation signal indicative of the confirmation from the user to proceed with autonomous navigation to the navigation goal. The conformation signal is received after notification of the identified change to the user. The one or more controllers 5110 output the navigation signal in dependence on the confirmation signal being received. Therefore, the user can instruct the host vehicle 10 to proceed with the autonomous navigation even where the one or more controllers 5110 identify the change in the environment.

The one a more controllers 5110 output the navigation signal in sufficient time such that autonomous navigation of the host vehicle 10 begins shortly of ter, for example in less than 30 seconds, of ter identification of any change in the environment based on the first image and the second image. Therefore, the environment of the host vehicle can be substantially unchanged between taking the second image and movement of the host vehicle 10 away from a current position of the host vehicle for autonomous navigation.

Figure 20:
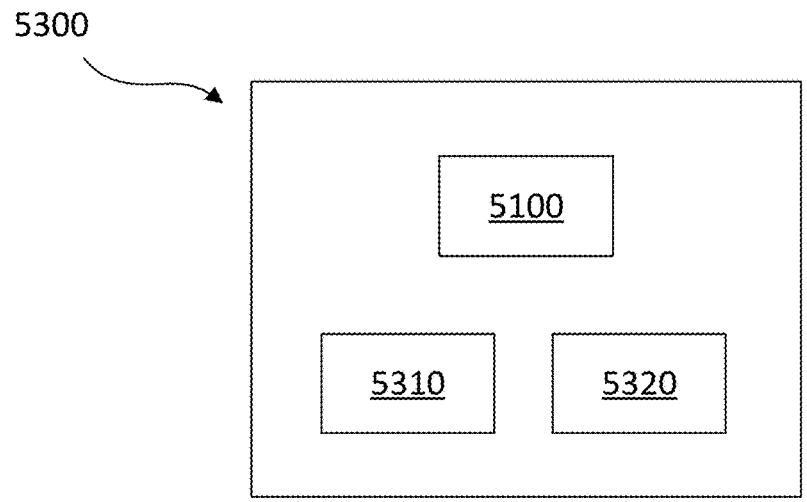

A system 5300 in accordance with an embodiment of the invention is shown in FIG. 20. The system 5300 comprises the control system 5100 as described hereinbefore with reference to FIG. 19. The system 5300 comprises notification means 5310 in the form of a notification unit 5310. The notification means 5310 is configured to receive the change signal from the control system 5100. The notification means 5310 is configured to output a user notification for notifying a user of the host vehicle of the change in the environment of the host vehicle in dependence on the change signal being received. Therefore, the user can be alerted to changes in the environment which can affect the ability of the host vehicle 10 to navigate autonomously in the autonomous mode. The notification unit 5310 includes an electronic display 5310. In some examples, the notification unit 5310 comprises an audio output device.

The system 5300 comprises image sensing means 5320 in the form of one or more optical imaging devices 5320, for example one or more cameras 5320. The image sensing means 5320 is configured to capture the first image of the environment of the host vehicle at the first time and to output the first image data to the control system 5100 in dependence thereon. The image sensing means 5320 is configured to capture the second image of the environment of the host vehicle at the second time and to output the second image data to the control system 5100 in dependence thereon. The image sensing means 5320 captures both the first image and the second image.

The image sensing means 5320 is arranged such that the field of view of the first image and the field of view of the second image each include a ground surface of the environment of the host vehicle 10 in normal use. Therefore, changes in the environment of the host vehicle in the vicinity of the ground surface, such as objects on the floor around the host vehicle, can be detected using the present system. The field of view of the first image and the field of view of the second image each include only the environment of the host vehicle below a predetermined height from the ground surface. Therefore, only changes in the environment in the vicinity of the ground surface can be detected. For example, a new shelf on a wall near the host vehicle and above the predetermined height from the ground surface will not be identified as a change in the environment. The predetermined height is substantially the height of the host vehicle.

The one or more controllers 5110 of the control system 5100 identify the change in the environment in dependence on only portions of the first image data and the second image data associated with the field of view below the predetermined height from the ground surface.

Figure 21:
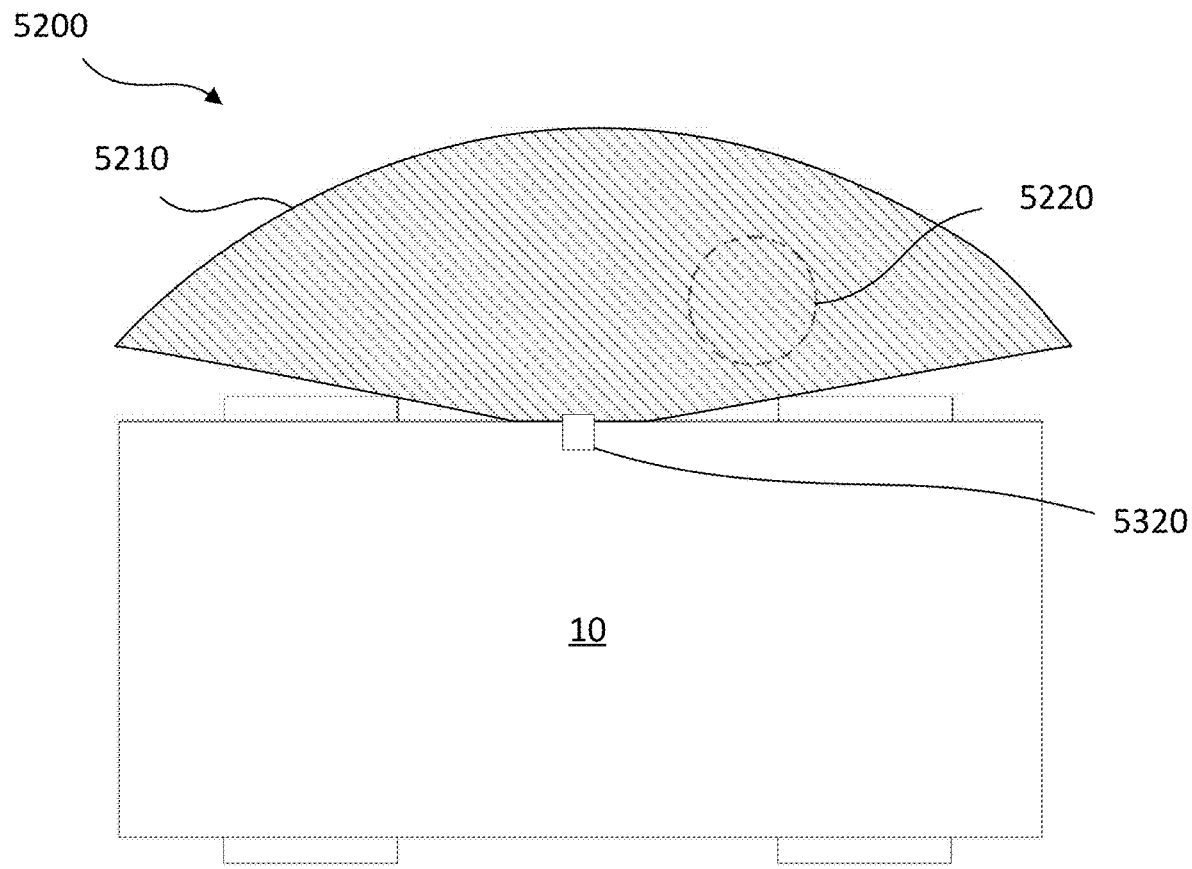

FIG. 21 shows a schematic diagram illustrating an example of the environment in which the host vehicle 10 in accordance with an embodiment of the invention can operate. The host vehicle 10 can comprise the control system 5100 as described with reference to FIG. 19 or the system 5300 as described with reference to FIG. 20. In particular, image sensing means 5320 can be seen positioned at a lateral side of the host vehicle 10. A field of view 5210 of the image sensing means 5320 is also shown, and covers an object 5220 in the vicinity of the host object. As described hereinbefore, the object 5220 is not present at the first time when the image sensing means 5320 captures a first image of the environment of the host vehicle 10. Between the first time and the second time, the object 5220 appears in the environment and is present when the image sensing means 5320 captures the second image at the second time. The one or more controllers 5110 can identify the change in the environment and notify the user of the change. In some circumstances, the user may decide to prevent the autonomous navigation of the host vehicle 10 until the object 5220 has been moved out of the vicinity of the user, for example by the user. It will be understood that FIG. 21 is merely a very basic schematic representation and the shape of the field of view 5210 may change. Furthermore, typically the image sensing means 5320 will cover both side of the host vehicle, for example with another sensor unit (not shown in FIG. 21).

Figure 22:
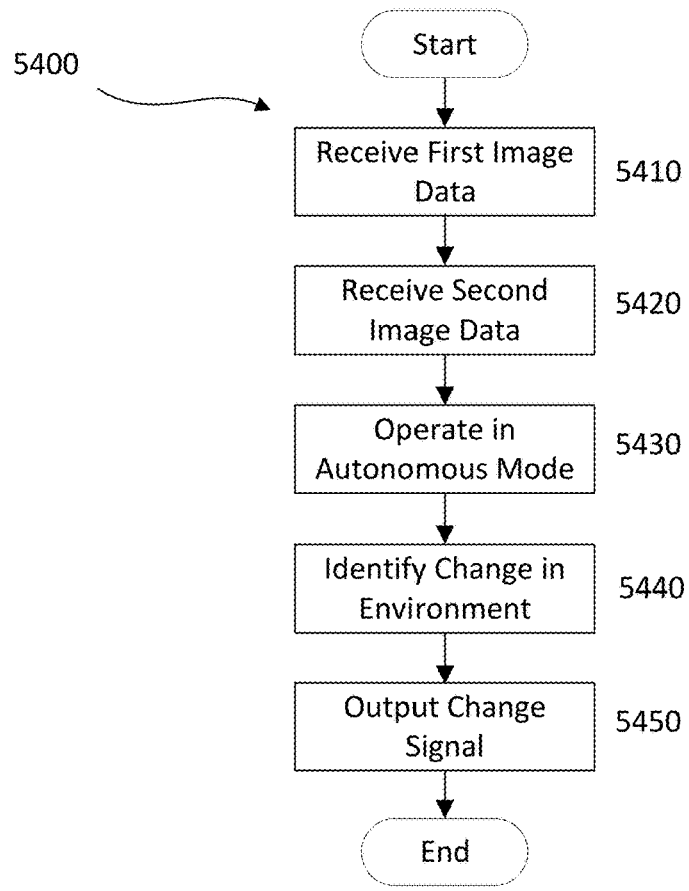

A method 5400 according to an embodiment of the invention is shown in FIG. 22. The method 5400 is a method of controlling the host vehicle 10. In particular, the method 5400 is a method of autonomously controlling the vehicle to navigate to a navigation goal in dependence on identification of a change in the environment. For example, the method 5400 is typically arranged to prevent or delay autonomous navigation of the vehicle to the navigation goal when the change is identified in the environment. The user can confirm that autonomous navigation can proceed after reviewing the change in the environment. Alternatively, the user can cancel the autonomous navigation of the host vehicle. The method 5400 may be performed by the control system 5100 and the system 5300 described hereinbefore with reference to FIGS. 19 and 20. The method may be performed by the vehicle 10 in the environment shown schematically in FIG. 21.

The method 5400 broadly comprises steps of receiving 5410 a first image of an environment of a vehicle, taken at a first time when the vehicle is substantially stationary, receiving 5420 a second image of the environment of the vehicle, taken at a second time after the first time and after at least one system shutdown event between the first time and the second time, and in dependence thereon, outputting 5450 a change signal indicative of a change in the environment of the vehicle between the first time and the second time.

Referring to FIG. 22, the illustrated embodiment of the method 5400 comprises a step of receiving 5410 first image data indicative of a first image of an environment of a vehicle. The first image is taken at a first time when the vehicle is substantially stationary.

In step 5420, second image data indicative of a second image of the environment of the vehicle taken at a second time when the vehicle is stationary is received. The second time is after the first time. The second time is after a system shutdown event between the first time and the second time. A field of view of the first image at least partially overlaps a field of view of the second image. The system shutdown event can include an event when the vehicle is unsupervised by the user of the vehicle, for example unoccupied by the user of the vehicle.

In step 5430, the vehicle is operated in an autonomous mode.

In step 5440, a change in the environment of the vehicle between the first time and the second time is identified in dependence on the first image data and the second image data In step 5450, a change signal indicative of the change in the environment of the vehicle is output.

The method may also comprise autonomously navigating the vehicle to a navigation goal in dependence on the change in the environment. As a result of the method 5400, the vehicle can delay, prevent or seek confirmation for autonomous navigation of the vehicle to the navigation goal based on the change in the environment.

Indication of Operation in Autonomous Driving Mode

Figure 23:
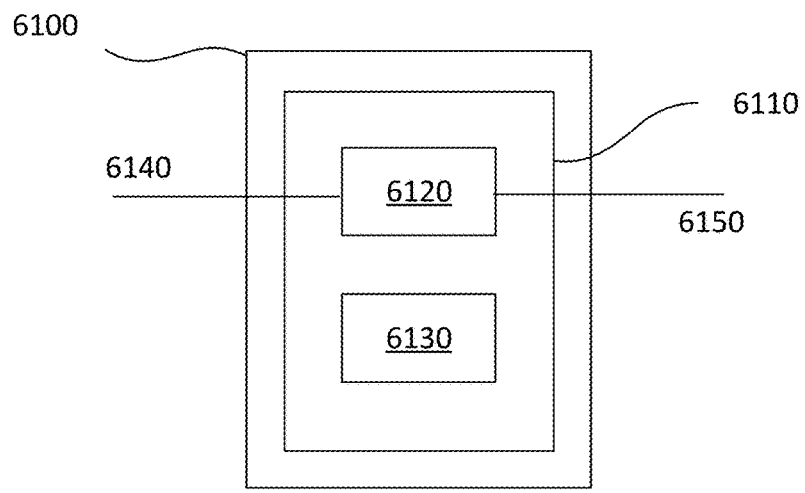

A control system 6100 or control unit 6100 in accordance with an embodiment of the invention is shown in FIG. 23.

The control system 6100 is for a host vehicle 10 operable in an autonomous mode and a non-autonomous mode. The host vehicle 10 may be substantially as described with reference to FIG. 1 hereinbefore.

The control system 6100 comprises one or more controllers 6110. The one or more controllers 6110 include a first controller 6110. The control system 6100 is configured to receive a request signal. The request signal is indicative of a request for a host vehicle to navigate to a navigation goal in an autonomous driving mode. The request is from a user of the host vehicle. The one or more controllers 6110, subsequent to receipt of the request signal, operate the host vehicle 10 in a preliminary mode. The one or more controllers 6110 operate the host vehicle 10 in the preliminary mode in dependence on the request signal being received. The preliminary mode is different from the autonomous driving mode. When operating in the preliminary mode, the one or more controllers 6110 cause production of a movement notification output for at least a predetermined first duration prior to any movement of the host vehicle. The movement notification output is to indicate that the host vehicle is about to move off from a stationary position. The one or more controllers 6110 output a navigation signal to cause the host vehicle 10 to navigate to the navigation goal in the autonomous driving mode. The navigation to the navigation goal caused by the navigation signal is to begin after production of the movement notification output and prior to a predetermined second duration after cessation of the production of the movement notification output. In other words, the host vehicle will begin movement towards the navigation goal in the autonomous driving mode at least after production of the movement notification output has begun. In this example, the movement notification output is in the form of a movement of the host vehicle. The movement is of a predetermined speed or a predetermined acceleration. The movement is for less than a predetermined distance in a longitudinal direction of the host vehicle 10. Therefore, the control system 6100 can advertise that the host vehicle 10 is about to imminently operate in the autonomous driving mode by output of the movement notification output. In other examples, the movement notification output may additionally or alternatively be in the form of an audio output external to the host vehicle 10 and/or a visual output external to the host vehicle 10. The audio output can be output by audio production means in the form of an audio output device, for example a speaker audible from outside the host vehicle 10. The visual output can be output by visual output production means in the form of a visual output device visible from outside the host vehicle 10, for example an electronic display. Therefore, it will be appreciated that the movement notification output can take any one or more of several forms to advertise that the host vehicle 10 is about to move off from a substantially stationary position in the autonomous driving mode. In particular, any parties in the vicinity of the host vehicle 10 can be alerted that the host vehicle 10 is about to move, even where no user has approached the host vehicle 10. The one or more controllers 6110 comprise an electronic processor 6120 having an electrical input 6140 and an electronic memory device 6130 electrically coupled to the electronic processor 6120. The electronic memory device 6130 has instructions stored therein. The electronic processor 6120 is configured to access the memory device 6130 and execute the instructions thereon so as to advertise that the host vehicle 10 is about to move in the autonomous driving mode. The electrical input 6140 is for receiving the request signal. The electronic processor 6120 includes an electrical output 6150 for outputting a notification signal. The notification signal is to cause the production of the movement notification output. The electrical input 6140 and the electrical output 6150 may be combined such as by being formed by an I/O unit or interface unit. For example, the one or more controllers 6110 may comprise an interface to a network forming a communication bus of the host vehicle. The interface bus may be an Internet Protocol (IP) based communication bus such as Ethernet, although embodiments of the invention are not limited in this respect.

The predetermined distance less than two metres in this example, and the movement in the preliminary mode is in the longitudinal direction of the host vehicle 10. In another example, the predetermined distance is substantially zero and the movement in the preliminary mode is in a direction other than the longitudinal direction, for example in a vertical direction relative to a ground surface associated with the host vehicle 10. The predetermined second duration is less than five seconds, for example less than two seconds. In this example, the predetermined second duration is substantially zero seconds. The predetermined speed is less than five metres per second, for example less than two metres per second. The predetermined acceleration has a maximum value greater than two metres per second per second. Therefore, the movement notification output in the form of movement of the host vehicle 10 in the preliminary mode is effective in catching the attention of parties external to the host vehicle 10 and make the parties aware that the host vehicle is about to move in the autonomous driving mode.

The movement in the preliminary mode is in a substantially discontinuous manner during the predetermined first duration. Therefore, the discontinuous movement of the host vehicle 10 can catch the attention of any parties external to the host vehicle 10 to advertise that the host vehicle 10 is about to move in the autonomous driving mode. The one or more controllers 6110, in the preliminary mode, cause the host vehicle 10 to move at a first speed for a first portion of the predetermined first duration. The one or more controllers 6110 cause the host vehicle 10 to move at a second speed, different from the first speed, for a second portion of the predetermined first duration. In other words, the one or more controllers 6110, in the preliminary mode, cause the host vehicle 10 to move in a "jerky" manner. In his example, the second speed is substantially zero, resulting in a stop-start motion of the host vehicle 10 in the preliminary mode.

The second speed is lower than the first speed. A transition from the first speed in the first portion of the predetermined first duration to the second speed in the second portion of the predetermined first duration is such that a maximum deceleration of the host vehicle is at least five metres per second per second. In other words, the deceleration of the host vehicle 10 need not be limited by a deceleration limit indicative of a limit for a comfortable deceleration to be experienced by an occupant of the host vehicle. The control system 6100 is configured to operate in the preliminary mode only in the absence of any occupants in the host vehicle 10.

The first speed is less than five metres per second, for example less than two metres per second.

In this example, the request signal is indicative of the request for the host vehicle 10 to navigate autonomously to the navigation goal in the autonomous driving mode at a predetermined first time. The host vehicle 10 operated in the preliminary mode immediately preceding operation in the autonomous driving mode. The request in this example is for the host vehicle 10 to navigate to the navigation goal for arrival at the predetermined first time. In some embodiments, the request signal is indicative of an entry in a calendar associated with the user.

In some embodiments, the movement in the preliminary mode comprises a first movement in a first direction and a second movement, subsequent to the first movement, in a second direction. The second direction is different, for example opposite, the first direction.

The navigation signal is output in dependence on the request signal and/or the operation of the host vehicle in the preliminary mode for the predetermined first duration.

Figure 24:
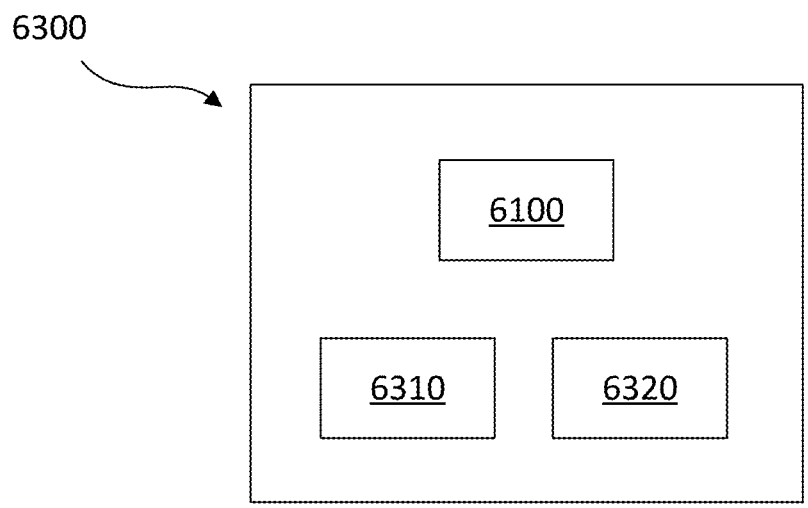

A system 6300 in accordance with an embodiment of the invention is shown in FIG. 24. The system comprises the control system 6100 as described hereinbefore with reference to FIG. 23. The system 6300 comprises notification means 6310 in the form of a notification unit 6310, for example movement means 6310 in the form of an actuator 6310. The notification means 6310 is to cause the production of the movement notification output in the preliminary mode to advertise that the host vehicle 10 is about to move in the autonomous driving mode.

In other examples, the notification means 6310 comprises an audio output device and/or a display device, for example a lighting device and/or an electronic display.

The movement means 6310 is configured to cause the movement of the host vehicle 10 in the preliminary mode in dependence on the notification signal. In this example, the actuator 6310 providing the movement means 6310 is utilised for moving the host vehicle 10 in the autonomous driving mode and the preliminary mode. The actuator 6310 comprises at least one motor 6310.

In examples including sound production means, the sound production means can comprise an audio transducer. In examples including a lighting device, the lighting device can be arranged to be visible from a ground surface in a vicinity of the host vehicle 10. Therefore, parties in the vicinity of the ground associated with the host vehicle 10 are notified that the vehicle can be about to move off in the autonomous driving mode. Furthermore, by illumination the ground surface, for example substantially only the ground surface, in the vicinity of the host vehicle, light pollution from the host vehicle 10 prior to movement of the host vehicle 10 in the autonomous mode may be reduced. The lighting device can be visible from the ground surface directly beneath the host vehicle 10. For example, the lighting device can be visible substantially only from the ground surface directly beneath the host vehicle 10.

The system 6300 comprises a vehicle controller 6320. The vehicle controller 6320 autonomously navigates the host vehicle 10 in accordance with the navigation goal in the autonomous driving mode in dependence on the navigation signal from the control system 6100. The request is typically from the user.

Figure 25:
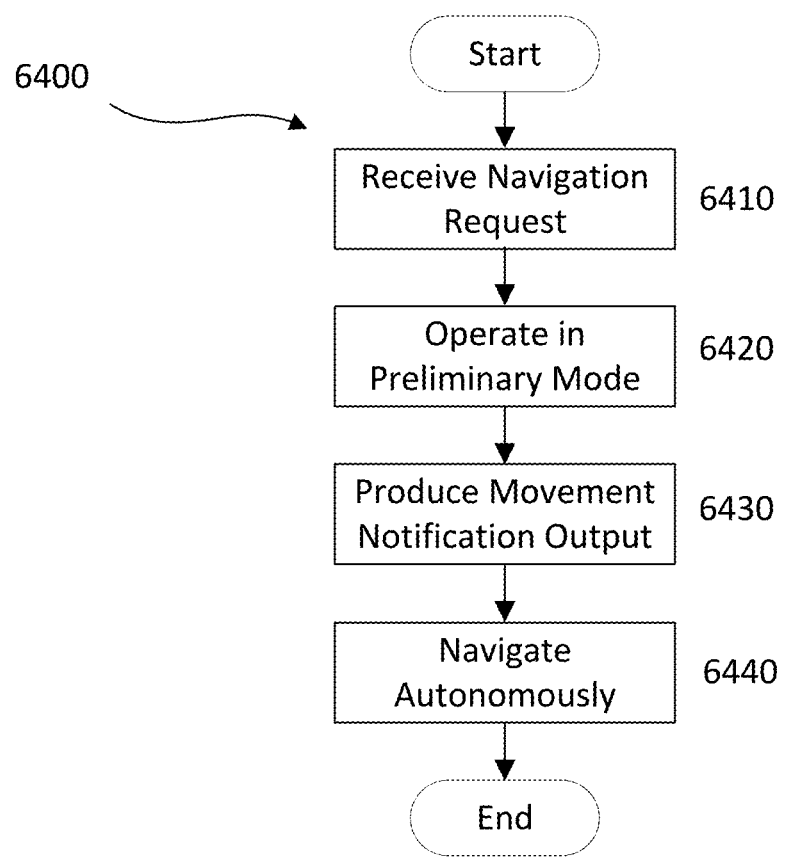

A method 6400 according to an embodiment of the invention is shown in FIG. 25. The method 6400 is a method of controlling the host vehicle 10. In particular, the method 6400 is a method of advertising that the vehicle 10 is about to move in the autonomous driving mode away from a substantially stationary position. The method 6400 may be performed by the control system 6100 and the system 6300 described hereinbefore with reference to FIGS. 23 and 24.

The method 6400 broadly comprises steps of receiving 6410 a request for a vehicle to navigate to a navigation goal in an autonomous driving mode and, in dependence thereon, operating 6420 the vehicle in a preliminary mode, producing 6430 a movement notification output in the form of a movement of the vehicle and subsequently navigating 6440 the vehicle towards the navigation goal in the autonomous driving mode.

Referring to FIG. 25, the illustrated embodiment of the method 6400 comprises a step of receiving 6410 a request for a vehicle to navigate to a navigation goal in an autonomous driving mode. The request is received while the vehicle is in a stationary position. The request may be received from a user of the vehicle. The user may be located remotely from the vehicle. Therefore, the request may be received wirelessly.

In step 6420, the vehicle is operated in a preliminary mode. The preliminary mode is different to the autonomous driving mode. The vehicle is typically operated in the preliminary mode in dependence on the request being received.

In step 6430, when operating in the preliminary mode, the movement notification output is produced. The movement notification output is produced for at least a predetermined first duration prior to movement of the vehicle in the autonomous driving mode. The movement notification output is to indicate that the vehicle is about to move towards the navigation goal in the autonomous driving mode. The movement notification output can comprise production of at least one of an audio output and a visual output external to the vehicle. The movement notification output can comprise movement of the vehicle in the preliminary mode. The movement in the preliminary mode is of a predetermined speed or a predetermined acceleration.

In step 6440, the vehicle is navigated towards the navigation goal in the autonomous driving mode prior to a predetermined second duration after cessation of production of the movement notification output in the preliminary mode.

As a result of the method 6400, the vehicle can advertise that it is about to move away from the stationary position in the autonomous driving mode before the vehicle moves in the autonomous driving mode.

Figure 26:
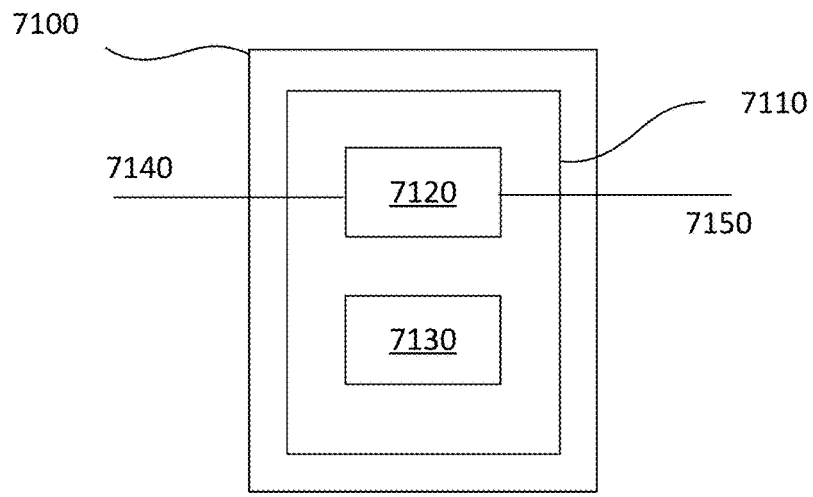

Alternative Goal Prompt A control system 7100 or control unit 7100 in accordance with an embodiment of the invention is shown in FIG. 26.

The control system 7100 is for a host vehicle 10 operable in an autonomous mode and a non-autonomous mode. The host vehicle 10 may be substantially as described with reference to FIG. 1 hereinbefore.

The control system 7100 comprises one or more controllers 7110. The one or more controllers 7110 include a first controller 7110. The control system 7100 is configured to receive a first request signal, a first availability signal and a second availability signal. The first request signal is indicative of a request for a host vehicle 10 to navigate autonomously to a primary navigation goal in an autonomous mode. The first request signal is typically received when the host vehicle 10 is operating in a non-autonomous mode, different to the autonomous mode. The request is from a user of the host vehicle 10. The first availability signal is indicative of an availability of the primary navigation goal for the host vehicle 10. The first availability signal is typically indicative of the availability of autonomous navigation of the host vehicle 10 to the primary navigation goal in the autonomous mode. The second availability signal is indicative of an availability of a secondary navigation goal for the host vehicle 10. The second availability signal is typically indicative of the availability of autonomous navigation of the host vehicle 10 to the secondary navigation goal in the autonomous mode. The one or more controllers 7110, subsequent to receipt of the first request signal and the first availability signal, typically in dependence on the first request signal and the first availability signal being received, output a first notification signal. The first notification signal is to notify the user of the host vehicle 10 of an unavailability of the primary navigation goal. In other words, the output of the first notification signal results in notification to the user that the host vehicle 10 cannot (at least currently) autonomously navigate to the primary navigation goal. The one or more controllers 7110, subsequent to receipt of the second availability signal, for example in dependence on the second availability signal being received, output a second notification signal. The second notification signal is to notify the user of the availability of the secondary navigation goal for the host vehicle 10. In other words, the output of the second notification signal results in notification to the user that the host vehicle 10 can autonomously navigate to the secondary navigation goal. The control system 7100 is configured to cause the host vehicle 10 to subsequently navigate to the secondary navigation goal instead of the primary navigation goal in the autonomous mode. Therefore, an alternative navigation goal (secondary navigation goal) can be suggested to the user where the requested navigation goal (primary navigation goal) is unavailable and the host vehicle 10 can autonomously navigate to the alternative navigation goal instead of the requested (or primary) navigation goal. The one or more controllers 7110 comprise an electronic processor 7120 having an electrical input 7140 and an electronic memory device 7130 electrically coupled to the electronic processor 7120. The electronic memory device 7130 has instructions stored therein. The electronic processor 7120 is configured to access the memory device 7130 and execute the instructions thereon so as to autonomously navigate the host vehicle to the secondary navigation goal instead of the primary navigation goal. The electrical input 7140 is for receiving the first request signal, the first availability signal and the second availability signal. The electronic processor 7120 includes an electrical output 7150 for outputting the first notification signal and the second notification signal. The electrical input 7140 and the electrical output 7150 may be combined such as by being formed by an I/O unit or interface unit. For example, the one or more controllers 7110 may comprise an interface to a network forming a communication bus of the host vehicle. The interface bus may be an Internet Protocol (IP) based communication bus such as Ethernet, although embodiments of the invention are not limited in this respect.

The unavailability of the primary navigation goal can be due to an obstacle, such as another vehicle, either at the primary navigation goal, or in a navigation path to the primary navigation goal. In some embodiments, the one or more controllers 7110 determine that the primary navigation goal is unavailable in dependence on an extent of the host vehicle 10 being greater than an available space at the navigation goal, or at any point along the navigation path.

In this example, the first notification signal comprises the second notification signal. Therefore, the user can be notified of the availability of the secondary navigation goal at substantially the same time as being notified that the primary navigation goal is unavailable.

The one or more controllers 7110 determine a location of first divergence between a first navigable area and a second navigable area. The first navigable area is between a start location of the host vehicle 10 and the primary navigation goal. The second navigable area is between the start location and the secondary navigation goal.

Figure 27:
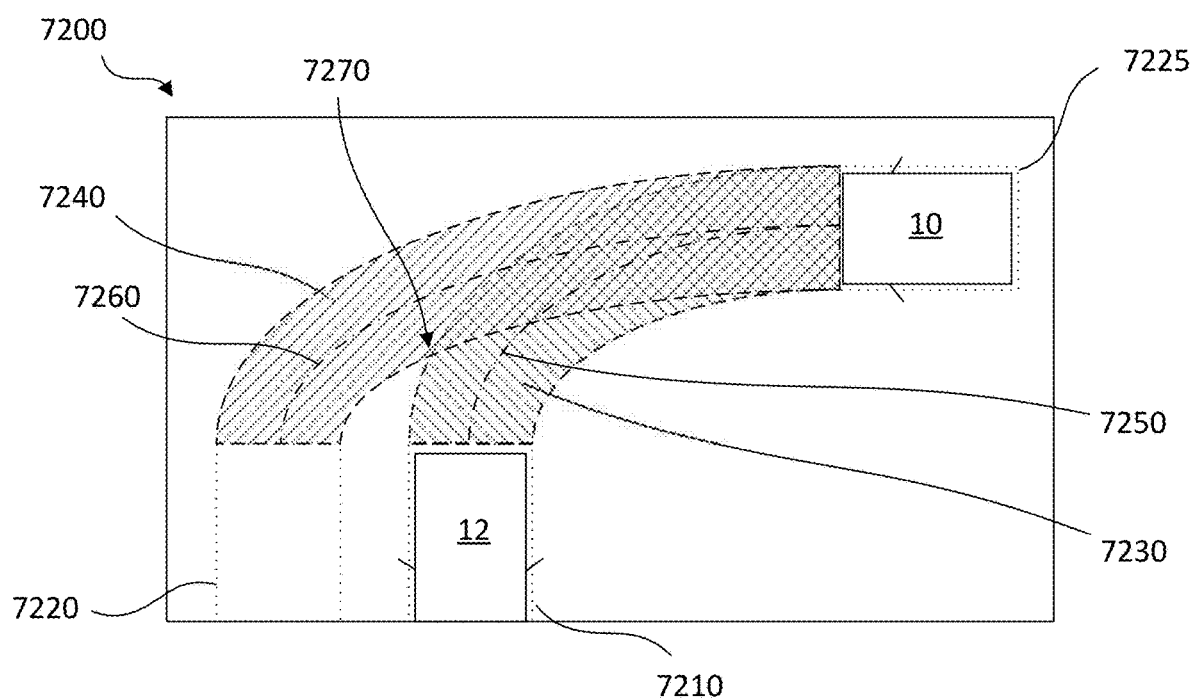

An environment 7200 in which the host vehicle 10 in accordance with an embodiment of the invention can operate is shown schematically in FIG. 27. The environment 7200 shown in FIG. 27 will help to explain at least some of the uses for an embodiment of the invention. As can be seen, the environment 7200 includes a plurality of navigation goals 7210, 7220 in the form of a primary navigation goal 7210 and a secondary navigation goal 7220. The host vehicle 10, receiving a request for autonomous navigation to the primary navigation goal 7210, considers a received availability of the primary navigation goal 7210. A further vehicle 12 is present at the primary navigation goal 7210, making the primary navigation goal 7210 unavailable for the host vehicle 10. Although the host vehicle 10 is shown at a start location 7225, it will be understood that the host vehicle 10 may have started autonomous navigation to the primary navigation goal 7210 prior to receiving the availability signal indicative of the availability of the primary navigation goal 7210. In this example, first navigable area 7230 is an area with lateral extent and is representative of an area of the environment 7200 within which the host vehicle 10 can manoeuvre during autonomous navigation to the primary navigation goal 7210, for example to avoid small obstacles in the navigation path. In other words, the first navigable area can comprise a plurality of possible navigation routes for the host vehicle 10 between the start location 7225 and the primary navigation goal 7210. The first navigable area 7230 also defines a centre line 7250, sometimes referred to as a centre location 7250 representing a centre-line of the first navigable area 7230 in a lateral direction. As will be seen in FIG. 27, second navigable area 7240 is also provided, having a lateral extent and defining a second centre line 7260, sometimes referred to as a second centre location 7250. The second navigable area 7240 can comprise a plurality of possible navigation routes for the host vehicle 10 between the start location 7225 and the secondary navigation goal 7220. In one example, the location of first divergence 7270 referred to previously may be determined as where the first navigable area 7230 first diverges from the second navigable area 7240, for example as the location associated with the first navigable area 7230 where the centre location 7250 of the first navigation area first separates from the second centre location 7260 by more than a predetermined divergence threshold. The predetermined divergence threshold here is the separation between the centre location 7250 and the second centre location 7260. As will be appreciated, when the host vehicle is before the location of first divergence 7270 in the first navigable area 7230, the host vehicle 10 can continue in the same direction and move instead to the second navigable area 7240 for autonomous navigation to the secondary navigation goal 7220 instead of the primary navigation goal 7210. However, when the host vehicle 10 is beyond the location of first divergence 7270, the host vehicle 10 may need to manoeuvre back to the location of first divergence 7270 to move to the second navigable area 7240 for autonomous navigation to the secondary navigation goal 7220 instead of the primary navigation goal 7210.

If there is a navigation obstacle in the first navigable area 7230 before the location of first divergence 7270, the one or more controllers 7110 determine if it is possible to autonomously navigate to the first navigation goal 7210 around the navigation obstacle and remaining within the first navigable area 7230. If the first navigation goal 7210 is unavailable due to the navigation obstacle being such that autonomous navigation around the navigation obstacle is not possible, then it will be understood that autonomous navigation to the second navigation goal 7220 may also be unavailable due to the same navigation obstacle. For the avoidance of doubt, it is noted that the above-described navigation obstacle is not shown in FIG. 27.

Moving back to FIG. 26, the one or more controllers 7110 output the second notification signal in dependence on an impassable location in the first navigable area being prior to the location of first divergence 7270 in a direction of travel of the host vehicle 10 from the start location 7225 to the first navigation goal 7210.

The one or more controllers 7110 determine a third navigable area between a current location of the host vehicle and the secondary navigation goal 7220 via the location of first divergence 7270. The second notification signal is output in dependence on the third navigable area being determined. Therefore, the host vehicle 10 can navigate autonomously to the second navigation goal from anywhere in the first navigable area 7230, even when the host vehicle 10 has already moved past the location of first divergence 7270. Typically, the third navigable area excludes the start location of the host vehicle 10 where the host vehicle 10 has already started moving towards the first navigation goal 7210 in the first navigable area 7230. The third navigable area typically includes areas only part of the first navigable area 7230 and the second navigable area 7240.

The control system 7100 is configured to receive a second request signal. The second request signal is indicative of a request for the host vehicle 10 to navigate autonomously to the secondary navigation goal in the autonomous mode. The one or more controllers 7110, subsequent to receiving the second request signal, typically in dependence on the second request signal being received, output an alternative navigation signal to cause the host vehicle 10 to navigate autonomously to the secondary navigation goal in the autonomous mode. The request indicated by the second request signal is typically from the user. The alternative navigation signal is to cause the host vehicle 10 to navigate autonomously to the secondary navigation goal via the third navigable area.

The one or more controllers 7110, subsequent to receiving the first request signal, typically in dependence on the first request signal being received, output a first navigation signal to cause the host vehicle 10 to navigate autonomously towards the primary navigation goal in the autonomous mode. Where the host vehicle 10 begins moving towards the primary navigation goal, the first notification signal can be output thereafter.

Figure 28:
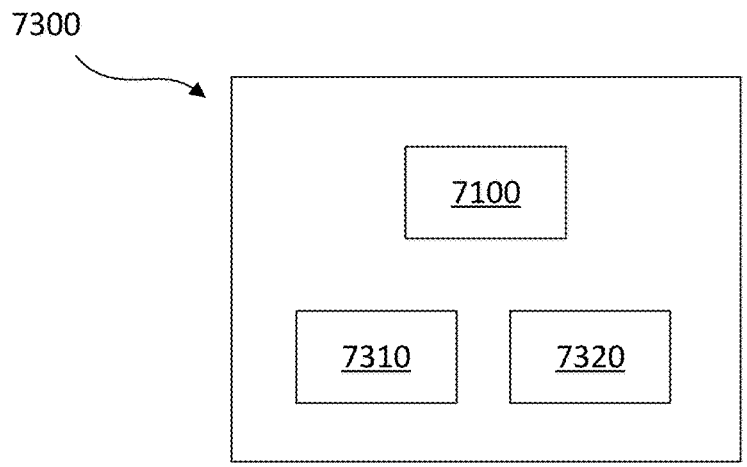

A system 7300 in accordance with an embodiment of the invention is shown in FIG. 28. The system comprises the control system 7100 as described hereinbefore with reference to FIG. 26. The system 7300 comprises notification means 7310 in the form of a notification unit 7310. The notification means 7310 is configured to receive the first notification signal and, in dependence thereon, to output a first user notification that a primary navigation goal is unavailable. The notification means 7310 typically comprises display means 7310 in the form of a display unit 7310, such as an electronic display 7310. Typically, the notification means 7310 is configured to receive the second notification signal and, in dependence thereon, to output a second user notification that autonomous navigation to the secondary navigation goal is available. The system 7300 comprises an input apparatus 7320. The input apparatus 7320 is to receive the request for the host vehicle to navigate autonomously to the primary navigation goal. The input apparatus 7320 is to output the first request signal to the control system 7100 in dependence on receiving the request. The input apparatus 7320 comprises at least one switch 7320, operable by the user to receive the request. The switch is typically in the form of an interactive display unit 7320.

Figure 29:
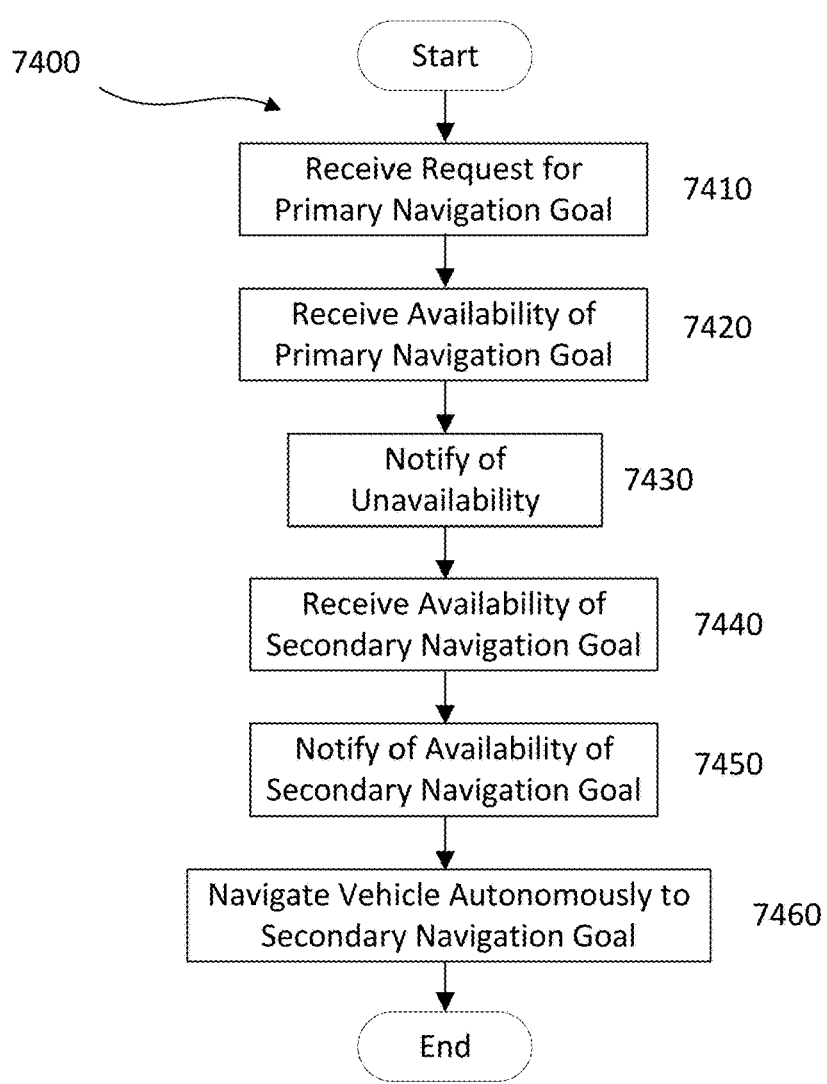

A method 7400 according to an embodiment of the invention is shown in FIG. 29. The method 7400 is a method of controlling the host vehicle 10. In particular, the method 7400 is a method of autonomously navigating the vehicle 10 to a secondary navigation goal in dependence on autonomous navigation to a primary navigation goal being unavailable. The method 7400 may be performed by the control system 7100 and the system 7300 described hereinbefore with reference to FIGS. 26 and 28.

The method 7400 broadly comprises steps of receiving 7410 a request for the vehicle to navigate autonomously to a primary navigation goal in an autonomous mode, receiving 7420 an availability of the primary navigation goal for the vehicle, notifying 7430 a user of the vehicle of an unavailability of the primary navigation goal, receiving 7440 an availability of a secondary navigation goal for the vehicle, notifying 7450 the user of the availability of the secondary navigation goal and, in dependence thereon, autonomously controlling 7460 the vehicle to navigate to the secondary navigation goal in the autonomous mode.

Referring to FIG. 29, the illustrated embodiment of the method 7400 comprises a step of receiving 7410 a request for the vehicle to navigate autonomously to a primary navigation goal in an autonomous mode. The request is typically from a user of the vehicle. The request may be made remotely, for example from a personal electronic device such as a handheld electronic device.

In step 7420, an availability of the primary navigation goal for the vehicle is received. The availability is typically the availability of autonomous navigation of the vehicle to the primary navigation goal. The availability can be that autonomous navigation of the vehicle to the primary navigation goal is unavailable.

In step 7430, a user of the vehicle is notified of the unavailability of the primary navigation goal. The user is typically notified in dependence on the request for autonomous navigation to the primary navigation goal and the availability of the primary navigation goal being received.

In step 7440, an availability of a secondary navigation goal for the vehicle is received. The availability is typically the availability of autonomous navigation of the vehicle to the secondary navigation goal. The availability can be that autonomous navigation of the vehicle to the secondary navigation goal is available. It will be understood that the availability of the secondary navigation goal for the vehicle can be received prior to step 7430, for example at substantially the same time as receiving the availability of the primary navigation goal for the vehicle in step 7420.

In step 7450, the user is notified of the availability of the secondary navigation goal. The user is notified in dependence on the availability of the secondary navigation goal being received. It will be understood that the availability of the secondary navigation goal may be only a preliminary estimate of the availability. For example, the secondary navigation goal may be deemed to be available if the vehicle is not aware of any obstructions or other reasons why the vehicle could not autonomously navigate to the secondary navigation goal, even if such reasons are discovered subsequently, for example during autonomous navigation towards the secondary navigation goal.

In step 7460, the vehicle is autonomously controlled to navigation to the secondary navigation goal instead of the primary navigation goal in the autonomous mode. The vehicle can autonomously navigate to the secondary navigation goal in dependence on receiving a second request from the user to navigate to the secondary navigation goal instead of the primary navigation goal after the user has been notified of the availability of the secondary navigation goal.

As a result of method 7400, the vehicle can autonomously navigate to a secondary navigation goal instead of a primary navigation goal when autonomous navigation to the primary navigation goal is unavailable.

Figure 30:
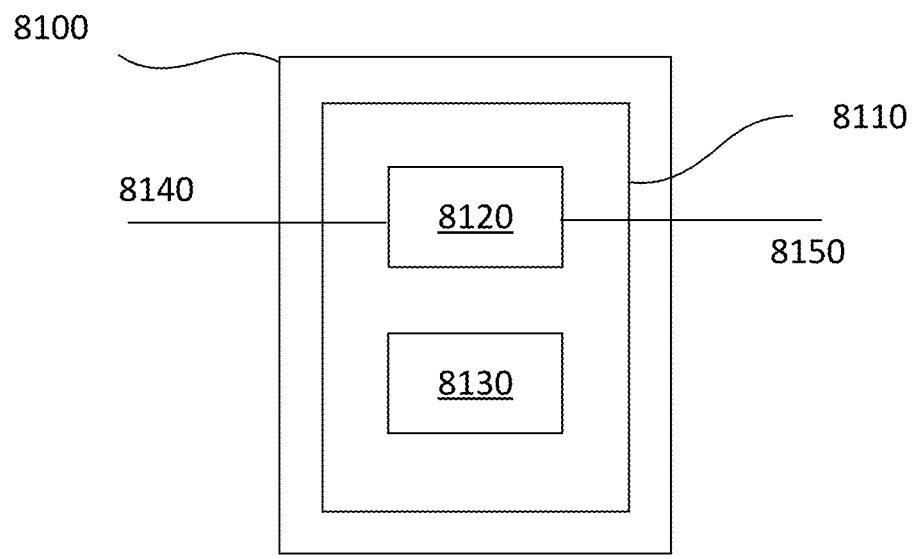

Desired vehicle orientation A control system 8100 or control unit 8100 in accordance with an embodiment of the invention is shown in FIG. 30.

The control system 8100 is for a host vehicle 10 operable in an autonomous mode and a non-autonomous mode. The host vehicle 10 may be substantially as described with reference to FIG. 1 hereinbefore. The control system 8100 comprises one or more controllers 8110. The one or more controllers 8110 include a first controller 8110. The control system 8100 is configured to receive environment data and a goal signal. The environment data is indicative of an environment of the host vehicle. The goal signal is indicative of a navigation goal of the host vehicle. The one or more controllers 8110 identify an availability of subsequent navigation of the host vehicle 10 operating in an autonomous mode, into a desired vehicle orientation at the navigation goal. The availability of subsequent navigation of the host vehicle 10 into the desired vehicle orientation at the navigation goal is typically identified in dependence on the environment data and the goal signal. The one or more controllers 8110 output a navigation signal to cause the host vehicle 10 to navigate autonomously into the desired vehicle orientation at the navigation goal. Therefore, the desired vehicle orientation at the navigation goal can be used where available. The one or more controllers 8110 comprise an electronic processor 8120 having an electrical input 8140 and an electronic memory device 8130 electrically coupled to the electronic processor 8120. The electronic memory device 8130 has instructions stored therein. The electronic processor 8120 is configured to access the memory device 8130 and execute the instructions thereon so as to autonomously navigate the host vehicle into the desired vehicle orientation at the navigation goal. The electrical input 8140 is for receiving the environment data and the goal signal. The electronic processor 8120 includes an electrical output 8150 for outputting the navigation signal. The electrical input 8140 and the electrical output 8150 may be combined such as by being formed by an I/O unit or interface unit. For example, the one or more controllers 8110 may comprise an interface to a network forming a communication bus of the host vehicle. The interface bus may be an Internet Protocol (IP) based communication bus such as Ethernet, although embodiments of the invention are not limited in this respect.

The desired vehicle orientation is typically one of at least two available vehicle orientations at the navigation goal. The goal signal is typically indicative of a plurality of different vehicle orientations at the navigation goal, for example any vehicle orientation at the navigation goal. The control system 8100 receives an orientation signal indicative of the desired vehicle orientation. The one or more controllers 8110 identify the availability of subsequent navigation of the host vehicle into the desired vehicle orientation at the navigation goal in dependence on the environment data, the goal signal and the orientation signal. In this example, the goal signal comprises the orientation signal.

The navigation goal indicated by the goal signal includes a location. The location is associated with the navigation goal, in particular, the location is a destination location of the navigation goal. The navigation goal includes a plurality of possible vehicle orientations at the location of the navigation goal.

The navigation goal is typically a parking goal. In this embodiment, the desired vehicle orientation is a nose out vehicle orientation. In other words, the front of the host vehicle is to be facing out of the parking location, such as a parking space. In this way, the host vehicle can drive forwards to exit the parking location. It will be understood that in other embodiments, the desired vehicle orientation can be different, for example a nose in vehicle orientation. Where the host vehicle is provided in a nose in vehicle orientation at the parking location, this can allow easy access to a storage compartment at a rear of the host vehicle at the paring location.

In some examples, the navigation goal comprises a drop-off location for navigation thereto by the host vehicle in advance of navigation to a final location, such as the parking location, of the navigation goal.

The one or more controllers 8110 output an availability signal. The availability signal is to notify a user of the host vehicle 10 of the availability of subsequent navigation of the host vehicle into the desired vehicle orientation at the navigation goal. Therefore, the user can be informed on the vehicle orientation into which the host vehicle will be autonomously navigated at the navigation goal.

The control system 8100 is configured to receive a location signal. The location signal is indicative of a current location of the host vehicle 10. After receipt of the location signal, the environment data and the goal signal, and typically in dependence on the location signal, the environment data and the goal signal being received, the one or more controllers 8110 determine a proposed navigation path from the current location to the navigation goal. The one or more controllers 8110 output the navigation signal in dependence on a vehicle orientation associated with the proposed navigation path at the navigation goal. In other words, the host vehicle will navigate autonomously to the navigation goal into the desired vehicle orientation if the host vehicle can determine a proposed navigation path for autonomous navigation thereto. The proposed navigation path can be determined prior to any autonomous movement of the host vehicle towards the navigation goal after receipt of the goal signal. In another example, the proposed navigation path can be determined or updated after autonomous movement of the host vehicle towards the navigation goal has begun. The navigation signal is typically indicative of the proposed navigation path. In some examples, the navigation signal may comprise a plurality of navigation waypoints between a current location of the host vehicle and the navigation goal. In some examples, the navigation signal may comprise component instructions for navigation components of the host vehicle to cause the host vehicle to navigate in accordance with the proposed navigation path.

The control system 8100 is configured to receive a request signal. The request signal is indicative of a request for the host vehicle 10 to navigate autonomously to the navigation goal to be positioned in the desired vehicle orientation. The request is typically from the user of the host vehicle. The request typically comprises the desired vehicle orientation amongst a plurality of available vehicle orientations at the navigation goal. The request can be made by the user after notification of the availability of the navigation to the navigation goal. The one or more controllers 8110, after receipt of the request signal and typically in dependence on the request signal being received, output the navigation signal in dependence on the desired vehicle orientation being determined to be available at the navigation goal. In some examples, the host vehicle 10 can navigate autonomously to the navigation goal to be positioned in an orientation other than the desired vehicle orientation if the desired vehicle orientation is determined to be unavailable at the navigation goal.

The environment data is indicative of a navigable area in which the host vehicle can navigate autonomously in the autonomous mode. The environment data is typically indicative of one or more navigation obstacles in the navigable area. Typically, the proposed navigation path is determined in dependence on the one or more navigation obstacles indicated by the environment data.

Figure 31:
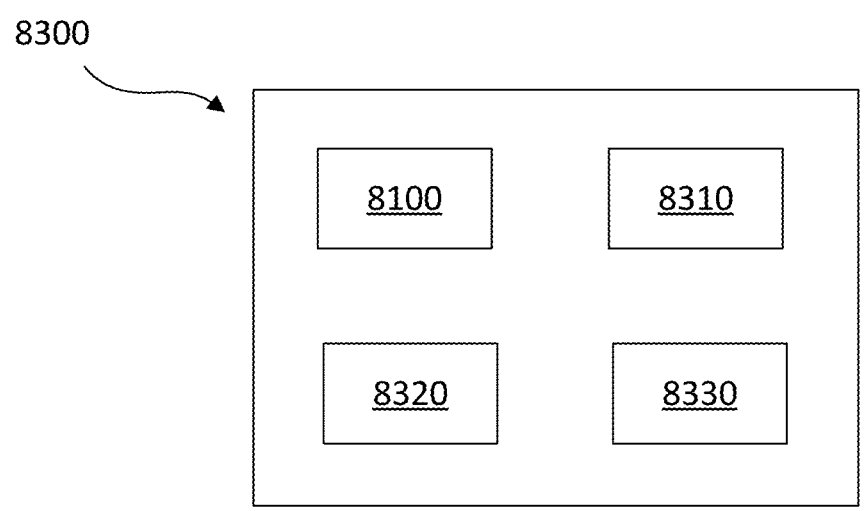

A system 8300 in accordance with an embodiment of the invention is shown in FIG. 31. The system 8300 comprises the control system 8100 as described hereinbefore with reference to FIG. 30. The system 8300 comprises a vehicle controller 8310. The vehicle controller 8310 is configured to receive the navigation signal from the control system 8100. In dependence on the received navigation signal, the vehicle controller 8310 causes the host vehicle 10 to navigate autonomously, in the autonomous mode, to the navigation goal to be positioned in the desired vehicle orientation. The system 8300 comprises sensing means 8320 in the form of one or more sensors 8320. The sensing means 8320 is configured to sense the environment of the host vehicle 10 and to output the environment data to the control system 8100 indicative of the sensed environment. The sensing means 8320 typically comprises a laser sensor, a radar sensor, an optical imaging sensor, an infrared camera and an ultrasound sensor. It will be understood that other combinations of sensors can be used to determine the environment of the host vehicle 10.

The system 8300 comprises notification means 8330 configured to output a user notification that autonomous navigation of the host vehicle, to be positioned in the desired vehicle orientation at the navigation goal is available in dependence on the availability signal. Therefore, the system 8300 can notify the user directly of the availability of the autonomous navigation of the host vehicle to be positioned in the desired vehicle orientation at the navigation goal.

Figure 32:
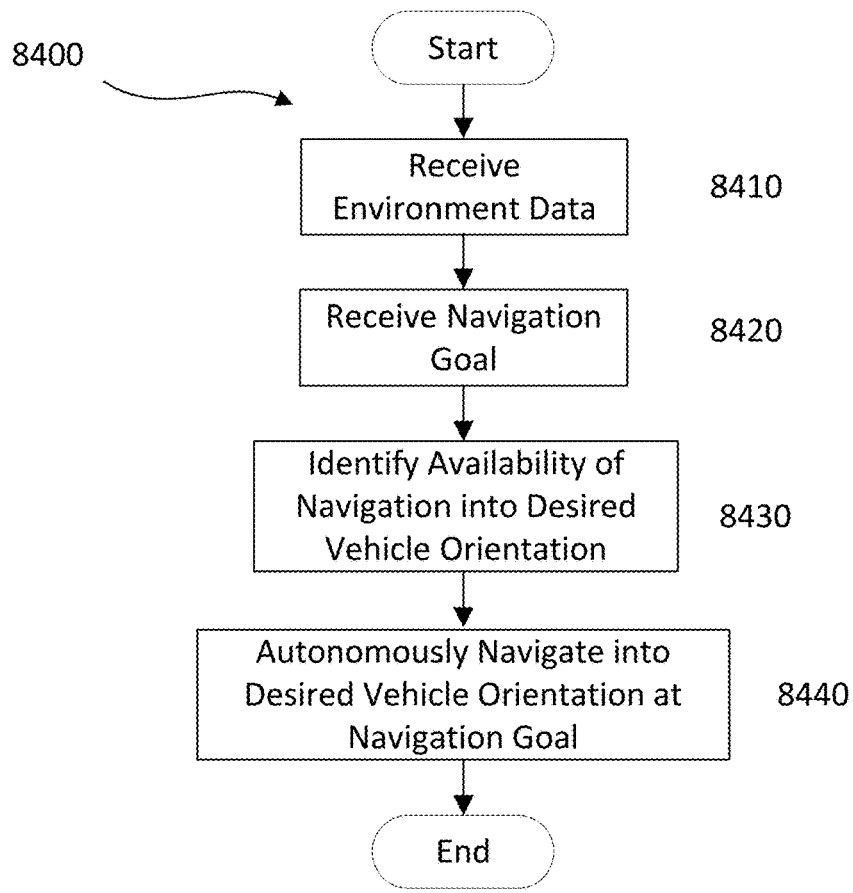

A method 8400 according to an embodiment of the invention is shown in FIG. 32. The method 8400 is a method of controlling the host vehicle 10. In particular, the method 8400 is a method of autonomously navigating the vehicle 10 into a desired vehicle orientation at a navigation goal. The method 8400 may be performed by the control system 8100 and the system 8300 described hereinbefore with reference to FIGS. 30 and 31.

The method 8400 broadly comprises steps of receiving 8410 environment data indicative of an environment of a vehicle, receiving 8420 a navigation goal of the vehicle including a desired vehicle orientation at the navigation goal, and in dependence thereon, identifying 8430 an availability of subsequent navigation of the vehicle into the desired vehicle orientation at the navigation goal and autonomously navigating 8440 the vehicle into the desired vehicle orientation at the navigation goal.

Referring to FIG. 32, the illustrated embodiment of the method 8400 comprises a step of receiving 8410 environment data indicative of an environment of a vehicle. The environment data is typically indicative of sufficient details of the environment of the vehicle to determine an availability of autonomous navigation of the vehicle to the navigation goal.

In step 8420, a navigation goal of the vehicle is received. The navigation goal includes a desired vehicle orientation at the navigation goal. The navigation goal is typically received when the vehicle is operating in a non-autonomous mode. The navigation goal typically includes a plurality of possible vehicle orientations at the navigation goal. The method 8400 can comprise determination of the desired vehicle orientation in dependence on the navigation goal.

In step 8430, an availability of subsequent autonomous navigation of the vehicle into the desired vehicle orientation at the navigation goal is identified. The availability is typically identified in dependence on the environment data and the navigation goal.

In step 8440, the vehicle is autonomously navigated into the desired vehicle orientation at the navigation goal. The vehicle can autonomously navigate in the autonomous mode.

As a result of method 8400, the vehicle can navigate autonomously into a desired vehicle orientation at a navigation goal.

Figure 33:
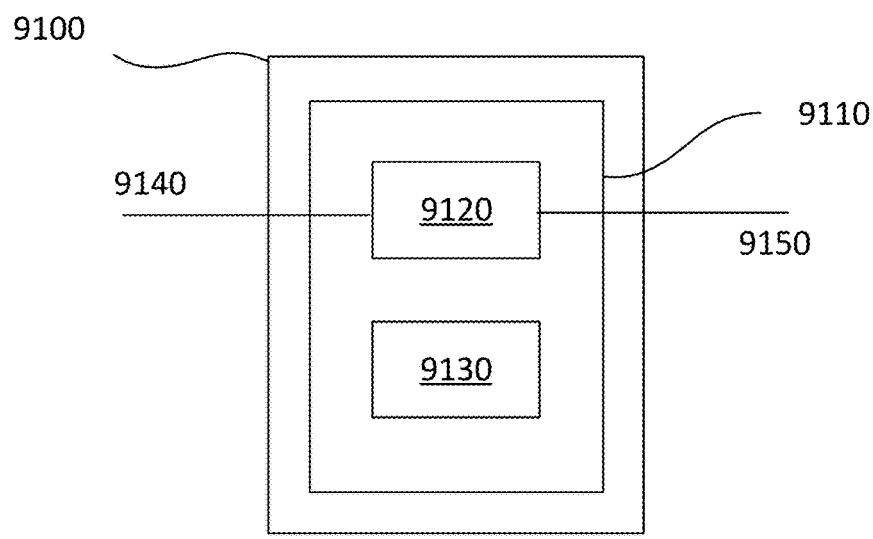

Rearward travel avoidance A control system 9100 or control unit 9100 in accordance with an embodiment of the invention is shown in FIG. 33.

The control system 9100 is for a host vehicle 10 operable in an autonomous mode and a non-autonomous mode. The host vehicle 10 may be substantially as described with reference to FIG. 1 hereinbefore. The control system 9100 comprises one or more controllers 9110. The one or more controllers 9110 include a first controller 9110. The control system 9100 is configured to receive a goal signal and environment data. The goal signal is indicative of a navigation goal of a host vehicle 10. The host vehicle 10 has a front and a rear. The navigation goal defines a target location for the host vehicle and a target orientation of the host vehicle 10 at the target location. The target location is sometimes referred to as a destination location. The navigation goal is for autonomous navigation thereto into the target orientation in the autonomous mode of the host vehicle 10. The environment data is indicative of an environment of the host vehicle 10. The one or more controllers 9110, subsequent to receipt of the goal signal and the environment data, for example in dependence on the goal signal and the environment data, determine path data indicative of a determined navigation path for the host vehicle 10, operating in an autonomous mode, to autonomously navigate, to the navigation goal in dependence on a direction parameter. The direction parameter is determined in dependence on a first amount of frontward travel of the host vehicle 10 along the determined navigation path, such that a first navigation path having a lesser amount of rearward travel of the host vehicle 10 is chosen as the predetermined navigation path in preference to a second navigation path having a greater amount of rearward travel. In other words, the host vehicle 10 can determine a navigation path with little travel in the rearward direction of the host vehicle. Therefore, the host vehicle 10 can provide an autonomous navigation function which avoids navigation paths having a larger amount of rearward travel. It will be understood that several functions of the host vehicle 10 may be optimised for forward travel of the host vehicle 10. The one or more controllers 9110 comprise an electronic processor 9120 having an electrical input 9140 and an electronic memory device 9130 electrically coupled to the electronic processor 9120. The electronic memory device 9130 has instructions stored therein. The electronic processor 9120 is configured to access the memory device 9130 and execute the instructions thereon so as to determine the path data indicative of the determined navigation path for the host vehicle 10. The electrical input 9140 is for receiving the goal signal and the environment data. The electronic processor 9120 includes an electrical output 9150 for outputting the path data. The electrical input 9140 and the electrical output 9150 may be combined such as by being formed by an I/O unit or interface unit. For example, the one or more controllers 9110 may comprise an interface to a network forming a communication bus of the host vehicle. The interface bus may be an Internet Protocol (IP) based communication bus such as Ethernet, although embodiments of the invention are not limited in this respect.

The one or more controllers 9110 control the host vehicle 10 to autonomously navigate to the target location of the navigation goal into the target orientation utilising the path data.

The control system 9100 is configured to receive a request signal. The request signal is indicative of a request for the host vehicle 10 to navigate autonomously to the navigation goal. The one or more controllers 9110, subsequent to receiving the request signal and to the determination of the path data, for example in dependence on the request signal and the determination of the path data, output a navigation signal. The navigation signal is to cause the host vehicle 10 to navigate autonomously to the target location in accordance with the determined navigation path.

The direction parameter is determined in dependence on a total path length of the determined navigation path. In this way, a shorter path can be chosen as the determined navigation path even if a potentially longer path includes a lesser amount of rearward travel, providing there exists another potential path including a greater amount of rearward travel than the shorter path.

It will be understood that the determined navigation path can include a turn manoeuvre. In this case, the me or more controllers 9110 determine the navigation path to be such that the turn manoeuvre is at a point along the navigation path so as to substantially reduce an amount of rearward travel compared to a navigation path having the turn manoeuvre at a different point along the navigation path. In particular, where the host vehicle 10 starts movement along the navigation path by moving rearwardly along the navigation path, any required turn manoeuvre can be performed as soon as possible along the navigation path. Similarly, where the host vehicle 10 starts moving along the navigation path by moving forwardly along the navigation path, any required turn manoeuvre can be performed as far as possible along the navigation path. It will be understood that in some situations where the vehicle starts moving rearwardly along the navigation path, it may not be possible to perform a turn manoeuvre, for example due to a lack of space in the environment. Therefore, in said situations, the navigation path will include exclusively rearward travel of the host vehicle 10.

Typically, the one or more controllers 9110 determine the navigation path to substantially minimise the amount of rearward travel of the host vehicle compared to other possible navigation paths.

In embodiments, the first amount and the second amount are proportional amounts relative to the total path length of the determined navigation path. In other words, the first amount and the second amount need not be absolute distances or travel times.

The environment data is indicative of a current location of the host vehicle 10. The current location is the location substantially at the time when the environment data is received by the control system 9100.

The one or more controllers 9110 determine the determined navigation path in dependence on the current location of the host vehicle 10. In his way, the determined navigation path starts at the current location of the host vehicle 10.

The environment data is indicative of one or more navigation obstacles to the host vehicle 10 between a current location of the host vehicle and the target location for the host vehicle 10. In his way, the navigation path can be determined to avoid the one or more navigation obstacles in the environment.

The navigation goal in some examples is a parking goal. In other examples, the navigation goal is a drop-off goal. The target orientation of the host vehicle can be different to a preliminary orientation of the host vehicle 10 prior to navigation along the determined navigation path in the autonomous mode. Where the target orientation of the host vehicle 10 is different to the preliminary orientation of the host vehicle 10, the determined navigation path comprises a change of direction manoeuvre, for example a turn manoeuvre such as a three-point turn, in which a direction of travel of the host vehicle 10 changes between a forward direction and a rearward direction. It will be understood that other turn manoeuvres are possible.

Figure 34:
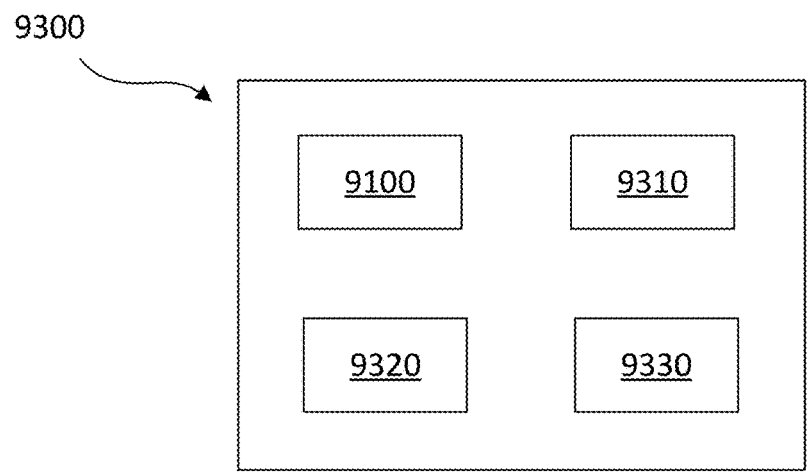

A system 9300 in accordance with an embodiment of the invention is shown in FIG. 34. The system comprises a control system 9100 as described hereinbefore with reference to FIG. 34. The system 9300 comprises a vehicle controller 9310. The vehicle controller 9310 is configured to cause the host vehicle 10 to navigate autonomously in accordance with, for example along, the determined navigation path to the navigation goal. The system 9300 comprises sensing means 9320 in the form of one or more sensors 9320. The sensing means 9320 is configured to sense the environment of the host vehicle 10 and to output the environment data to the control system 9100 in dependence thereon. The sensing means 9320 typically comprises a radar sensor, an ultrasound sensor, an optical camera, an infrared camera, a LIDAR sensor and a stereoscopic sensor. It will be understood that different combinations of sensors may be provided to sense the environment of the host vehicle 10. The one or more sensors 9320 typically comprise a directional sensor. The system 9300 comprises an input apparatus 9330. The input apparatus 9330 is operable by a user of the host vehicle 10 to receive a navigation goal of the host vehicle 10. The input apparatus 9330 is configured to output the goal signal to the control system 9100 in dependent on the navigation goal being received from the user.

Figure 35:
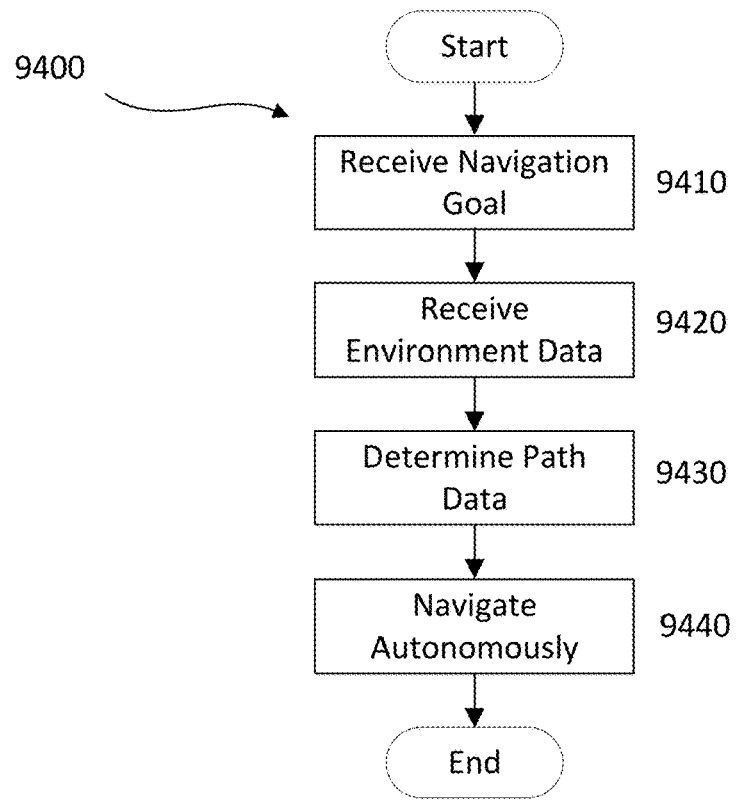

A method 9400 according to an embodiment of the invention is shown in FIG. 35. The method 9400 is a method of controlling the host vehicle 10. In particular, the method 9400 is a method of autonomously navigating the vehicle 10 to a navigation goal in accordance with a determined navigation path, having a lesser amount of rearward travel than at least one other navigation path to the navigation goal. The method 9400 may be performed by the control system 9100 and the system 9300 described hereinbefore with reference to FIGS. 33 and 34.

The method 9400 broadly comprises steps of receiving 9410 a navigation goal of a vehicle, receiving 9420 environment data indicative of an environment of the vehicle 10, and in dependence thereon, determining 9430 path data indicative of a navigation path for autonomous navigation in accordance therewith to the navigation goal, the navigation path having a lesser amount of rearward travel than a further navigation path for the vehicle to the navigation goal and autonomously navigate 9440 the vehicle to the navigation goal utilising the path data.

Referring to FIG. 35, the illustrated embodiment of the method 9400 comprises a step of receiving 9410 a navigation goal of a vehicle. The vehicle has a front and a rear. The navigation goal defines a target location for the vehicle and a target orientation of the vehicle al the target location.

In step 9420, environment data indicative of an environment of the vehicle is received. The environment data is typically indicative of one or more navigation obstacles in the vicinity of the vehicle. The environment data is typically indicative of a current location of the vehicle.

In step 9430, path data indicative of a determined navigation path for the vehicle to autonomously navigate in accordance therewith, for example along, to the navigation goal is determined in dependence on a direction parameter. The direction parameter is determined in dependence on a first amount of frontward travel of the vehicle in accordance with, for example along, the determined navigation path and a second amount of rearward travel of the vehicle in accordance with, for example along, the determined navigation path, such that a first navigation path having a lesser amount of rearward travel of the vehicle is chosen as the determined navigation path in preference to a second navigation path having a greater amount of rearward travel.

In step 9440, the vehicle is autonomously navigated to the navigation path utilising the path data, for example in accordance with, for example along, the determined navigation path indicated by the path data.

As a result of method 9400, the vehicle can autonomously navigate to a navigation goal along a navigation path having a lesser amount of rearward travel compared to at least one other possible navigation path. Typically, the vehicle can autonomously navigate mostly forward to the navigation goal.

Figure 36:
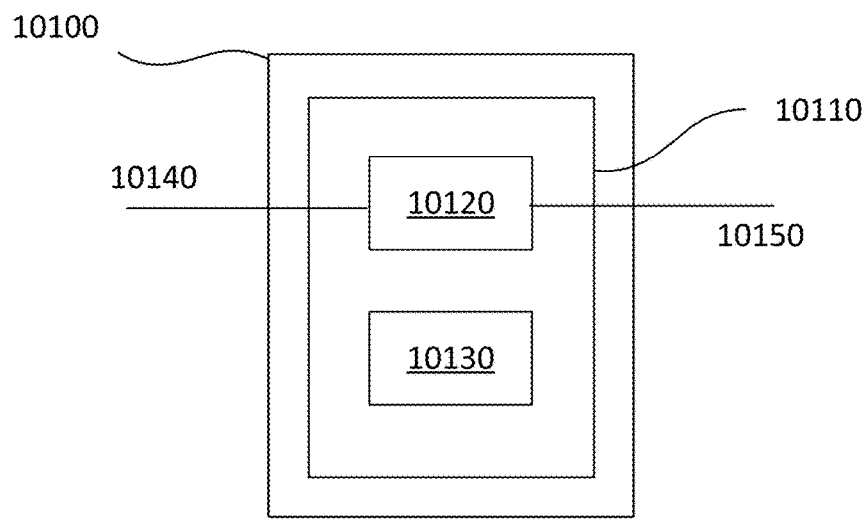

Speed dependent on proximity to navigation obstacles A control system 10100 or control unit 10100 in accordance with an embodiment of the invention is shown in FIG. 36.

The control system 10100 is for a host vehicle 10 operable in an autonomous mode and a non-autonomous mode. The host vehicle 10 may be substantially as described with reference to FIG. 1 hereinbefore. The control system 10100 comprises one or more controllers 10110. The one or more controllers 10110 include a first controller 10110. The control system 10100 is configured to receive map data, environment data and a goal signal. The goal signal is indicative of a navigation goal of the host vehicle 10. The map data is indicative of a navigable area in which the host vehicle 10 is permitted to operate in an autonomous mode to navigate autonomously to the navigation goal. The environment data is indicative of a location of one or more navigation obstacles in an environment associated with the navigable area of the host vehicle. At least one of the one or more navigation obstacles is not indicated in the map data. The one or more controllers 10110, subsequent to receiving the goal signal, the map data and the environment data, for example in dependence on the goal signal, the map data and the environment data being received, determine a navigation trajectory. The navigation trajectory includes a plurality of navigation waypoints. Each navigation waypoint has associated therewith a navigation speed. Each navigation speed is determined in dependence on a proximity of the navigation trajectory to the location of the one or more navigation obstacles indicated by the environment data. The one or more controllers 10110 output a navigation signal. The navigation signal is to cause the host vehicle 10 to navigate autonomously to the navigation goal in accordance with the navigation trajectory, for example in accordance with the navigation speeds associated with the plurality of navigation waypoints of the navigation trajectory. The navigation signal can cause the host vehicle 10 to navigate autonomously to the navigation goal along the navigation trajectory, passing through the navigation waypoints at the respective navigation speed Therefore, the navigation speeds associated with the navigation trajectory can be set depending on a proximity of the navigation obstacle(s) indicated in the environment data, even where at least one of the navigation obstacle(s) is not present in the map data. The map data can be indicative of at least one of a plurality of navigation obstacles in the environment. The one or more controllers 10110 comprise an electronic processor 10120 having an electrical input 10140 and an electronic memory device 10130 electrically coupled to the electronic processor 10120. The electronic memory device 10130 has instructions stored therein. The electronic processor 10120 is configured to access the memory device 10130 and execute the instructions thereon so as to autonomously navigate the host vehicle to the navigation goal in accordance with the navigation trajectory. The electrical input 10140 is for receiving the map data, the environment data and the goal signal. The electronic processor 10120 includes an electrical output 10150 for outputting the navigation signal. The electrical input 10140 and the electrical output 10150 may be combined such as by being formed by an I/O unit or interface unit. For example, the one or more controllers 10110 may comprise an interface to a network forming a communication bus of the host vehicle. The interface bus may be an Internet Protocol (IP) based communication bus such as Ethernet, although embodiments of the invention are not limited in this respect.

The environment data is typically indicative of a current location of the host vehicle 10.

The map data is indicative of a location of one or more previously identified navigation obstacles. The one or more navigation obstacles indicated by the environment data typically includes at least one navigation obstacle different to the one or more previously identified navigation obstacles indicated by the map data. The map data comprises previous environment data. The previous environment data is indicative of a location of one or more navigation obstacles in the environment during a previous manoeuvre of the host vehicle 10 in the environment. Typically, the previous environment data is indicative of a location of, of the one or more navigation obstacles in the environment during the previous manoeuvre of the host vehicle 10 in the environment, only static navigation obstacles. The previous manoeuvre of the host vehicle 10 in the environment is typically at least 6 hours, for example approximately 24 hours prior to a current manoeuvre of the host vehicle 10 in the environment associated with which the environment data is to be sensed. Typically, there is at least one shutdown event of the control system 10100 between the current manoeuvre of the host vehicle 10 and the previous manoeuvre of the host vehicle 10.

Figure 37:
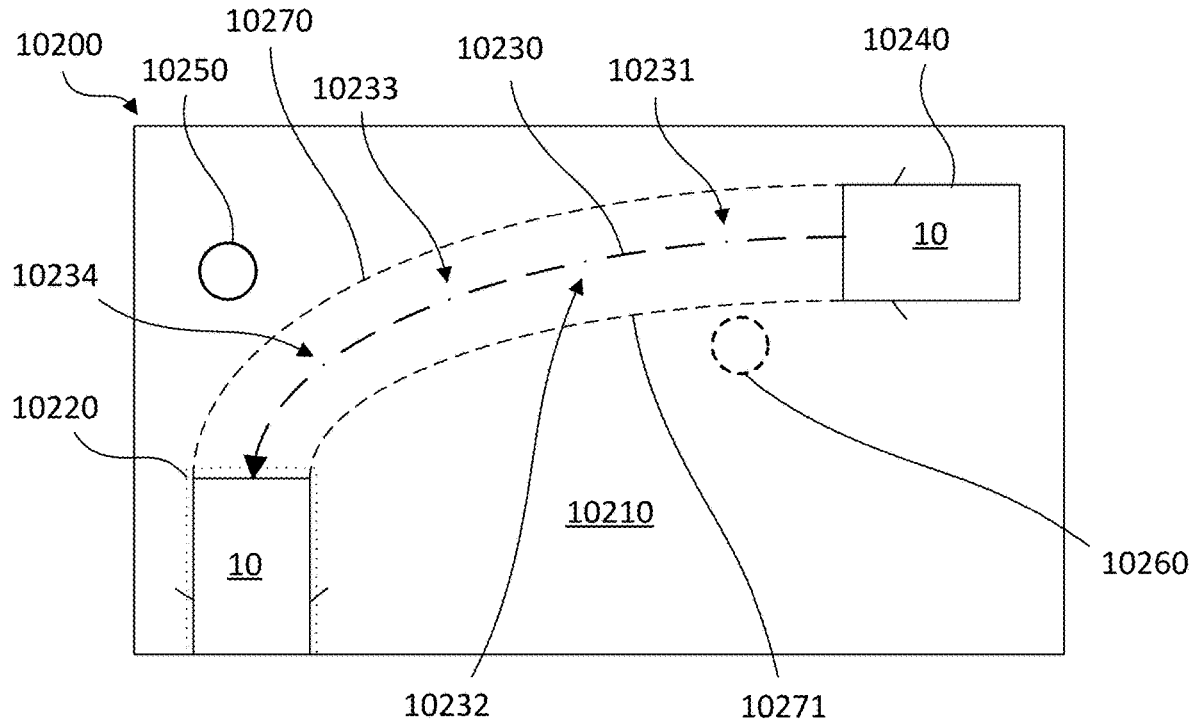

An environment 10200 in which the host vehicle 10 in accordance with an embodiment of the invention can operate is shown schematically in FIG. 37. The environment 10200 shown in FIG. 37 will help explain at least some of the uses for an embodiment of the invention. As can be seen, the environment 10200 provides a navigable area 10210 in which the host vehicle 10 can operate. The environment 10200 includes a navigation goal 10220 for navigation thereto by the host vehicle 10. As explained with reference to FIG. 36 hereinbefore, the one or more controllers 10110 determine the navigation trajectory 10230 for autonomous navigation of the host vehicle 10 from a current location 10240 of the host vehicle 10 to the navigation goal 10220. The environment 10200 has associated therewith a plurality of navigation obstacles 10250, 10260. A previously identified navigation obstacle 10250 is indicated by the map data, and was previously detected during a previous manoeuvre of the host vehicle 10 in the navigable area 10210 associated with the environment 10200. The previously identified navigation obstacle 10250 is still detected during at a time of a current manoeuvre of the host vehicle 10 in the navigable area and indicated in the environment data. The environment data is indicative of a further navigation obstacle 10260, for example indicative of a location of the further navigation obstacle 10260. As described hereinbefore, the navigation trajectory 10230 includes a plurality of navigation waypoints 10231, 10232, 10233, 10234, each having associated therewith a navigation speed. The navigation speeds can be different at each navigation waypoint 10231, 10232, 10233, 10234. Therefore, the host vehicle 10 will autonomously navigate to the navigation goal 10220 in accordance with the navigation trajectory 10230, at a navigation speed in dependence on the plurality of navigation speeds associated with the navigation waypoints 10231, 10232, 10233, 10234. A first navigation speed associated with a first navigation waypoint 10231 of the navigation trajectory 10230 is less than a second navigation speed associated with a second navigation waypoint 10232 of the navigation trajectory 10230. A distance between the first navigation waypoint 10231 and the further navigation obstacle 10260 is greater than a distance between the second navigation waypoint 10232 and the further navigation obstacle 10260. In this way, the host vehicle 10 can be slowed down as it passes near to the further navigation obstacle 10260. It will be understood that the navigation trajectory 10230 has been determined to avoid the previously identified navigation obstacle 10250, such that no speed reduction for the host vehicle 10 is necessary due to the presence of the previously identified obstacle 10250. Typically, the distance between the second navigation waypoint 10232 and the further navigation obstacle 10260 is less than a first predetermined threshold distance, for example less than five metres. Further, typically the distance between the first navigation waypoint 10231 and the further navigation obstacle 10260 is greater than a second predetermined threshold distance, for example greater than one metre. It will be understood that the distance navigation waypoint can be an extent of the host vehicle 10. For example, where the distance between the navigation waypoint and the navigation obstacle is two metres, his is representative of a spacing between the host vehicle and the navigation obstacle al the navigation waypoint on the navigation trajectory being Iwo metres. The extent of the host vehicle 10 during manoeuvre in accordance with the navigation trajectory 10230 is shown schematically by the dotted lines 10270, 10271.

The navigation obstacles 10250, 10260 can be any object, including physical objects in the environment 10200 having associated therewith the navigable area 10210. Previously identified navigation obstacle 10250 is, in this example, representative of a flower bed 10250. Therefore, whilst the host vehicle 10 is capable of autonomously navigating over the flower bed 10250, this is not permitted, and so the navigation trajectory 10230 is determined to avoid autonomous navigation of the host vehicle 10 over the flower bed 10250. Further navigation obstacle 10260 is, in this example, representative schematically of a parked further vehicle 10260. The host vehicle 10 is substantially unable to traverse the location of the further vehicle 10260. Although both of the navigation obstacles 10260 described hereinbefore can be described as static obstacles in that they are not expected to move during the manoeuvre by the host vehicle 10 through the navigable area 10210, it will be understood that one or the navigation obstacles 10250, 10260 may instead be a dynamic navigation obstacle, that is a navigation obstacle capable of movement or expected to move during navigation of the host vehicle 10 through the navigable area 10210. Examples of dynamic navigation obstacles include people, animals, further vehicles which are moving, or other objects set in motion by people, such as frisbees or balls. In particular, even if the navigation trajectory of the host vehicle 10 is not in the vicinity of a current position of the dynamic navigation obstacle, the dynamic navigation obstacle may move to a further position during a movement of the host vehicle, such that the host vehicle is in the vicinity of the dynamic navigation obstacle at the further position. Therefore, the navigation trajectory 10230 including the navigation waypoints 10231, 10232, 10233, 10234 and associated navigation speeds can be modified during the autonomous navigation of the host vehicle 10 to the navigation goal 10220 in response to movement of any dynamic obstacles in the environment 10200. Although in the present example, the navigation goal 10220 is a parking goal 10220, it will be understood that the navigation goal 10220 may instead be a drop-off goal or a pick-up goal.

Moving back to FIG. 36, the environment data is typically indicative of an obstacle type of at least one of the one or more navigation obstacles. The obstacle type can be a dynamic obstacle capable of moving along at obstacle path between a first location and a second location and/or a static obstacle. The one or more controllers 10110 determine the navigation trajectory including each of the navigation speeds in dependence on the obstacle type of the at least one of the navigation obstacles being a dynamic obstacle. In this way, the speed of the host vehicle 10 can be reduced when a dynamic obstacle is in a vicinity of the host vehicle 10. The one or more controllers 10110 determine the navigation speed associated with at least one navigation waypoint of the navigation trajectory in dependence on the obstacle path of the dynamic obstacle. The navigation speed associated with the at least one navigation waypoint is determined such that the host vehicle 10 remains at least a first predetermined distance, for example at least one metre, from the dynamic obstacle during autonomous navigation to the navigation goal.

The one or more controllers 10110, during operation of the host vehicle in the autonomous mode, can output a pause signal. The pause signal cause the host vehicle to stop. The one or more controllers 10110 can output the pause signal in dependence on a distance to a first navigation obstacle, having an obstacle type of the dynamic obstacle, being less than a predetermined minimum distance, for example less than one metre. The one or more controllers 10110, during operation of the host vehicle 10 in the autonomous mode, output a resume signal after the pause signal. The resume signal is to cause the host vehicle 10 to resume movement along the navigation trajectory in dependence on the distance to the first navigation obstacle increasing beyond a predetermined second threshold, for example increasing beyond 1.5 metres. Therefore, the host vehicle 10 can move away again once the dynamic obstacle moves an acceptable distance away from the host vehicle 10 and away from the navigation trajectory of the host vehicle 10.

The one or more controllers 10110 determine the navigation trajectory in dependence on the map data. Typically, the one or more controllers 10110, subsequent to receipt of the environment data, determines further area data in dependence on the environment data. The further area data is indicative of a further navigable area. The further navigable area does not include at least one of the one or more navigation obstacles. The one or more controllers 10110 determine the navigation trajectory in dependence on the further navigable area. Therefore, the host vehicle 10 can navigate around the navigation obstacles by determining a new navigable area for the host vehicle 10, in which the host vehicle 10 can operate, which excludes the navigation obstacles. In this way, determination of the navigation trajectory can utilise the further navigable area, and need not directly utilise a location of the navigation obstacles.

Figure 38:
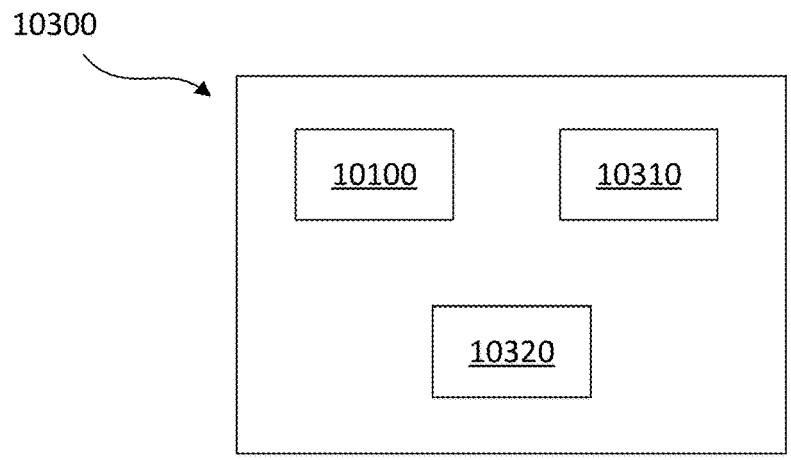

A system 10300 in accordance with an embodiment of the invention is shown in FIG. 38. The system comprises the control system 10100 as described hereinbefore with reference to FIG. 36. The system 10300 comprises a vehicle controller 10310. The vehicle controller 10310 is configured to receive the navigation signal. The vehicle controller 10310, in dependence on receiving the navigation signal, is to cause the host vehicle 10 to autonomously navigate to the navigation goal in accordance with the navigation trajectory. The system 10300 comprises sensing means 10320, in the form of one or more sensors 10320, to sense the location of the one or more navigation obstacles in the environment of the host vehicle. The sensing means 10320 is to output the environment data to the control system 10100 in dependence on the sensed location of the one or more navigation obstacles. The host vehicle 10 typically comprises the sensing means 10320, as in other examples. In this example, the sensing means 10320 comprises a radar sensor, an ultrasound sensor, an optical camera, an infrared camera, a LIDAR sensor and a stereoscopic sensor. It will be understood that different sensors and different combinations of sensors can be used to sense the environment of the host vehicle 10.

Figure 39:
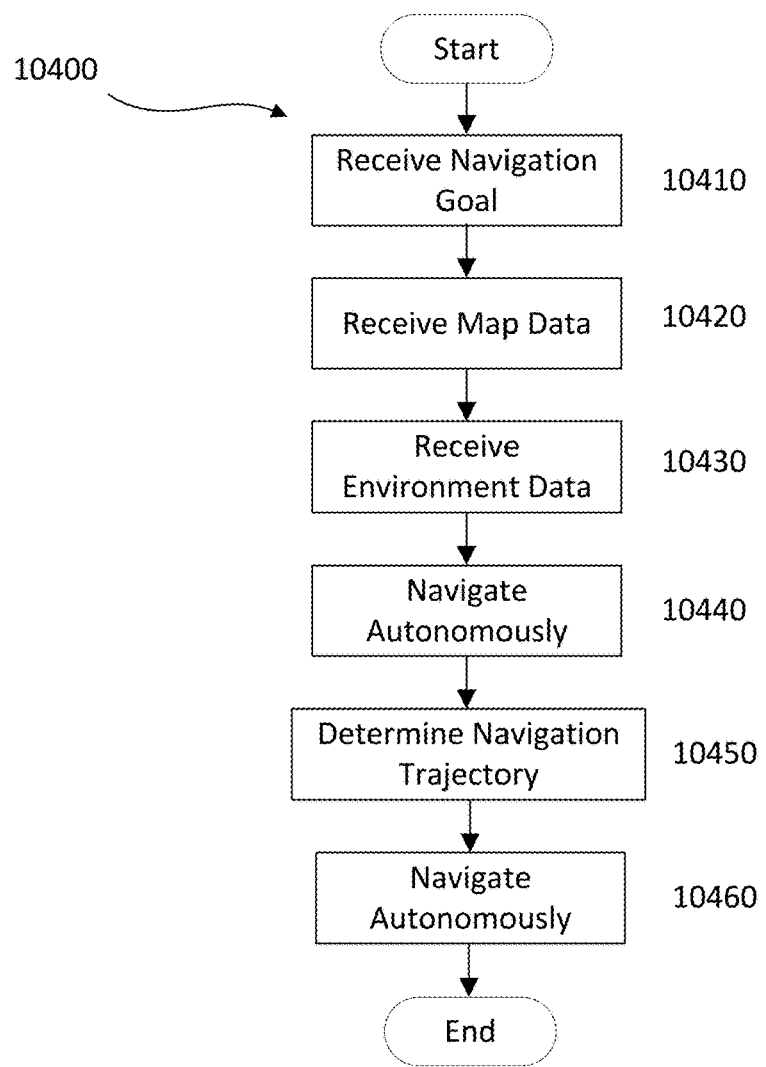

A method 10400 according to an embodiment of the invention is shown in FIG. 39. The method 10400 is a method of controlling the host vehicle 10. In particular, the method 10400 is a method of autonomously navigating the vehicle 10 to a navigation goal in an environment utilising a determined navigation trajectory to navigate the vehicle 10 past navigation obstacles in the environment. The method 10400 may be performed by the control system 10100 and the system 10300 described hereinbefore with reference to FIGS. 36 and 38.

The method 10400 broadly comprises steps of receiving 10410 a navigation goal of a vehicle, receiving 10420 map data indicative of a navigable area of the vehicle, receiving 10430 environment data indicative of a location of one or more navigation obstacles and, in dependence thereon, determining 10440 a navigation trajectory through the navigable area for autonomous navigation of the vehicle to the navigation goal in accordance with the navigation trajectory and, when operating 10450 the vehicle in an autonomous mode, autonomously controlling 10460 the vehicle to navigate to the navigation goal utilising the navigation trajectory.

Referring to FIG. 39, the illustrated embodiment of the method 10400 comprises a step of receiving 10410 a navigation goal of a vehicle. The navigation goal can be a parking goal, a pick-up goal or a drop-off goal.

In step 10420, map data indicative of a navigable area in which the vehicle is permitted to operate in an autonomous mode to navigate autonomously to the navigation goal is received. The map data can be indicative of one or more previously identified navigation obstacles, for example indicative of the location of the one or more previously identified navigation obstacles.

In step 10430, environment data indicative of a location of one or more navigation obstacles in an environment associated with the navigable area of the vehicle is received. At least one of the one or more navigation obstacles are not indicated in the map data.

In step 10440, a navigation trajectory is determined. The navigation trajectory includes a plurality of navigation waypoints, each having associated therewith a navigation speed. The navigation speeds are determined in dependence on a proximity of the navigation trajectory to the one or more navigation obstacles indicated by the environment data.

In step 10450, the vehicle is operated in an autonomous mode.

In step 10460, when operating in the autonomous mode, the vehicle 10 is autonomously controlled to navigate the environment to the navigation goal utilising the navigation trajectory.

As a result of method 10400, the vehicle can autonomously navigate to a navigation goal even when there are one or more navigation obstacles in the environment which have not been previously part of map data of the environment.

Figure 40:
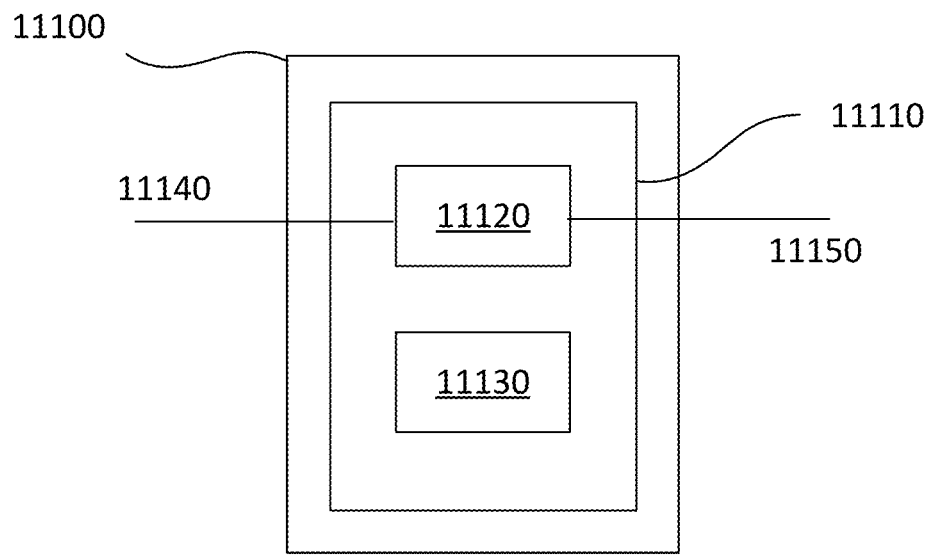

Control of Access Control Apparatus A control system 11100 or control unit 11100 in accordance with an embodiment of the invention is shown in FIG. 40.

The control system 11100 is for a host vehicle 10 operable in an autonomous mode and a non-autonomous mode. The host vehicle 10 may be substantially as described with reference to FIG. 1 hereinbefore. The control system 11100 comprises one or more controllers 11110. The one or more controllers 11110 include a first controller 11110. The control system 11100 is configured to receive a goal signal. The goal signal is indicative of a navigation goal for autonomous navigation thereto by the host vehicle 10 operating in the autonomous mode. The navigation goal is associated with a traverse past an access control apparatus when the host vehicle 10 is operating in the autonomous mode. In other words, access beyond the access control apparatus is required for the host vehicle 10 to navigate to the navigation goal, for example where the navigation goal is a parking location in a garage, and where the access control apparatus is a garage door which must be open to permit access for the vehicle into the garage. The access control apparatus is operable on receipt of an access request to change from a first state to a second state. In the first state access for the host vehicle 10 past the access control apparatus is prohibited. In the second state access for the host vehicle 10 past the access control apparatus is permitted. The one or more controllers 11110 output a first request signal. The first request signal is indicative of the access request to cause the access control apparatus to change from the first state to the second state. When autonomously navigating to the navigation goal in the autonomous mode, the control system 11100 autonomously controls the host vehicle 10 to traverse past the access control apparatus when the access control apparatus is in the second state. Therefore, the access control apparatus can be autonomously controlled as part of autonomous navigation of the host vehicle 10 and a user of the host vehicle 10 need not separately activate the access control apparatus. The one or more controllers 11110 comprise an electronic processor 11120 having an electrical input 11140 and an electronic memory device 11130 electrically coupled to the electronic processor 11120. The electronic memory device 11130 has instructions stored herein. The electronic processor 11120 is configured to access the memory device 11130 and execute the instructions thereon so as to control the access control apparatus as part of the autonomous navigation of the host vehicle 10 to the navigation goal. The electrical input 11140 is for receiving the goal signal. The electronic processor 11120 includes an electrical output 11150 for outputting the first request signal. The electrical input 11140 and the electrical output 11150 may be combined such as by being formed by an I/O unit or interface unit. For example, the one or more controllers 11110 may comprise an interface to a network forming a communication bus of the host vehicle 10. The interface bus may be an Internet Protocol (IP) based communication bus such as Ethernet, although embodiments of the invention are not limited in his respect.

The one or more controllers 11110 output a navigation signal. The navigation signal is output subsequent to output of the first request signal, in other words, after the access control apparatus has been changed from the first state to the second state. The navigation signal causes the host vehicle 10 to autonomously navigate to the navigation goal past the access control apparatus.

The control system 11100 is configured to receive a state signal. The state signal is indicative of the access control apparatus being in the second state. The one or more controllers 11110 output the navigation signal in dependence on the state signal. Therefore, the host vehicle 10 waits for confirmation that the host vehicle 10 can travers past the access control apparatus before the host vehicle 10 is autonomously navigated past the access control apparatus.

In one example, the one or more controllers 11110 output the first request signal for receipt by a smart home hub connected to the access control apparatus. It will be understood that a typical smart home hub will be in data communication with the control system 11100, for example via a home wireless transceiver separate from the smart home hub. The smart home hub is also in data communication with the access control apparatus, for example via the home wireless transceiver, or via a wired connection. Typically, the smart home hub will be in data communication with a plurality of electronic devices in the building. It will be understood that although referred to as a smart home hub, the smart home hub can be used to control electronic devices in areas other than the home, for example a commercial location such as an office building or a manufacturing site.

In one example, the smart home hub can receive the first request signal from the one or more controllers 11110 (directly or indirectly) The first request signal may comprise authentication data to authenticate the host vehicle 10 or the user of the host vehicle 10. The smart home hub will determine whether to cause the access control apparatus to change from the first state to the second state in dependence on the authentication data, for example in dependence on a comparison between the authentication data and an expected authentication data stored on a memory device of the smart home hub. It will be appreciated that the authentication can instead take place on another device connected to the smart home hub, for example on the access control apparatus.

Although the disclosure hereinbefore refers to a smart home hub, the one or more controllers 11110 can output the first request signal for receipt by any controller connected to the access control apparatus, for example a garage door opener receiver, such as using the "HomeLink"® technology.

The control system 11100 is configured to receive a location signal. The location signal is indicative of the host vehicle 10 having cleared the access control apparatus. The one or more controllers 11110, output a second request signal. The second request signal is to cause the access control apparatus to change from the second state to the first state. In his way, the access control apparatus can revert to the first state where access past the access control apparatus is prohibited of ter passage of the host vehicle 10 past the access control apparatus, ensuring security at the access control apparatus is maintained. The second request signal is output in dependence on the location signal being received. The second request signal is output after output of the first request signal.

Typically, the navigation goal is a parking goal, such as a parking location. Alternatively, the navigation goal can be a pick-up goal or a drop-off goal.

The access control apparatus in the present example is a barrier, such as a physical barrier, for example a garage door movable between the first state and the second state. It will be understood that alternative access control apparatus is possible, for example a gate, a rising bollard, or a ramp.

The goal signal is indicative of a location of the navigation goal, for example comprising the location of the navigation goal. It will be understood that the location may be either a geographic location, for example a coordinate of the navigation goal, or alternatively may be a reference location, for example "parking location". The goal signal is typically indicative of a vehicle orientation at the navigation goal.

Figure 41:
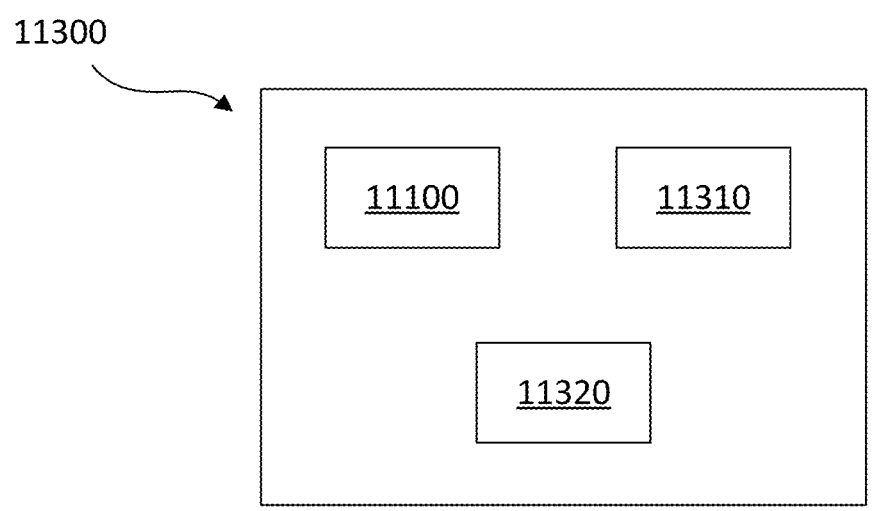

A system 11300 in accordance with an embodiment of the invention is shown in FIG. 41. The system comprises the control system 11100 as described hereinbefore with reference to FIG. 40. The system 11300 comprises communications means 11310, for example a wireless transmitter 11310 configured to receive the first request signal from the one or more controllers 11110 of the control system 11100. The communication means 11310 is in data communication with the one or more controllers 11110 of the control system 11100 and is configured to transmit an access request signal. The access request signal is to cause the access control apparatus to change from the first state to the second state. In an example, the communication means 11310 directly relays the first request signal as the access request signal. The wireless transmitter 11310 is configured to transmit the first request signal according to a predetermined wireless protocol, for example a radio frequency communication channel such as a WiFi® network connection, a Bluetooth® connection or a cellular network connection. In the present example, the communication means in the form of the wireless transmitter 11310 is on the host vehicle 10.

The system 11300 comprises a vehicle controller 11320. The vehicle controller 10320 is configured to receive the navigation signal. The vehicle controller 10320, in dependence on receiving the navigation signal, is to cause the host vehicle 10 to autonomously navigate to the navigation goal after output of the first request signal.

Figure 42:
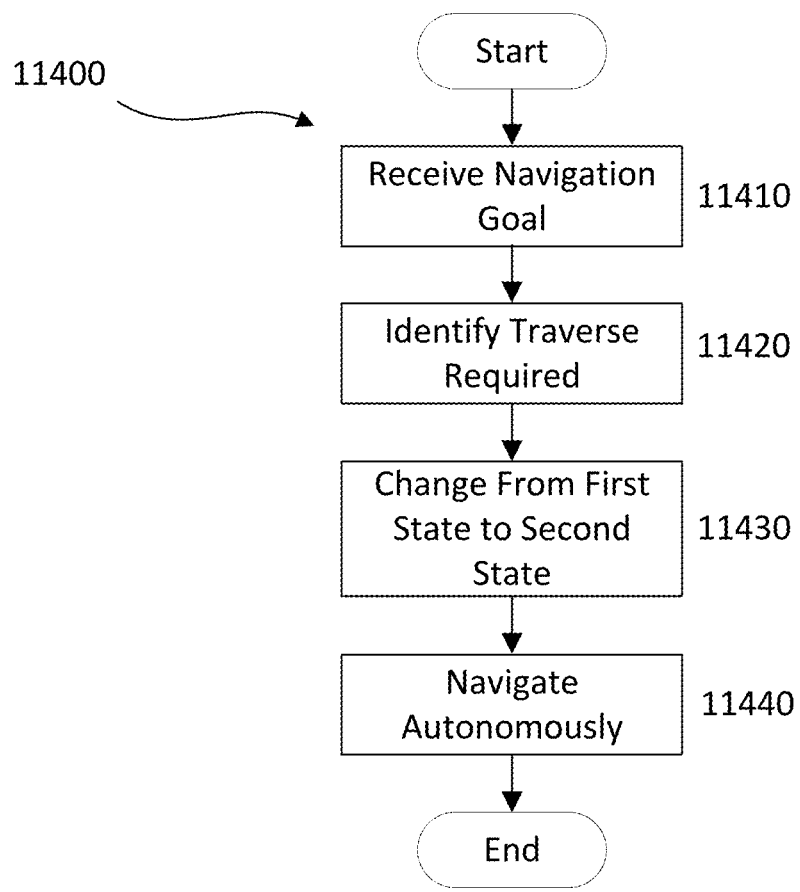

A method 11400 according to an embodiment of the invention is shown in FIG. 42. The method 11400 is a method of controlling the host vehicle 10. In particular, the method 11400 is a method of autonomously navigating the vehicle 10 to a navigation goal past an access control apparatus including controlling the access control apparatus to change from a first state in which access past the access control apparatus is prohibited to a second state in which access past the access control apparatus is permitted. The method 11400 may be performed by the control system 11100 and the system 11300 described hereinbefore with reference to FIGS. 40 and 41.

The method 11400 broadly comprises steps of receiving 11410 a navigation goal of a host vehicle, identifying 11420 that the navigation goal is associated with a traverse past an access control apparatus, and in dependence thereon, changing 11430 the access control apparatus from a first state in which access for the vehicle is prohibited to a second state in which access for the vehicle is permitted, and autonomously navigating 11440 the vehicle towards the navigation goal past the access control apparatus in the second state.

Referring to FIG. 42, the illustrated embodiment of the method 11400 comprises a step of receiving 11410 a navigation goal. The navigation goal is for autonomous navigation thereto by a vehicle, operating in an autonomous mode. The navigation goal typically comprises a location of the navigation goal.

In step 11420, an associated of the navigation goal with a traverse past an access control apparatus is identified. The access control apparatus is operable on receipt of an access request to change between a first state and a second state. In the first state, assess for the vehicle past the access control apparatus is prohibited. In the second state, access for the vehicle past the access control apparatus is permitted.

In step 11430, the access control apparatus is changed from the first state to the second state. The access control apparatus is changed from the first state to the second state as a result of a first request signal output in dependence on the identification of the association in step 11420.

In step 11440, the vehicle is autonomously controlled to travers past the access control apparatus towards the navigation goal while the access control apparatus is in the second state. The vehicle is operating in an autonomous mode.

As a result of method 11400, the host vehicle can be controlled to traverse past the access control apparatus when the vehicle is operating in the autonomous mode. There is no need for a user to operate the access control apparatus manually.

Navigation Through a Non-Navigable Area

Figure 43:
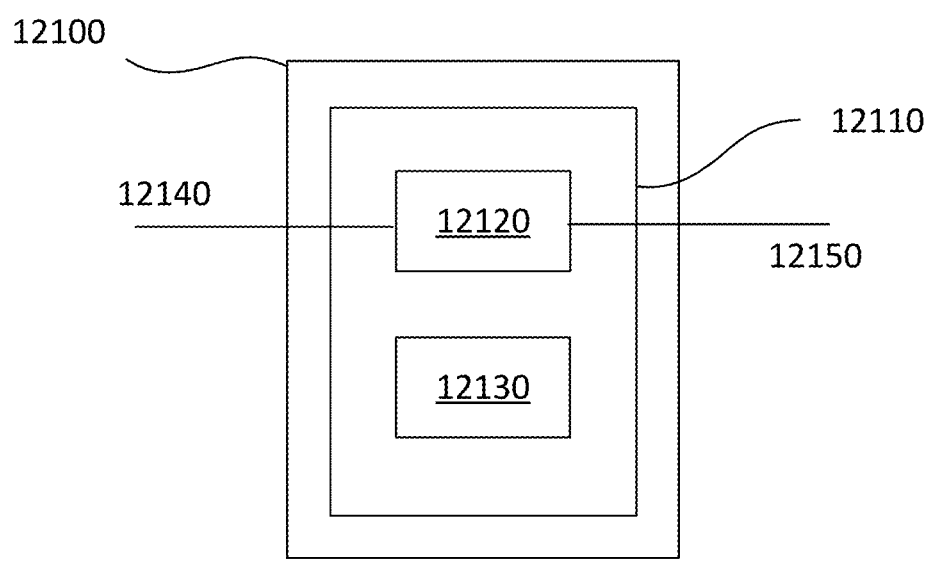

A control system 12100 or control unit 12100 in accordance with an embodiment of the invention is shown in FIG. 43.

The control system 12100 is for a host vehicle 10 operable in an autonomous mode and a non-autonomous mode. The host vehicle 10 may be substantially as described with reference to FIG. 1 hereinbefore. The control system 12100 comprises one or more controllers 12110. The one or more controllers 12110 include a first controller 12110. The control system 12100 is configured to receive environment data. The environment data is indicative of an environment of the host vehicle 10. The one or more controllers 12110 identify a non-navigable area, associated with the environment of the host vehicle, in which autonomous navigation of the host vehicle 10 is unavailable. The non-navigable area is identified in dependence on the environment data. For example, by default, the one or more controllers 12110 are configured to designate a grass terrain in the environment as a non-navigable area in which autonomous navigation of the host vehicle 10 is unavailable. In other words, the host vehicle 10 will not normally autonomously navigate the host vehicle 10 over grass. The one or more controllers 12110, in a training mode, navigate the host vehicle 10 via a navigation path through the environment. The one or more controllers 12110 navigate the host vehicle 10 in the training mode in dependence of at least a steering input by a user of the host vehicle 10. In other words, the host vehicle 10 is driven along the navigation path through the environment in the training mode by the user. The navigation path in the training mode passes at least partially through the non-navigable area. The one or more controllers 12110 identify a navigable area associated with the environment of the host vehicle 10 in which autonomous navigation of the host vehicle 10, operating in the autonomous mode, is available. The navigable area includes at least a portion of the navigation path passing through the non-navigable area. When subsequently navigating to a navigation goal in the autonomous mode, the control system 12100 utilises the navigable area to autonomously control the host vehicle 10. Therefore, the host vehicle 10 can autonomously navigate through an area previously identified as part of a non-navigable area where autonomous navigation is unavailable after the user drives the host vehicle 10 through similar terrain. In other words, where the user drives the hose vehicle 10 on grass, where grass has previously been identified as an unavailable terrain for autonomous navigation of the host vehicle 10 thereover, the control system 12100 will subsequently include grass terrain in the navigable area in which the host vehicle 10 can autonomously navigate. The one or more controllers 12110 comprise an electronic processor 12120 having an electrical input 12140 and an electronic memory device 12130 electrically coupled to the electronic processor 12120. The electronic memory device 12130 has instructions stored therein. The electronic processor 12120 is configured to access the memory device 12130 and execute the instructions thereon so as to utilise the navigable area to autonomously navigate the environment. The electrical input 12140 is for receiving the environment data. The electronic processor 12120 includes an electrical output 12150 for outputting the navigable area. The electrical input 12140 and the electrical output 12150 may be combined such as by being formed by an I/O unit or interface unit. For example, the one or more controllers 12110 may comprise an interface to a network forming a communication bus of the host vehicle 10. The interface bus may be an Internet Protocol (IP) based communication bus such as Ethernet, although embodiments of the invention are not limited in this respect.

Figure 44:
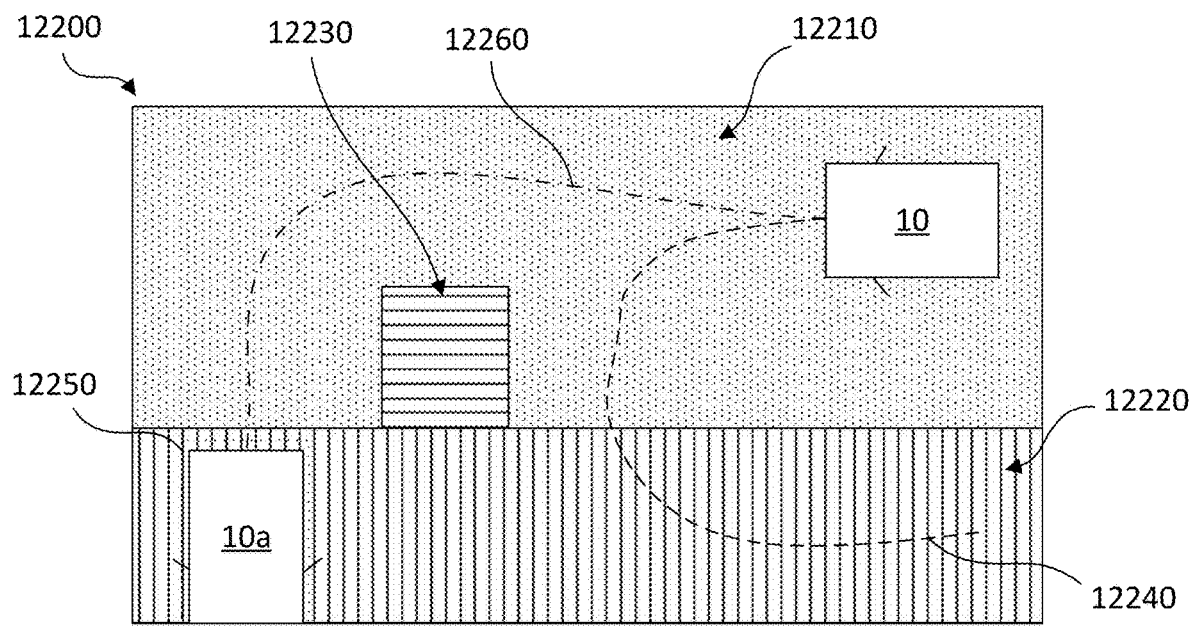

An environment 12200 in which the host vehicle 10 in accordance with an embodiment of the invention can operate is shown schematically in FIG. 44. The environment 12200 shown in FIG. 44 will help explain at least some of the uses for an embodiment of the invention. As explained hereinbefore, the environment 12200 includes a plurality of different terrain types 12210, 12220, 12230 for potential navigation by the host vehicle 10. In the example shown in FIG. 44, the environment 12200 includes a first region 12210 of gravel terrain, a second region 12220 of grass terrain and a third region 12230 of flowerbed terrain. By default, only the first region 12210 of gravel terrain is acceptable for autonomous navigation thereover by the host vehicle 10. The environment data is indicative of the presence, location and extent of the first regions 12210, the second region 12220 and the third region 12230. Therefore, when the non-navigable area is identified, it includes both the second region 12220 and the third region 12230, but not the first region 12210. Subsequently, the host vehicle 10 is driven by the user along navigation path 12240. Navigation path 12240 starts in the first region 12210, but also extends into the second region 12220. Therefore, the one or more controllers 12110 subsequently identify a navigable area for autonomous navigation of the host vehicle 10 therethrough which includes the first region 12210 and the second region 12220. The third region 12230 is not included in the navigable area because the navigation path 12240 did not pass through any part of the third region 12230. Thereafter, the host vehicle 10 can perform autonomous navigation to locations in either the first region 12210 or the second region 12220, and manoeuvre over the first region 12210 and the second region 12220. For example, the host vehicle 10 can navigate autonomously to a navigation goal 12250 FIG. 44 shows host vehicle 10a positioned at the navigation goal 12250 after autonomous navigation thereto. The one or more controllers 12110 can determine the navigation trajectory 12260 to be followed by the host vehicle 10 during autonomous navigation to the navigation goal 12250. As can be seen, the navigation trajectory passes through the first region 12210 and through the second region 12220 but steers clear of the third region 12230.

Returning to FIG. 43, the control system 12100 is configured to receive a goal signal. The goal signal is indicative of the navigation goal of the host vehicle associated with the navigable area. The one or more controllers 12110 output a navigation signal. The navigation signal is to cause the host vehicle 10 to navigate autonomously to the navigation goal via a determined path associated with the navigable area. The navigation signal is output subsequent to receiving the goal signal and identifying the navigable area, for example in dependence on receiving the goal signal and identifying the navigable area. The one or more controllers 12110 determine the path in dependence on the navigable area and the goal signal.

The control system 12100 is configured to receive one or more state signals. The one or more state signals are indicative of one or more control inputs of the host vehicle 10 during the navigation via the navigation path. When subsequently navigating to the navigation goal in the autonomous mode, the control system 12100 utilises the one or more state signals to autonomously control the host vehicle 10. The one or more state signals typically comprise at least one of a ride height, a traction control setting an ABS (Assisted Braking System) setting and a transmission gear.

The one or more controllers 12110 identify the navigable area in dependence on the environment data and the navigation path of the host vehicle 10 in the environment. The navigation path of the host vehicle 10 in the training mode can be determined utilising the environment data.

The environment data is indicative of one or more terrain categories associated with the environment. The one or more controllers 12110 identify the non-navigable area in dependence on the one or more terrain categories. The possible terrain categories include at least grass, mud, gravel, tarmac, sand, snow, earth, concrete and asphalt. The terrain categories can be further subdivided, for example into short grass and long grass.

In the example shown in FIG. 44, the resulting navigable area has associated therewith each of the terrain categories of the environment 12200 associated with the navigation path 12240. Furthermore, the navigable area formed of the first region 12210 and the second region 12220 includes all of the non-navigable area that is associated with each of the terrain categories of the environment 12200 associated with the navigation path 12240. In other words, all of the first region 12210 and the second region 12220 are included in the navigable area. A boundary of the navigable area in the environment 12200, for example around the third are 12230 is associated with a further terrain category. The further terrain category is different from the one or more terrain categories associated with the navigation path 12240.

Figure 45:
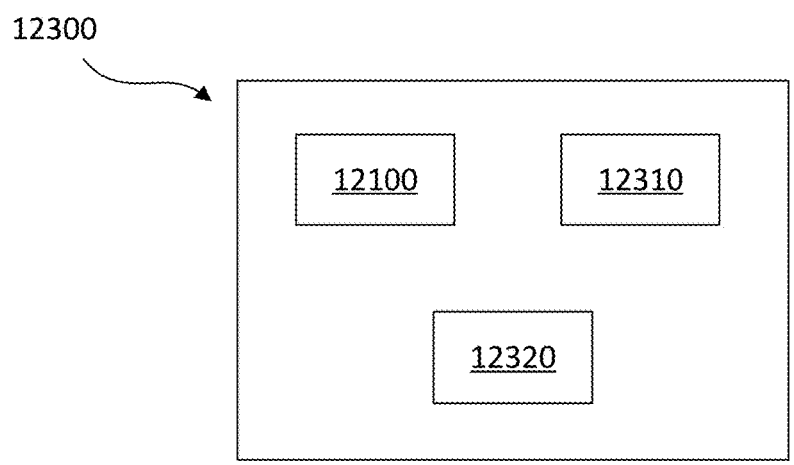

A system 12300 in accordance with an embodiment of the invention is shown in FIG. 45. The system comprises the control system 12100 as described hereinbefore with reference to FIG. 43. The system 12300 comprises sensing means 12310 in the form of one or more sensors 12310, to sense the environment of the host vehicle. The sensing means 12310 is configured to sense the one or more terrain categories associated with the environment. The sensing means 12310 outputs the environment data to the control system 12100 in dependence on the sensed environment. In this example, the sensing means 12310 comprises a radar sensor, an ultrasound sensor, an optical camera, an infrared camera, a LIDAR sensor and a stereoscopic sensor. It will be understood that different sensors and different combinations of sensors can be used to sense the environment of the host vehicle 10. The system comprises a vehicle controller 12320. The vehicle controller 12320 is configured to receive the navigation signal from the control system 12100. The vehicle controller 12320 is to cause the host vehicle 10 to autonomously navigate to the navigation goal via the determined path associated with the navigable area when the host vehicle 10 is operating in the autonomous mode.

Figure 46:
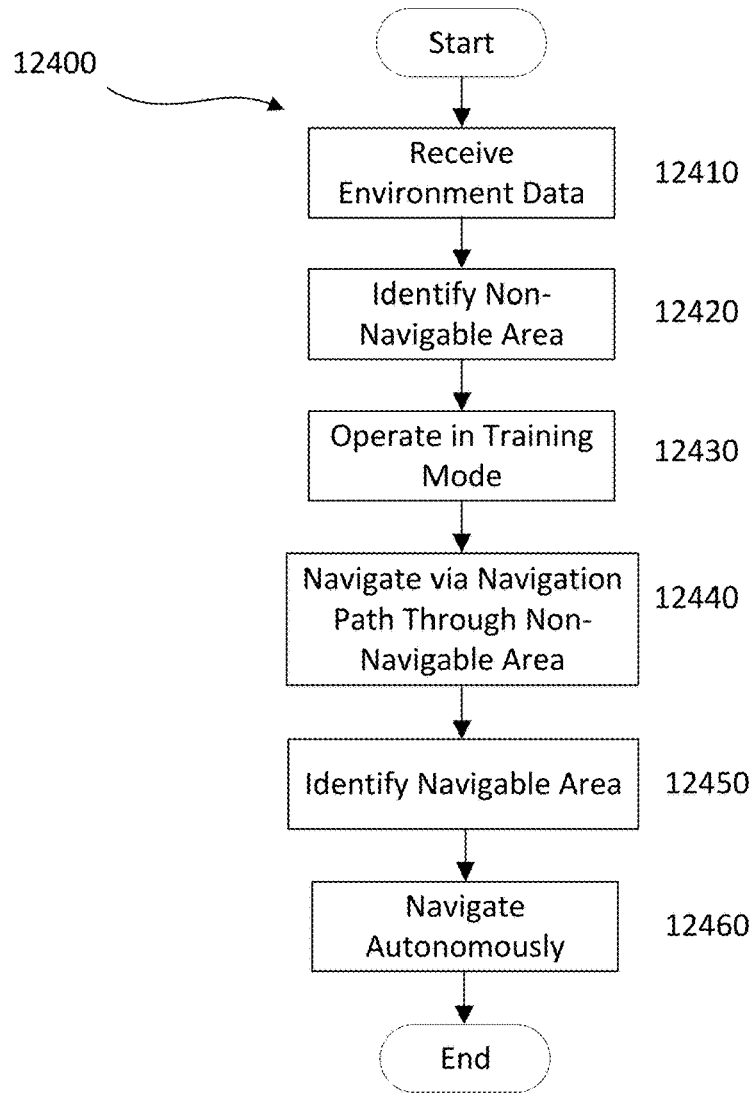

A method 12400 according to an embodiment of the invention is shown in FIG. 46. The method 12400 is a method of controlling the host vehicle 10. In particular, the method 12400 is a method of autonomously navigating the vehicle 10 in a navigable area including portions of an environment of the host vehicle previously identified as being in a non-navigable area for the vehicle. The method 12400 may be performed by the control system 12100 and the system 12300 described hereinbefore with reference to FIGS. 43 and 45.

The method 12400 broadly comprises steps of receiving 12410 environment data indicative of an environment of a vehicle, identifying 12420 a non-navigable area in dependence on the environment data, navigating 12440 the vehicle via a navigation path at least partially through the non-navigable area in dependence on at least a steering input by a user of the vehicle, and in dependence on the navigation path and the non-navigable area, identifying 12450 a navigable area for the vehicle.

Referring to FIG. 46, the illustrated embodiment of the method 12400 comprises a step of receiving 12410 environment data. The environment data is indicative of an environment of the vehicle. Typically, the environment data is indicative of one or more terrain categories, for example a plurality of terrain categories, associated with the environment of the vehicle. The environment data is indicative of a location of each of the one or more terrain categories.

In step 12420 a non-navigable area in the environment of the vehicle 10 is identified. The non-navigable area is an area of the environment in which autonomous navigation of the host vehicle is unavailable. The non-navigable area is identified in dependence on the environment data.

In step 12430, the vehicle is operated in a training mode.

In step 12440, when operating in the training mode, the vehicle is navigated through the environment via a navigation path in dependence on at least a steering input by a user of the vehicle. The navigation path passes through the non-navigable area. The vehicle is typically navigated through the environment via the navigation path in dependence on a torque input, for example an acceleration input and/or a braking input by the user. When operating in the training mode, the vehicle can receive path data indicative of the navigation path through the environment. The navigation path can be determined in dependence on the path data.

In step 12450, a navigable area in the environment of the vehicle in which autonomous navigation of the vehicle is available is identified. The navigable area includes at least a portion of the navigation path passing through the non-navigable area. The navigable area is identified after identification of the non-navigable area.

In step 12460, when operating in the autonomous mode, the vehicle is autonomously controlled to navigate to a navigation goal utilising the navigable area.

As a result of method 12400, the vehicle can autonomously navigate to a navigation goal via portions of the environment previously identified as a non-navigable area. Further, the user can indicate that portions of the non-navigable area are to be included in the navigable area by manoeuvring the vehicle through the non-navigable area.

Figure 47:
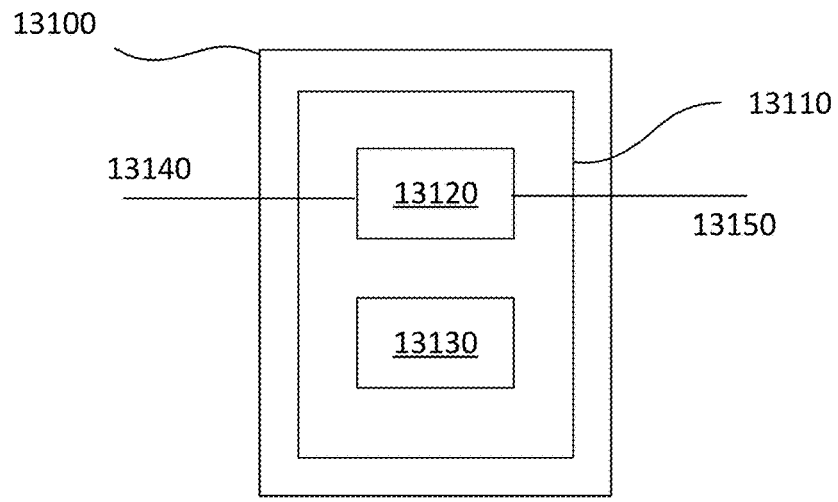

Preparing for autonomous navigation A control system 13100 or control unit 13100 in accordance with an embodiment of the invention is shown in FIG. 47.

The control system 13100 is for a host vehicle 10 operable in an autonomous mode and a non-autonomous mode. The host vehicle 10 may be substantially as described with reference to FIG. 1 hereinbefore. The control system 13100 comprises one or more controllers 13110. The one or more controllers 13110 include a first controller 13110. The control system 13100 is configured to receive a request signal. The request signal is indicative of a request for autonomous navigation of the host vehicle 10 to a navigation goal. Typically, the request signal is indicative of the navigation goal. The one or more controllers 13110 output a precondition signal. The precondition signal is to cause one or more components to prepare the host vehicle for autonomous navigation to the navigation goal prior to movement of the host vehicle away from the current location. The one or more components are associated with an effectiveness of one or more sensors of the host vehicle. The one or more controllers 13110 output the precondition signal after receipt of the request signal, for example in dependence on the request signal being received. The precondition signal may be output in dependence on the navigation goal. In one example, the precondition signal is to cause a subset of a plurality of components associated with the effectiveness of the one or more sensors to prepare the host vehicle 10 for autonomous navigation to the navigation goal. The one or more sensors sense an environment of the host vehicle 10. The one or more controllers 13110 autonomously navigate the host vehicle 10 to the navigation goal. The autonomous navigation of the host vehicle 10 to the navigation goal typically utilises sensor data output from the one or more sensors of the host vehicle 10 and therefore depends on the one or more sensors being in an effective state. The one or more controllers 13110 typically autonomously navigate the host vehicle 10 to the navigation goal after output of the precondition signal to prepare the host vehicle for autonomous navigation to the navigation goal. Therefore, the control system 13100 can prepare the host vehicle 10 for navigation in the autonomous mode where the sensors required for operation of the host vehicle 10 in the autonomous mode are in an ineffective state. The one or more controllers 13110 comprise an electronic processor 13120 having an electrical input 13140 and an electronic memory device 13130 electrically coupled to the electronic processor 13120. The electronic memory device 13130 has instructions stored therein. The electronic processor 13120 is configured to access the memory device 13130 and execute the instructions thereon so as to prepare the host vehicle 10 for navigation in the autonomous mode. The electrical input 13140 is for receiving the request signal. The electronic processor 13120 includes an electrical output 13150 for outputting the precondition signal and a navigation signal. The navigation signal is to cause the host vehicle 10 to navigate autonomously to the navigation goal. The electrical input 13140 and the electrical output 13150 may be combined such as by being formed by an I/O unit or interface unit. For example, the one or more controllers 13110 may comprise an interface to a network forming a communication bus of the host vehicle 10. The interface bus may be an Internet Protocol (IP) based communication bus such as Ethernet, although embodiments of the invention are not limited in this respect.

The request can be for the host vehicle 10 to arrive at the navigation goal at a predetermined time. Alternatively, the request can be for the host vehicle 10 to depart towards the navigation goal at a predetermined time. Typically, the request is indicative of the predetermined time. Therefore, the one or more controllers 13110 navigate the host vehicle 10 to the navigation goal for arrival at the predetermined time. Alternatively, the one or more controllers 13110 navigate the host vehicle 10 to the navigation goal, departing towards the navigation goal at the predetermined time.

The navigation goal is typically a pick-up location where one or more occupants and/or one or more items of luggage are to be added to the host vehicle 10.

The one or more controllers 13110 output a notification signal. The notification signal is to notify a user of the host vehicle 10 of an expected arrival time of the host vehicle 10 at the navigation goal, for example that the host vehicle 10 is expected to arrive at "09.48".

In one embodiment, the precondition signal is to cause operation of a heating component. The heating component is associated with the host vehicle 10 and is to prepare the host vehicle 10 for autonomous navigation to the navigation goal by heating. In particular, where at least one of the one or more sensors of the host vehicle 10 are below optimum operating temperatures, for example covered in frost, the heating component can melt the ice and/or raise the operating temperature of the at least one sensor. Therefore, the sensor(s) is/are being prepared for autonomous navigation of the host vehicle to the navigation goal.

In another embodiment, the precondition signal is to cause operation of a cooling component. The cooling component is associated with the host vehicle 10 and is to prepare the host vehicle 10 for autonomous navigation to the navigation goal by cooling. In particular, where at least one of the one or more sensors of the host vehicle 10 are above optimum operating temperatures, the cooling component can cool the operating temperature of the at least one sensor. Therefore, the sensor(s) is/are being prepared for autonomous navigation of the host vehicle to the navigation goal.

In this example, the one or more components are part of the host vehicle 10. It will be understood that in other examples, the one or more components are separate from the host vehicle 10, for example in a garage. The garage is for storage of the host vehicle 10 thereon prior to autonomous navigation to the navigation goal.

The control system 13100 is configured to receive a status signal. The status signal is indicative of an effectiveness of the one or more sensors. The one or more controllers 13110 commence autonomous navigation of the host vehicle 10 to the navigation goal in dependence on the effectiveness of the one or more sensors. Therefore, the host vehicle 10 can wait until the one or more sensors are sufficiently effective to be utilised in the autonomous navigation of the host vehicle 10 to the navigation goal. In an embodiment, the status signal is indicative of a time since activation of the one or more components associated with the effectiveness of the one or more sensors. Therefore, the one or more sensors of the host vehicle 10 can be deemed to be effective after operation of the one or more components for a predetermined time.

In some embodiments, the host vehicle 10 may begin autonomous navigation to the navigation goal when only some of the one or more sensors are sufficiently effective. The request signal is, in some examples, indicative of an entry in a calendar. The entry is associated with a user of the host vehicle 10. In this way, the host vehicle 10 can automatically prepare the host vehicle for autonomous operation based on receiving a calendar entry.

In an embodiment, at least one of the one or more components is for clearing an aperture, for example a window, of the host vehicle 10. The aperture is associated with at least one or the one or more sensors. It will be understood that clearing the aperture will improve the effectiveness of the sensor and can be required before autonomous navigation of the host vehicle 10. In particular, the one or more components for clearing the aperture can be a wiper, a window-washing component or a de-icing component.

It will be understood that other examples of components associated with the effectiveness of the one or more sensors can be envisaged by the skilled person.

Figure 48:
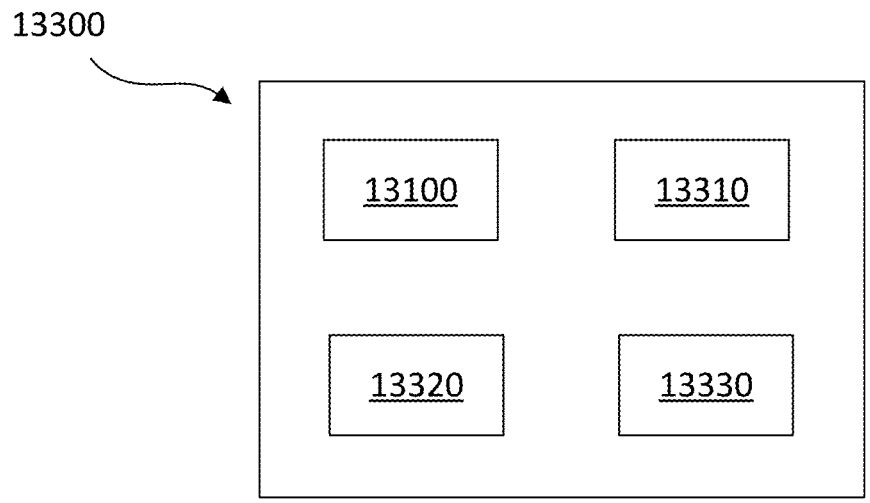

A system 13300 in accordance with an embodiment of the invention is shown in FIG. 48. The system comprises the control system 13100 as described hereinbefore with reference to FIG. 47. The system 13300 comprises the one or more components 13310 associated with the effectiveness of the one or more sensors 13320. The one or more components 13310 are configured to receive the precondition signal from the one or more controllers 13110 of the control system 13100 and, in dependence thereon, to prepare the host vehicle 10, operating in the autonomous mode, for autonomous navigation to the navigation goal. As described hereinbefore, the one or more components 13310 can comprise at least one of a heating component 13310 and a cooling component (not shown in FIG. 48) In this example, the system 13300 comprises the one or more sensors 13320. The system 13100 comprises a vehicle controller 13330. The vehicle controller is configured to cause the host vehicle 10, operating in the autonomous mode, to navigate autonomously to the navigation goal utilising sensor data from the one or more sensors 13320.

Figure 49:
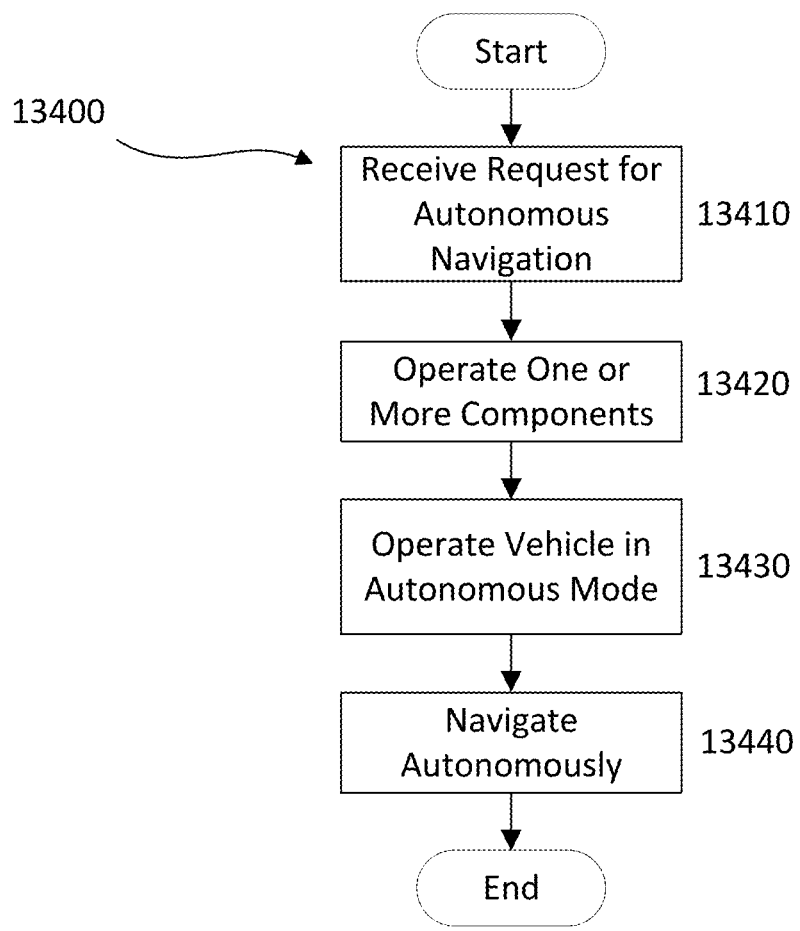

A method 13400 according to an embodiment of the invention is shown in FIG. 49. The method 13400 is a method of controlling the host vehicle 10. In particular, the method 13400 is a method of preparing the vehicle 10 for autonomous navigation to a navigation goal by activation of one or more components associated with an effectiveness of one or more sensors utilised during autonomous navigation of the host vehicle 10 to the navigation goal. The method 13400 may be performed by the control system 13100 and the system 13300 described hereinbefore with reference to FIGS. 47 and 48.

The method 13400 broadly comprises steps of receiving 13410 a request for autonomous navigation of the vehicle 10 to a navigation goal, in dependence thereon, operating 13420 one or more components associated with an effectiveness of one or more sensors of the vehicle to prepare the vehicle for navigation to the navigation goal, and subsequent to the vehicle being prepared, autonomously navigate 13440 the vehicle to the navigation goal.

Referring to FIG. 49, the illustrated embodiment of the method 13400 comprises a step of receiving 13410 a request for autonomous navigation of the vehicle 10. The request can be indicated by a request signal and is for autonomous navigation of the vehicle, operating in an autonomous mode, from a current location of the vehicle to a navigation goal, for example a pick-up goal.

In step 13420, one or more components associated with an effectiveness of one or more sensors of the vehicle are operated to prepare the vehicle for autonomous navigation to the navigation goal. The one or more components are operated prior to movement of the vehicle away from the current location. The one or more sensors output sensor data to be utilised during autonomous navigation of the vehicle to the navigation goal.

In step 13430, the vehicle is operated in the autonomous mode. It will be understood that step 13430 need not come after the preceding steps 13410 or 13420. In some example, the vehicle can simply continue to operate in the autonomous mode.

In step 13440, when the vehicle is operating in the autonomous mode, the vehicle is autonomously navigated to the navigation goal. Sensor data from the one or more sensors can be utilised to autonomously navigate the vehicle to the navigation goal.

As a result of method 13400, the vehicle can be prepared for autonomous navigation to the navigation goal. Thus, the vehicle can navigate autonomously to the navigation goal regardless of the effectiveness of the sensors at the time the request is received.

Figure 50:
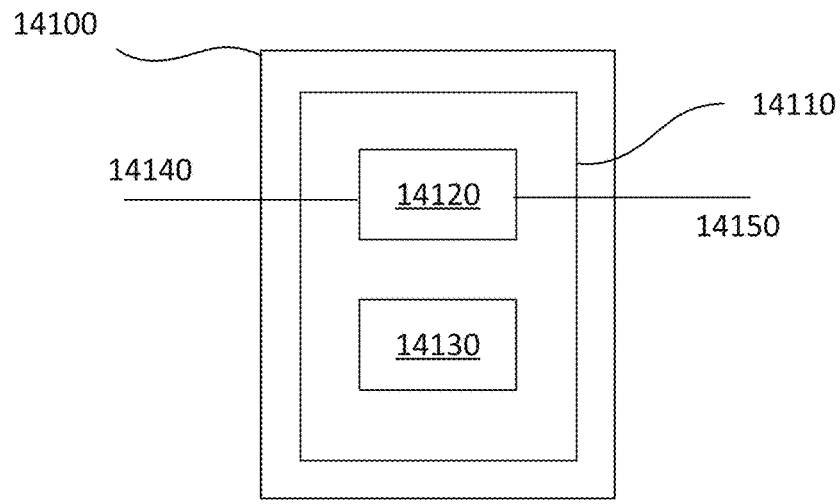

Accessibility based on extent of external feature A control system 14100 or control unit 14100 in accordance with an embodiment of the invention is shown in FIG. 50.

The control system 14100 is for a host vehicle 10 operable in an autonomous mode and a non-autonomous mode. The host vehicle 10 may be substantially as described with reference to FIG. 1 hereinbefore. The control system 14100 comprises one or more controllers 14110. The one or more controllers 14110 include a first controller 14110. The control system 14100 is configured to receive a size signal and environment data. The size signal is indicative of an extent of an external feature associated with the host vehicle 10. The environment data is indicative of an environment of the host vehicle 10. The one or more controllers 14110 identify an accessibility of a navigation goal for the host vehicle. The accessibility of the navigation goal is identified in dependence on, for example utilising, the size signal and the environment data. The one or more controllers 14110 output an accessibility signal. The accessibility signal is to notify a user of the host vehicle 10 of the accessibility of the navigation goal. The one or more controllers 14110 autonomously navigate the host vehicle 10 to one of the navigation goal or an alternative navigation goal in dependence on the accessibility of the navigation goal. For example, the one or more controllers 14110 autonomously navigate the host vehicle 10 to the alternative navigation goal in dependence on the navigation goal being identified as inaccessible. Therefore, the control system 14100 can autonomously navigate the host vehicle 10 to the navigation goal only if the navigation goal is determined to be accessible based on the extent of an external feature associated with the host vehicle 10. In particular, where autonomous navigation to the navigation goal requires navigation through a restricted opening, the extent of the external feature associated with the host vehicle can be taken into account, as well as the extend of the host vehicle in the absence of the external feature. As explained hereinbefore, the external feature is different from a body of the host vehicle 10. The external feature is typically to attach to the body of the host vehicle 10 whereby to change one or more dimensions of the host vehicle 10. The one or more controllers 14110 comprise an electronic processor 14120 having an electrical input 14140 and an electronic memory device 14130 electrically coupled to the electronic processor 14120. The electronic memory device 14130 has instructions stored therein. The electronic processor 14120 is configured to access the memory device 14130 and execute the instructions thereon so as to notify the user of the accessibility of the navigation goal for the host vehicle 10 and to autonomously navigate the host vehicle 10 to one of the navigation goal and the alternative navigation goal. The electrical input 14140 is for receiving the size signal and the environment data. The electronic processor 14120 includes an electrical output 14150 for outputting the accessibility signal. The electrical input 14140 and the electrical output 14150 may be combined such as by being formed by an I/O unit or interface unit. For example, the one or more controllers 14110 may comprise an interface to a network forming a communication bus of the host vehicle 10. The interface bus may be an Internet Protocol (IP) based communication bus such as Ethernet, although embodiments of the invention are not limited in this respect.

The one or more controllers 14110 determine the extent of the external feature in dependence on the size signal.

Figure 51:
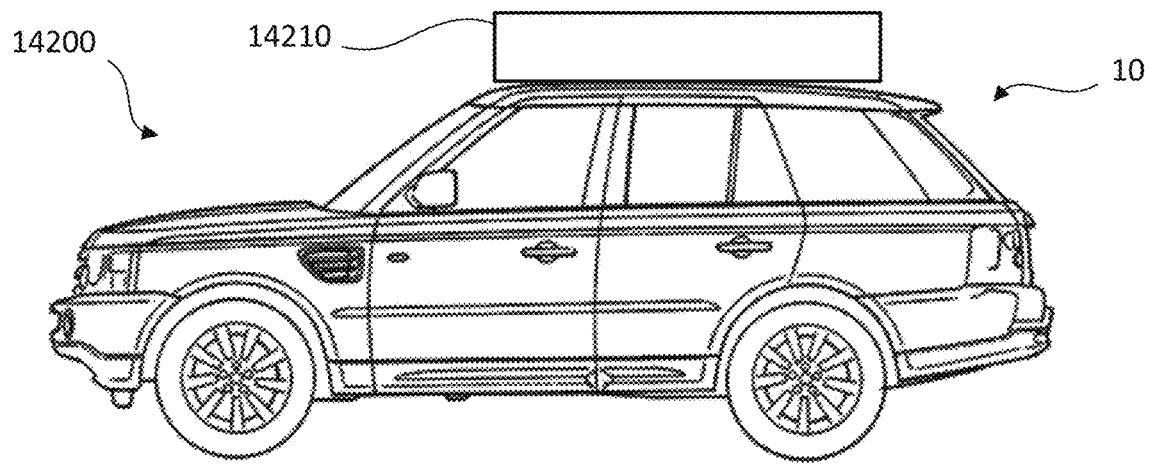
FIG. 51 shows a schematic representation of a host vehicle to be used with the control system of FIG. 50.

A vehicle setup 14200 suitable for use with the host vehicle 10 in accordance with an embodiment of the invention is shown schematically in FIG. 51. The host vehicle 10 has an external feature 14210, also referred to as an attachment 14210, in the form of a roof-mounted feature 14210. Although not shown explicitly in FIG. 51, it will be understood that the roof-mounted feature 14210 may connect to the host vehicle 10 via roof connection means, for example one or more roof bars.

The external feature 14210 is typically an optional feature 14210 for example removable and/or attached after assembly of the host vehicle 10, such as an attachment 14210. In this particular example, the attachment 14210 is a roof-mounted object 14210, for example a roof box 14210. It will be understood that a roof box 14210 is a storage container for fitting to a roof of a vehicle to increase a storage capacity of the vehicle.

Returning to FIG. 50, the accessibility signal is to request confirmation from the user to autonomously navigate the host vehicle 10 to the navigation goal. In other words, the host vehicle 10 may determine that autonomous navigation of the host vehicle 10 to the navigation goal is available even taking into account the additional extent of the host vehicle 10 due to the external feature. Nevertheless, the control system 14100 can seek confirmation from the user to proceed. The alternative navigation goal is a different navigation goal, which does not include navigation of the host vehicle 10 to the navigation goal.

In some examples, the external feature is one of a plurality of external features of the host vehicle 10. The accessibility may be identified in dependence on the extent of each of the plurality of external features. As will be understood, the size of the external feature can change an accessibility of navigation goals for the host vehicle 10.

The size signal is typically indicative of an extent of the external feature in a dimension that impacts the accessibility of the navigation goal. Where the external feature is one or more roof-mounted objects 14210 as shown in FIG. 51, the size signal is indicative of an additional height of the host vehicle 10 due to the one or more roof-mounted objects 14210 compared to the host vehicle 10 in the absence of the one or more roof-mounted objects 14210.

The one or more controllers 14110 determine a clearance extent defined by at least one feature of the environment of the host vehicle 10. The clearance extent is determined in dependence on the environment data. The one or more controllers 14110 determine a vehicle extent of the host vehicle 10. The vehicle extent is determined in dependence on the size signal. For example, the vehicle extent can be determined as the sum of a pre-stored reference vehicle extent of the host vehicle 10 absent the external feature and the extent of the external feature indicated by the size signal. The one or more controllers 14110 determine the accessibility of the navigation goal subsequent to determining the clearance extent and the vehicle extent, for example in dependence on the clearance extent and the vehicle extent. For example, the accessibility of the navigation goal may be determined in dependence on the clearance extent being greater than the vehicle extent, such as at least a predetermined amount greater than the vehicle extent. In this way, the navigation goal will only be identified as accessible where the host vehicle 10 will comfortably fit through the clearance extent defined by at least one feature, for example between two features, of the environment.

In other words, where the host vehicle 10 is fitted with a roof-mounted object 14210 as shown in FIG. 51, and the environment includes a garage opening having a height greater than a height of the host vehicle 10 in the absence of the roof-mounted object 14210, but less than the height of the host vehicle 10 with the roof-mounted object 14210 mounted thereto, a navigation goal requiring travel of the host vehicle 10 through the garage opening can be identified as inaccessible.

Figure 52:
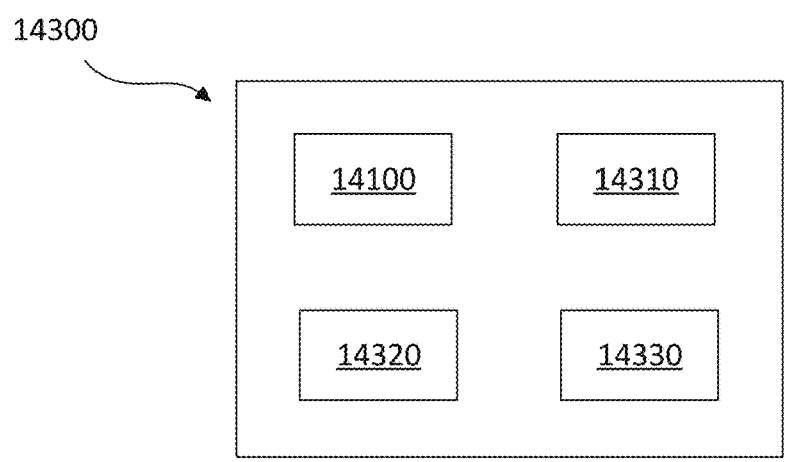

A system 14300 in accordance with an embodiment of the invention is shown in FIG. 52. The system comprises the control system 14100 as described hereinbefore with reference to FIG. 50. The system 14300 comprises notification means 14310 in the form of a notification unit 14310. The notification means 14310 is configured to receive the accessibility signal from the control system 14100. The notification means 14310 is configured to output a user notification for notifying a user of the accessibility of the navigation goal for the host vehicle in dependence on the accessibility signal. Therefore, the user can be alerted to the accessibility of the navigation goal. The notification unit 14310 includes display means 14310 in the form of an electronic display 14310. In some examples, the notification unit 14310 comprises audio output means, for example an audio output device. The system 14300 comprises an input apparatus 14320 to receive a user input. The user input is indicative of the extent of the external feature in at least one dimension of the external feature. The input apparatus 14320 is configured to output the size signal to the control system 14100 in dependence on receiving the user input. The system 14300 comprises sensing means 14330 in the form of one or more sensors 14330 to sense the environment. The sensing means 14330 is configured to output the environment data to the control system 14100 in dependence on the sensed environment of the host vehicle 10. In this example, the sensing means 14330 comprises a radar sensor, an ultrasound sensor, an optical camera, an infrared camera, a LI DAR sensor and a stereoscopic sensor. It will be understood that different sensors and different combinations of sensors can be used to sense the environment of the host vehicle 10.

Figure 53:
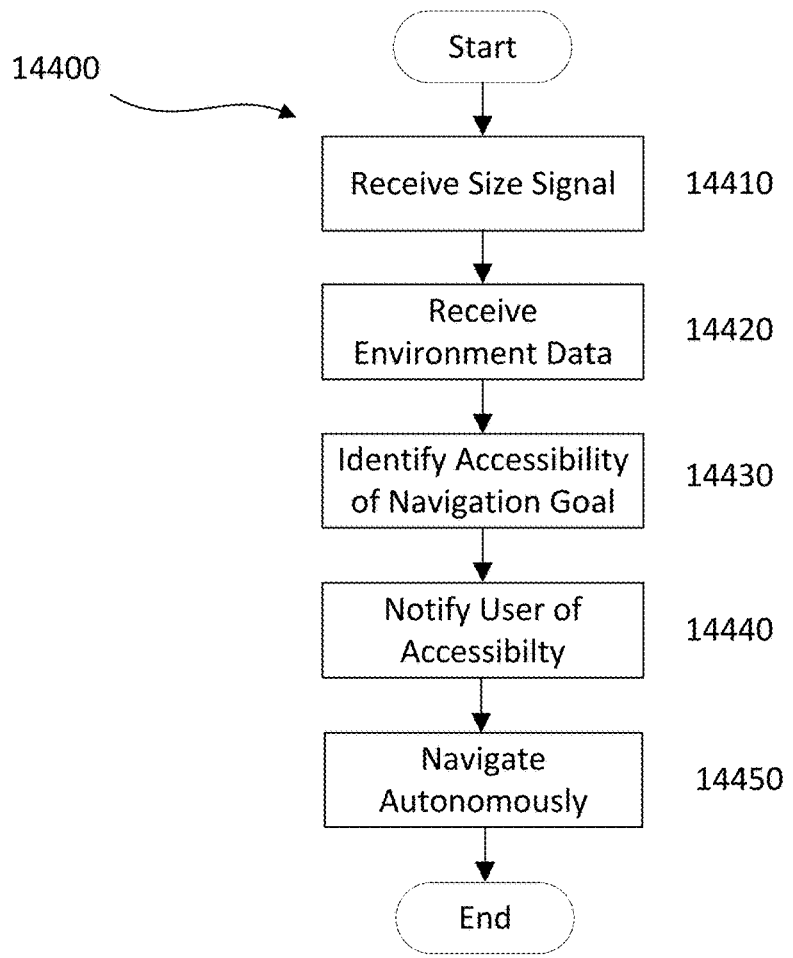

A method 14400 according to an embodiment of the invention is shown in FIG. 53. The method 14400 is a method of controlling the host vehicle 10. In particular, the method 14400 is a method of notifying the user of the accessibility of the navigation goal to the vehicle 10 for autonomous navigation thereto, when an extent of the vehicle 10 is extended in at least one direction by addition of an external feature. The method 14400 may be performed by the control system 14100 and the system 14300 described hereinbefore with reference to FIGS. 50 and 52.

The method 14400 broadly comprises steps of receiving 14410 a size signal indicative of an extent of an external feature associated with a vehicle 10, receiving 14420 environment data indicative of an environment of the vehicle, in dependence thereon, identifying 14430 an accessibility of a navigation goal for the vehicle and notifying 14440 a user of the vehicle of the accessibility of the navigation goal. The method may comprise autonomously navigating 14450 the vehicle to one of the navigation goal and an alternative navigation goal in dependence on the accessibility of the navigation goal.

Referring to FIG. 53, the illustrated embodiment of the method 14400 comprises a step of receiving 14410 a size signal. The size signal is indicative of an extent of an external feature, for example an attachment, associated with a vehicle 10. Typically, the extent of the external feature is received from a user of the vehicle 10.

In step 14420, environment data indicative of an environment of the vehicle is received. The environment data is typically indicative of a clearance extent associated with one or more features of the environment of the vehicle.

In step 14430, an accessibility of a navigation goal for the vehicle is identified. The accessibility is identified in dependence on the size signal and the environment data.

In step 14440, the user is notified of the accessibility of the navigation goal.

In step 14450, the vehicle is autonomously navigated to one of the navigation goal or an alternative navigation goal. The vehicle is autonomously navigated in dependence on the accessibility of the navigation goal.

As a result of method 14400, the user can be notified of the accessibility of the navigation goal to the vehicle, even when the vehicle is provided with an external feature.

Figure 54:
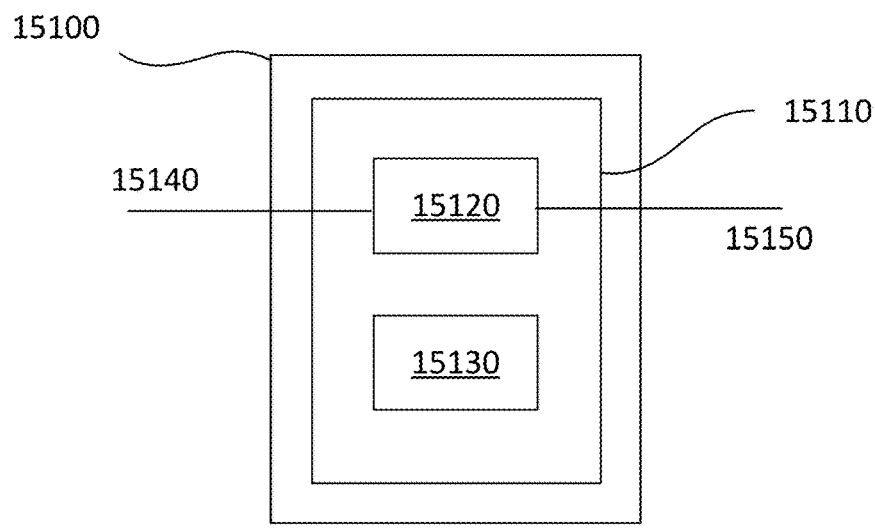

Modified Navigation Definition A control system 15100 or control unit 15100 in accordance with an embodiment of the invention is shown in FIG. 54.

The control system 15100 is for a host vehicle 10 operable in an autonomous mode and a non-autonomous mode. The host vehicle 10 may be substantially as described with reference to FIG. 1 hereinbefore. The control system 15100 comprises one or more controllers 15110. The one or more controllers 15110 include a first controller 15110. The control system 15100 is configured to receive a navigation signal, a request signal and a location signal. The navigation signal is indicative of a navigation definition associated with navigation, in this example of the host vehicle 10, to a first navigation goal. The request signal is indicative of a request by a user of the host vehicle 10 to modify the navigation definition. The location signal is indicative of a location of the host vehicle. The one or more controllers 15110 determine a modified navigation definition associated with navigation of the host vehicle 10 in the autonomous mode via the location indicated by the location signal. The one or more controllers 15110 determine the modified navigation definition after receipt of the request signal, for example in dependence on the request signal being received. The one or more controllers 15110 determine the modified navigation definition when the control system 15100 is in the non-autonomous mode. The one or more controllers 15110 output the modified navigation definition. When subsequently navigating the host vehicle 10 in the autonomous mode, the control system 15100 autonomously controls the host vehicle 10 utilising the modified navigation definition. Therefore, the navigation definition can be modified as required by the user by moving the host vehicle into the location. In examples, the user can drive to a new location such that the modified navigation definition is associated with autonomous navigation of the host vehicle 10 to the new location. The one or more controllers 15110 comprise an electronic processor 15120 having an electrical input 15140 and an electronic memory device 15130 electrically coupled to the electronic processor 15120. The electronic memory device 15130 has instructions stored therein. The electronic processor 15120 is configured to access the memory device 15130 and execute the instructions thereon so as to utilise the location signal to modify the navigation definition in the form of the modified navigation definition. The electrical input 15140 is for receiving the request signal. The electronic processor 15120 includes an electrical output 15150 for outputting the modified navigation definition. The electrical input 15140 and the electrical output 15150 may be combined such as by being formed by an I/O unit or interface unit. For example, the one or more controllers 15110 may comprise an interface to a network forming a communication bus of the host vehicle 10. The interface bus may be an Internet Protocol (IP) based communication bus such as Ethernet, although embodiments of the invention are not limited in this respect.

In some embodiments, the modified navigation definition is associated with autonomous navigation of the host vehicle 10 in accordance with a second navigation goal. The second navigation goal is different to the first navigation goal. In particular, the second navigation goal has associated therewith a destination location different to a destination location associated with the first navigation goal. Further, a navigation route associated with the second navigation goal is different to a navigation route associated with the first navigation goal. In some examples, a vehicle orientation associated with the second navigation goal, such as at the destination location associated with the second navigation goal, is different to a vehicle orientation associated with the first navigation goal, such as at the destination location associated with the first navigation goal.

The one or more controllers 15110 determine a location associated with the second navigation goal in dependence on the location indicated by the location signal, for example, the location associated with the second navigation goal is the location indicated by the location signal. In some examples, the location associated with the second navigation goal is the destination location of the second navigation goal. The location can be a geographic location, for example in a predetermined coordinate system. Alternatively, the location can be a conceptual location, for example "behind the house" In this way, the control system 15100 can be used to change any part of the navigation definition, such as a start location, a destination location or an intermediate location.

The location signal comprises a path signal, for example path data indicative of a path of the host vehicle. In this way, the location signal can be indicative of a plurality of navigation waypoints along the path. Therefore, a plurality of locations associated with the navigation definition can be modified in the form of the modified navigation definition.

In embodiments, the location signal is indicative of a current location of the host vehicle 10. Additionally or alternatively, the location signal is indicative of a previous location of the host vehicle 10, and/or an expected future location of the host vehicle 10. Similarly, in embodiments, the path is a current path of the host vehicle. Additionally or alternatively, the path is a previously path of the host vehicle 10 and/or an expected future path of the host vehicle 10.

The host vehicle 10 is typically navigated via the location, for example via the path, when the vehicle is operating in the non-autonomous mode, in dependence on one or more primary control inputs of the user, such as a steering control input. In this example, the one or more primary control inputs also include an acceleration control input and/or a braking control input.

In embodiments, the path is to the second navigation goal. Therefore, the user can modify at least the end portion of the navigation definition into the modified navigation definition. It will be understood that more or different portions of the navigation definition can be modified instead.

The one or more controllers 15110 replace the navigation definition with the modified navigation definition. The one or more controllers 15110 determine the modified navigation definition in dependence on the navigation definition associated with navigation of the host vehicle 10 to the first navigation goal. Therefore, the whole of the modified navigation definition need not be defined by further movement of the host vehicle 10, but can instead utilise pan of the previous navigation definition for any unmodified parts of the modified navigation definition.

Typically, the request signal is indicative of the request by the user to modify only a portion of the navigation definition. In embodiments, the navigation definition is associated with navigation of the host vehicle 10 to the first navigation goal in the autonomous mode. Therefore, the host vehicle 10 is autonomously navigating in accordance with the navigation definition.

Figure 55:
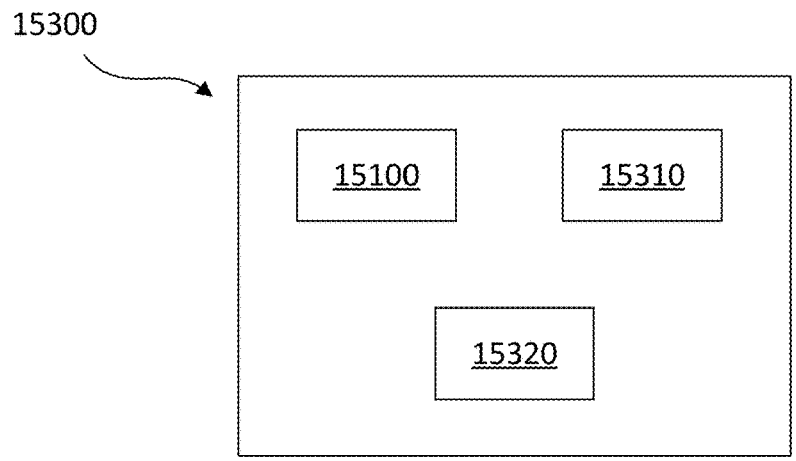

A system 15300 in accordance with an embodiment of the invention is shown in FIG. 55. The system comprises the control system 15100 as described hereinbefore with reference to FIG. 54. The system comprises an input apparatus 15310 and a primary control apparatus 15320. The input apparatus 15310 is configured to receive the request to modify the navigation definition from the user. The input apparatus 15310 is configured to output the request signal to a first controller 15110 of the one or more controllers 15110 of the control system 15100 in dependence on the received request. The primary control apparatus 15320 is configured to receive one or more primary control inputs from the user, for example one or more steering control inputs. The primary control apparatus 15320 is configured to output the request signal to the first controller 15110 of the one or more controllers 15110 to cause the host vehicle 10 to navigate via the location indicated by the location signal in dependence on the one or more primary control inputs. In particular, the location indicated by the location signal is typically the location to which the host vehicle 10 is navigated in dependence on the one or more primary control inputs to the primary control apparatus 15320. The primary control apparatus 15320 typically comprises a steering wheel 15320. The primary control apparatus 15320 can also comprise an acceleration control input, for example an accelerator pedal and a braking control input, for example a brake pedal.

Figure 56:
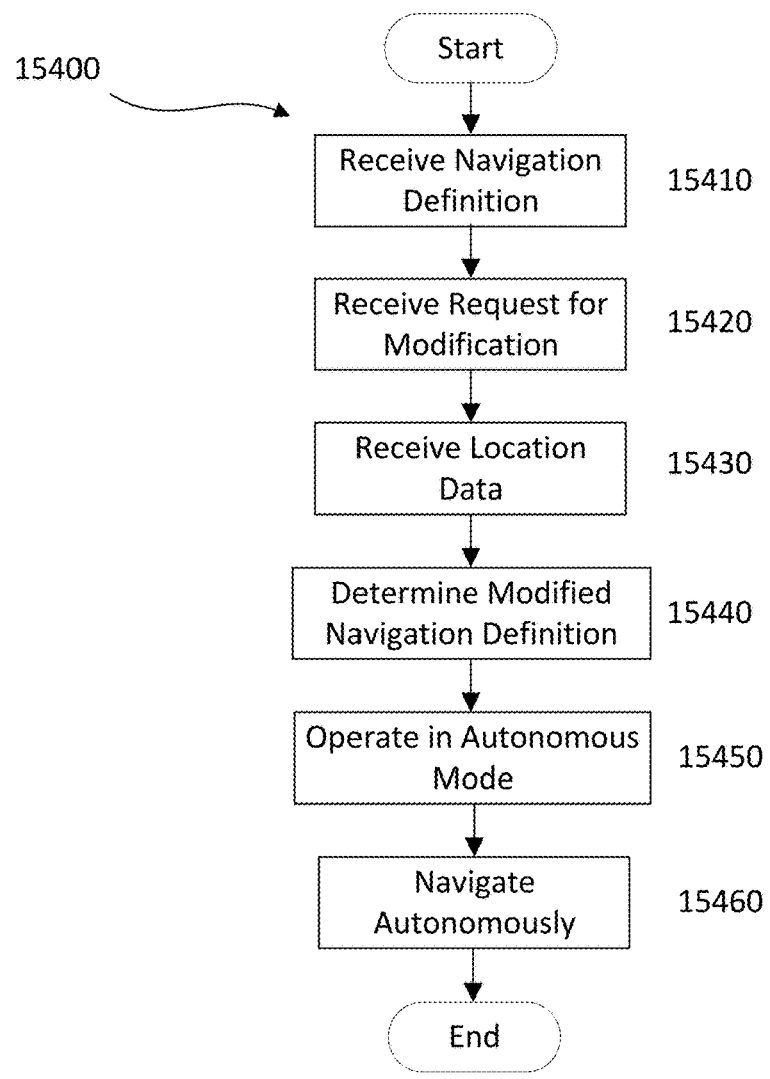

A method 15400 according to an embodiment of the invention is shown in FIG. 56. The method 15400 is a method of controlling the host vehicle 10. In particular, the method 15400 is a method of determining a modified navigation definition and autonomously navigating the vehicle 10 in accordance with the modified navigation definition. The method 15400 may be performed by the control system 15100 and the system 15300 described hereinbefore with reference to FIGS. 54 and 55.

The method 15400 broadly comprises steps of receiving 15410 a navigation definition associated with navigation to a first navigation goal, receiving 15420 a modification request, receiving 15430 a location of the vehicle and, in dependence thereon, determining 15440 a modified navigation definition, operating 15450 the vehicle in an autonomous mode and autonomously navigating 15460 the vehicle in accordance with the modified navigation definition.

Referring to FIG. 56, the illustrated embodiment of the method 15400 comprises a step of receiving 15410 a navigation definition. The navigation definition is associated with navigation, for example autonomous navigation of a vehicle 10, to a first navigation goal. The navigation definition is received when the vehicle 10 is operating in a non-autonomous mode.

In step 15420, a request by a user of the vehicle 10 to modify the navigation definition is received. The request is typically to modify a portion of the navigation definition, for example, of the navigation definition, only a portion of the navigation definition. Prior to receiving the request, in embodiments the vehicle is navigated autonomously to the first navigation goal.

In step 15430, location data indicative of a location of the vehicle 10 is received. Typically, the location data is indicative of the location of the vehicle 10 following navigation of the vehicle 10 in dependence on one or more primary control inputs by the user. The navigation of the vehicle to the location in dependence on the one or more primary control inputs can be before or after the request by the user to modify the navigation definition.

In step 15440, a modified navigation definition is determined. The modified navigation definition is associated with navigation of the vehicle 10 in the autonomous mode. The modified navigation definition is determined in dependence on the request being received. The modified navigation definition is determined in dependence on the navigation definition and the location data.

In step 15450, the vehicle 10 is operated in the autonomous mode.

In step 15460, the vehicle 10 is autonomously navigated in accordance with the modified navigation definition.

As a result of method 15400, the modified navigation definition can be determined to alter operation of the vehicle 10 in the autonomous mode. If the user is not satisfied with the navigation definition, the vehicle can be re-navigated to redefine at least a portion of the navigation definition.

Supervised Navigation

Figure 57:
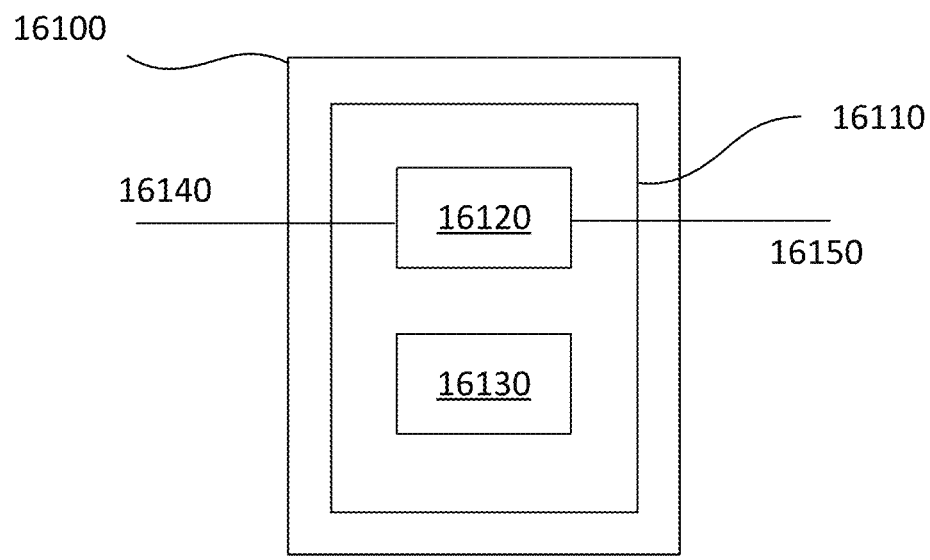

A control system 16100 or control unit 16100 in accordance with an embodiment of the invention is shown in FIG. 57.

The control system 16100 is for a host vehicle 10 operable in an autonomous mode and a non-autonomous mode. The host vehicle 10 may be substantially as described with reference to FIG. 1 hereinbefore. The control system 16100 comprises one or more controllers 16110. The one or more controllers 16110 include a first controller 16110. The control system 16100 is configured to receive vehicle control data, a request signal, a presence signal and a confirmation signal. Typically, the request signal and the presence signal are received when the control system 16100 is operating in the non-autonomous mode. The vehicle control data is for utilisation when the host vehicle 10 is navigating to a navigation goal in an autonomous mode. Typically, the vehicle control data comprises one or more control instructions for at least one locomotive component of the host vehicle 10. The request signal is indicative of a navigation request by a user of the host vehicle 10. The navigation request is for navigation of the host vehicle to the navigation goal, typically in the autonomous mode. The presence signal is indicative of a presence of the user in the host vehicle 10. In other words, the presence signal is indicative of the presence or absence of the user in the host vehicle 10. The one or more controllers 16110, subsequent to receipt of the request signal, for example in dependence on the request signal being received, output a notification signal. The notification signal is to notify the user that the host vehicle 10 can navigate to the navigation goal in the autonomous mode in the absence of the user. The notification signal is output in dependence on the presence signal, for example in dependence on the presence signal being indicative of the user being in the host vehicle 10. When operating in a non-autonomous mode, for example a supervised mode in which the user is present in the host vehicle 10, the one or more controllers 16110 autonomously navigate the host vehicle 10 towards the navigation goal in dependence on receipt of the confirmation signal. The confirmation signal is indicative of confirmation of the navigation request by the user for navigation of the host vehicle 10 in the presence of the user. The one or more controllers 16110 autonomously navigate the host vehicle 10 towards the navigation goal in the supervised mode utilising the vehicle control data. Therefore, the host vehicle 10 can autonomously navigate towards the navigation goal in the supervised mode with the user present in the host vehicle 10, even though the vehicle control data can be utilised to autonomously navigate the host vehicle 10 to the navigation goal without the presence of the user in the host vehicle 10. The one or more controllers 16110 comprise an electronic processor 16120 having an electrical input 16140 and an electronic memory device 16130 electrically coupled to the electronic processor 16120. The electronic memory device 16130 has instructions stored therein. The electronic processor 16120 is configured to access the memory device 16130 and execute the instructions thereon so as to utilise the vehicle control data to autonomously navigate the host vehicle 10 to the navigation goal in the presence of the user. The electrical input 16140 is for receiving the vehicle control data, the request signal, the presence signal and the confirmation signal. The electronic processor 16120 includes an electrical output 16150 for outputting the notification signal. The electrical input 16140 and the electrical output 16150 may be combined such as by being formed by an I/O unit or interface unit. For example, the one or more controllers 16110 may comprise an interface to a network forming a communication bus of the host vehicle 10. The interface bus may be an Internet Protocol (IP) based communication bus such as Ethernet, although embodiments of the invention are not limited in this respect.

In some embodiments, the control system 16100 is configured to receive a validation signal. The validation signal is indicative of a validation of the vehicle control data by the user of the host vehicle 10 after the host vehicle 10 has completed autonomous navigation towards the navigation goal in the supervised mode. In other words, if the user is satisfied with the performance of the host vehicle 10 during autonomous navigation to the navigation goal in the supervised mode, the vehicle control data can be validated. In future, the user will be satisfied that the host vehicle 10 can autonomously navigate to the navigation goal in the absence of the user, utilising the vehicle control data. Typically, the one or more controllers 16110 store data, in a memory. The data is associated with the autonomous navigation towards the navigation goal. The data includes validation data indicative of the validation of the vehicle control data. Therefore, the validation of the vehicle control data by the user can be stored in memory and checked at another time.

The control system 16100 is configured to receive a control signal. The control signal is indicative of a control request by the user to deviate from a navigation path of the host vehicle 10 during autonomous navigation towards the navigation goal in the supervised mode. In other words, when the user is present in the host vehicle 10 during autonomous navigation to the navigation goal in the supervised mode, the user can modify the movement of the host vehicle 10 along a determined navigation path. For example, the user may want the host vehicle 10 to navigate along a different navigation path, such as further to the left or to the right. In another example, the user may be dissatisfied with the navigation path of the host vehicle 10, and so may brake the host vehicle 10 to a stop. In this way, the one or more controllers 16110 deviate from the navigation path in dependence on the control signal received. Typically, when the host vehicle 10 is autonomously navigating to the navigation goal in an unsupervised mode, where the user is not required to be present in the host vehicle 10, the one or more controllers 16110 can not deviate from the navigation path in dependence on the control signal. In other words, the one or more controllers 16110 deviate from the navigation path during navigation towards the navigation goal in dependence on the control signal in only the supervised mode of the supervised mode and the unsupervised mode.

It will be understood that there may be further control signals which cause the one or more controllers 16110 to deviate from the navigation path in both the supervised mode and the unsupervised mode.

It will be understood that typically, the control signal is a primary control input in the form of a longitudinal movement control input, such as an acceleration control input or a braking control input. Alternatively or additionally, the primary control input can be in the form of a lateral movement control input, such as a steering control input.

The control system 16100 is configured to receive an availability signal. The availability signal is indicative of an availability of autonomous navigation of the host vehicle 10 to the navigation goal in the unsupervised mode. In other words, when autonomous navigation of the host vehicle 10 can be performed without the presence of the user, then the availability signal can be received. The one or more controllers 16110 output a further notification signal. The further notification signal is to notify the user of an availability of operation of the host vehicle 10 in the supervised mode, such as in the presence of the user in the host vehicle 10, for navigation towards the navigation goal. The further notification signal is output in dependence on autonomous navigation of the host vehicle to the navigation goal in the unsupervised mode being available. Therefore, the control system 16100 can make the user aware that autonomous navigation of the host vehicle 10 to the navigation goal is available in both the supervised mode and the unsupervised mode. The user can then select which of the unsupervised mode and the supervised mode to choose.

Figure 58:
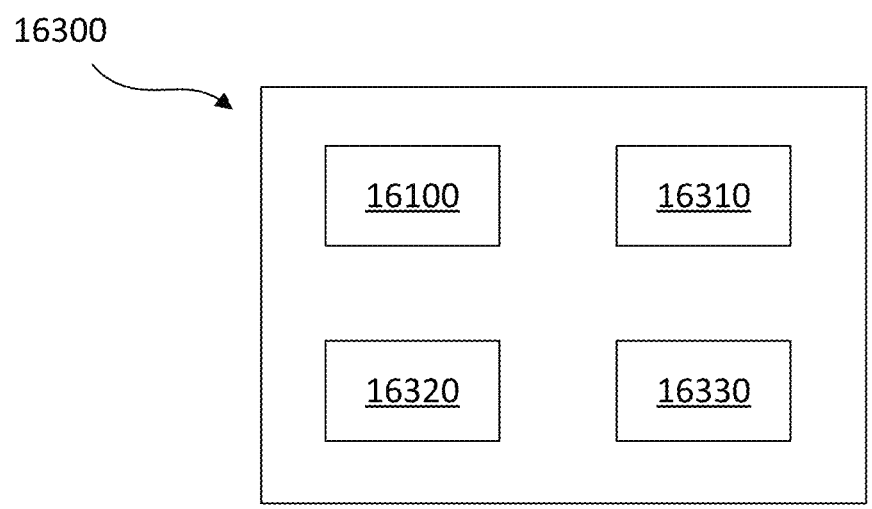

A system 16300 in accordance with an embodiment of the invention is shown in FIG. 58. The system comprises the control system 16100 as described hereinbefore with reference to FIG. 57. The system comprises an input apparatus 16310, a control apparatus 16320 in the form of a primary control apparatus 16320 and a notification means 16330 in the form of a notification unit 16330. The input apparatus 16310 is configured to receive the confirmation by the user. The input apparatus 16310 is configured to output the confirmation signal to the control system 16100 in dependence on the received confirmation by the user. Typically, the input apparatus 16310 is an input device, such as a mechanical button or an electronic button. It will be understood that alternative forms of input apparatus 16310 are possible. The primary control apparatus 16320 is configured to receive the control request by the user. The primary control apparatus 16320 is configured to output the control signal to the control system 16100 in dependence on the received control request. Typically, the control request includes at least one of a longitudinal movement control input, such as an acceleration control input or a braking control input, and a lateral movement control input, such as a steering control input. In other words, the primary control apparatus 16320 typically comprises a steering wheel, brake pedal or accelerator pedal of the host vehicle 10. The notification unit 16330 is configured to receive the notification signal from the control system 16100. The notification unit 16330 is configured to output the user notification in dependence on the notification signal. In other words, the notification unit 16330 is to notify the user that the host vehicle 10 can navigate to the navigation goal in the autonomous mode in the absence of the user. Typically, the notification unit 16330 is in the form of an electronic display 16330. It will be understood that the notification unit 16330 can alternatively or additionally comprise an audio transducer and alternatively or additionally a haptic notification means.

Figure 59:
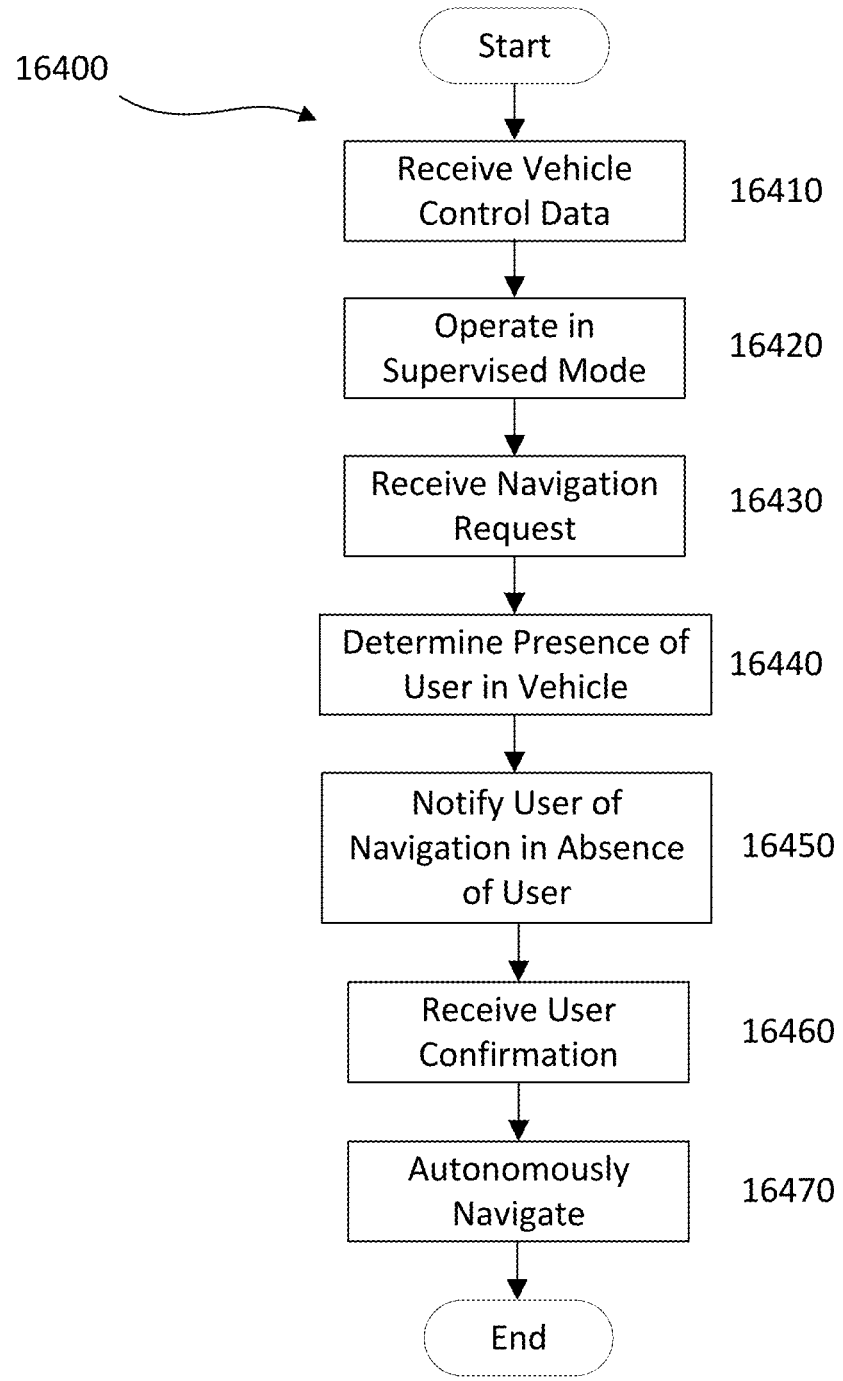

A method 16400 according to an embodiment of the invention is shown in FIG. 59. The method 16400 is a method of controlling the host vehicle 10. In particular, the method 16400 is a method of autonomously navigating the vehicle 10 to the navigation goal in the presence of a user, utilising vehicle control data for causing the vehicle 10 to navigate to the navigation goal in an autonomous mode. The method 16400 may be performed by the control system 16100 and the system 16300 described hereinbefore with reference to FIGS. 57 and 58.

The method 16400 broadly comprises steps of receiving 16410 vehicle control data, receiving 16430 a navigation request, operating 16420 the vehicle in a supervised mode, determining 16440 a presence of the user in the vehicle, notifying 16450 the user that autonomous navigation of the vehicle is available with the user in the vehicle, receiving 16460 confirmation of the navigation request to navigate the vehicle with the user in the vehicle, and autonomously navigating 16470 the vehicle to the navigation goal with the user in the vehicle.

Referring to FIG. 59, the illustrated embodiment of the method 16400 comprises a step of receiving 16410 vehicle control data. The vehicle control data is for causing the vehicle 10 to navigate to a navigation goal in an unsupervised mode. The vehicle control data can be received when the vehicle is operating in the unsupervised mode or a supervised mode, or an autonomous mode or a non-autonomous mode. Typically the vehicle control data is utilised during autonomous navigation of the vehicle 10 to the navigation goal in the unsupervised mode. The vehicle control data can include one or more control instructions to control one or more locomotive components of the vehicle 10 for use to move the vehicle 10 to the navigation goal.

In step 16420, the vehicle 10 is operated in the supervised mode. In other words, the vehicle is operated under supervision of a user. It will be understood that the vehicle 10 is not operating in the supervised mode if the vehicle 10 is operating in the absence of a user in a vicinity of the vehicle and with an ability to provide a control input to the vehicle to deviate the vehicle 10 from a navigation path of the vehicle 10 during navigation to the navigation goal, for example to stop the vehicle 10.

In step 16430, a navigation request is received. The navigation request a request by the user for navigation of the vehicle 10 to the navigation goal. Typically, the navigation request is received while the vehicle 10 is operating in the supervised mode.

In step 16440, a presence of the user, for example in the vehicle, is determined. Therefore, the method 16400 determines if the user is present in the vehicle 10.

In step 16450, the user is notified that the vehicle 10 can navigate to the navigation goal in the autonomous mode in the absence of the user. The user is notified in dependence on the user being determined to be present in the vehicle 10. In other words, the user is made aware that because autonomous navigation to the navigation goal is possible in the absence of the user, the user need not stay in the vehicle 10 and can instead leave the vehicle 10 if they desire.

In step 16460, a confirmation of the navigation request by the user is received. The confirmation is for the vehicle 10 to autonomously navigate to the navigation goal in the presence of the user. In other words, the user confirms that the vehicle 10 should navigate to the navigation goal even though the user is present in the vehicle 10. In this way, the user can validate the movements of the vehicle 10 during navigation of the vehicle 10 to the navigation goal.

In step 16470, the vehicle is autonomously navigated towards the navigation goal in the presence of the user. The vehicle control data is utilised to autonomously navigate the vehicle towards the navigation goal. The vehicle is autonomously navigated towards the navigation goal in dependence on the received confirmation, for example in dependence on the confirmation being received.

As a result of method 16400, the vehicle 10 can be autonomously navigated to the navigation goal in the presence of the user, even when the user is not required to be in the vehicle. For example, the vehicle 10 may be capable of autonomously navigating to the navigation goal in the absence of the user, but may offer the user the possibility of autonomous navigation to the navigation goal whist the user is in the vehicle 10, for example for the user to validate that the vehicle is autonomously navigating to the navigation goal along an acceptable navigation path.

Modified Portion of Navigation Goal

Figure 60:
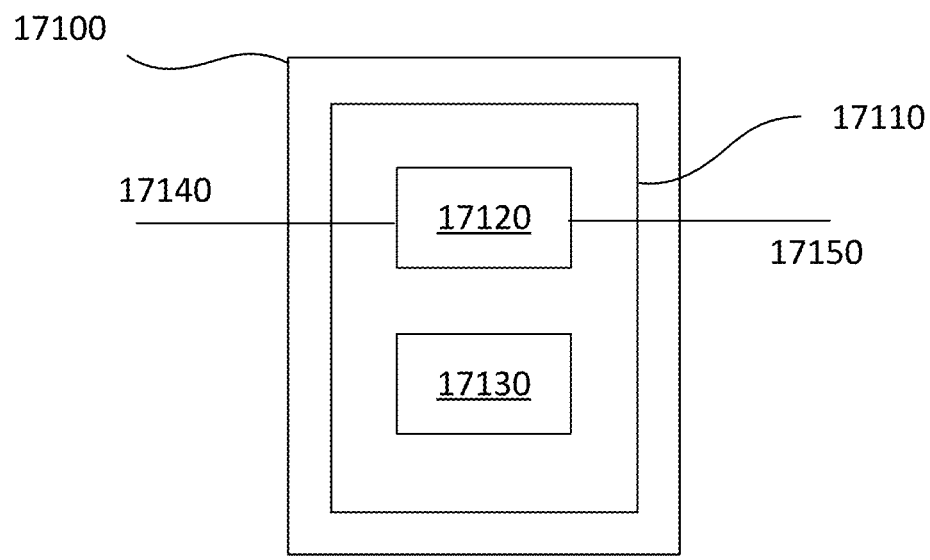

A control system 17100 or control unit 17100 in accordance with an embodiment of the invention is shown in FIG. 60.

The control system 17100 is for a host vehicle 10 operable in an autonomous mode and a non-autonomous mode. The host vehicle 10 may be substantially as described with reference to FIG. 1 hereinbefore. The control system 17100 comprises one or more controllers 17110. The one or more controllers 17110 include a first controller 17110. The control system 17100 is configured to receive an availability signal, a rejection signal and a request signal. The availability signal is indicative of an availability of autonomous navigation by the host vehicle 10, operating in the autonomous mode, in accordance with a navigation goal. The navigation goal is associated with, for example includes, a first navigation definition for autonomous navigation in accordance therewith. The navigation goal is associated with, for example includes, a second navigation definition for autonomous navigation in accordance therewith. The second navigation definition is for autonomous navigation in accordance therewith subsequent to navigation in accordance with the first navigation definition. In other words, autonomous navigation in accordance with the navigation goal can be achieved by autonomous navigation in accordance with the first navigation definition followed by autonomous navigation in accordance with the second navigation definition. It will be understood that the first navigation definition defines a first portion of a navigation path for the host vehicle 10 to navigate, and the second navigation definition defines a second portion of the navigation path for the host vehicle 10 to navigate. The rejection signal is indicative of a rejection by the user of autonomous navigation in accordance with the second navigation definition of the navigation goal. Typically, the rejection signal is not indicative of a rejection of autonomous navigation in accordance with the first navigation definition. In other words, of the first navigation definition and the second navigation definition, the rejection signal is only indicative of the rejection by the user of autonomous navigation in accordance with the second navigation definition. The request signal is indicative of a request for the host vehicle 10 to autonomously navigate in accordance with a third navigation definition of the navigation goal subsequent to navigation in accordance with the first navigation definition. The third navigation definition is different to the second navigation definition. In other words, the request is for the host vehicle 10 to autonomously navigate in accordance with the first navigation definition and subsequently to autonomously navigate in accordance with the third navigation definition. The third navigation definition is typically part of the navigation goal, such that navigation in accordance with the navigation goal can be achieved by navigation in accordance with the first navigation definition and subsequently navigation in accordance with the third navigation definition. For example, the navigation goal may be defined in such a way that navigation in accordance with the first navigation definition and the second navigation definition, and navigation in accordance with the first navigation definition and the third navigation definition can each be considered to be autonomous navigation of the host vehicle 10 in accordance with the navigation goal. It will be understood that in some embodiments, the rejection signal and the request signal may be combined into a single signal. The one or more controllers 17110, subsequent to receipt of the availability signal, for example in dependence on the availability signal being received, output a notification signal. The notification signal is to notify the user of the host vehicle of the availability of autonomous navigation in accordance with the first navigation definition and the second navigation definition in order to achieve autonomous navigation of the host vehicle 10 in accordance with the navigation goal. The one or more controllers 17110, subsequent to receipt of the rejection signal and the request signal, for example in dependence on the request signal and the rejection signal being received, output a navigation signal. The navigation signal is to cause the host vehicle 10 to navigate autonomously in accordance with the first navigation definition and the third navigation definition of the navigation goal instead of the second navigation definition. Advantageously, the user can request a slightly different navigation whilst still navigating in accordance with the navigation goal. For example, the navigation goal may be a parking goal, such as parking the host vehicle in any of a plurality of parking spaces. The second navigation definition corresponds to parking the host vehicle 10 in a first parking space. The third navigation definition corresponds to parking the host vehicle 10 in a second parking space. It will be understood that the first navigation definition can be associated with autonomous navigation of the host vehicle 10 to a vicinity of the plurality of parking spaces, such as to a point of first divergence between a first navigation path from the host vehicle to the first parking space and a second navigation path from the host vehicle 10 to the second parking space. The one or more controllers 17110 comprise an electronic processor 17120 having an electrical input 17140 and an electronic memory device 17130 electrically coupled to the electronic processor 17120. The electronic memory device 17130 has instructions stored therein. The electronic processor 17120 is configured to access the memory device 17130 and execute the instructions thereon so as cause the host vehicle to navigate autonomously in accordance with the first navigation definition and the third navigation definition whereby to navigate autonomously in accordance with the navigation goal in the autonomous mode. The electrical input 17140 is for receiving the availability signal, the rejection signal and the request signal. The electronic processor 17120 includes an electrical output 17150 for outputting the notification signal and the navigation signal. The electrical input 17140 and the electrical output 17150 may be combined such as by being formed by an I/O unit or interface unit. For example, the one or more controllers 17110 may comprise an interface to a network forming a communication bus of the host vehicle 10. The interface bus may be an Internet Protocol (IP) based communication bus such as Ethernet, although embodiments of the invention are not limited in this respect.

Typically, the second navigation definition and the third navigation definition are associated with an end portion of the autonomous navigation in accordance with the navigation goal. In one example, the second navigation definition is associated with a destination location and a first destination orientation. The third navigation definition is associated with the same destination location and a second destination orientation. The second destination orientation is different from the first destination orientation. In other words, autonomous navigation of the host vehicle 10 in accordance with the first navigation definition and the second navigation definition will navigate the host vehicle 10 to the destination location at the first destination orientation. Autonomous navigation of the host vehicle 10 in accordance with the first navigation definition and the third navigation definition will navigate the host vehicle 10 to the destination location at the second destination orientation. Typically, the first destination orientation is separated from the second destination orientation by 180 degrees. In a parking space, the two orientations may be referred to as a nose-out parking orientation and a nose-in parking orientation.

In another example, the second navigation definition is associated with a first destination location and the third navigation definition is associated with a second destination location, as described hereinbefore in relation to the plurality of parking spaces.

The availability signal is typically indicative of the host vehicle 10 being within a predetermined distance of a navigable area. In one example, the navigable area has associated therewith each of the first navigation definition, the second navigation definition and the third navigation definition. For example, the navigable area can be a car park, sometimes referred to as a parking lot, including a plurality of parking spaces. The car park may be a private car park associated with a home of the user, or may be a public car park, for example associated with a commercial building, such as an office, a hotel or a shop. The one or more controllers 17110 output the notification signal in dependence on the host vehicle 10 being within the predetermined distance of the navigable area.

The one or more controllers 17110 output a further notification signal. The further notification signal is to notify the user of an availability of autonomous navigation in accordance with the third navigation definition of the navigation goal. In his example, the further notification signal is output subsequent to receiving the rejection signal, for example in dependence on the rejection signal being received. In other examples, it will be understood that the further notification signal can be output before receipt of the rejection signal.

Figure 61:
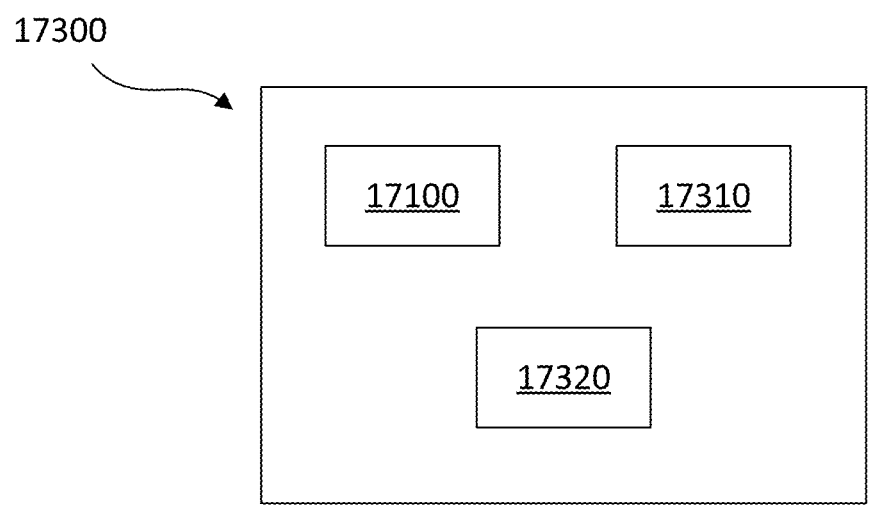

A system 17300 in accordance with an embodiment of the invention is shown in FIG. 61. The system 17300 comprises the control system 17100 as described hereinbefore with reference to FIG. 60. The system comprises an input apparatus 17310 and a notification means 17320 in the form of a notification unit 17320. The input apparatus 17310 is configured to receive the request from the user for the host vehicle 10 to navigate autonomously in accordance with the third navigation definition. The input apparatus 17310 is configured to output the request signal to the control system 17100 in dependence on the received request, for example in dependence on the request being received. The notification means 17320 is configured to receive the notification signal from the control system 17100. The notification means 17320 is configured to output a user notification that autonomous navigation in accordance with the first navigation definition and the second navigation definition is available in dependence the received notification signal. In this example, the notification means 17320 is configured to receive the further notification signal. The notification means 17320 is configured to output a further user notification in dependence on the further notification signal, for example in dependence on the further notification signal being received. The further user notification is to notify the user that autonomous navigation in accordance with the third navigation definition is available.

Figure 62:
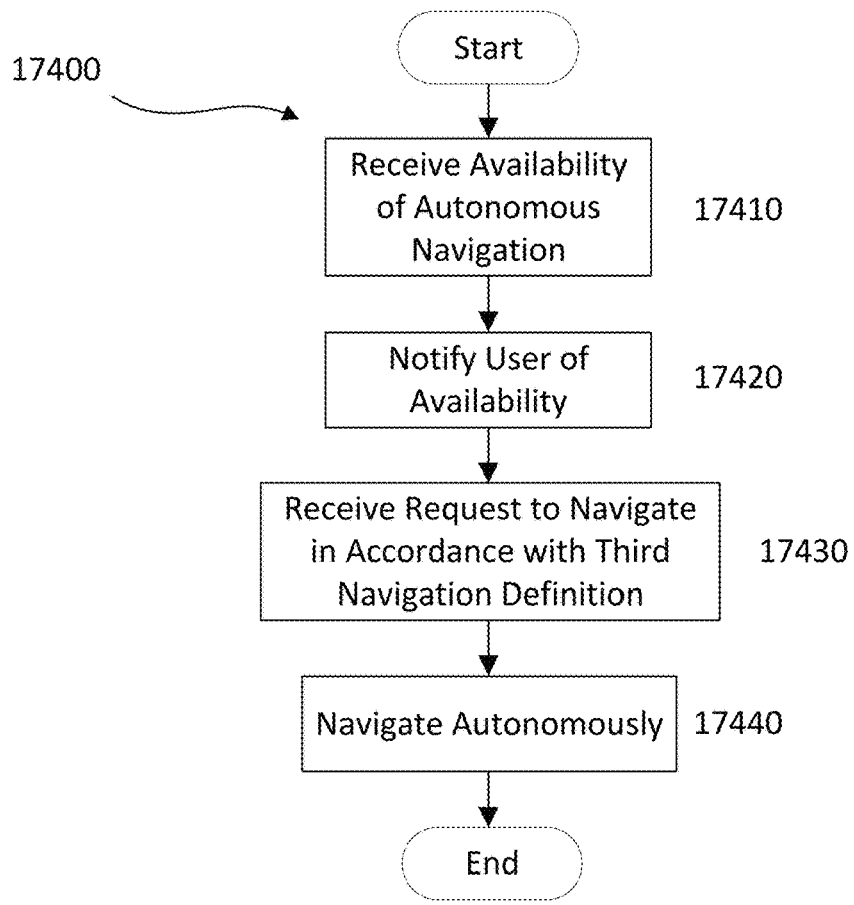

A method 17400 according to an embodiment of the invention is shown in FIG. 62. The method 17400 is a method of controlling the host vehicle 10. In particular, the method 17400 is a method of autonomously navigating the vehicle 10 in accordance with a first navigation definition and a third navigation definition instead of a second navigation definition. The method 17400 may be performed by the control system 17100 and the system 17300 described hereinbefore with reference to FIGS. 60 and 61.

The method 17400 broadly comprises steps of receiving 17410 an availability of autonomous navigation by a vehicle in accordance with a first navigation definition and subsequently in accordance with a second navigation definition, notifying 17420 a user of the availability of autonomous navigation, receiving 17430 a request from the user to navigate in accordance with a third navigation definition and, in dependence thereon, autonomously navigating 17440 the vehicle in accordance with the first navigation definition and the third navigation definition instead of the second navigation definition.

Referring to FIG. 62, the illustrated embodiment of the method 17400 comprises a step of receiving 17410 an availability of autonomous navigation by a vehicle 10 operating in an autonomous mode. The autonomous navigation by the vehicle 10 is in accordance with a navigation goal. The navigation goal includes a first navigation definition for autonomous navigation in accordance therewith and a second navigation definition for autonomous navigation in accordance therewith subsequent to navigation in accordance with the first navigation definition. In other words, the autonomous navigation by the vehicle 10 in accordance with the navigation goal comprises autonomous navigation along a first portion of a navigation path and autonomous navigation along a second portion of the navigation path. The first portion and the second portion can be defined by the first navigation definition and the second navigation definition respectively. Ultimately, the autonomous navigation in accordance with the navigation goal is to a navigation destination. The navigation destination in one example can be any of a plurality of parking spaces. Alternatively, the navigation destination can be a specific parking space, in any of a plurality of orientations. In some examples, the navigation destination can be a specific parking space in a specific orientation of the vehicle 10. It will be understood that locations other than parking locations can be the navigation destination of the navigation goal.

In step 17420, a user of the vehicle 10 is notified of an availability of autonomous navigation in accordance with the first navigation definition and the second navigation definition. The user is notified subsequent, for example in dependence on, the availability being received in step 17410. It will be understood that the user can be notified of the availability of autonomous navigation in accordance with the first navigation definition in one or more of a plurality of different ways. For example, the user can be notified by an electronic display. As described hereinbefore, when the user is notified of the availability of autonomous navigation in accordance with the first navigation definition and the second navigation definition, of the second navigation definition and the third navigation definition, the user may be notified of the availability of autonomous navigation in accordance with only the second navigation definition. In this way, the user may not be made aware of the availability of an alternative to the second navigation definition until it has been rejected as described further hereinafter.

In step 17430, a request from the user of the vehicle 10 is received. The request is for the vehicle 10 to navigate autonomously in accordance with a third navigation definition of the navigation goal. The request is typically received when operating in a non-autonomous mode. As described hereinbefore, the third navigation definition is representative of an alternative to the second navigation definition. In other words, the vehicle 10 can navigate in accordance with the navigation goal by navigating in accordance with the first navigation definition and the second navigation definition, or by navigating in accordance with the first navigation definition and the third navigation definition. In some embodiments, the method 17400 comprises receiving a rejection by the user of autonomous navigation in accordance with the second navigation definition. The rejection can precede the request in step 17430. In other examples, the rejection can be part of the request from the user in step 17430. The rejection can be explicit or implicit in the actions of the user.

In step 17440, the vehicle 10 is navigated autonomously in accordance with the first navigation definition and the third navigation definition of the navigation goal. As described hereinbefore, the vehicle 10 is navigated in accordance with the third navigation definition instead of navigation in accordance with the second navigation definition.

Step 17440 is typically performed subsequent to, for example in dependence on, receiving the request from the user.

As a result of method 17400, the vehicle 10 can be autonomously navigated in accordance with a third navigation definition instead of a second navigation definition while autonomously navigating in accordance with a navigation goal. Therefore, the second navigation definition associated with navigation in accordance with the navigation goal can be replaced or changed, without changing or determining every navigation definition otherwise used for navigation in accordance with the navigation goal, such as the first navigation definition.

Vehicle

Figure 63:
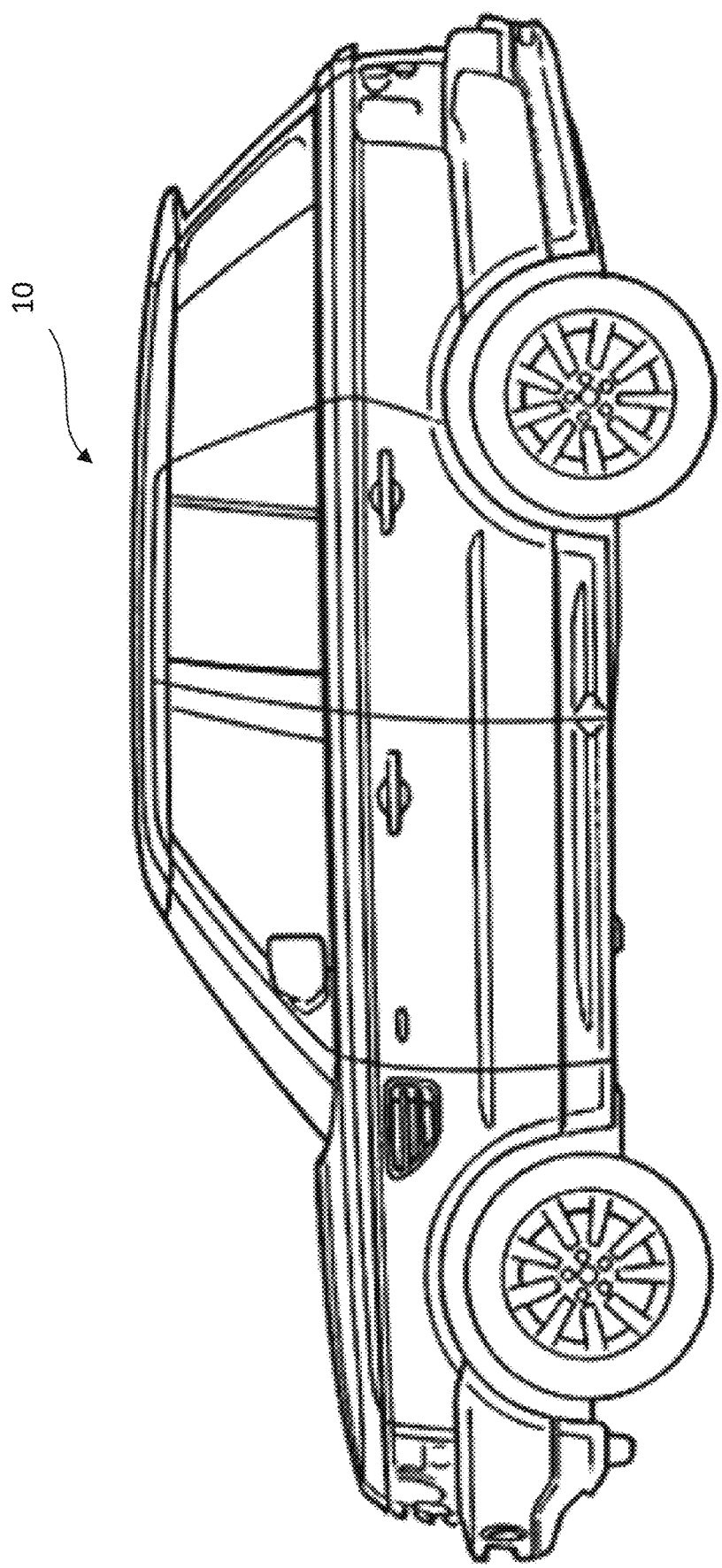
FIG. 63 shows an illustrative example of a host vehicle as described herein.

A representative image of the host vehicle 10 for comprising any of the control systems or systems or associated with performing any of the methods described hereinbefore is shown in FIG. 63.

Figure 64:
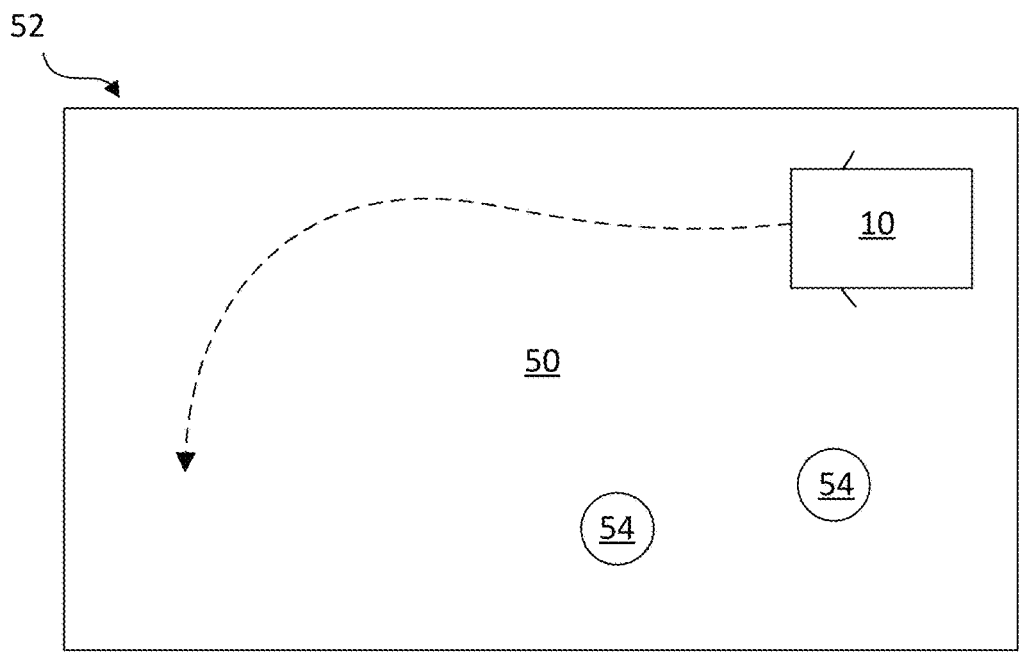

A navigable area 50 for navigation of the host vehicle 10 therein in accordance with any of the methods described hereinbefore is shown in FIG. 64. In other words, in autonomous driving modes of the host vehicle 10 described herein, it will be understood that any of the control systems described herein can control the host vehicle 10 to autonomously navigate in the navigable area 50 utilising a map of the navigable area 50. The host vehicle 10 typically autonomously navigates in the navigable area 50 by navigating in accordance with a navigation goal, for example to a navigation goal, utilising the map of the navigable area 50. Thus, the map of the navigable area 50 of the host vehicle 10 can be used during autonomous navigation of the host vehicle 10 in the navigable area 50, for example in accordance with the navigation goal.

The map comprises data indicative of one or more features 54 of an environment 52 associated with the navigable area 50, such as localised features. In one example, the map comprises a retrievable map stored on a memory means, such as a non-transitory computer readable medium associated with the host vehicle 10, or on a cloud-based server accessible by the control system of the host vehicle 10. Such maps may be uploaded by the user to a cloud-based server. The uploaded map may be shared with other users. Maps uploaded by other users may likewise be shared, such that a user has access to a number of maps which may be downloaded directly from the cloud-based server. In some embodiments, one or more maps may additionally or alternatively be provided by a third-party service provider, such as a map and/or navigation service company or a provider which generates a map of a particular navigable area on request as a service and makes the map available, whether via an on-line source or otherwise.

In another example, the map may be built by a driver teaching the host vehicle 10 the navigable area 50 in an initial mapping process. The map may be built by the driver teaching the host vehicle 10 a navigable area 50 in an independent mapping process by driving the host vehicle 10 around the navigable area 50 to provide guidance to the host vehicle 10. While the driver drives the host vehicle 10 around the navigable area 50, one or more sensing means associated with the host vehicle 10, such as one or more on-board vehicle sensors, scan at least a portion of the navigable area 50 to gradually build a map of the scanned area, optionally including landmarks, features or environmental attributes. In this way, the map can be used for later localisation and/or autonomous navigation of the host vehicle 10. The initial mapping process may be selected by the user of the host vehicle 10 for teaching the host vehicle 10 the map of the navigable area 50. Alternatively, the initial mapping process may be a passive mapping process in which the map is built during movement of the host vehicle 10 in the navigable area 50. Where the initial mapping process is the passive mapping process, the user may not be notified that the host vehicle 10 is building the map whilst the host vehicle 10 is moving in the navigable area 50. Thus, the user can be made aware that the map of the navigable area 50 is being or has been built only after building the map has already started.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A control system for a host vehicle operable in an autonomous mode and a non-autonomous mode, the control system comprising one or more controllers configured to:
receive, when operating in the non-autonomous mode:
a mode signal indicative of the host vehicle operating in a training mode; and
environment data indicative of a sensed environment of the host vehicle during a first manoeuvre by the host vehicle from a first location to a first navigation goal;
wherein, in the training mode, the one or more controllers:
identify a navigable area in a vicinity of the first manoeuvre based on the environment data, the navigable area being suitable to contain a plurality of possible navigation paths for subsequent navigation of the host vehicle, operating in the autonomous mode, from the first navigation goal as a start location to a second navigation goal within the navigable area, the second navigation goal being different than the first navigation goal; and output vehicle control data indicative of the navigable area, wherein when subsequently navigating to the second navigation goal in the autonomous mode, the control system utilises the vehicle control data to autonomously control the host vehicle.

2. The control system of claim 1 wherein the one or more controllers collectively comprise:

at least one electronic processor having an input for receiving the mode signal and the environment data; and at least one electronic memory device associated with the at least one electronic processor and having instructions stored therein;

and wherein the at least one electronic processor is configured to access the at least one memory device and execute the instructions to utilise the vehicle control data to autonomously navigate to the second navigation goal.

3. The control system of claim 1, wherein a location of the second navigation goal substantially corresponds to the first location.

4. The control system of claim 1, wherein the environment data is indicative of the sensed environment of the host vehicle proximal to the host vehicle during the first manoeuvre.

5. The control system of claim 4, wherein the environment data is indicative of the sensed environment of the host vehicle at or generally rearward of a rear of the host vehicle during the first manoeuvre.

6. The control system of claim 5, wherein the environment data is indicative of the sensed environment of the host vehicle at or generally forward of a front of the host vehicle during the first manoeuvre.

7. The control system of claim 1, wherein:

the control system is configured to receive, when operating in the autonomous mode, a goal signal indicative of the second navigation goal, and in the autonomous mode, the one or more controllers determine the navigation path based on the navigable area and the goal signal and output a navigation signal to cause the host vehicle to navigate autonomously to the second navigation goal along the determined navigation path.

8. The control system of claim 7, wherein in the determined navigation path, the host vehicle is to arrive forwardly at the second navigation goal.

9. The control system of claim 1, wherein the control system is configured to output a notification signal to cause output of a user notification for notifying a user of the host vehicle of an availability of autonomous navigation of the host vehicle to the second navigation goal, and wherein the one or more controllers cause the control system to output the notification signal based on the navigable area.

10. The control system of claim 1 wherein:

the one or more controllers include a first controller for receiving the mode signal; and the control system comprises an input apparatus, operable by a user of the host vehicle to provide the mode signal to the first controller.

11. The control system of claim 1, comprising a primary control apparatus to receive one or more primary control inputs from the user to cause the host vehicle to perform the first manoeuvre.

12. The control system of claim 1, comprising sensing means configured to output the environment data to the one or more controllers.

13. The control system of claim 12, wherein the sensing means comprise at least one sensor for sensing the environment of the host vehicle during the first manoeuvre.

14. The control system of claim 12, wherein the sensing means comprises a first sensing means configured to be directed generally forward from the host vehicle, and a second sensing means configured to be directed generally rearward from the host vehicle.

15. A vehicle comprising the control system of claim 1, and a sensing means arranged to output the environment data to the control system.

16. The vehicle as claimed in claim 15, having a front and a rear, wherein the sensing means comprises a first sensing means directed generally forward of the front of the vehicle and a second sensing means directed generally rearward of the rear of the vehicle.

17. The vehicle as claimed in claim 15, wherein the sensing means is arranged such that the environment data indicative of the sensed environment of the host vehicle during the first manoeuvre is indicative of a sensed environment of the host vehicle from the host vehicle when performing the first manoeuvre in a reverse orientation.

* * * * *